United States Patent [19]

Davis et al.

[11] 4,445,180
[45] Apr. 24, 1984

[54] PLANT UNIT MASTER CONTROL FOR FOSSIL FIRED BOILER IMPLEMENTED WITH A DIGITAL COMPUTER

[75] Inventors: Guy E. Davis, Martinez, Calif.; Jack R. Smith, Pittsburgh, Pa.

[73] Assignee: Westinghouse Electric Corp., Pittsburgh, Pa.

[21] Appl. No.: 413,291

[22] Filed: Nov. 6, 1973

[51] Int. Cl.³ .................... G06F 15/46; G05B 15/00; F01D 17/02
[52] U.S. Cl. .................................. 364/494; 60/646; 290/40 R; 364/139; 364/161
[58] Field of Search ............. 235/151.21; 60/39.28 R, 60/39.14, 646; 290/2, 40, 40.2, 40 A, 40 B, 40 C, 40 F; 322/14, 15, 28, 33, 34, 38, 59; 340/172.5; 444/1; 364/200, 900, 494, 139, 161

[56] References Cited

U.S. PATENT DOCUMENTS

| | | | |
|---|---|---|---|
| 3,552,872 | 1/1971 | Giras et al. | 415/17 |
| 3,555,251 | 1/1971 | Shavit | 235/151 |
| 3,561,216 | 2/1971 | Moore, Jr. | 60/73 |
| 3,564,273 | 2/1971 | Cockrell | 415/17 X |
| 3,588,265 | 6/1971 | Berry | 415/17 X |

OTHER PUBLICATIONS

Application of the Prodac 50 System to Direct Digital Control, J. C. Belz, G. J. Kirk & P. S. Radcliffe, IEEE Intl. Conv. Rec., Part 3, 1965, pp. 102–122.
Monitoring and Automatic Control in Steam Power Stations by Process Computer, E. Doetsch & G. Hirschberg, Siemens Review XXXV, (1968), No. 12, pp. 471–476.

Primary Examiner—Edward J. Wise
Attorney, Agent, or Firm—E. F. Possessky

[57] ABSTRACT

An electric power plant, including a fossil fired boiler and a steam turbine, is operated by a control system including a plant unit master. The control system includes a boiler control for determining the inputs of fuel, air and water, and a turbine control for determining the position of the throttle valves introducing steam from the boiler to the turbine. The plant unit master provides a load demand reference in parallel to the boiler control and to the turbine control, whereby the turbine and the boiler are operated in a coordinated manner. Measuring means provide indications of throttle pressure, power generated by the system and turbine rotor speed. Distinct controllers, each including a controller and responsive to one of the aforementioned indications and its corresponding reference, modify the load demand reference before it is applied to the turbine control or to the boiler control. The above-described control system including the plant unit master, boiler control and turbine control is implemented by a single digital computer.

30 Claims, 120 Drawing Figures

Microfiche Appendix Included
(4 Microfiche, 344 Pages)

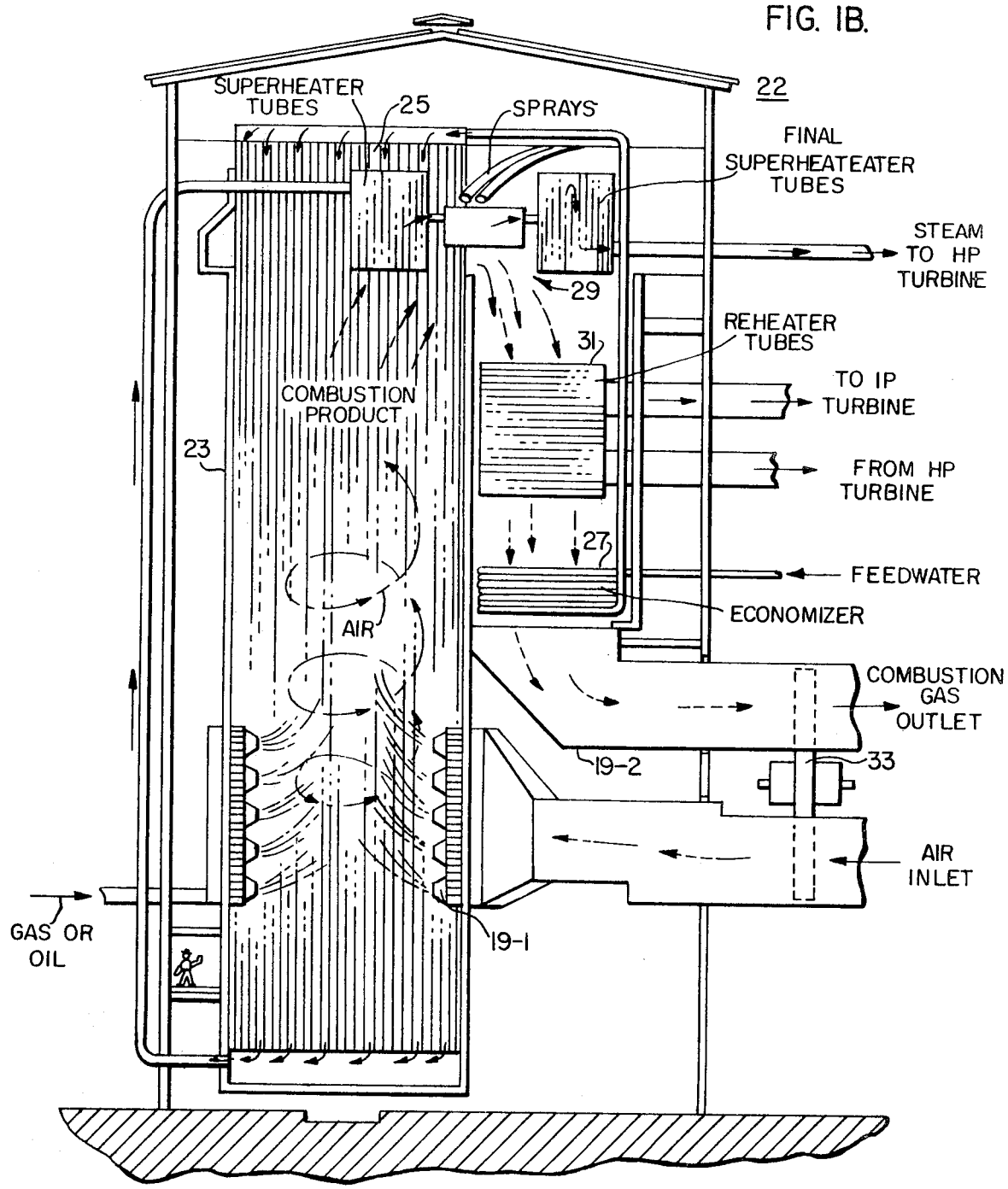
FIG. IB.

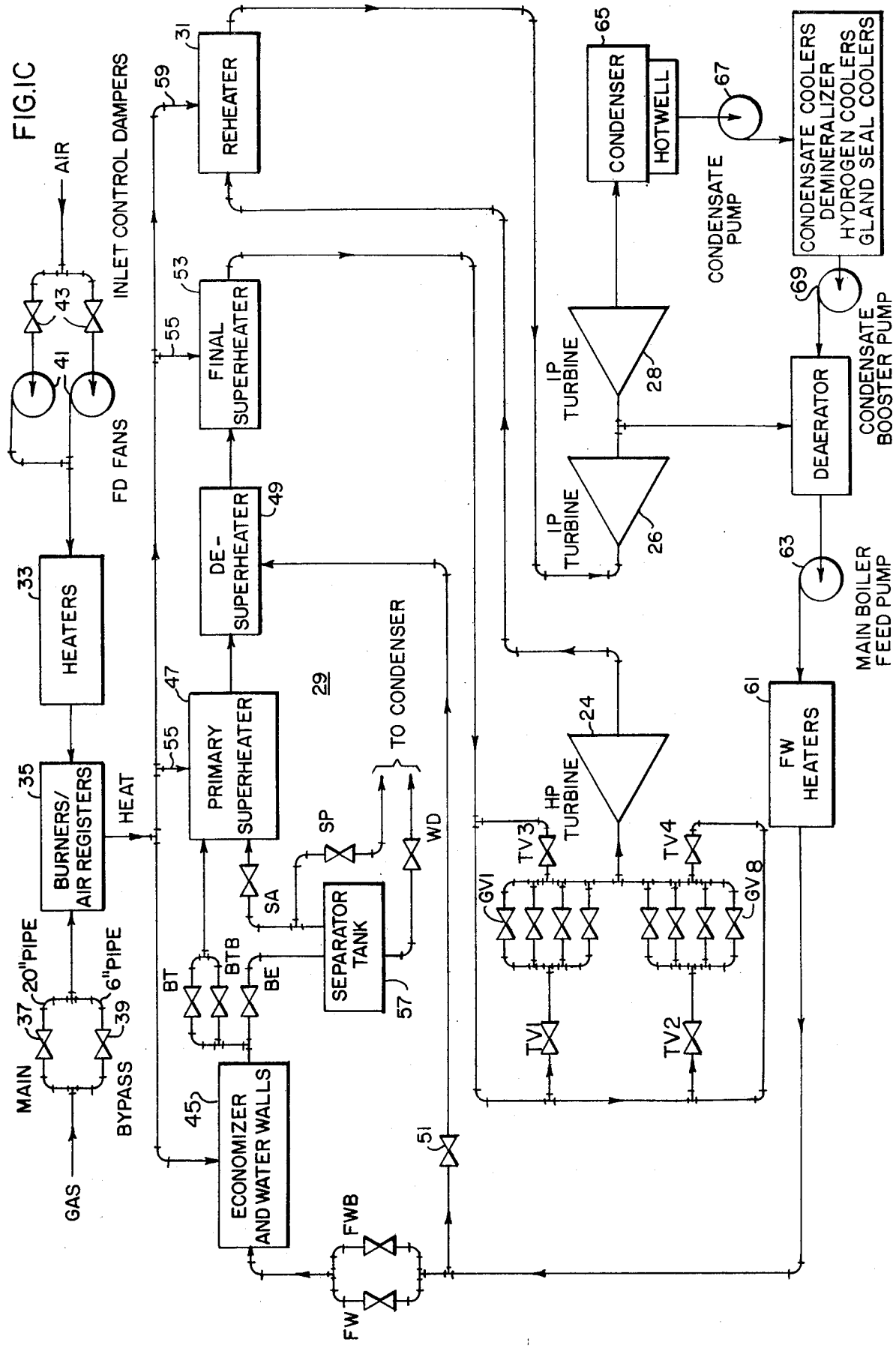

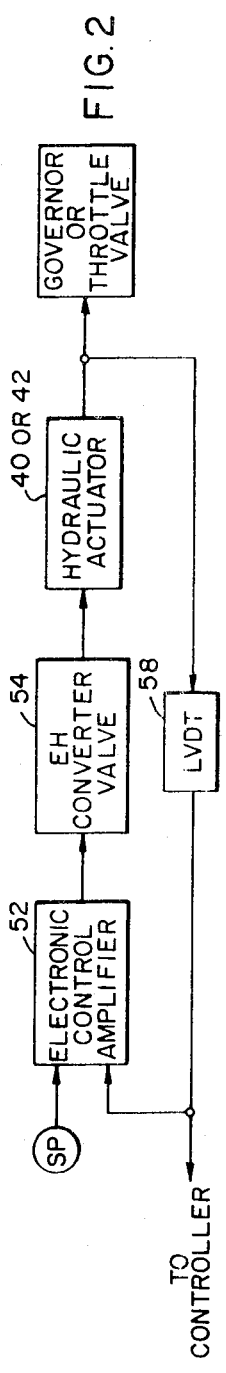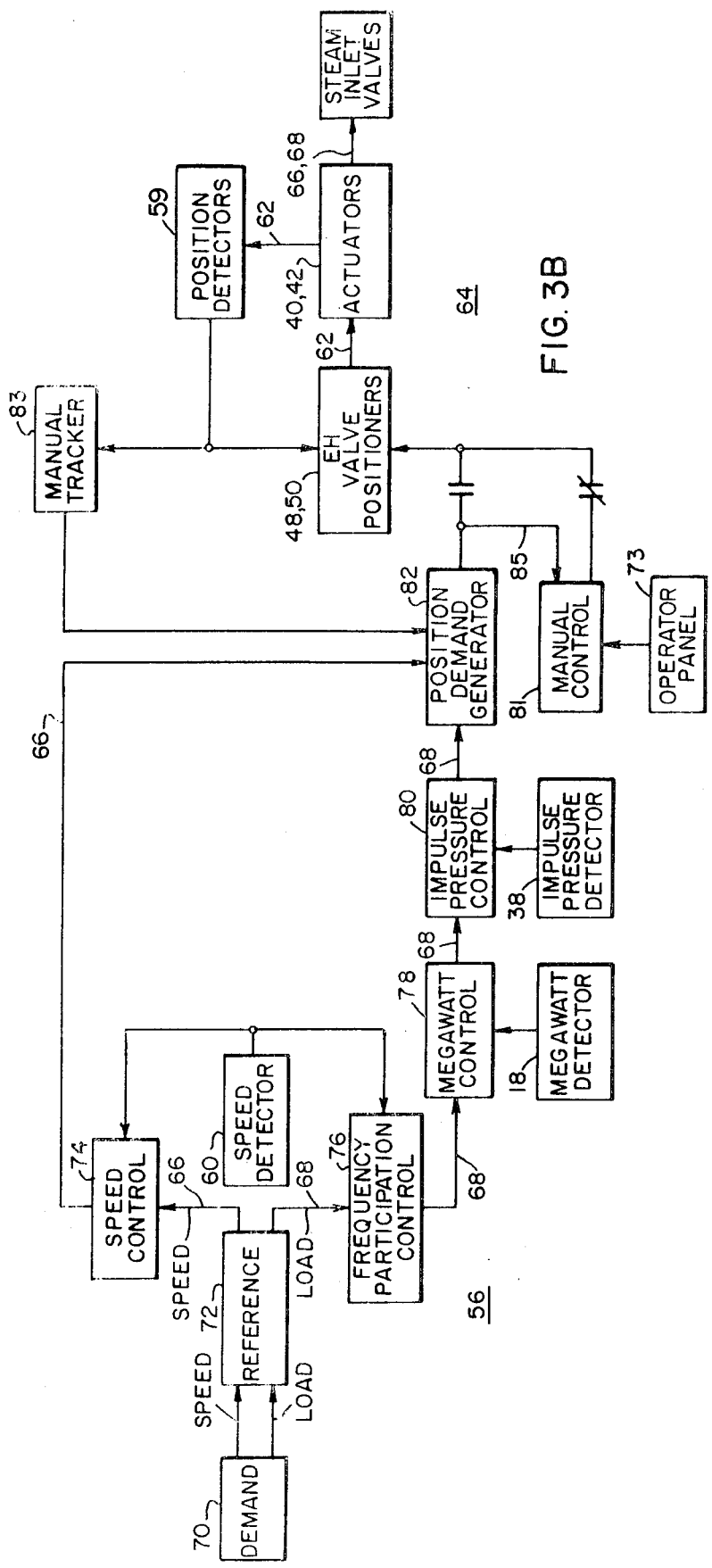

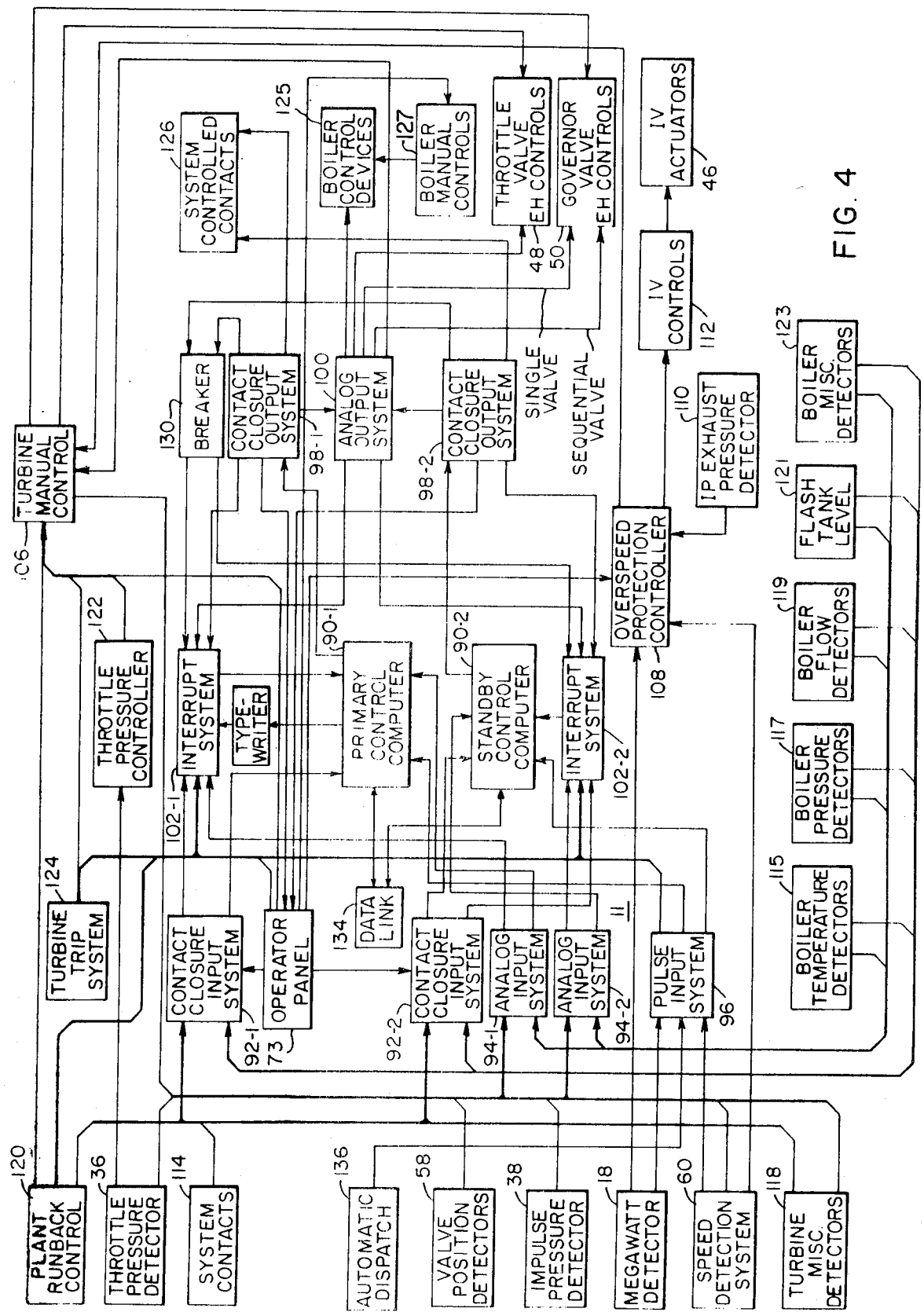

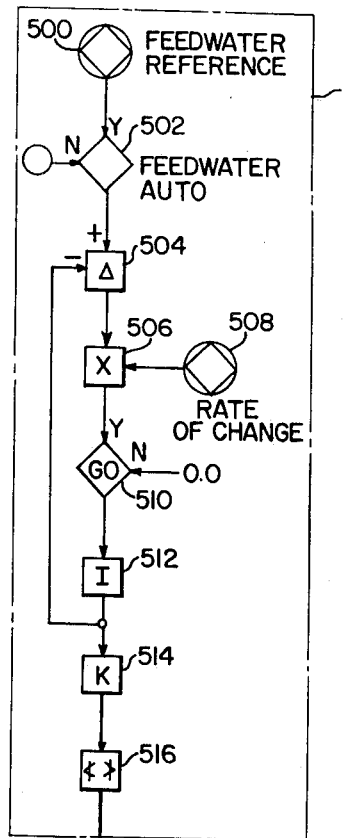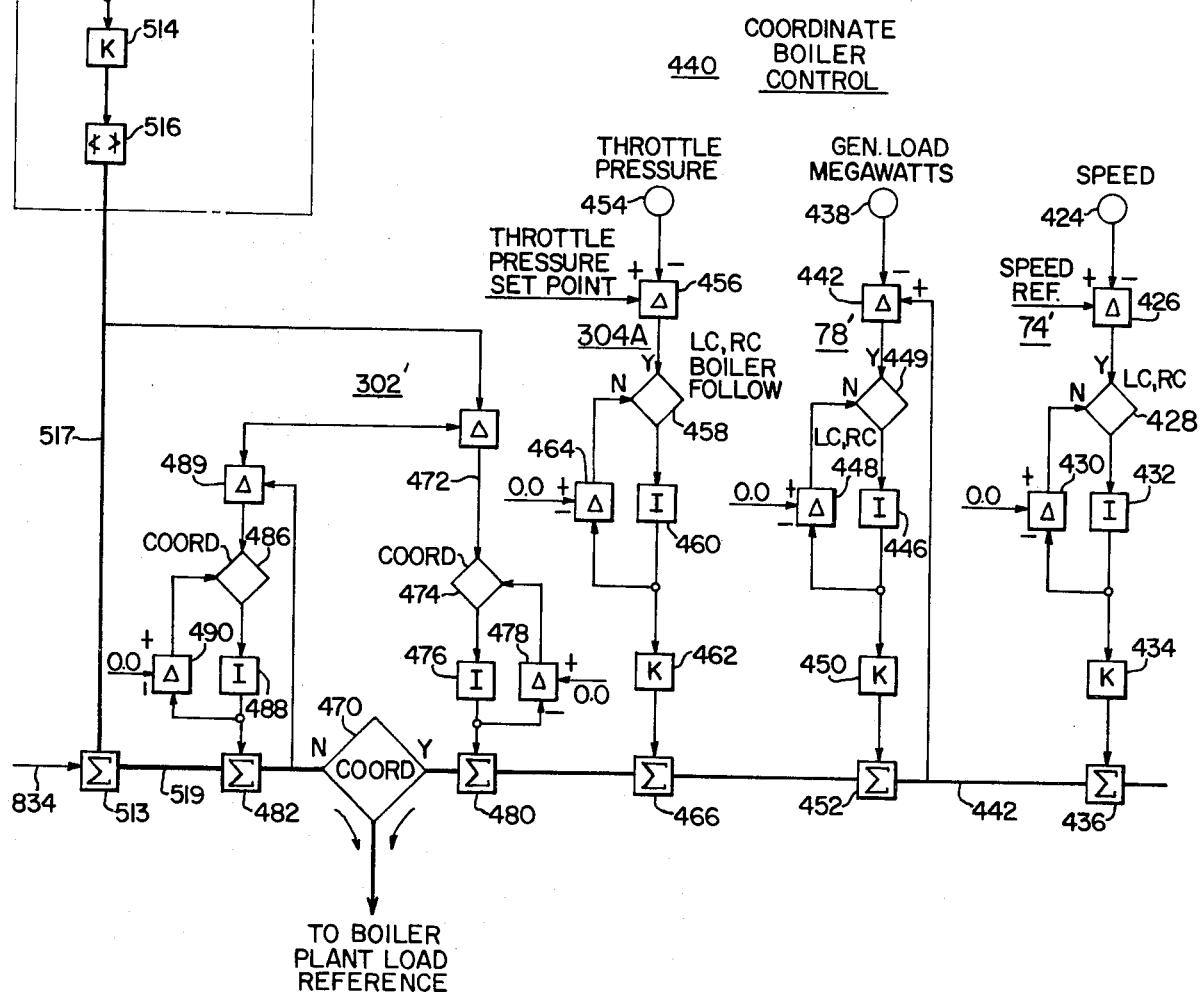
FIG.7A.

FIG. IOA

| | | | |
|---|---|---|---|
| BE VALVES | BFP 7-1 SPEED | FD FAN 7-1 DAMPER | SH SPRAY VALVE-1 |
| BTB VALVES | BFP 7-1 MIN. SPEED | FD FAN 7-2 DAMPER | SH SPRAY VALVE-2 |
| BT VALVE-1 | BFP 7-2 SPEED | FWB VALVE | ISPR VALVE |
| BT VALVE-2 | BFP 7-2 MIN SPEED | FW VALVE | RH SPRAY VALVE-1 |
| SD VALVE | IC VALVE | | RH SPRAY VALVE-2 |
| BRG CLG WTR TEMP | | | RECIRC FAN 7-1 DAMPER |
| PPE BLR CLN-UP | | | RECIRC FAN 7-2 DAMPER |
| FUEL OIL TEMP | | FUEL GAS VALVE | |
| GEN HYDROGEN TEMP | | MIN GAS VALVE | |
| COND COOLER TEMP | | FUEL OIL VALVE | |
| | | AIR REGISTER-GAS | |
| | | AIR REGISTER-OIL | |
| TURB LUBE OIL TEMP | | | |
| BFP7-2 LUBE OIL TEMP | | | |

73B

AUX. LIMIT TO MASTER LOAD DEMAND

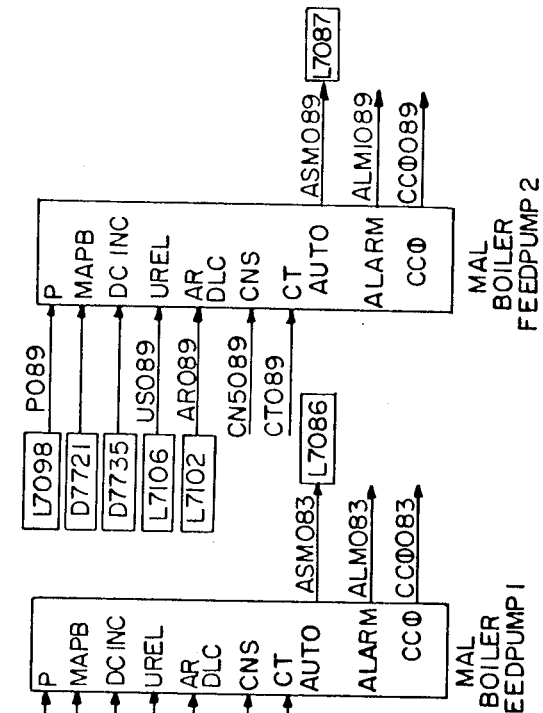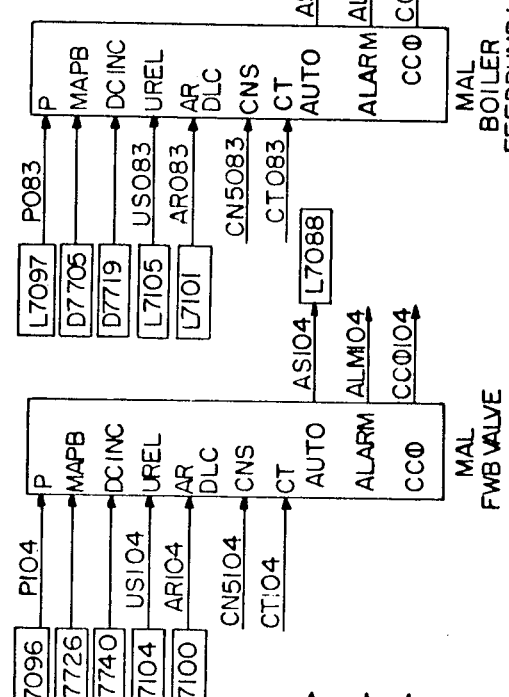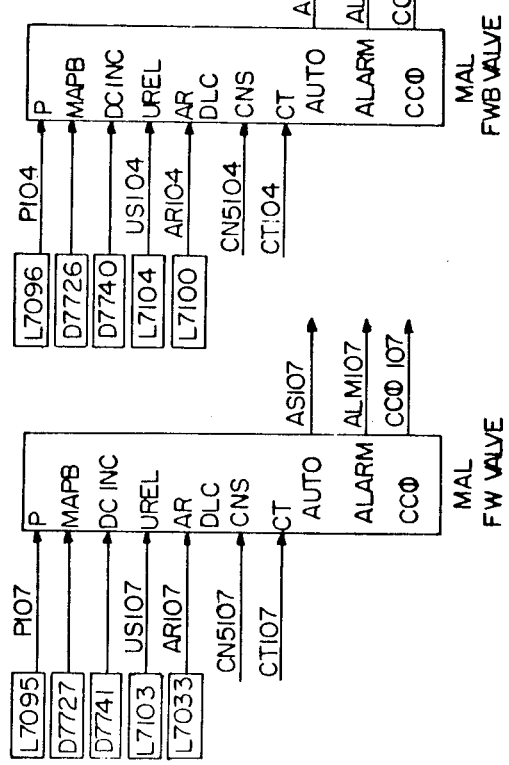
FIG. 31A. FIG. 31B. FIG. 31C. FIG. 31D.

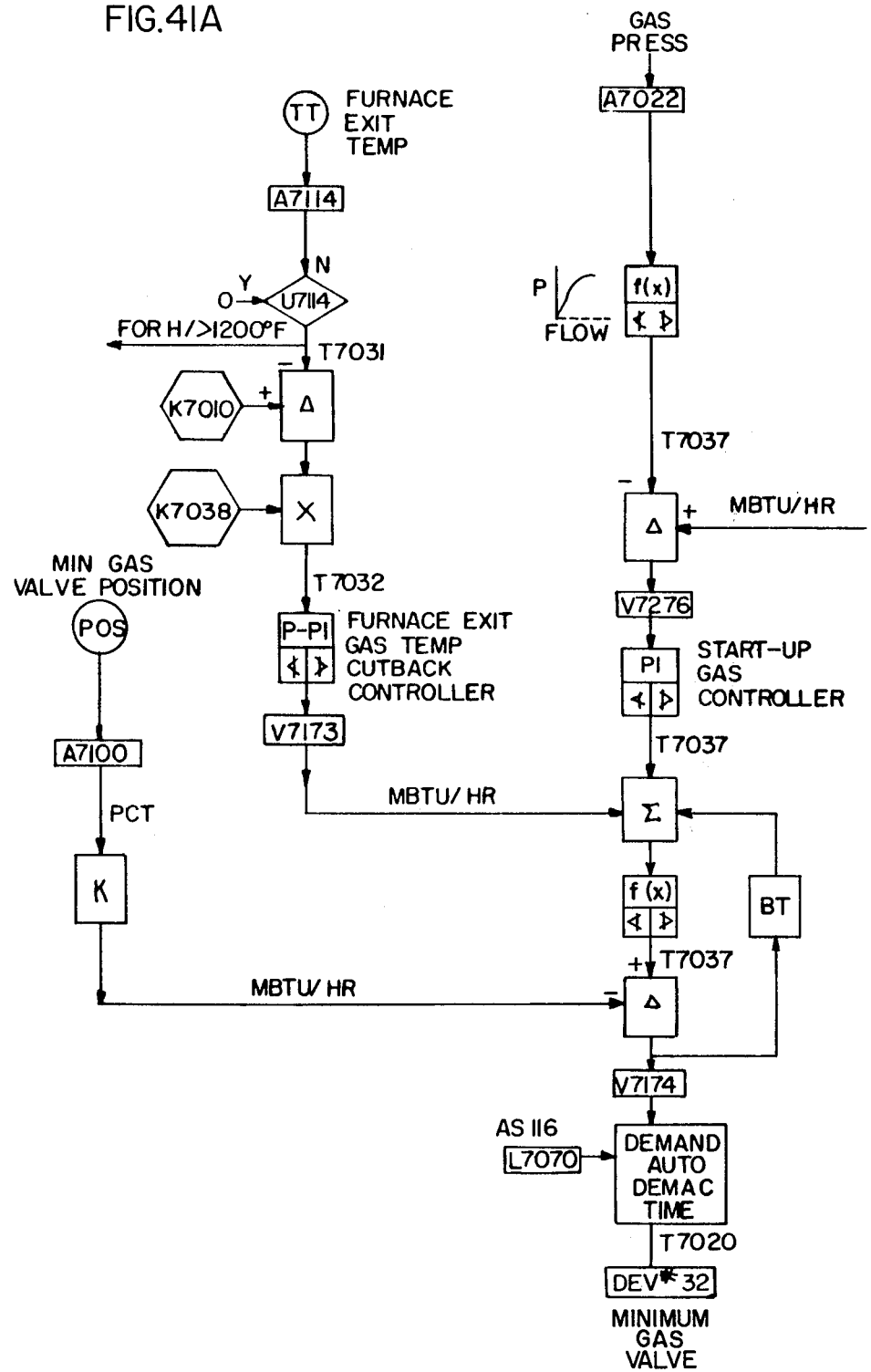

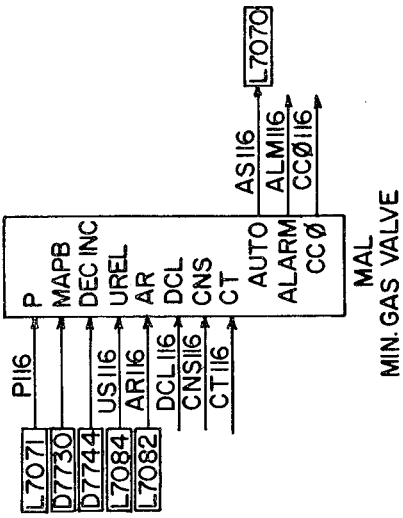
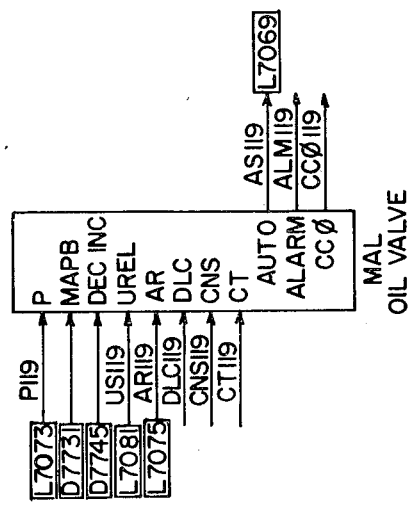
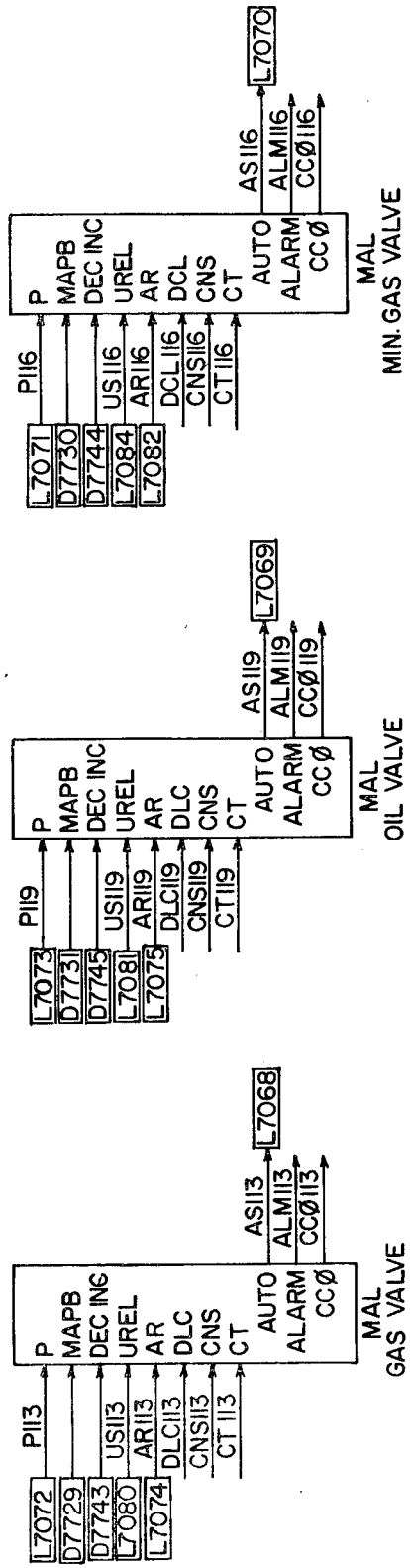
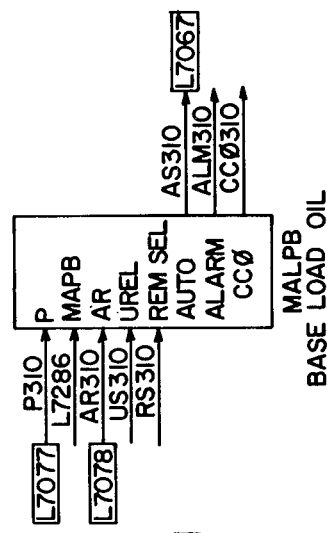
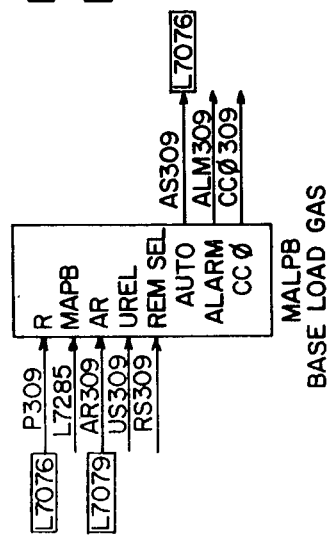

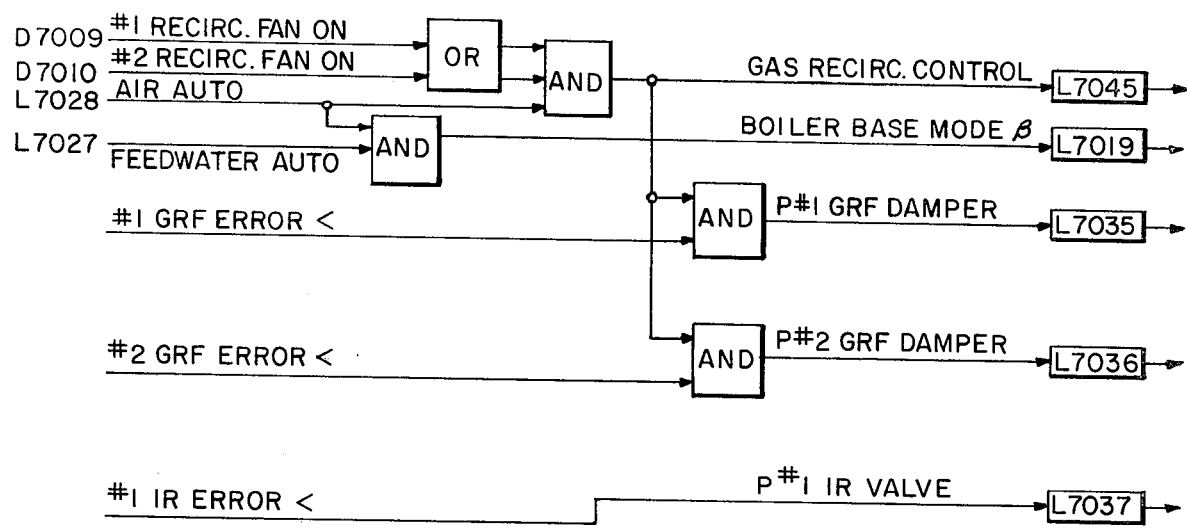
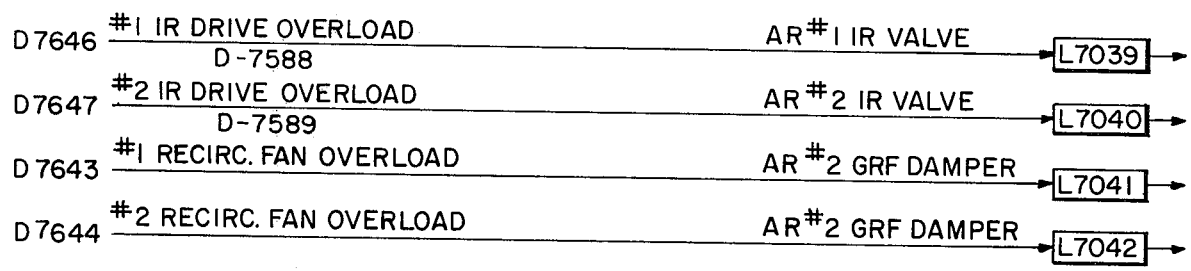
FIG. 55.

FIG. 64.
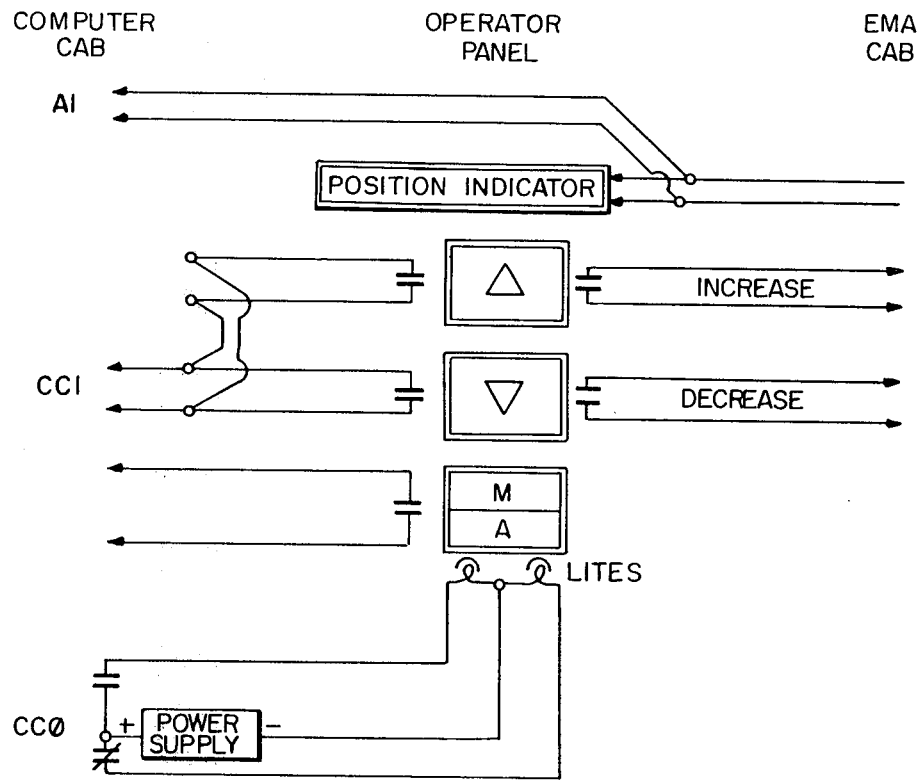
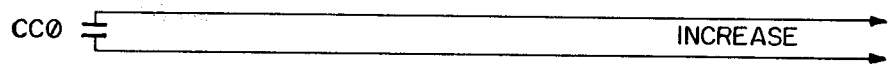
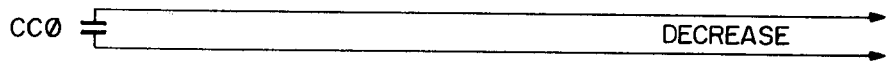
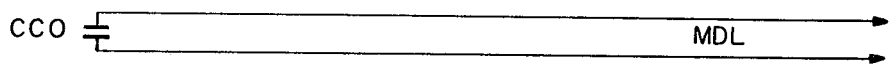
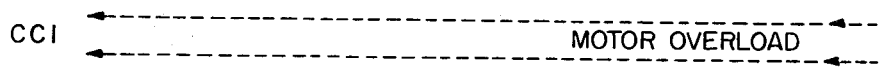

PLANT UNIT MASTER CONTROL FOR FOSSIL FIRED BOILER IMPLEMENTED WITH A DIGITAL COMPUTER

CROSS-REFERENCE TO RELATED APPLICATIONS

A Microfiche Appendix, consisting of 4 microfiche having a total of 344 frames, is included in the application.

The following co-assigned patent applications are hereby incorporated by reference:

(1) Ser. No. 250,826, entitled "A Digital Computer Monitored And/Or Operated System or Process Which Is Structured For Operation With An Improved Automatic Programming Process And System" filed by J. Gomola et al on May 5, 1972 now U.S. Pat. No. 4,257,094.

(2) Ser. No. 247,877, entitled "System And Method For Starting, Synchronizing And Operating A Steam Turbine With Digital Computer Control" filed by T. Giras et al on Apr. 26, 1972 which in turn has been abandoned in favor of a continuation application, now identified as U.S. Pat. No. 4,267,458. (3) Ser. No. 306,752, entitled "System And Method Employing Valve Management For Operating A Steam Turbine" filed by T. Giras et al on November 15, 1972 now abandoned.

(4) Ser. No. 413,275, entitled "Electric Power Plant Having A Multiple Computer System For Redundant Control of Turbine And Steam Generator Operator" filed by T. Giras, W. Mendez and J. Smith concurrently herewith now U.S. Pat. No. 4,029,952.

(5) Ser. No. 413,272, entitled "Control System With Adaptive Process Controllers Especially Adapted For Electrical Power Plant Operation" filed by G. Davis concurrently herewith now U.S. Pat. No. 3,939,328.

The following co-assigned patent applications are filed herewith and are referenced as related applications:

(1) Ser. No. 413,277, entitled "Protection System For Transferring Turbine And Steam Generator Operation To A Backup Mode Especially Adapted For Multiple Computer Electric Power Plant Control Systems" filed by G. Davis concurrently herewith now U.S. Pat. No. 3,875,384.

(2) Ser. No. 413,271, entitled "A Multiple Computer System For Operating A Power Plant Turbine With Manual Backup Capability" filed by G. Davis R. Hoover and W. Ghrist concurrently herewith now U.S. Pat. No. 3,898,441.

(3) Ser. No. 413,274, entitled "A System For Initializing A Backup Computer In A Multiple Electric Power Plant And Turbine Control System To Provide Turbine And Plant Operation With Reduced Time For Backup Computer Availability" filed by G. Davis concurrently herewith now U.S. Pat. No. 4,053,247.

(4) Ser. No. 413,278, entitled "A System For Manually Or Automatically Transferring Control Between Computers Without Power Generation Disturbance In An Electric Power Plant Or Steam Turbine Operated By A Multiple Computer Control System" filed by G. Davis concurrently herewith now U.S. Pat. No. 4,031,372.

(5) Ser. No. 413,273, entitled "Wide Load Range System For Transferring Turbine Or Plant Operation Between Computers In A Multiple Computer Turbine And Power Plant Control System" filed by G. Davis, F. Lardi and W. Ghrist concurrently herewith now U.S. Pat. No. 4,037,088.

(6) Ser. No. 413,276, entitled "Wide Speed Range System For Transferring Turbine Operation Between Computers In A Multiple Turbine Computer Control System" filed by D. Jones and G. Davis concurrently herewith now U.S. Pat. No. 4,057,715.

BACKGROUND OF THE INVENTION

Field of the Invention

1. The present invention relates to the operation of steam turbines and electric power plants and more particularly to the implementation of a plant unit master in the operation of steam turbines and electric power plants.

Description of the Prior Art

2. In the prior art, boiler and turbine controls have been engineered and installed as separate systems. Typically, the turbine control loop was designed independent of the boiler control loop and operated to control steam as required by the turbine. More specifically, the turbine control loop operated as a boiler follow system in which a load demand signal, as provided by the operator or an automatic dispatcher system (ADS), controlled the position of the turbine governor valves. The change in system steam pressure is measured to, in turn, control the input of fuel, air and water to bring the system steam pressure to a predetermined level. Since throttle or system steam pressure is a function of the boiler fuel input, the boiler and turbine tended to follow the fuel input rather than the governor valve position. Such a boiler follow system when applied to a supercritical once-through boiler, did not keep the boiler pressure above critical at all times.

Alternatively, there was suggested a turbine follow system in which the operator or ADS set a new load demand whereby the fuel, air and water inputs were respectively controlled. As the steam pressure varied, the position of the governor valve was adjusted to set the system steam pressure at a predetermined level. Though such turbine follow systems did maintain pressure at all times, their overall system response was considered poor. By attempting to maintain a constant pressure, the turbine follow system did not make maximum use of the stored energy in the boiler. Further, as larger units and greater numbers of such units were placed into service to meet ever-increasing power energy requirements, the control of power generation of each unit required improvement in order to achieve good frequency control over the entire system. In addition to systems requirements, there was a strong requirement that new methods be developed to extract energy from the boiler as well as to set limits by which the boiler could be operated safely and efficiently. As discussed in the article, "System Design Considerations for Advanced Utility Unit Control," by T. A. Rumsey and D. L. Armstrong, presented at the 14th Annual Southeastern ISA Conference, Apr. of 1968, the required improved control of power generation is efficiently accomplished by achieving a close coordination of the boiler and turbine controls. As suggested in this article, the controls for the boiler and turbine are placed in parallel in a manner similar to the boiler follow system, except that the steam pressure is varied to take advantage of the energy stored in the boiler. The turbine regulates steam pressure, but with a changing set point derived from the error between load demand and actual unit power output. If the load demand is higher than the actual unit power output, the signal applied to the pressure controller calls for a lower steam pressure, thus opening the governor valve and temporarily increasing megawatts as the pressure drops. The same signal applied to the pressure controller effecting a lower pressure in response to detection of a megawatts output below the required demand level, increases the boiler inputs (water, air and fuel). This control action continues until the megawatt error is zero, at which time the steam pressure is at its normal value. Such integrated control techniques have been applied to once-through, supercritical boilers and to drum-type subcritical boilers.

A significant aspect of the integrated control of turbines and boilers is the use of feed forward control techniques to minimize interaction and to extract the best possible dynamic response. Generally, such feed forward control is effected by applying load demand signals from either the ADS, a computer, or a manual operator control, simultaneously to the boiler and turbine. The advantages of such a control means that subloop process changes are made simultaneously with load changes before subloop errors exist. Feedback controllers are used as a final trim on the process subloop to correct for minor non-linearities and static effects. As a result, it is possible to extract more efficiently energy from the boiler of an individual unit, whereas on a system level, each of a plurality of units may be operated so as to maintain system frequency integrity.

From the general concept of applying load demand signals from a common source (termed herein, the plant unit master) simultaneously to the turbine and boiler, there has developed more sophisticated control systems employing this basic technique, whereby the boiler-turbine control functions are closely coordinated. For example, such a coordinated control may include adjustments for the high limit, low limit and rate of change of limits for various turbine-boiler control parameters such as load, system steam pressure, and fuel inputs. Further, there is provision for run-back and run-up in response to some abnormal condition in the plant auxiliaries, so that the unit will be operated safely and within the capability of the auxiliaries in service. As will be elaborated upon below, coordinated control also provides for transferring to any of a number of desired modes of operation.

As explained above, the basic concept of integrated control is to apply simultaneously load demand signals to the boiler control system and to the turbine control system in a feed forward manner whereby minor or trim corrections are made in response to detection of throttle pressure error, megawatt error, and frequency bias. In particular, the measured throttle pressure is compared to a reference level determined by a set point to provide the throttle pressure error, which subsequently is inntegrated and applied to the turbine control. The throttle pressure error signal serves to adjust the load set point. The output of the turbine is measured and compared with a reference to provide megawatt error, which is integrated and also is used in combination with the throttle pressure error signal to set the air and fuel inputs to the boiler.

During steady state operation, the megawatt generation is proportional to the fuel input. More specifically, the integrated generation error adjusts the throttle pressure set point to permit more effective transfer of the stored energy in the boiler to the turbine. This transfer of stored eneregy may be seen more readily from a specific example of operation. Where an increasing load demand is applied, the throttle pressure and the megawatt generation will be low. Under these conditions, the throttle pressure set point is increased by an amount proportional to generation error, whereby the energy stored in the boiler will be transferred to the turbine to increase its power generation. At the same time, the boiler inputs of air, fuel and water are increased momentarily to likewise increase the throttle pressure, which is lowered momentarily as the governor valves are opened to permit greater steam flow.

In effecting turbine control, the ratio of impulse chamber pressure to throttle pressure is used in that it is a more accurate indication of valve area, which is linear with load when operating at rated pressure. The turbine load demand is summed with the integrated throttle pressure error signal and a signal indicative of the ratio of the impulse chamber pressure to throttle pressure. The error signal then is used to adjust the position of the control valves directing steam into the turbine.

A frequency bias is provided as a function of speed error derived between a reference speed level signal and the measured rotational speed of the turbine. The frequency bias is applied to the turbine and boiler control systems to permit the entire unit to share properly in frequency control by increasing or decreasing the boiler and turbine load demand signals as required. In particular, the frequency bias is applied to adjust the megawatt error signal, which in turn controls the boiler inputs. In the turbine control, the frequency bias similarly adjusts the valve position error signal.

Thus, it can be seen that by coordinated control of the turbine and boiler, no significant time delays are introduced between the increase of boiler inputs and a corresponding change of pressure. In non-integrated systems of control, first the turbine would be adjusted and then the boiler. By contrast, the integrated mode of operation permits both the turbine and boiler to be controlled at once, whereby greater overall system frequency control is achieved, and a more efficient transfer of the energy from the boiler to the turbine is provided.

In addition to the steady state mode of operation (local and remote coordinated), the following modes of operation are available to start up the unit as well as to provide for certain abnormal contingencies:

(1) Plant Start
(2) Go
(3) Ramp
(4) Coordinated Turbine Follow
(5) Coordinated Boiler Follow
(6) Boiler Manual
(7) Remote Coordinated
(8) Local Coordinated The Plant Start Mode is an automatic mode, not selected by the operator, and is an initial mode of operation in which the turbine and boiler are prepared individually to operate together for generating power. The boiler is lighted off and fired under the control of the operator, while the inputs are controlled selectively. Further, it is necessary to supply input to the boiler to provide a predetermined pressure and to preheat the turbine under controlled conditions as by slowly rotating the turbine and by supplying steam from an auxiliary source, to prepare the turbine to receive the boiler steam. More specifically, the turbine is unlatched and rotated by a turning gear while steam is supplied under controlled conditions through gland seals, an appropriate pull vacuum is established, and the drain valves are opened to a predetermined condition, whereby the temperature of the turbine is gradually brought up to a predetermined level. Further, the desired terminal speed and acceleration are set by the operator.

Having established the proper boiler steam and turbine conditions, the operator initiates a Go Mode, wherein the unit master directs a speed error signal only to the turbine. The signal applied to the boiler controls is held constant at a predetermined value corresponding to load. The turbine accelerates to the preset terminal speed at a preset acceleration by wide-range speed control operation of the turbine throttle valve. When the turbine has arrived at th preset speed, transfer will be made from full-arc to partial-arc control of the valves. During further operation, the throttle valves are set wide open, while the turbine governor valves are set to control steam flow to the turbine. At this point, the turbine has been brought to near-rated speed and after suitable operator checks, the main circuit breaker may be closed and the governor valves are disposed quickly to a position that will result in a predetermined percentage of load at the existing steam condition.

The Ramp Mode is the first truly coordinated mode in which the boiler and turbine are operated together to control the gradual build-up of the system steam pressure and to control the heating rate of the turbine to avoid placing undue stress on the turbine parts. In a first step, throttle pressure is increased to its rated value while the turbine governor valves are held at an essentially constant position. During this initial stage, a transfer signal is generated to be combined with a load reference signal derived from the plant unit master, whereby the governor valves are maintained in a nearly fixed position. In another method of controlling the boiler, the steam pressure as controlled by the throttle valves and the boiler firing are increased along a ramp to a predetermined load level. The second, ramping phase is performed automatically by setting the ramp rate and the ramp end point in load. In particular, a reference ramp signal is generated according to the ramp rate and the ramp end point to define the pressure set point, which is compared with the measured throttle pressure to provide a pressure error signal; the pressure error signal is integrated and applied as an input to the automatic governor valve controls. At this time, the boiler master is in an Automatic Mode, whereby the plant unit master output becomes the boiler demand signal. Thus, as the demand signal increases along a ramp, the boiler firing increases thereby to increase the throttle pressure along a similar ramp. In the Ramp Mode, the megawatt error signal is not used to provide boiler control.

At the termination of the Ramp Mode, the plant unit master automatically reverts to a "hold" condition in preparation for being operated in the Remote or Local Coordinated Mode, as generally explained above. The operator effects the transitions by setting the desired load share with respect to the remaining units of the system and then initiates the transfer to either the Local Coordinated Control Mode, wherein the operator has direct control over the unit load demand, or to the Remote Coordinated Control Mode, wherein the unit load demand is controlled either by an automatic dispatching system (ADS) or a computer.

The Boiler Manual Mode permits the operator to control the boiler independently of the plant unit master, which continues to provide demand signals to the turbine. This mode is particularly useful in the initial firing of the boiler.

In the event of certain abnormal conditions, the plant unit master automatically transfers to either a Coordinated Boiler Follow Mode or to a Coordinated Turbine Follow Mode. More specifically, if an unusual turbine condition develops, the plant unit master automatically transfers to the Boiler Follow Mode wherein the operator determines the load demand at a predetermined, constant governor value setting and as a result, the governor values are set to a predetermined position. Thus, the inputs to the boiler are controlled to derive, in turn, a desired throttle pressure. If unusual boiler conditions develop, the Coordinated Turbine Follow Mode is automatically set, wherein the boiler is set to operate according to predetermined limits and the governor valves are adjusted to maintain substantially constant pressure.

The plant unit master includes a digital reference for the electrohydraulic governing system, which sets the operational capability for the plant unit master in terms of the set points and limits for turbine and boiler operation. Such a digital reference is further described in a paper entitled, "Electrohydraulic Control for Improved Availability and Operation of Large Steam Turbines", and presented by M. Birnbaum and E. G. Noyes to the ASME-IEEE National Power Conference, September 1965. It also has the ability to receive digital or analog signals for back-up purposes. Further, the digital reference system generates the load demand for on-line and off-line modes of plant operation, whereby the number of operating stations is minimized. In particular, limit, run-back and run-up signals are applied to the digital reference system. The limit signals confine the load demand signal derived from the plant unit master to protect the system when abnormal conditions develop in the auxiliaries. For example, if one of the water or oil pumps becomes inoperative for any reason, a predetermined limit is disposed upon the load demand signal. Run-back signals reduce the unit demand signal from the digital reference to a safe value corresponding to the availability of fuel, water, air and generator coolant. Run-up signals are used to increase the unit demand signal from the digital reference to correspond to the minimum level of energy generation by the boiler. For example, the boiler burners may require a certain minimum fuel requirement to provide a minimum power output, which must be absorbed by the remaining part of the generating unit.

The basic plant unit master or coordinated techniques as described above, have been adapted to the use of electric power plants operated by steam turbines for which the steam supply is provided by a nuclear boiling water reactor, as described in U.S. Pat. No. 3,630,839 of Podolsky. The modifications to the coordinated control from that described above primarily relate to the boiling water nuclear reactor, the power operating level of which is determined in part by the accumulation of steam voids on the heat transfer surfaces thereof. In a boiling water nuclear reactor, the nuclear fuel is structured with a suitable geometry to provide for a sustained chain nuclear reaction as the coolant water passes through the fuel arrangement. The nuclear fuel is contained within a plurality of elongated metallic tubes, which form the reactor core. The coolant flow is directed about the metallic tubes of the reactor core; as a result, the design of the core with respect to eliminating void accumulation on the surface of the tubes is significant. In this regard, it is desirable to operate the turbine inlet valves to determine the turbine and generator load level subject to the pressure regulating demands of the reactor. Further, the steam turbine energization level is determined by the flow of the turbine inlet steam which, in turn, is determined by the steam conditions at the outlet of the steam source and by the steam inlet valve positioning.

In such nuclear boiling water reactors, a steam bypass system is provided to direct the steam flow from the reactor output to the plant condenser. In the Start-Up and Shut-Down Modes of operation, it is necessary to control the amount of steam pressure supplied to the turbine; the steam bypass system redirects the excess steam not required by the turbine to the condenser.

The coordinated control as described in the noted patent provides back-up speed control uniformly without dependence on turbine operating level, by applying a load demand signal as derived from a digital reference system to the reactor control system and to the electrohydraulic inlet valve control system. Further, a speed error signal signifying the difference between a speed reference signal and the measured speed of the turbine, is applied also to the reactor control system and to the electrohydraulic inlet valve control system, to efficiently control turbine acceleration during Start-Up, frequency participation during the Load Mode of operation and turbine deceleration during Shut-Down. The measured values of throttle pressure, megawatts and the ratio of impulse pressure to throttle pressure are used in a manner very similar to that described above. With particular regard to the water reactor-steam turbine operation, improved performance results from the operation of the pressure control system to control a bypass valve function generator to generate a signal to control the bypass valve system, whereby the excess steam not needed by the turbine during load control is diverted directly to the condenser. The bypass valve energizing signal is limited by the detected impulse pressure.

In such coordinated control systems, the various functions described were implemented in a manner in which the coordinated control could be considered distinct from that of the boiler control and the turbine control. As explained above, the digital refernce receives for the purpose of coordinated control, the run-up, run-back and limit signals to ensure the safe operation of the turbine, boiler and auxiliaries. In view of the increasing power demands placed upon large generating systems, it becomes increasingly important to avoid unit failure. Though the availability of large once-through supercritical units does provide for relatively increased power generation, their increased size has resulted in an increase in their failure and lack of availability to the power system. Their relatively poor record of availability is due in part to their complexity, requiring increased control hardware. Thus, it is highly desirable to integrate the control system even further, whereby the various safety limits, and other control and limit signals are available to each of the control functions of the coordinated system. In this regard, the present analog coordinated systems require additional hardware to adjust or scale the various values before being applied from one control section to the next. In such analog systems, the limits as stored in the plant unit master are available to one of, but not both, the turbine and boiler control systems, at a single instant in time. Further, improved coordinated control is needed to ensure faster response of the entire turbine-boiler system whereby efficient, rapid load and speed control may be assured.

SUMMARY OF THE INVENTION

It is therefore an object of this invention to provide an improved electric power plant control wherein the response to measured power plant variables is achieved more positively and/or more quickly than that capable of being achieved by the prior art analog plant unit master control systems.

It is a further object of this invention to provide a new and improved power plant control wherein the control operations may be carried out flexibly in that the gain and/or time constant may be set selectively as a function of the control operation performed.

It is a still further object of this invention to provide an electric power plant control wherein the plant unit master, the turbine and boiler controls are implemented by a single computer.

In accordance with these and other objects, there is provided an electric power plant comprising one or more turbines and a fossil fired boiler, and a control system for operating the turbines and the boiler in a coordinated fashion. More specifically, there is included a turbine control responsive to an electrical representation of load demand reference for operating the boiler to meet the load demand reference, an electrohydraulic control system for operating the turbine valves to direct steam from the fossil fired boiler to the turbine, and a boiler control responsive to the electrical representation of the load demand reference for controlling the operation of the electrohydraulic control system to direct steam to the turbine so that the turbine meets the plant load reference. In order to operate the boiler and turbine control in a coordinated manner, there is provided a plant unit master for providing the electrical representation of the load demand in parallel to the turbine and boiler controls. The plant unit master is responsive to measured representations of throttle pressure, generated power and turbine rotor speed, to modify or trim the load demand reference before it is applied to the boiler and turbine controls. In particular, the plant unit master includes a plurality of control loops, each distinct and responsive to a difference between the measured representation of throttle pressure, generated power and turbine rotor speed and a corresponding reference value, to modify the load demand reference to be applied to the boiler control. A further control loop responsive to the difference between the measured representation of throttle pressure and a throttle pressure reference, modifies the load demand reference to be applied to the turbine control. Each of the aforementioned control loops is distinct, including an integrating controller capable of being operated with varying constants dependent upon the mode of operation of the plant unit master.

In a further aspect of this invention, the integrating controllers may be adapted to carry out certain algorithms, whereby the operation of the control system may be achieved in a more positive manner. In particular, as the plant unit master transitions between modes of operation, selected of the integrating controllers are operated in a linear fashion. Further, the control system of this invention includes certain function generators, wherein it is desired to generate a linear signal ramping to a specified value, at a given rate.

In a still further aspect of this invention, it is desired to implement the above-described plant unit master, as well as the turbine and boiler controls, within a single computer.

BRIEF DESCRIPTION OF THE DRAWINGS

These and other objects and advantages of the present invention will become more apparent by referring to the following detailed description and accompanying drawings, in which:

FIG. 1B shows a schematic view of a once-through boiler employed in the plant of FIG. 1A, with portions of the boiler cut away;

FIG. 1C shows a process flow diagram for the electric power plant of FIG. 1A;

FIG. 2 shows a schematic block diagram of a position control loop for electrohydraulic valves employed in a turbine included in the plant of FIG. 1A;

FIG. 3B shows a control loop diagram for the steam turbine in the electric power plant of FIG. 1A;

FIG. 4 shows a schematic diagram of apparatus employed in a control system for the steam turbine and the once-through boiler of the electric power plant of FIG. 1A;

FIGS. 31A, B, C and D relate to feedwater flow logic;

FIGS. 40A and 40B, 41A and 41B, 42 and 43 relate to fuel control;

FIGS. 44A and 44B, 45 and 46A to E relate to fuel control logic;

FIGS. 55 and 56 relate to reheat temperature control logic;

FIG. 64 relates to AMID station;

DESCRIPTION OF THE PREFERRED EMBODIMENT

Electric Power Plant and Steam Turbine System

Figure 1A:
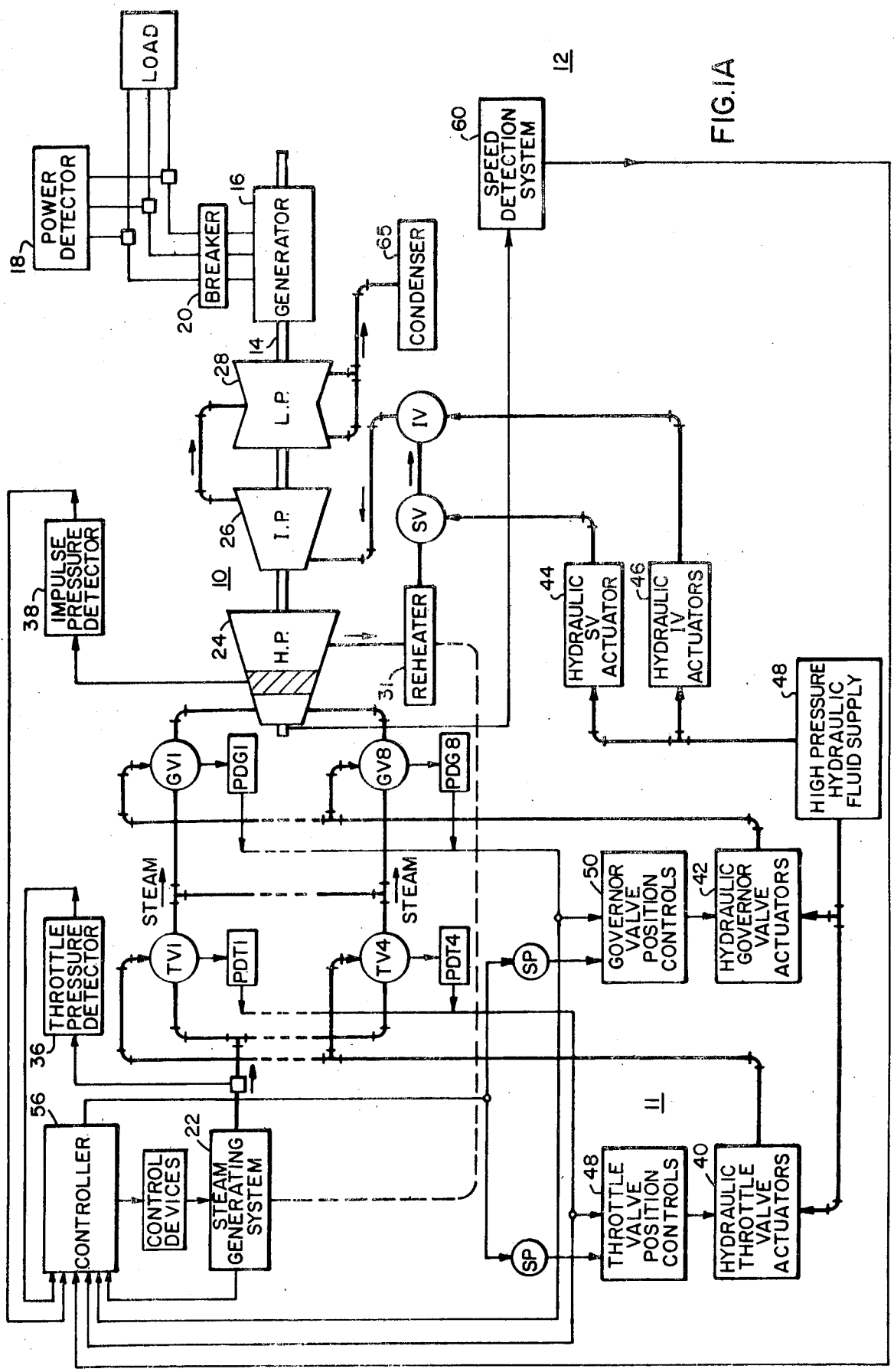
FIG. 1A shows a schematic block diagram of an electric power plant which is operated by a control system in accordance with the principles of the invention.

More specifically, there is shown in FIG. 1A a large single reheat steam turbine 10 and a steam generating system including a boiler 22 constructed in a well known manner and operated by a control system 11 in an electric power plant 12 in accordance with the principles of the invention. The turbine 10 and the turbine control functions are like those disclosed in the cross-referenced Uram copending patent application Ser. No. 247,877 entitled "Sytem For Starting, Synchronizing and Operating a Steam Turbine With Digital Computer Control" which in turn has been abandoned in favor of a continuation application, now identified as U.S. Pat. No. 4,267,458.

The turbine 10 is provided with a single output shaft 14 which drives a conventional large alternating current generator 16 to produce three-phase electric power sensed by a power detector 18. Typically, the generator 16 is connected through one or more breakers 20 per phase to a large electric power network and when so conected causes the turbo-generator arrangement to operate at synchronous speed under steady state conditions. Under transient electric load change conditions, system frequency may be affected and conforming turbo-generator speed changes would result if permitted by the electric utility control engineers.

After synchronism, power contribution of the generator 16 to the network is normally determined by the turbine steam flow which in this instance is normally supplied to the turbine 10 at substantially constant throttle pressure. The constant throttle pressure steam for driving the turbine 10 is developed by the steam generating system 22 which in this case is provided in the form of a conventional once through type boiler operated by fossil fuel in the form of natural gas or oil. The boiler 22 specifically can be a 750 MW combustion engineering supercritical tangentially fired gas and oil fuel once through boiler.

In this case, the turbine 10 is of the multistage axial flow type and it includes a high pressure section 24, an intermediate pressure section 26, and a low pressure section 28 which are designed for fossil plant operation. Each of the turbine sections may include a plurality of expansion stages provided by stationary vanes and an interacting bladed rotor connected to the shaft 14.

As shown in FIG. 1B, the once-through boiler 22 includes walls 23 along which vertically hung waterwall tubes 25 are distributed to pass preheated feedwater from an economizer 27 to a superheater 29. Steam is directed from the superheater 29 to the turbine HP section 26 and steam from the HP section 26 is redirected to the boiler 22 through reheater tubes 31 and back to the turbine IP section 26. The feedwater is elevated in pressure and temperature in the waterwall tubes 25 by the heat produced by combustion in approximately the lower half of the furnace interior space.

Five levels of burners are provided at each of the four corners of the furnace. The general load operating level of the plant determines how many levels of burners are in operation, and the burner fuel flow is placed under control to produce particular load levels. At any one burner level, both gas and oil burners are provided but only one type of burner is normally operated at any one time.

Combustion air is preheated by the exhaust gases and enters the furnace near the furnace corners through five inlet ducts 19-1 under the driving force of four large fans. Air flow is basically controlled by positioning of respective dampers in the inlet ducts.

Hot products of combustion pass vertically upward through the furnace to the superheater 29. The hot exhaust gases then pass through the reheater tube 31 and then through the feedwater economizer 27 and an inlet air heat exchanger 33 in an exhaust duct 19-2 prior to being exhausted in the atmosphere through a large stack.

In FIG. 1C, there is shown a schematic process flow diagram which indicates how the plant working fluid is energized and moved through the turbine 10 to operate the generator 16 and produce electric power. Thus, gas or other fuel is supplied to burners 35 through main valves 37 or bypass valves 39. Air for combustion is supplied through the preheaters 33 and air registers to the combustion zone by fans 41 under flow control by dampers 43.

Feedwater is preheated by heaters 61 and flows under pressure produced by boiler feedwater pumps 63 to the economizer 27 and waterwall tubes 25 through valve FW or startup valve FWB. Heat is transferred to the working fluid in the economizer 27 and waterwall tubes 25 as indicated by the reference character 45. Next, the working fluid flows to the superheater 29 comprising a primary superheater 47, a desuperheater 49 to which cooling spray can be applied through a valve 51, and a final superheater 53. Heat is added to the working fluid as indicated by the reference character 55 in the superheaters 29. Valves BT and BTB pass the working fluid to the superheater 29 after boiler startup, and valves BE, SA, ST and WD cooperate with a separator tank 57 and a condenser 65 (see FIG. 1A) to separate steam and water flows and regulate superheater working fluid flow during boiler startup.

Boiler outlet steam flows from the final superheater 53 through the turbine inlet throttle valves TV and governor valves GV to the turbine HP section 24. The steam is then reheated in the reheater 31 as indicated by the reference character 59 and passed through the IP and LP turbine sections 26 and 28 to the condenser 65. Condenser pumps 67 and 69 then drive the return water to the boiler feed pump 63 through condensate and hydrogen cooling systems, and makeup water is supplied through a demineralizer treatment facility.

As seen in FIGS. 1A and C, the fossil turbine 10 in this instance employs steam chests of the double ended type, and steam flow is directed to the turbine steam chests (not specifically indicated) through four main inlet valves or throttle inlet valves TV1-TV4. Steam is directed from the admission steam chests to the first high pressure section expansion stage through eight governor inlet valves GV1-GV8 which are arranged to supply steam to inlets arcuately spaced about the turbine high pressure casing to constitute a somewhat typical governor valve arrangement for large fossil fuel turbines. Nuclear turbines on the other hand typically utilize only four governor valves. Generally, various turbine inlet valve configurations can involve different numbers and/or arrangements of inlet valves.

In applications where the throttle valves have a flow control capability, the governor valves GV1-GV8 are typically all fully open during all or part of the startup process and steam flow is then varied by full arc throttle valve control. At some point in the startup and loading process, transfer is normally and preferably automatically made from full arc throttle valve control to full arc governor valve control because of throttling energy losses and/or reduced throttling control capability. Upon transfer, the throttle valves TV1-TV4 are fully open, and the governor valves GV1-GV8 are positioned to produce the steam flow existing at transfer. After sufficient turbine heating has occurred, the operator would typically transfer from full arc governor valve control to partial arc governor valve control to obtain improved heating rates.

In instances where the main steam inlet valves are stop valves without flow control capability as is often the case in nuclear turbines, initial steam flow control is achieved during startup by means of a single valve mode of governor valve operation. Transfer can then be made to sequential governor valve operation at an appropriate load level.

In the described arrangement with throttle valve control capability, the preferred turbine startup and loading method is to raise the turbine speed from the turning gear speed of about 2 rpm to about 80% of the synchronous speed under throttle valve control, then transfer to full arc governor valve control and raise the turbine speed to the synchronous speed, then close the power system breakers and meet the load demand with full or partial arc governor valve control. On shutdown, governor valve control or coastdown may be employed. Other throttle/governor valve transfer practice may be employed but it is unlikely that transfer would be made at a loading point above 40% rated load because of throttling efficiency considerations.

Similarly, the conditions for transfer between full arc and partial arc governor valve control modes can vary in other applications of the invention. For example, on a hot start it may be desirable to transfer from throttle valve control directly to partial arc governor valve control at about 80% synchronous speed.

As shown in FIG. 1A, the steam has crossed past the first stage impulse blading to the first stage reaction blading of the high pressure section 24, it is directed to the reheater 31 as previously described. To control the flow of reheat steam, one or more reheat stop valves SV are normally open and closed only when the turbine is tripped. Interceptor valves IV (only one indicated), are also provided in the reheat steam flow path.

A throttle pressure detector 36 of suitable conventional design senses the steam throttle pressure for data monitoring and/or turbine or plant control purposes. As required in nuclear or other plants, turbine control action can be directed to throttle pressure control as well as or in place of speed and/or load control.

In general, the steady state power or load developed by a steam turbine supplied with substantially constant throttle pressure steam is proportional to the ratio of first stage impulse pressure to throttle pressure. Where the throttle pressure is held substantially constant by external control, the turbine load is proportional to the first stage impulse pressure. A conventional pressure detector 38 is employed to sense the first stage impulse pressure for assigned control usage in the turbine part of the control 11.

A speed detection system 60 is provided for determining the turbine shaft speed for speed control and for frequency participation control purposes. The speed detector 60 can for example include a reluctance pickup (not shown) magnetically coupled to a notched wheel (not shown) on the turbo-generator shaft 14. In the present case, a plurality of sensors are employed for speed detection.

Respective hydraulically operated throttle valve actuators 40 and governor valve actuators 42 are provided for the four bottle valves TV1-TV4 and the eight governor valves GV1-GV8. Hydraulically operated actuators 44 and 46 are also provided for the reheat stop and interceptor valves SV and IV. A high pressure hydraulic fluid supply 48 provides the controlling fluid for actuator operation of the valves TV1-TV4, GV1-GV8, SV and IV. A lubricating oil system (not shown) is separately provided for turbine plant lubricating requirements.

The inlet valve actuators 40 and 42 are operated by respective electrohydraulic position controls 48 and 50 which form a part of the control system 11. If desired, the interceptor valve actors 46 can also be operated by a position control (not shown).

Each turbine valve position control includes a conventional electronic control amplifier 52 (FIG. 2) which drives a Moog valve 54 or other suitable electrohydraulic (EH) converter valve in the well known manner. Since the turbine power is proportional to steam flow under substantially constant throttle pressure, inlet valve positions are controlled to produce control over steam flow as an intermediate variable and over turbine speed and/or load as an end control variable or variables. The actuators position the steam valves in response to output position control signals applied through the EH convert valves 54. Respective valve position detectors PDT1-PDT4 and PDG1-PDG8 (see FIG. 1A) are provided to generate respective valve position feedback signals which are combined with respective valve position setpoint signals SP to provide position error signals from which the control amplifiers 52 generate the output cntrol signals.

The setpoint signals SP are generated by a controller system 56 which also forms a part of the control system 11 and includes multiple control computers and a manual backup control. The position detectors are provided in suitable conventional form, for example they may be linear variable differential transformers 58 (FIG. 2) which generate negative position feedback signals for algebraic summing with the valve position setpoint signals SP.

The combination of the amplifier 52, converter 54, hydraulic actuator 40 or 42, and the associated valve position detector identified generally by the numeral 59 in FIG. 3B and other miscellaneous devices (not shown) form a local analog electrohydraulic valve position control loop 62 for each throttle or governor inlet steam valve.

Plant Master Control

Figure 3A:
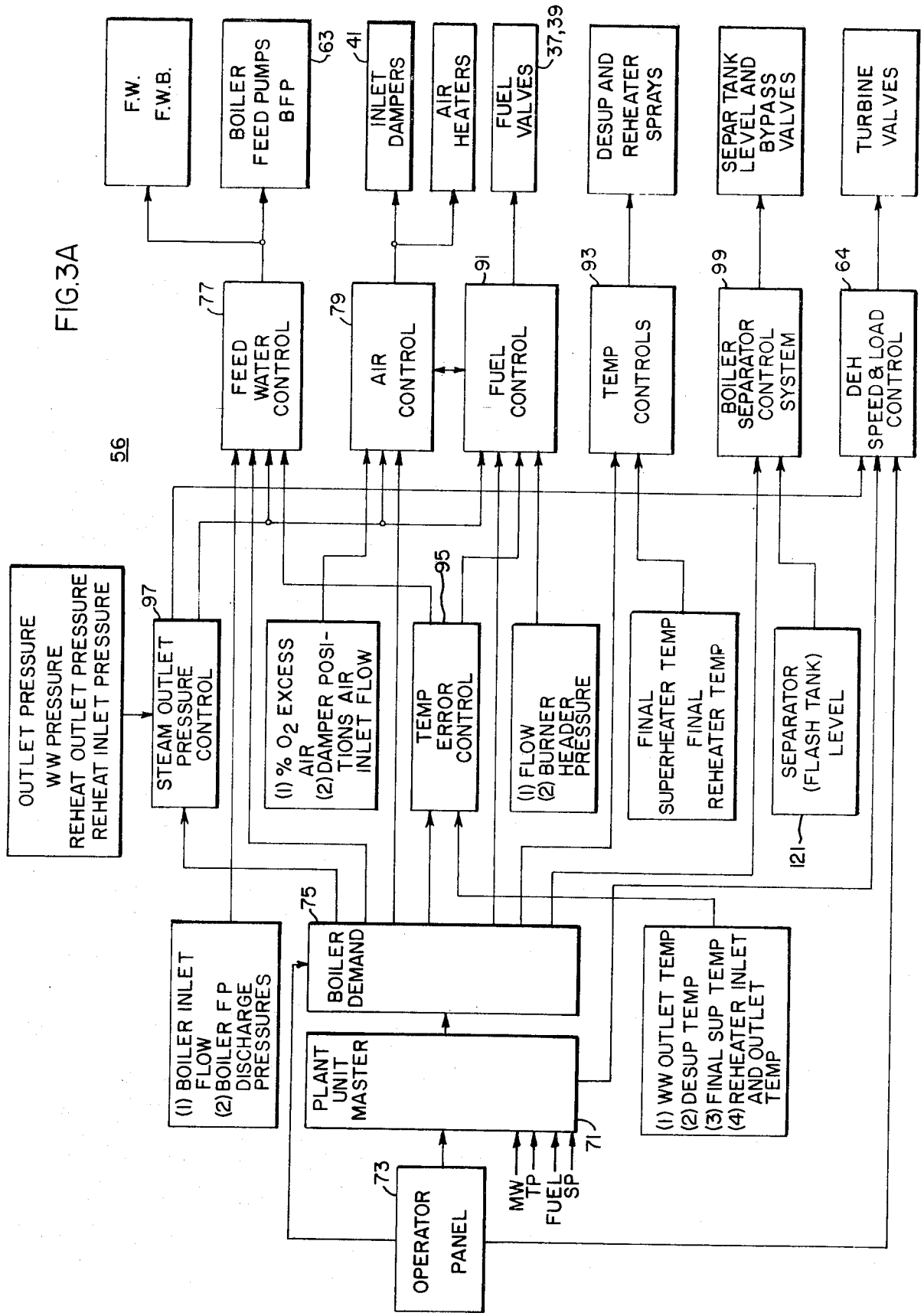
FIG. 3A shows a schematic block diagram of a plant unit master control system for the electric power plant shown in FIG. 1A.

After the boiler 22 and the turbine 10 are started under manual/automatic control, a plant unit master 71 (FIG. 3A) operates as a part of the computer controller system 56 and coordinates lower level controls in the plant control hierarchy to meet plant load demand in an efficient manner. Thus, in the integrated plant mode, the plant unit master 71 implements plant load demand entered by the operator from a panel 73 or from an automatic dispatch system (ADS) by simultaneously applying a corresponding turbine load demand to a digital electrohydraulic (DEH) speed and load control 64 for the turbine 10 and a corresponding boiler demand applied to a boiler demand generator 75 for distribution across the various boiler subloops as shown in FIG. 3A to keep the boiler 22 and the turbine 10 in step. Under certain contingency conditions, the plant unit master 71 rejects from integrated control and coordinates the plant operation in either the turbine follow mode or the boiler follow mode. If the plant unit master 71 is not functioning, load is controlled through a boiler demand generator 75 and the turbine load is controlled directly from the operator panel 73.

In some usages, "coordinated control" is equated to "integrated control" which is intended to mean in step or parallel control of a steam generator and a turbine. However, for the purposes of the present patent application, the term coordinated control is intended to embrace the term "integrated control" and in addition it is intended to refer to the boiler and turbine follow modes of operation in which control is "coordinated" but not "integrated".

Once-Through Boiler Controls

Feedwater flow to the economizer 45 (FIG. 1C) is controlled by setting the speed of the boiler feed pumps 63 and the position of the FW or FWB (startup) valve. Generally, valve stems and other position regulated mechanisms are preferably positioned by use of a conventional electric motor actuator. Air flow is controlled by two speed fans and dampers 41 and fuel flow is controlled by the valves 37, 39.

In the boiler part of the control system 11 as shown in FIG. 3A, first level control for the feedwater pumps 63 and the feedwater valves is provided by a feedwater control 77 which responds to load demand from the boiler demand generator 75 and to process variables so as to keep the feedwater flow dynamically in line with the load demand. Similarly, first level control is provided for the fans and the fuel valves respectively by an air control 79 and a fuel control 91. Fuel/air ratio is regulated by interaction between the air and fuel controls 79 and 91. The air and fuel controls respond to the boiler demand generator 75 and process variables so that water, fuel and air flows are all kept in step with load demand.

A first level temperature control 93 operates desuperheater and reheater sprays to drop outlet steam temperature as required. A second level temperature error control 95 responds to the boiler demand 75 and to process variables to modify the operation of the feedwater and fuel controls 77 and 91 for outlet steam temperature control. Another second level control is a throttle pressure control 97 which modifies turbine and boiler flow demands to hold throttle pressure constant as plant load demand is met.

During startup, the level of the flash or separator tank 57 and the operation of the bypass valves referred to in connection with FIG. 1C are controlled by a boiler separator control system 99. Once the boiler 22 is placed in load operation, the boiler separator control system 97 is removed from control.

Generally, individual boiler control loops and boiler subcontrol loops in the control system 11 can be operated automatically or manually from the panel 73. Where manual control is selected for a lower control level subloop and it negates higher level automatic control, the latter is automatically rejected for that particular subloop and higher control loops in the hierarchy.

Steam Turbine Control Loops

In FIG. 3B, there is shown the preferred arrangement 64 of control loops employed in the control system 11 to provide automatic and manual turbine operation. To provide for power generation continuity and security, a manual backup control 81 is shown for implementing operator control actions during time periods when the automatic control is shut down. Relay contacts effect automatic or manual control operation as illustrated. Bumpless transfer is preferably provided between the manual and automatic operating modes, and for this purpose a manual tracker 83 is employed for the purpose of updating the automatic control on the status of the manual control 81 during manual control operation and the manual control 81 is updated on the status fo the automatic control during automatic control operation as indicated by the reference character 85.

The control loop arrangement 62 is schematically represented by functional blocks, and varying structure can be employed to produce the block functions. In addition, various block functions can be omitted, modified or added in the control loop arrangement 62 consistent with application of the present invention. It is further noted that the arrangement 62 functions within overriding restrictions imposed by elements of an overall turbine and plant protection system (not specifically indicated in FIG. 3B).

During startup, an automatic speed control loop 66 in the control loop arrangement 62 operates the turbine inlet valves to place the turbine 10 under wide range speed control and bring it to synchronous speed for automatic or operator controlled synchronization. After synchronization, an automatic load control loop 68 operates the turbine inlet valves to load the turbine 10. The speed and load control loops 66 and 68 function through the previously noted EH valve position control loops 62.

The turbine part of the controller 56 of FIG. 1A is included in the control loops 66 and 68. Speed and load demands are generated by a block 70 for the speed and load control loops 66 and 68 under varying operating conditions in the integrated or non-integrated coordinator modes or non-coordinator mode in response to a remote automatic load dispatch input, a synchronization speed requirement, a load or speed input generated by the turbine operator or other predetermined controlling inputs. In the integrated mode, the plant unit master 71 functions as the demand 70. A reference generator block 72 responds to the speed or load demand to generate a speed or load reference during turbine startup and load operation preferably so that speed and loading change rates are limited to avoid excessive thermal stress on the turbine parts.

An automatic turbine startup control can be included as part of the demand and reference blocks 68 and 70 and when so included it causes the turbine inlet stream flow to change to meet speed and/or load change requirements with rotor stress control. In that manner, turbine life can be strategically extended.

The speed control loop 66 preferably functions as a feedback type loop, and the speed reference is accordingly compared to a representation of the turbine speed derived from the speed detector 60. A speed control 74 responds to the resultant speed error to generate a steam flow demand from which a setpoint is developed for use in developing valve position demands for the EH valve position control loops 62 during speed control operation.

The load control loop 68 preferably includes a frequency participation control subloop, a megawatt control subloop and an impulse pressure control subloop which are all cascaded together to develop a stream flow demand from which a setpoint is derived for the EH valve position control loops 62 during load control operation. The various subloops are preferably designed to stabilize interactions among the major turbine-generator variables, i.e. impulse pressure, megawatts, speed and valve position. Preferably, the individual load control subloops are arranged so that they can be bumplessly switched into and out of operation in the load control loop 68.

The load reference and the speed detector output are compared by a frequency participation control 76, and preferably it includes a proportional controller which operates on the comparison result to produce an output which is summed with the load reference. A frequency compensated load reference is accordingly generated to produce a megawatt demand.

A megawatt control 78 responds to the megawatt demand and a megawatt signal from the detector 18 to generate an impulse pressure demand. In the megawatt control subloop, the megawatt error is determined from the megawatt feedback signal and the megawatt demand, and it is operated upon by a proportional plus integral controller which produces a megawatt trim signal for multiplication against the megawatt demand.

In turn, an impulse pressure control 80 responds to an impulse pressure signal from the detector 38 and the impulse pressure demand from the megawatt control to generate a steam flow demand from which the valve position demands are generated for forward application to the EH valve position control loops 62. Preferably, the impulse pressure control subloop is the feedback type with the impulse pressure error being applied to a proportional plus integral controller which generates the steam flow demand.

Generally, the application of feedforward and feedback principles in the control loops and the types of control transfer functions employed in the loops can vary from application to application. More detail on the described control loops is presented in the cross-referenced copending application Ser. No. 247,877 which in turn has been abandoned in favor of a continuation application, now identified as U.S. Pat. No. 4,267,458.

Speed loop or load loop steam flow demand is applied to a position demand generator 82 which generates feedforward valve position demands for application to the EH valve position control 52, 54 (FIG. 2) in the EH valve position control loops 62. Generally, the position demand generator 82 employs an appropriate characterization to generate throttle and governor valve position demands as required for implementing the existing control mode as turbine speed and load requirements are satisfied. Thus, up to 80% synchronous speed, the governer valves are held wide open as the throttle valves are positioned to achieve speed control. After transfer, the throttle valves are held wide open and the governer valves are positioned either in single valve operation or sequential valve operation to achieve speed and/or load control. The position demand generator 82 can also include a valve management function as set forth more fully in the cross-referenced copending patent application Ser. No. 306,789 which in turn has been abandoned in favor of a continuation application, now identified as U.S. Pat. No. 4,270,055.

Control System

The control system 11 includes multiple and preferably two programmed digital control computers 90-1 and 90-2 and associated input/output equipment as shown in the block diagram of FIG. 4 where each individual block generally corresponds to a particular structural unit of the control system 11. The computer 90-1 is designated as the primary on-line control computer and the computer 90-2 is a standby and preferably substantially redundant programmed computer which provides fully automatic backup operation of the turbine 10 and the boiler 22 under all plant operating conditions. As needed, the computers 90-1 and 90-2 may have their roles reversed during plant opertion, i.e. the computer 90-1 may be the standby computer. As shown in FIG. 5B and briefly considered subsequently herein, a plant monitoring computer can also provide some control functions within the control system 11. The fact that the boiler and turbine controls are integrated in a single computer provides the advantage that redundant computer backup control for two major pieces of apparatus is possible with two computers as opposed to four computers as would be the case where separate computers are dedicated to separate major pieces of apparatus. Further, it is possible in this manner to achieve some economy in background programming commonly used for both controls.

In relating FIGS. 3A and 3B with FIG. 4, it is noted that particular functional blocks of FIGS. 3A and 3B may be embraced by one or more structural blocks of FIG. 4. The computers 90-1 and 90-2 in this case are P2000 computers sold by Westinghouse Electric Corporation and designed for real time process control applications. The P2000 operates with a 16-bit word length, 2's complement, and single address in a parallel mode. A 3 microsecond memory cycle time is employed in the P2000 computer and all basic control functions can be performed with a 65K core memory. Expansion can be made to a 65K core memory to handle various options includable in particular control systems by using mass memory storage devices.

Generally, input/output interface equipment is preferably duplicated for the two computers 90-1 and 90-2. Thus, a conventional contact closure input system 92-1 or 92-2 and an analog input system 94-1 or 94-2 are preferably coupled to each computer 90-1 or 90-2 to interface system analog and contact signals with the computer at its input. A dual channel pulse input system 96 similarly interfaces pulse type system signals with each computer at its input. Computer output signals are preferably interfaced with external controlled devices through respective suitable contact closure output system 98-1 and 98-2 and a suitable analog output system 100.

A conventional interrupt system 102-1 or 102-2 is employed to signal each computer 90-1 or 90-2 when a computer input is to be executed or when a computer output has been executed. The computer 90-1 or 90-2 operates immediately to detect the identity of the interrupt and to execute or to schedule execution of the response required for the interrupt.

The operator panel 73 provides for operator control, monitoring, testing and maintenance of the turbine-generator system and the boiler 22. Panel signals are applied to the computer 90-1 or 90-2 through the contact closure input system 92-1 or 92-2 and computer display outputs are applied to the panel 73 through the contact closure output system 98-1 or 98-2. During manual turbine control, panel signals are applied to a manual backup control 106 which is like the manual control 65 of FIG. 3B but is specifically arranged for use with both digital computers 90-1 and 90-2.

An overspeed protection controller 108 provides protection for the turbine 10 by closing the governor valves and the interceptor valves under partial or full load loss and overspeed conditions, and the panel 723 is tied to the overspeed protection controller 108 to provide an operating setpoint therefor. The power or megawatt detector 18, the speed detector 60 and an exhaust pressure detector 110 associated with the IP turbine generate signals which are applied to the controller 108 in providing overspeed protection. More detail on a suitable overspeed protection scheme is set forth in U.S. Patent 3,643,437, issued to M. Birnbaum et al.

Generally, process sensors are not duplicated and instead the sensor outputs are applied to the input interface equipment of the computer in control. Input signals are applied to the computers 90-1 and 90-2 from various relay contacts 114 in the turbine-generator system and the boiler 22 through the contact closure input systems 92. In addition, signals from the electric power, steam pressure and speed detectors 18, 36, 38 and 60 and steam valve position detectors 50 and other miscellaneous turbine-generator detectors 118 and interfaced with the computer 90-1 and 90-2. The detectors 118 for example can include impulse chamber and other temperature detectors, vibration sensors, differential expansion sensors, lubricant and coolant pressure sensors, and current and voltage sensors. Boiler process detectors include waterwall outlet desuperheater, final superheater, reheater inlet and outlet and other temperture detectors 115, waterwall and reheat and BFP discharge and other pressure detectors 117, boiler inlet and other flow detectors 119, flash tank level detector 121 and other miscellaneous boiler sensors 123.

Generally, the turbine and boiler control loops described in connection with FIGS. 3A and 3B are embodied in FIG. 4 by incorporation of the computer 90-1 or 90-2 as a control element in those loops. The manual backup control 106 and its control loop are interfaced with and are external to the computers 90-1 and 90-2.

Certain other control loops function principally as part of a turbine protection system externally of the computer 90-1 or 90-2 or both externally and internally of the computer 90-1 or 90-2. Thus, the overspeed protection controller 108 functions in a loop external to the computer 90-1 or 90-2 and a plant runback control 120 functions in a control loop through the computer 90-1 or 90-2 as well as a control loop external to the computer 90-1 or 90-2 through the manual control 106. A throttle pressure control 122 functions through the manual control 106 in a control loop outside the computer 90-1 or 90-2, and throttle pressure is also applied to the computer 90-1 or 90-2 for monitoring and control purposes as described in connection with FIG. 3A. A turbine trip system 124 causes the manual control and computer control outputs to reflect a trip action initiated by independent mechanical or other trips in the overall turbine protection system.

Contact closure outputs from the computer 90-1 or 90-2 operate various turbine and boiler system contacts 126, various displays, lights and other devices associated with the operator panel 73. Further, in a plant synchronizing system, a breaker 130 is operated by the computer 90-1 or 90-2 through computer output contacts. If desired, synchronization can be performed automatically during startup with the use of an external synchronizer it can be accurately performed manually with the use of the accurate digital speed control loop which operates through the computer 90-1 or 90-2, or it can be performed by use of an analog/digital hybrid synchronization system which employs a digital computer in the manner set forth in a copending application Serial No. 276,508, entitled "System And Method Employing A Digital Computer For Automatically Synchronizing A Gas Turbine Or Other Electric Power Plant Generator With A Power System" filed by J. Reuther on July 31, 1972 as a continuation of an earlier filed patent application and assigned to the present assignee. In the present case, synchronization is preferably performed under operator control.

The analog output system 100 accepts outputs from one of the two computers and employs a conventional resistor network to produce output valve position signals for the turbine throttle and governor valve controls during automatic control. Further, the automatic valve position signals are applied to the manual control 106 for bumpless automatic/manual transfer purposes. In manual turbine operation, the manual control 106 generates the position signals for application to the throttle and governor valve controls and for application to the computer 90 for computer tracking needed for bumpless manual/automatic transfer. The analog output system 100 further applies output signals to various boiler control devices 125 in boiler automatic operation. These devices include all those previously described devices which are used for controlling boiler fuel, air and water flows and for other purposes. A set of boiler manual controls 127 operates off the operator panel 73 to provide manual boiler operations for those loops where automatic boiler operation has been rejected by the operator or by the control system.

An automatic dispatch computer or other controller 136 is coupled to the comuters 90-1 and 90-2 through the pulse input system 96 for system load scheduling and dispatch operations. A data link 134 in this case provides a tie between the digital computers 90-1 and 90-2 for coordination of the two computers to achieve safe and reliable plant operation under varying contingency conditions.

Program System For Control Computers

Figure 5A:
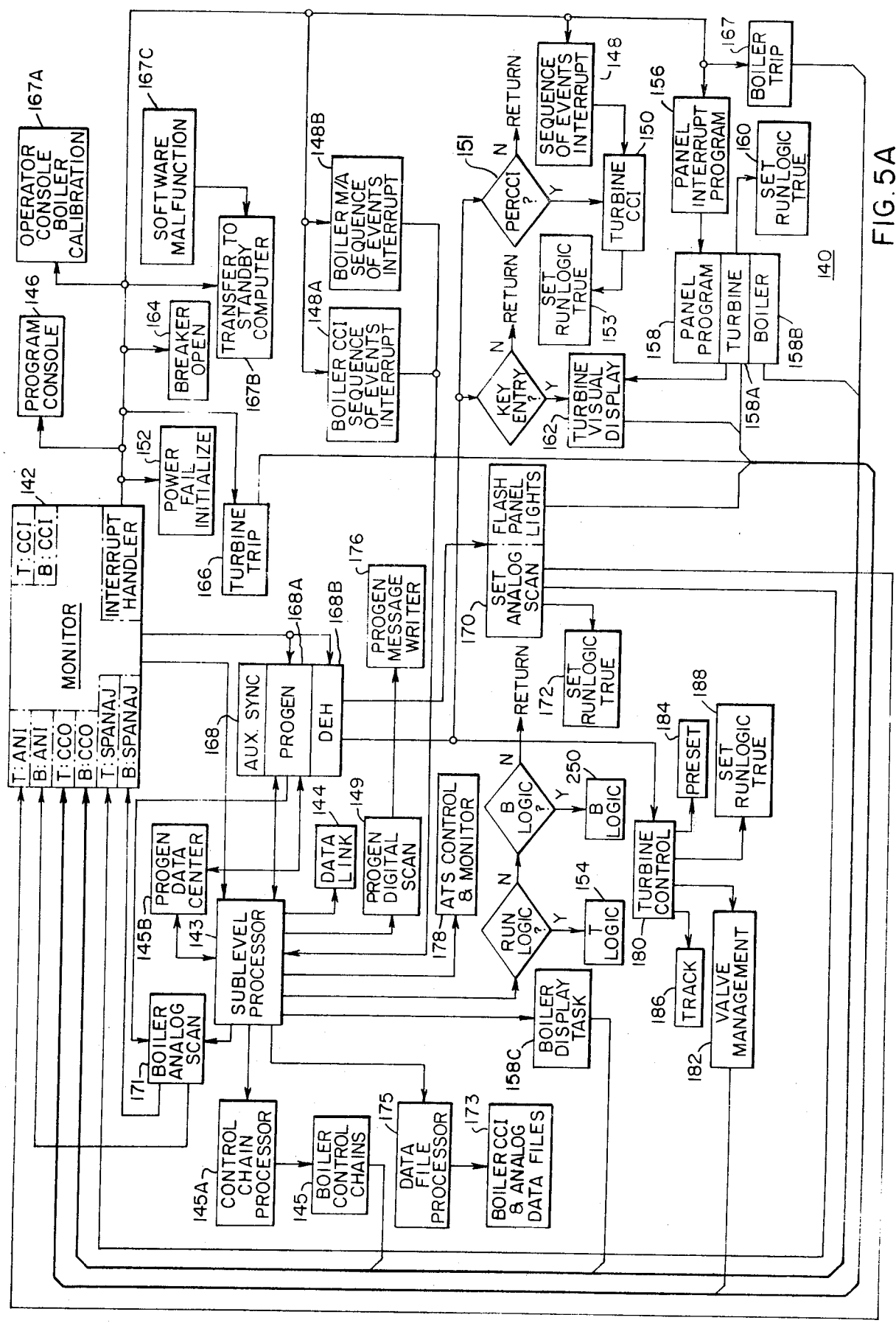
FIG. 5A shows a block diagram of the organization of a program system included in each of two computers employed in the control system of FIG. 4.
Figure 5B:
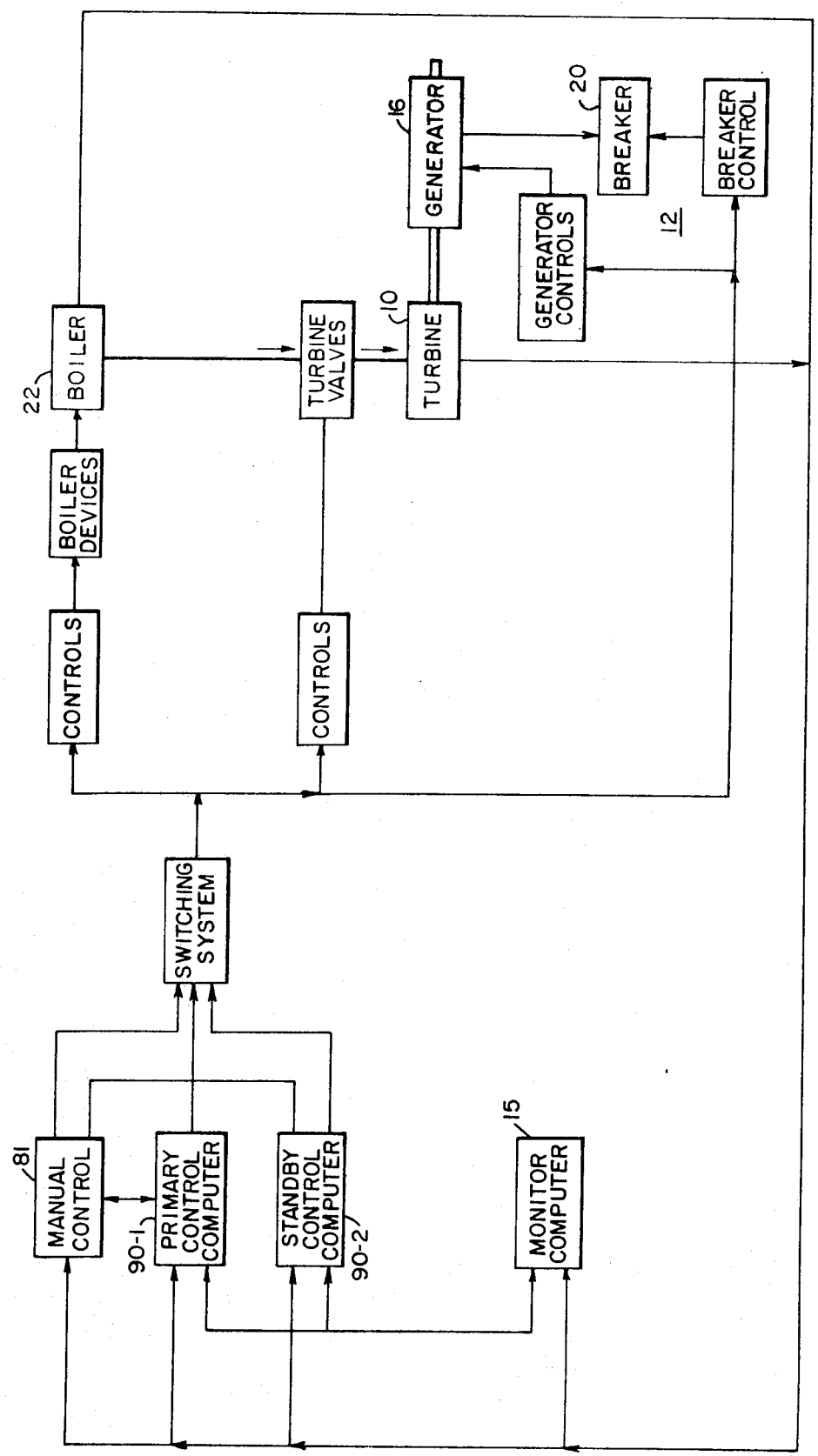
FIG. 5B shows a schematic apparatus block diagram of the electric power plant of FIG. 1A with the control system shown from the standpoint of the organization of computers in the system.

A computer program system 140 is preferably organized as shown in FIG. 5A to operate the control system 11 as a sampled data system in providing turbine and control variable monitoring and continuous turbine, boiler and plant control with stability, accuracy and substantially optimum response. Substantially like programming corresponding to the program system is loaded in both computers 90-1 and 90-2. However, some minor programming differences do exist. The program system 140 will be described herein only to the extent necessary to develop an understanding of the manner in which the present invention is applied. As shown in FIG. 5B, it is also noted that the plant 12 is provided with a plant monitoring computer 15 which principally functions as a plant data logger and a plant performance calculator. In addition, certain plant sequencing control functions may be performed in the computer 15. For example, the computer 15 may sequence the particular burners and the particular burner levels which are to be used to execute fuel flow demand from the control computer 90-1 or 90-2. However, the sequencing functions of the computer 15 generally are not essential to an understanding of the present invention and they are therefore not considered in detail herein.

As shown in FIG. 5A, an executive or monitor program 142, an auxiliary synchronizer 168 including a PROGEN synchronizer section 168A and a DEH synchronizer section 168B, and a sublevel processor 143 provide scheduling control over the running of boiler control chains and various programs in the computer 90-1 or 90-2 as well as control over the flow of computer inputs and outputs through the previously described input/output systems. Generally, the executive priority system has 16 task levels and most of the DEH programs are assigned to 8 task levels outside the PROGEN sublevel processor 143. The lowest task level is made available for the programmer's console and the remaining 7 task levels are assigned to PROGEN. Thus, boiler control chains and some DEH and other programs are assigned as sublevel tasks on the various PROGEN task levels in the sublevel processor 143. Generally, bids are processed to run the bidding task level with the highest priority. Interrupts may bid programs, and all interrupts are processed with a priority higher than any task or subtask level.

Generally, the program system 140 is a combination of turbine control programs and boiler control chains 145 along with the support programming needed to execute the control programs and the chains 145 with an interface to the power plant in real time. The boiler control chains 145 are prepared with the use of an automatic process programming and structuring system known as PROGEN and disclosed in the reference patent application Ser. No. 250,826 now U.S. Pat. No. 4,257,094. The PROGEN executed DEH or turbine programs and the boiler control chains 145 are interfaced with the support programs such as the sublevel processor 143, the auxiliary synchronizer 168, a control chain processor 145A and the executive monitor 142 generally in the manner described in Ser. No. 250,826 now U.S. Pat. No. 4,257,394. A PROGEN data center 145B provides PROGEN initialization and other data. The turbine control programs are like those disclosed in the referenced patent applications Ser. No. 247,877 which in turn has been abandoned in favor of a continuation application, now identified as U.S. Pat. No. 4,267,458 and Ser. No. 306,752 now abandoned, and those turbine or DEH programs which bypass the sublevel processor 143 are interfaced with the auxiliary synchronizer 168 as described in the same application.

Once the boiler control chains 145 are written, they are processed off-line by a control chain generator (not indicated in FIG. 5B) and the output from the latter is entered into the computer with use of a file loader program (not indicated). Chains then are automatically stored in the computer and linked to the process through the I/0 equipment and to other programmed chains and program elements as required to execute the desired real time chain performance. Logic related to the selection of a chain for execution or the process triggering of a selected chain generally is entered into the computer 90-1 or 90-2 as a separate chain. Thus, if a particular boiler control mode requires the execution of a certain chain, the chain is automatically executed when that mode is selected.

A data link program 144 is bid periodically or on demand to provide for intercomputer data flow which updates the status of the standby computer relative to the controlling computer in connection with computer switchover in the event of a contingency or operator selection. A programmer's console program 146 is bid on demand by interrupt and it enables program system changes to be made.

When a turbine system contact changes state, an interrupt causes a sequence of events interrupt program 148 to place a bid for a scan of all turbine system contacts by a turbine contact closure input program 150. A periodic bid can also be placed for running the turbine contact closure input program 150 through a block 151. Boiler contacts are similarly scanned by a PROGEN digital scan 149 in response to a boiler contact change detected with a Manual/Auto Station sequence of events interrupt 148A or a boiler plant CCI sequence of events interrupt 148B. A power fail initialize 152 also can bid the turbine contact closure input program 150 to run as part of the computer initialization procedure during computer starting or restarting. The program 152 also initializes turbine contact outputs through the executive 142. In some instances, changes in turbine contact inputs will cause a bid 153 to be placed for a turbine logic task program 154 to be executed so as to achieve programmed responses to certain turbine contact input changes. Periodic scanning of boiler contacts by the block 149 is initiated through the sublevel processor 143.

When an operator panel signal is generated, external circuitry decodes the panel input and an interrupt is generated to cause a panel interrupt program 156 to place a bid for the execution of a panel program 158 which includes turbine and boiler portions 158A and 158B and which provides a response to the panel request. The turbine panel program 158A can itself carry out the necessary response or it can place a bid 160 for the turbine logic task program 154 to perform the response or it can bid a turbine visual display program 162 to carry out the response. In turn, the turbine visual display program 162 operates contact closure outputs to produce the responsive panel display. Similarly, the boiler panel program 158B may itself provide a response or it may place a bid for a task to be performed, such as the execution of a boiler visual display task 158C which operates CCO's.

Generally, the turbine visual display program 162 causes numerical data to be displayed in panel windows in accordance with operator requests. When the operator requests a new display quantity, the visual display program 162 is initially bid by the panel program 158. Apart from a new display request, the turbine visual display program 162 is bid periodically to display the existing list of quantities requested for display. The boiler display task 158C similarly is organized to provide a boiler data display for the plant operator through output devices.

The turbine pushbuttons and keys on the operator panel 73T as shown in FIG. 10C are classifiable in one of several functional groups. Some turbine pushbuttons are classified as control system switching since they provide for switching in or out certain control functions. Another group of turbine pushbuttons provide for operating mode selection. A third group of pushbuttons provide for automatic turbine startup and a fourth group provide for manual turbine operation. Another group of turbine pushbuttons are related to valve status/testing/limiting, while a sixth group provide for visual display and change of DEH system parameters.

Boiler and plant panel (see FIG. 10A) include a large number which serve as manual/automatic selectors for various controlled boiler drives, valves and other devices. Other boiler and plant pushbuttons relate to functions including operating mode selection and visual display. Certain pushbuttons relate to keyboard activity, i.e. of the entry of numerical data into the computer 90-1 or 90-2.

A breaker open interrupt program 164 causes the computer 90-1 or 90-2 to generate a close governor valve bias signal when load is dropped. Similarly, when the trip system 124 (see FIG. 4) trips the turbine 10 or when the boiler 22 is tripped, a trip interrupt program 166 causes close throttle and governor valve bias signals to be generated by the computer 90-1 or 90-2. On a boiler trip, a program 167 configures the control computers for a plant shutdown. Boiler trips can be produced for example by the monitor computer 15 (see FIG. 5B) on the basis of calculated low pressure or improper flow or other parameters or on the basis of hardware detected contingencies such as throttle overpressure or waterwall overpressure or on the basis of improper water conductivity detected in the controlling computer. After the governor valves have been closed in response to a breaker open interrupt, the turbine system reverts to speed control and the governor valves are positioned to maintain synchronous speed.

Boiler calibration is provided as an operator console function as indicated by block 167A. A computer switchover is triggered by block 167B in response to a hardware interrupt condition or in response to a software malfunction 167C.

Periodic programs are scheduled by the auxillary sychronizer program 168. An external clock (not shown) functions as the system timing source. A task 170 which provides turbine analog scan is directly bid every half second to select turbine analog inputs for updating through an executive analog input handler. A boiler analog scan 171 is similarly run through the sublevel processor 143 to update boiler analog inputs in PROGEN files 173 under the control of a PROGEN data file processor 175. After scanning, the analog scan program 170 or 171 converts the inputs to engineering units, performs limit checks and makes certain logical decisions. The turbine logic task 154 may be bid by block 172 as a result of a turbine analog scan program run. Similarly, a boiler control chain may be bid as a result of the updating of a boiler analog data file.

The task 170 also provides a turbine flash panel light function to flash predetermined turbine panel lights through the executive contact closure output handler under certain conditions. In the present embodiment, a total of nine turbine conditions are continually monitored for flashing.

The turbine logic program 154 is run periodically to perform various turbine logic tasks if it has been bid. A PROGEN message writer program 176 is run off the sublevel processor every 5 seconds to provide a printout of significant automatic turbine startup events and other preselected messages.

A boiler logic program 250 is run each time a run logic flag has been set. If the resultant bid is for a boiler logic function, the turbine logic is bypassed and only the boiler logic is run. On the other hand, a turbine logic function bid does result in the execution of the boiler logic.

The turbine software control functions are principally embodied in an automatic turbine startup (ATS) control and monitoring program 178 periodically run off the sublevel processor 143 and a turbine control program 180 periodically run off the DEH auxiliary synchronizer 168B, with certain supportive program functions being performed by the turbine logic task 154 or certain subroutines. To provide rotor stress control on turbine acceleration or turbine loading rate in the startup speed control loop 66 or the load control loop 68 (see FIG. 3B), rotor stress is calculated by the ATS program 178 on the basis of detected turbine impulse chamber temperature and other parameters.

The ATS program 178 also supervises turning gear operation, eccentricity, vibration, turbine metal and bearing temperatures, exciter and generator parameters, gland seal and turbine exhaust conditions, condenser vacuum, drain valve operation, anticipated steam chest wall temperature, outer cylinder flange-base differential, and end differential expansion. Appropriate control actions are initiated under programmed conditions detected by the functioning of the monitor system.

Among other functions, the ATS program 178 also sequences the turbine through the various stages or startup operation from turning gear to synchronization. More detail on a program like the ATS program 178 is disclosed in another copending application Ser. No. 247,598 entitled "System And Method For Operating A Steam Turbine With Digital Computer Control Having Automatic Startup Sequential Programming", filed by J. Tanco on Apr. 26, 1972 and assigned to the present assignee now U.S. Pat. No. 3,959,635.

In the turbine control program 180, program functions generally are directed to (1) computing throttle and governor valve positions to satisfy speed and/or load demand during operator or remote automatic operation and (2) tracking turbine valve position during manual operation. Generally, the control program 180 is organized as a series of relatively short subprograms which are sequentially executed.

In performing turbine control, speed data selection from multiple independent sources is utilized for operating reliability, and operator entered program limits are placed on high and low load, valve position and throttle pressure. Generally, the turbine control program 180 executes operator or automatically initiated transfers bumplessly between manual and automatic modes and bumplessly between one automatic mode and another automatic mode. In the execution of control and monitor functions, the control program 180 and the ATS program 178 are supplied as required with appropriate representations of data derived from input detectors and system contacts described in connection with FIG. 4. Generally, predetermined turbine valve tests can be performed on-line compatibly with control of the turbine operation through the control programming.

The turbine control program 180 logically determines turbine operating mode by a select operating mode function which operates in response to logic states detected by the logic program 154 from panel and contact closure inputs. For each mode, appropriate values for demand and rate of change of demand are defined for use in control program execution of speed and/or load control.

The following turbine speed control modes are available when the breaker is open in the hierarchical order listed: (1) Automatic Synchronizer in which pulse type contact inputs provide incremental adjustment of the turbine speed reference and demand; (2) Automatic Turbine Startup which automatically generates the turbine speed demand and rate; (3) Operator Automatic in which the operator generates the speed demand and rate; (4) Maintenance Test in which the operator enters speed demand and rate while the control system is being operated as a simulator/trainer; (5) Manual Tracking in which the speed demand and rate are internally computed to track the manual control preparatory to bumpless transfer from manual to automatic operation.

The following turbine load control modes are available when the breaker is closed in the hierarchical order listed: (1) Throttle Pressure Limiting in which the turbine load reference is run back at a predetermined rate to a preset minimum as long as the limiting condition exists; (2) Runback in which the load reference is run back at a predetermined rate as long as predefined contingency conditions exist; (3) Automatic Dispatch System in which pulse type contact inputs provide for adjusting the turbine load reference and demand; (4) Automatic Turbine Loading (if included in system) in which the turbine load demand and rate are automatically generated; (5) Operator Automatic in which the operator generates load demand and rate; (6) Maintenance Test in which the operator enters load demand and rate while the control system is being operated as a simulator/trainer; (7) Manual Tracking in which the load demand and rate are internally computed to track the manual control preparatory to bumpless transfer to automatic control.

In executing turbine control within the control loops described in connection with FIG. 3B, the control program 180 includes a speed/load reference function. Once the turbine operating mode is defined, the speed/load reference function generates the reference which is used by the applicable control functions in generating valve position demand.

The turbine speed or load reference is generated at a controlled or selected rate to meet the defined demand. Generation of the reference at a controlled rate until it reaches the demand is especially significant in the automatic modes of operation. In modes such as the Automatic Synchronizer or Automatic Dispatch System, the reference is advanced in pulses which are carried out in single steps and the speed/load reference function is essentially inactive in these modes. Generally, the speed/load reference function is responsive to GO and HOLD logic and in the GO condition the reference is run up or down at the program defined rate until it equals the demand or until a limit condition or synchronizer or dispatch requirement is met.

A turbine speed control function provides for operating the throttle and governor valves to drive the turbine 10 to the speed corresponding to the reference with substantially optimum dynamic and steady-state response. The speed error is applied to either a software proportional-plus-reset throttle valve controller or a software proportional-plus-reset governor valve controller.

Similarly, a turbine load control function provides for positioning the governor valves so as to satisfy the existing load reference with substantially optimum dynamic and steady-state response. The load reference value computed by the operating mode selection function is compensated for frequency participation by a proportional feedback trim factor and for megawatt error by a second feedback trim factor. A software proportional-plus-reset controller 756 (FIG. 8) is employed in the megawatt feedback trim loop to reduce megawatt error to zero.

If the speed and megawatt loop are in service, the frequency and megawatt corrected load reference operates as a setpoint for the impulse pressure control or as a flow demand for a valve management subroutine 182 (FIG. 5A) according to whether the impulse pressure control is in or out of service. In the impulse pressure control, a software proportional-plus-reset controller is employed to drive the impulse pressure error to zero. The output of the impulse pressure controller or the output of the speed and megawatt corrected load reference functions as a governor valve setpoint which is converted into a percent flow demand prior to application to the valve management subroutine 182.

The turbine control program 180 further includes a throttle valve control function and a governor valve control function. During automatic control, the outputs from the throttle valve control function are position demands for the throttle valves, and during manual control the throttle valve control outputs are tracked to the like outputs from the manual control 106 (see FIG. 4). Generally, the position demands hold the throttle valves closed during a turbine trip, provide for throttle valve position control during startup and during transfer to governor valve control, and drive and hold the throttle valves wide open during and after the completion of the throttle/governor valve transfer.

The governor valve control function generally operates in a manner similar to that described for the throttle valve control function during automatic and manual operations of the control system 11. If the valve management subroutine 182 is employed, the governor valve control function outputs data applied to it by the valve management subroutine 182.

If the valve management subroutine 182 is not employed, the governor valve control function employs a nonlinear characterization function to compensate for the nonlinear flow versus lift characteristics of the governor valves. The output from the nonlinear characterization function represents governor valve position demand which is based on the input flow demand. A valve position limit entered by the operator may place a restriction on the governor valve position demand prior to output from the computer 90.

Generally, the governor valve control function provides for holding the governor valves closed during a turbine trip, holding the governor valves wide open during startup and under throttle valve control, driving the governor valves closed during transfer from throttle to governor valve operation during startup, reopening the governor valves under position control after brief closure during throttle/governor valve transfer and thereafter during subsequent startup and load control.

A preset subroutine 184 evaluates an algorithm for a proportional-plus-reset controller corresponding to controllers 756, 772, 790 and 792 as discussed in detail later with respect to FIG. 8 and as required during execution of the turbine control program 180. In addition, a track subroutine 186 is employed when the control system 11 is in the manual mode of operation. In the operation of the multiple computer system, the track subroutine is operated open loop in the computer on standby so as to provide for turbine tracking in the noncontrolling computer.

Certain logic operations are performed by the turbine logic program 154 in response to a control program bid by block 188. The logic program 154 includes a series of control and other logic duties which are related to various parts of the turbine portion of the program system 140 and it is executed when a bid occurs on demand from the auxiliary synchronizer program 168 in response to a bid from other programs in the system. In the present system, the turbine logic is organized to function with the plant unit master, i.e. the megawatt and impulse pressure controls are preferably forced out of service on coordinated control so that the load control function can be freely coordinated at the plant level.

Generally, the purpose of the turbine logic program 154 is to define the operational status of the turbine portion of the control system 11 from information obtained from the turbine system, the operator and other programs in the program system 140. Logic duties included in the program 154 include the following: flip-flop function; maintenance task; speed channel failure monitor lamps; automatic computer to manual transfer logic; operator automatic logic; GO and HOLD logic; governor control and throttle control logic; turbine latch and breaker logic; megawatt feedback, impulse pressure, and speed feedback logic; and automatic synchronizer and dispatch logic.

During automatic computer control, the turbine valve management subroutine 182 develops the governor valve position demands needed to satisfy turbine steam flow demand and ultimately the speed/load reference and to do so in either the sequential or the single valve mode of governor valve operation or during transfer between these modes. Mode transfer is effected bumplessly with no load change other than any which might be demanded during transfer. Since changes in throttle pressure cause actual steam flow changes at any given turbine inlet valve position, the governor valve position demands may be corrected as a function of throttle pressure variation. In the manual mode, the track subroutine 186 employs the valve management subroutine 182 to provide governor valve position demand calculations for bumpless manual/automatic transfer.

Governor valve position is calculated from a linearizing characterization in the form of a curve of valve position (or lift) versus steam flow. A curve valid for low-load operation is stored for use by the valve management program 182 and the curve employed for control calculations is obtained by correcting the stored curve for changes in load or flow demand and preferably for changes in actual throttle pressure. Another stored curve of flow coefficient versus steam flow demand is used to determine the applicable flow coefficient to be used in correcting the stored low-load position demand curve for load or flow changes. Preferably, the valve position demand curve is also corrected for the number of nozzles downstream from each governor valve.

In the single valve mode, the calculated total governor valve position demand is divided by the total number of governor valves to generate the position demand per valve which is output as a single valve analog voltage (FIG. 4) applied commonly to all governor valves. In the sequential mode, the governor valve sequence is used in determining from the corrected position demand curve which governor valve or group of governor valves is fully open which governor valve or group of governor valves is to be placed under position control to meet load references changes. Position demands are determined for the individual governor valves, and individual sequential valve analog voltages (FIG. 4) are generated to correspond to the calculated valve position demands. The single valve voltage is held at zero during sequential valve operation and the sequential valve voltage is held at zero during single valve operation.

To transfer from single to sequential valve operation, the net position demand signal applied to each governor valve EH control is held constant as the single valve analog voltage is stepped to zero and the sequential valve analog voltage is stepped to the single valve voltage value. Sequential valve position demands are then computed and the steam flow changes required to reach target steam flows through individual governor valves are determined. Steam flow changes are then implemented iteratively, with the number of iterations determined by dividing the maximum flow change for any one governor valve by a predetermined maximum flow change per iteration. Total steam flow remains substantially constant during transfer since the sum of incremental steam flow changes is zero for any one iteration.

To transfer from sequential to single valve operation, the single valve position demand is determined from steam flow demand. Flow changes required to satisfy the target steam flow are determined for each governor valve, and an iteration procedure like that described for single-to-sequential transfer is employed in incrementing the valve positions to achieve the single valve target position substantially without disturbing total steam flow. If steam flow demand changes during any transfer, the transfer is suspended as the steam flow change is satisfied equally by all valves movable in the direction required to meet the change.

Plant Unit Master, Coordinated Turbine-Boiler Control

The plant unit master identified in FIG. 3A by the numeral 71 provides a plant load or master reference to be applied in parallel to the boiler control whereby the total feedwater flow, fuel flow and air flow are controlled accordingly (see FIG. 1C) and to the turbine control whereby the governor valves (see FIG. 1A) are controlled thereby. Generally, power generation is established by the selection of appropriate levels of firing rate, feedwater flow and governor valve positions. To change the generation level, selective incremental changes in the rates at which the feedwater, fuel and air are supplied to the boiler are made in accordance with the desired generation level. In a coordinated control as carried out by the plant unit master, the incremental changes made to these variables are made in the same proportion as the desired generation change, thus minimizing disturbances in pressure, temperatures or fuel/air ratio.

Figure 6:
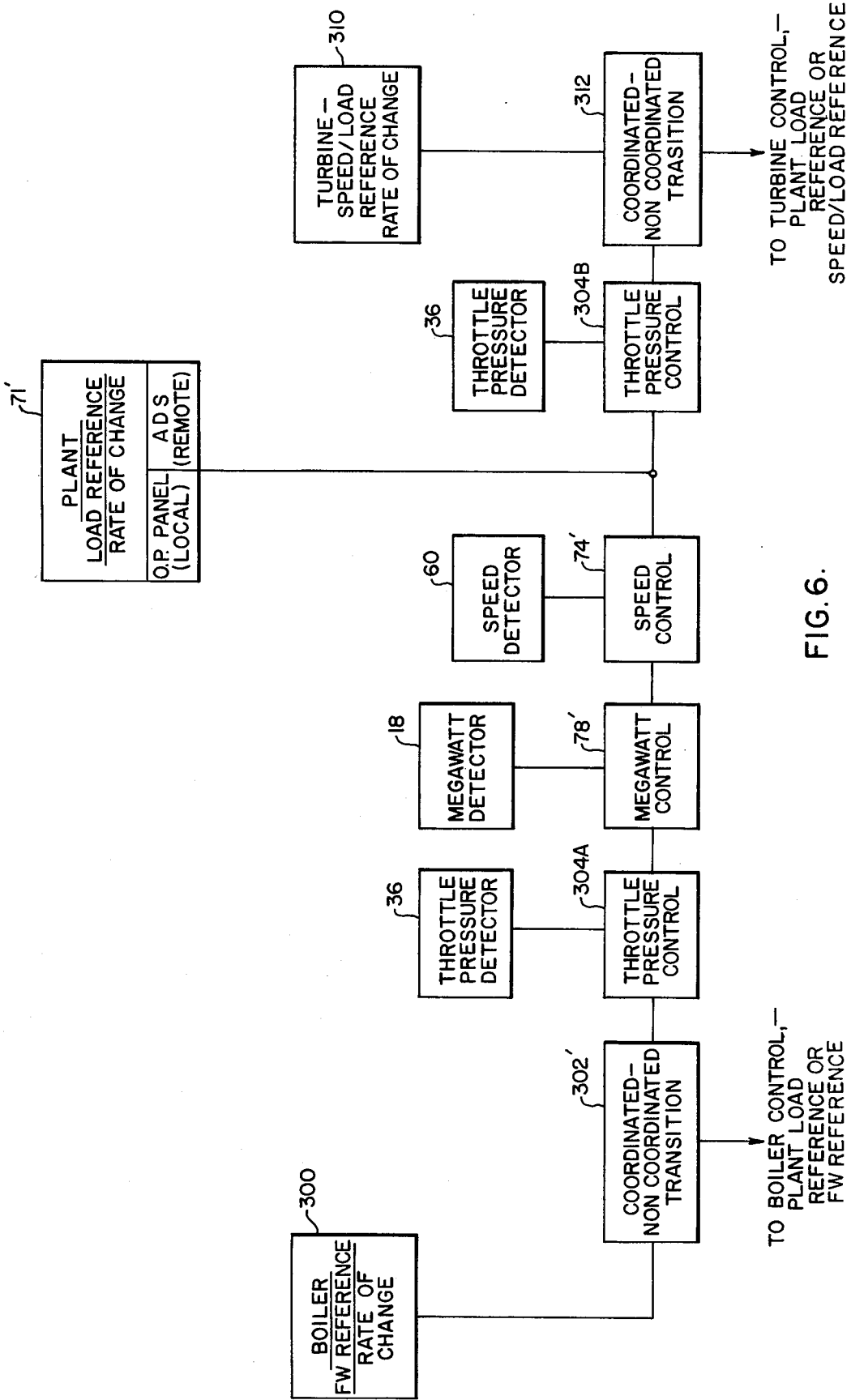
FIG. 6 shows a schematic block diagram of the plant unit master for applying a plant reference signal in parallel to control the electric power plant as shown in FIG. 1A.

With regard to FIG. 6, the overall organization of the plant unit master (first discussed with respect to block 71 of FIG. 3A) is shown to provide an explanation of the coordinated control of the turbine and boiler, as well as to provide an explanation of the manner in which the boiler and turbine controls may be operated in a separate, uncoordinated manner. Basically, a master or plant load reference signal is supplied as indicated generally by block 71'. In a coordinated fashion, the plant load reference is successively trimmed as functions of turbine speed, the power (megawatts) generated, the throttle pressure and the impulse pressure to provide a modified plant load reference to the boiler control. In a similar fashion, the plant load reference is processed or trimmed in accordance with the detected throttle pressure to provide a modified plant load reference to the turbine control. As specifically illustrated in FIG. 6, the plant load reference is successively trimmed by a speed control 74', a megawatt control 78' and a throttle pressure control 304a, which in turn are responsive to the outputs of the speed detector 60, the megawatt detector 18 and the throttle pressure detector 36, respectively. The plant unit master does provide that the turbine-boiler system may be operated in a non-coordinated mode and provides for a smooth transition between these differing modes of operation. In a separated mode of operation, the operator may enter, as upon his panel 73 (see FIG. 3A), a boiler feedwater reference and its rate of change to be applied through a coordinated/non-coordinated transition 302' to provide a command signal to the boiler control.

In the coordinated mode control for the turbine, the plant load reference is trimmed by the throttle pressure control 304B in response to an indication of the throttle pressure as provided by the detector 36. If it is desired to operate in an uncoordinated mode, the operator may enter upon his panel 73 a speed/load reference and its rate of change. As shown in FIG. 6, these control valves are directed from the block 310 through a coordinated non-coordinated transition block 312 to provide a demand signal to the turbine control.

Further, the plant unit master received load demand signals from either an automatic load dispatching system (ADS) or inputed locally by the unit operator upon his panel 73, as indicated in FIG. 6. Further, adjustments are provided for high limit, low limit and rate of change. The plant unit also contains provision for utilizing run-up/run-down and limit signals from plant auxiliaries for operating the unit within the capability of the auxiliary equipment in service. The control operations panel 73 provides a means of selecting the desired operating mode and is able to automatically transfer to contingency modes if required.

The output of the plant unit master is a megawatt reference to the boiler regardless of speed or load operation on the turbine. Calibration on the system accounts for the low megawatt value required when the unit is first starting up. Once the main generator breaker is closed, the demand for both boiler and turbine is megawatts.

The plant unit master control has two basic modes of operation, coordinated, or separated. Coordinated mode for this system is defined to be the operating condition when both boiler and turbine are operating under one plant load reference regardless of the existence of a contingency mode or feedback circuit. For example, during the contingency mode it is still possible to have either the boiler or the turbine being positioned to a preset reference and the other portion of the control function to directly support the reference accounting for the contingency condition. On the other hand, separated control occurs during the time that the plant operator enters a megawatt reference for the boiler, coordinates the megawatt reference for the turbine control, and maintains the correlation between the two controls to provide proper balance of steam generation and utilization at all times. In the Coordinated Mode, the plant unit master operates the turbine valves, fuel input, feedwater flow and air flow simultaneously. Corrective computations for flow, pressure error, generation error and frequency bias are applied to the boiler and turbine in the correct relationship to maintain alignment.

During the plant start-up (as in the Start Mode) before the breakers are closed, feedwater flow can be placed on either Automatic or Manual. In the Manual Mode of operation, each boiler feed pump 63 (see FIGS. 1C and 3A) is indexed from its associated increase/decrease pushbutton. The Base Mode is not lighted when both feed pumps 63 are on Manual control. The Base Mode indicating light (FIG. 10A) is in the boiler section of the panel.

When either of the boiler feedback pumps 63 is placed on Automatic, the Base Mode is lighted automatically to transfer feedwater demand control to the boiler reference setter. When feedwater demands are transferred to the Base Mode, the operator sets in the new desired feedwater set point from the panel 73. The boiler control demand 75 will make the bumpless transfer from Feedwater Manual to Feedwater Base Automatic Control Mode.

After the breaker is closed, the load demand computation is used to index both the turbine and the boiler when the unit is coordinated. The speed error signal is used simultaneously during on-line operation and the frequency bias signal is applied to the boiler inputs and speed regulation for the turbine generator unit. This approach minimizes the number of operating stations requiring monitoring and the adjustment required by the operator, thus simplifying the interlock system between the boiler and turbine.

Further, since both the turbine and boiler control systems contain interlocks, control and safety systems, the plant coordination and contingency control system must provide the ability to operate the boiler and turbine coordinated in one of several modes depending on the plant requirements and capabilities or separately for start-up and during contingencies. As will be discussed in detail later, it must provide sufficient logic so unsafe mode transfers will be prevented and the system will have a predetermined mode to enter when a boiler or turbine contingency occurs.

A selector is provided on the operator's panel 73 to permit any one of the following modes to be implemented:

| MODE # | FUNCTION |
| --- | --- |
| 1 | Plant Manual |
| 2 | Start |
| 3 | Ramp |
| 4 | Local Coordinated |
| 5 | Remote Coordinated |
| 6 | Turbine Follow |
| 7 | Boiler Follow |

The above modes are selected so that the operator can properly control the unit from a cold start through all phases of operation with a minimum of manual operating stations. The unit is operated using the Remote Coordinated or Local Coordinated Mode as the normal operating procedure. The Plant Manual, Start, Ramp and Boiler Follow Modes are required for gradually heating the turbine and boiler, bringing the unit up to synchronous speed, and synchronizing, while ramping to full rated pressure. The unit load demand signal is transmitted simultaneously to the boiler control system and to the turbine governor control system as a boiler load demand signal and a turbine load demand signal, respectively. Thus, in the Coordinated Control Mode, the unit load demand is applied to the boiler and turbine in a feed forward manner with minor corrections or trims being made as a function of measured throttle pressure, power generated and turbine speed, as shown in FIG. 6. When operating in the Coordinated Mode, the plant load reference is entered in the plant portion of the unit operating panel, as shown in FIG. 10B.

Any time the generator breaker is closed, the plant unit master will transfer from its Start to its Manual Mode of operation. Under this condition, the boiler demand signal is taken from the feedwater reference in the boiler portion of the panel. The feedwater reference will be established from initial manual operation and a value of feedwater flow currently in the unit prior to the transfer of feedwater system from Manual to Automatic.

A logic system, to be explained, ensures that the proper conditions have been met before transfer is made from one of the above-listed modes to the other, as well as to ensure that the proper signals are in service for the selected mode. A further significant function of the logic system is to initiate the operation of the coordinated/non-coordinated transition blocks 302' and 312, as shown in FIG. 6. More specifically, if the unit is operating in a Coordinated Mode and an unusual turbine condition develops, the plant unit master will automatically transfer to a Boiler Follow Mode of operation. If an unusual boiler condition develops, the plant unit master will transfer to Turbine Follow.

Though a detailed description of the coordinated modes of control will be given later, the Coordinated Modes of operation, which are the normal, steady state modes, will be described briefly with respect to FIG. 6. The logic which is associated with the plant load reference to be directed to the boiler control includes three feedback values used to function as trim values on the prime feed forward reference which is the plant load reference. The first trim effected by the speed control 74, on the plant load reference is as a function of a deviation of turbine speed, for example, where there has been a frequency disturbance. The speed compensation is introduced when the unit is in either Local Coordinated or Remote Coordinated Modes. The polarity of the feedback is such that if speed goes high, the reference to the boiler is decreased. If speed goes low, the reference to the boiler is increased, asking for more megawatts. The next trim circuitry (or control loop) is associated with the generated load in terms of megawatts The plant load reference which has been trimmed as a function of speed error, is summed in the power control loop with an integrated power error signal. Thus, if at any instant time generator load does not compare precisely with the load reference, a trim value will be added into the plant load reference to accommodate whatever error exists, whereby the boiler control system is adjusted to maintain proper balance between the boiler and turbine during steady state or normal operation, wherein the megawatt generation is proportional to fuel input. Next, the load reference signal is trimmed by a throttle pressure error signal developed within the throttle pressure control 304A, so that the throttle pressure is adjusted to a point to permit the proper usage of the stored energy in the boiler. As throttle pressure varies from setpoint, an integrating controller derives the deviation or error and accumulates an offset which is scaled and added to plant load reference, which now has trims of generator load error and speed error. This is the final correction from the plant unit master. Throttle pressure correction is applied when in Local Coordinated, Remote Coordinated or Boiler Follow Modes. If not in these modes, the trim is zero and the integrator will assume zero offset. As throttle pressure goes high, the plant load reference will be decreased. If throttle pressure is low, the plant reference will be increased to attempt to maintain proper value. When the plant unit master is operating in a separated or uncoordinated mode, all three trims, throttle pressure, generator load and speed error, are removed from the plant load reference. Only after transfer to a coordinated mode as specified in the appropriate transfer box will the trims come into action.

These three trims applied to the plant unit master to modify boiler control, differ from the control operations of the prior art analog plant unit masters in that each of the three trims has its own separate integrating controller, i.e. controls 74', 78' and 304A, and also makes use of dual time constants for proportional and reset scheme values depending on whether the controller is either selected for actual feedback trim operation or transferring back and bleeding off an accumulated offset. An analog control system uses a single integrating controller and employs three cascaded error blocks to obtain errors of speed, load and throttle pressure, which are summed together. Thus, in an analog plant unit master, the flexibility of calibration of individual gain and time constant on the controller is very limited, requiring the adjustment of one overall gain and time constant for the three variables. In particular, each of the variable responds at a different rate and, at best in an analog system, only a compromised gain and time constant adjustment can be made.

During a transition between a Coordinated and Uncoordinated Mode, a balancing function is performed between the plant load reference and turbine reference. The mechanism for modifying the plant load reference to provide the boiler reference differs from that described above, because the digital electrohydraulic system shown in FIG. 8 has its own method of tracking the process. The DEH system functions as one large manual auto station in comparison to the many manual auto stations of the boilers. As a result, the transition 312 as shown in FIG. 7 includes only one integrating controller 638 to balance the plant load reference against the turbine speed load reference. The reference balancing mechanism operates only when a load reference in megawatts is applied to the turbine control after the breakers are closed because the plant unit master cannot be coordinated when the turbine is on speed control. For turbine control, the plant load reference signal is trimmed by an amount proportional to the throttle pressure error so that when the governor valves open, the energy stored in the boiler will be transferred to the turbine for megawatt generation. In particular, the plant load reference applied to the turbine control, is trimmed as a function of the throttle pressure error as developed within the throttle pressure control block 304B, whereby simultaneously, boiler and turbine response is effected according to the plant load reference.

Frequency bias (or speed error) is applied to both the turbine and boiler control systems to permit the unit to share properly in the frequency control by increasing or decreasing the boiler and turbine demand signals, as required. As generally shown in FIG. 6, the speed control block 74' trims the plant load reference to be applied to the boiler control as a function of speed. In the turbine, direct proportion regulation is effected as a function of frequency, while in the boiler, frequency error is summed or integrated.

As will be explained in greater detail later, in the Start and Plant Manual Modes, the boiler and turbine are operated separately and provide a means of operating the unit prior to synchronizing and during periods of Total Manual operation after synchronizing.

Ramping is a Coordinated Mode and provides for operation from synchronizing and bypass system operation to full throttle pressure and once-through operation. The Local Coordinated and Remote Coordinated Modes are the normal plant operation. Boiler Follow and Turbine Follow are coordinated contingency modes of operation.

At this point, a more detailed discussion will be given of the various modes of operation under the control of the plant unit master. The modes of operation will be described in that order, beginning with the Start Mode, whereby the power generating system, including the boiler and turbine, are brought from a cold condition up to that condition wherein a turbine is placed online and is meeting the load and frequency requirements of the power generating system.

The Start Mode is an uncoordinated mode used from initial firing up to the closing of the generator breaker. This mode cannot be selected by the operator, but is automatically selected when the unit is tripped in order to be ready for the next start-up. During this mode, the speed/load reference is providing the speed reference for the turbine control system which is in the wide-range speed control mode.

In the Start Mode, transition is effected from a stage wherein the BE valves which are opened to permit steam to recirculate through the separator to the condenser, to a stage where BTB valves are opened to permit the boiler to operate in a once-through mode. It is understood that the boiler may not be operated initially in the once-through mode in that the temperature and quantity of heat must be raised to permit the water to absorb sufficient energy to be converted to steam in a single pass; when this condition has been achieved, the control system is ready to be transitioned from the Start Mode to the Plant Manual Mode.

Figure 7B:
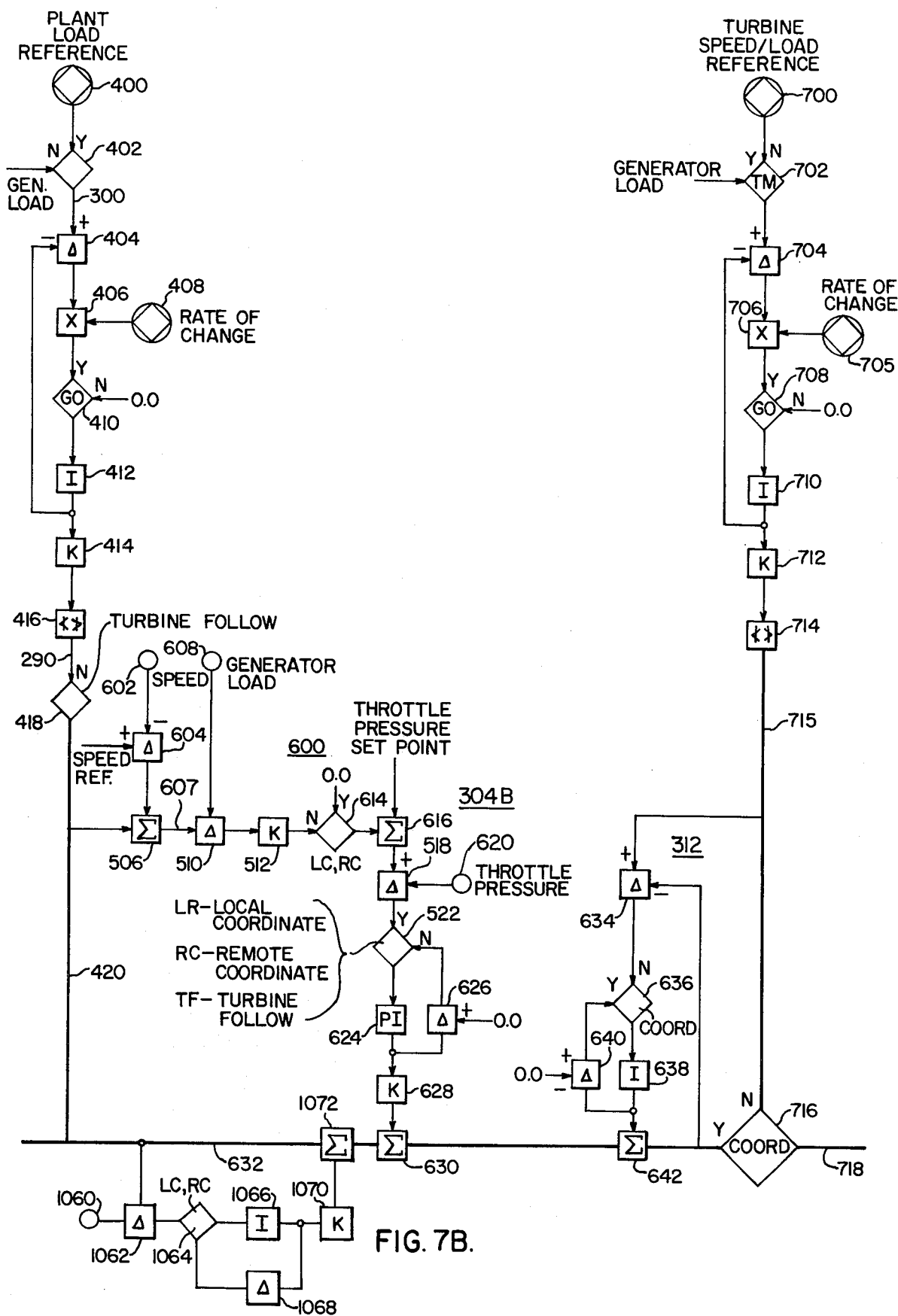
FIGS. 7A and B are schematic diagrams of the plant unit master showing in detail the control flow and application of the plant load reference to the boiler and turbine controls when operating in a coordinated fashion, and the manner in which the feedwater reference and the turbine speed/load reference are applied, respectively, to the boiler and turbine controls when operating in a non-coordinated fashion.
Figure 10:
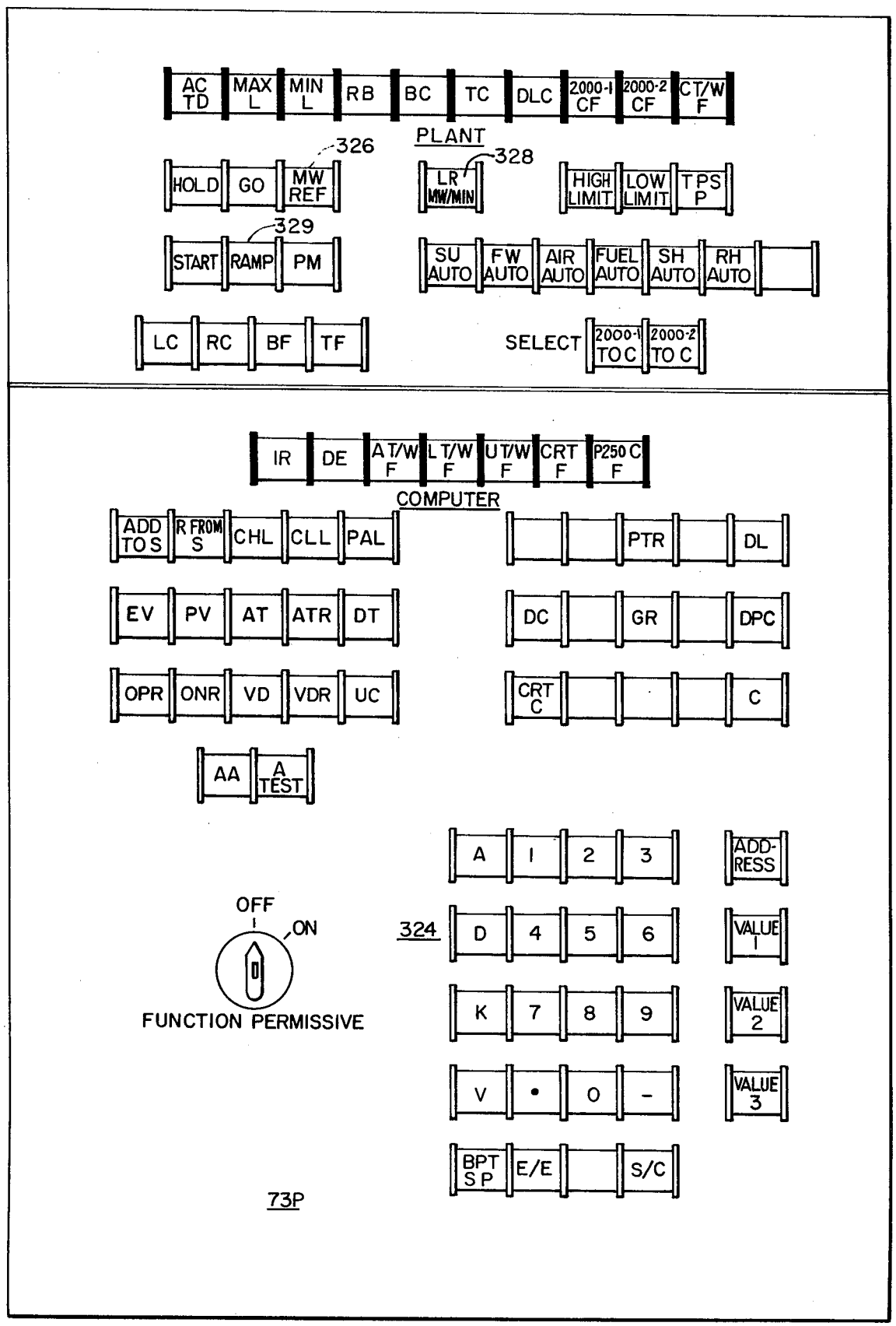
FIGS. 10A, 10B and 10C show in detail the operator's panel, shown generally in FIG. 3A.
Figure 10:
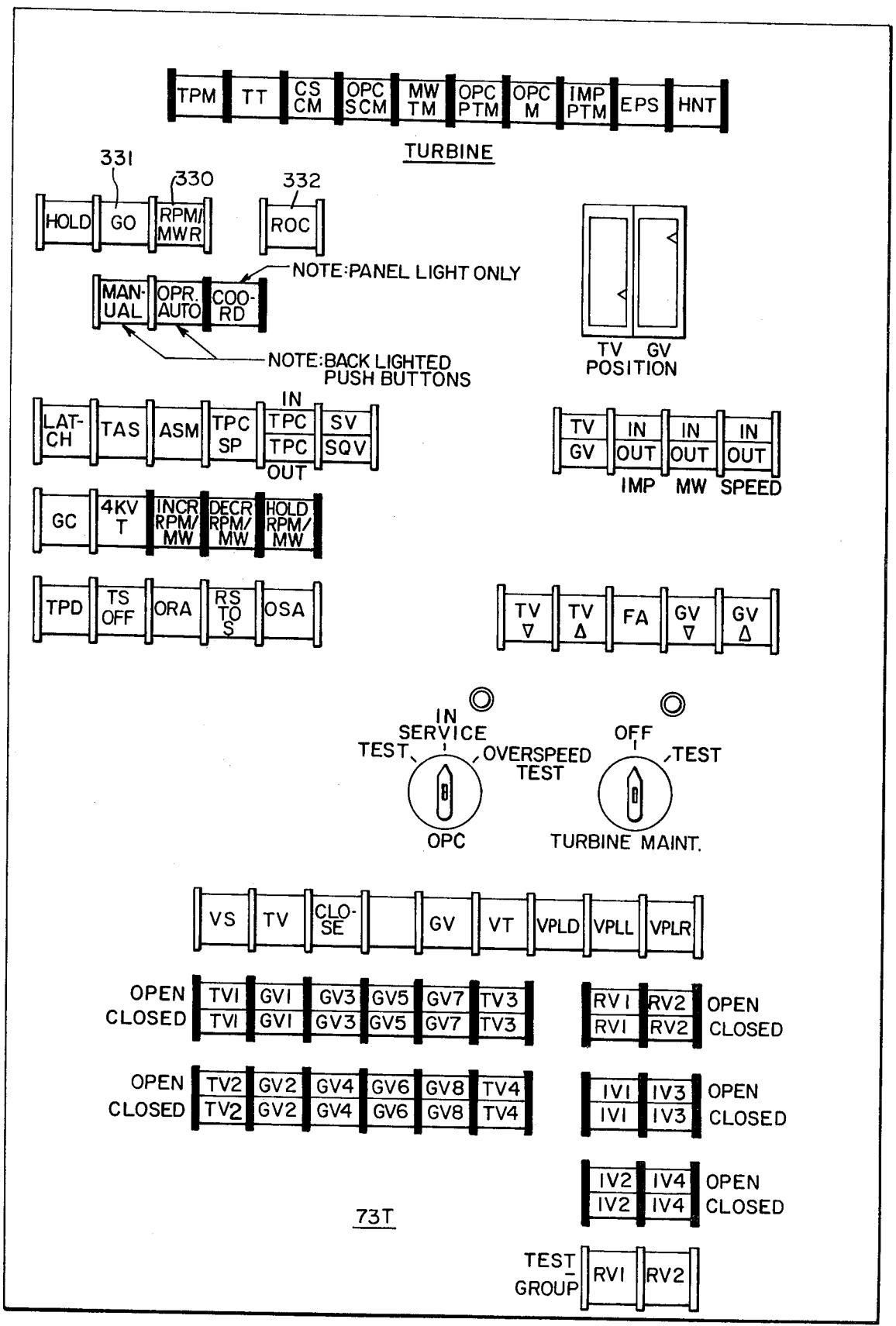

First, the speed/load reference for the turbine is entered in the turbine reference pushbuttons symbolically shown in FIG. 7B by the numeral 700. In FIG. 10, a portion of the operator's panel 73 is shown, which includes a series of pushbuttons for making operator entry as well as a demand window (not shown) for displaying the value to be entered, and a reference window (not shown) for providing a display of the actually-measured value. If the operator desires to enter the speed/load reference for the turbine, he presses the pushbutton RPM/MWR, as identified by the numeral 330 in FIG. 10C, whereby the system is prepared to receive a value to be entered upon the matrix 324 (see FIG. 10B), and the value to be entered will appear in the demand window. If the value is correct as confirmed by the operator, he will press the ENTER button and such a value will be entered into the overall control system. As shown generally in FIG. 6, the coordinated-non-coordinated transition block 312 permits the speed/load reference to be applied directly to the turbine control. In a similar manner, the boiler control can be in a feedwater base mode with a load reference placed into the system by a feedwater reference entry 500, as shown in FIG. 7A. The control for the boiler may be on automatic or manual control during the start-up of the turbine. With respect to FIG. 10, the entry of various other values upon the operator's panel may take place in a manner similar to that described above.

The Start Mode is an uncoordinated mode whereby both the boiler and turbine are prepared to be operated in a coordinated mode. Initially, both the boiler and turbine are cold and require a gradual process of heating, before they may be operated under rated conditions and/or in a coordinated mode. With respect to the initial operation of the boiler, a feedwater reference and its rate of change are placed into the system at entries 500 and 508, respectively. With reference to FIG. 10A, once the feedwater reference and rate of change have been entered on buttons 334 and 336, respectively, the GO button 335 is actuated and the entered value of the feedwater reference is imposed gradually upon the boiler control at a rate determined by the entered rate. Normally, in the Start Mode, the boiler control can be in a feedwater base mode with a load reference coming from the feedwater reference button in the boiler portion of the panel as shown in FIG. 10A. The control for the boiler may be on Automatic or Manual control during the start-up of the turbine. The speed/load reference is entered as shown in FIG. 7B at entry point 700 and the rate of change is entered at entry point 705. The entered value of the speed/load reference is placed gradually upon the system in a manner similar to that described above. The operator gradually increases the value of the turbine speed/load reference, thereby disposing the throttle valves to a fixed position. If in the feedwater mode, the decision block 502 (FIG. 7A) applies the feedwater reference to a difference block 504. The difference block 504 provides an error signal indicative of the difference between the entered feedwater reference and the actual, total feedwater provided to the boiler as derived by the feedback loop. The difference signal is operated upon by a multiplier 506 by the rate of change received at entry 508. In particular, during each interval, e.g. one second, that the control program runs, the entered rate of change oeprates upon the difference signal. The control system will remain in a GO state and the GO decision block 510 will apply the processed difference signal to an integrator 512, until the entered value of feedwater reference has been totally imposed upon the system and the output of the integrator 512 is zero. The feedwater reference value, as derived above, is applied through a proportional block 514, a limiter 516, and the coordination block 470 to the boiler control. When the value of feedwater reference has been satisfied, i.e. entered into the control system, the system will go to a hold condition, as indicated by the back-light HOLD button 333 (see FIG. 10A).

The value of feedwater reference as previously entered is determined empirically (approximately 3% of total flow) as that amount of water required to produce the desired steam pressure. After the value of feedwater reference has been entered, air is introduced into the furnace and fuel likewise is introduced to permit the burners to be ignited. At this point, the water begins to be heated to create steam.

During the preparation of the boiler, the turbine is turned by gear while the throttle valves are opened under modulated control to admit superheated steam to the turbine, causing it to roll-off turning gear. It is realized that the turbine shaft and rotor are quite large, requiring a gradual heating process to permit thorough heating and to prevent possible distortion which might damage the rotor or the turbine housing. With the throttle valves disposed at a predetermined, fixed opening, the inflows of fuel, air and water are gradually increased along a predetermined ramp to increase the steam pressure at a corresponding rate.

The Start Mode is effected in two steps. In the first, the speed of rotation of the turbine is increased gradually, as explained above, to a value of approximately 2200 RPM, whereby the turbine blades, and in particular the roots of the turbine blades, are heated gradually. During a first heat soak, the values of fuel, air and water input are maintained relatively constant, while the turbine is permitted to run at 2200 RPM until its blades are heated entirely. Thereafter, the second step commences to further increase the speed of rotation until the turbine rotor is rotating at a synchronous speed of 3600 RPM. During the second step of the Start Mode, control over the entry of steam pressure is transferred from the throttle valves to the governor valves at 3200 RPM, under the control of the digital electrohydraulic control system, described above. Upon achieving 3600 RPM, the operator vents the turbine valves, before closing the breakers to place the turbine on-line. At this point, the steam pressure has been brought up to a value of approximately 1000 PSI, the turbine is rotating at synchronous speed to generate approximately 5% of the load.

As an alternative to the method described above which is effected by the operator through his panel, the operator may initiate the automatic turbine start-up program, as described above, whereby the gradually-increasing value of speed/load reference is imposed gradually upon the turbine control by the ATS program 178 (FIG. 5).

The control for the boiler may be on Automatic or Manual control during initial rolling of the turbine. Control is transferred automatically to the Plant Manual Mode, when the breakers are closed; this is the only method of leaving the Start Mode.

The Plant Manual Mode is an uncoordinated mode used after synchronizing and during certain manual operations. This mode cannot be selected by the operator, but is automatically selected when the boiler fuel, water, air and turbine are not on Automatic control. The boiler or turbine mode transfers can be made manually by the operator or automatically by their logic systems. During this mode, the speed/load reference is providing the load reference for the turbine control system which can be operating in Operator Automatic or on Manual. The boiler control can be in any of the feedwater base modes with the load reference coming from the feedwater base control or on Manual. The boiler-turbine coordination control and the contingency load limiting control are not active at this time.

Control is automatically transferred to the Start Mode if the breaker opens, or by operator selection to any of the five Coordinated modes if their respective permissives are satisfied.

In the Plant Manual Mode, the turbine and boiler controls are operated separately in the sense that the operator enters a value of feedwater reference through the entry 500 and a value of turbine speed/load reference through the entry 700. The turbine speed/load reference is set in terms of load so that a speed does not induce vibration in the turbine shaft. Further, the operator is limited as to the rate of change of the RPM that may be set at entry 705, e.g. 200 RPM/min. When a GO button 331 becomes back-lighted (see FIG. 10C), the operator is apprised that the values of turbine speed/load reference and rate of change have been imposed upon the turbine control.

The Ramp Mode is initiated by pressing a RAMP button 329 on the operator's panel (see FIG. 10B) to effect a transition from the above-described Plant Manual Mode into the Ramp Mode. In the Ramp Mode, the steam pressure is increased gradually along a ramp from an illustrative value of 1000 PSIG to 3500 PSIG and is considered a limited coordinated mode of operation. Generally, in this mode, the position of the governor valves is moved from a fixed position from about 7% to 8% load to a predetermined value, e.g. 25% load, and the boiler pressure is increased along a ramp as the values of feedwater, fuel and air are increased according to the desired ramp. When the desired end point upon the ramp, e.g. 3500 PSIG, has been achieved, the BTB valves are opened to reduce the pressure while the feedwater pumps are operated to increase the pressure to the desired level of 3500 PSIG. At this point in the operation of the turbine-boiler system, the plant unit master is prepared to be transferred from the Ramp Mode into any of the Boiler Follow, Turbine Follow or Local Coordinated Modes of operation, to be explained. There will be further described the logical conditions (or permissives) required to permit a transition from the Ramp Mode to any of the mentioned modes, as well as the transitions between the other modes of operation of the plant unit master.

Figure 15:
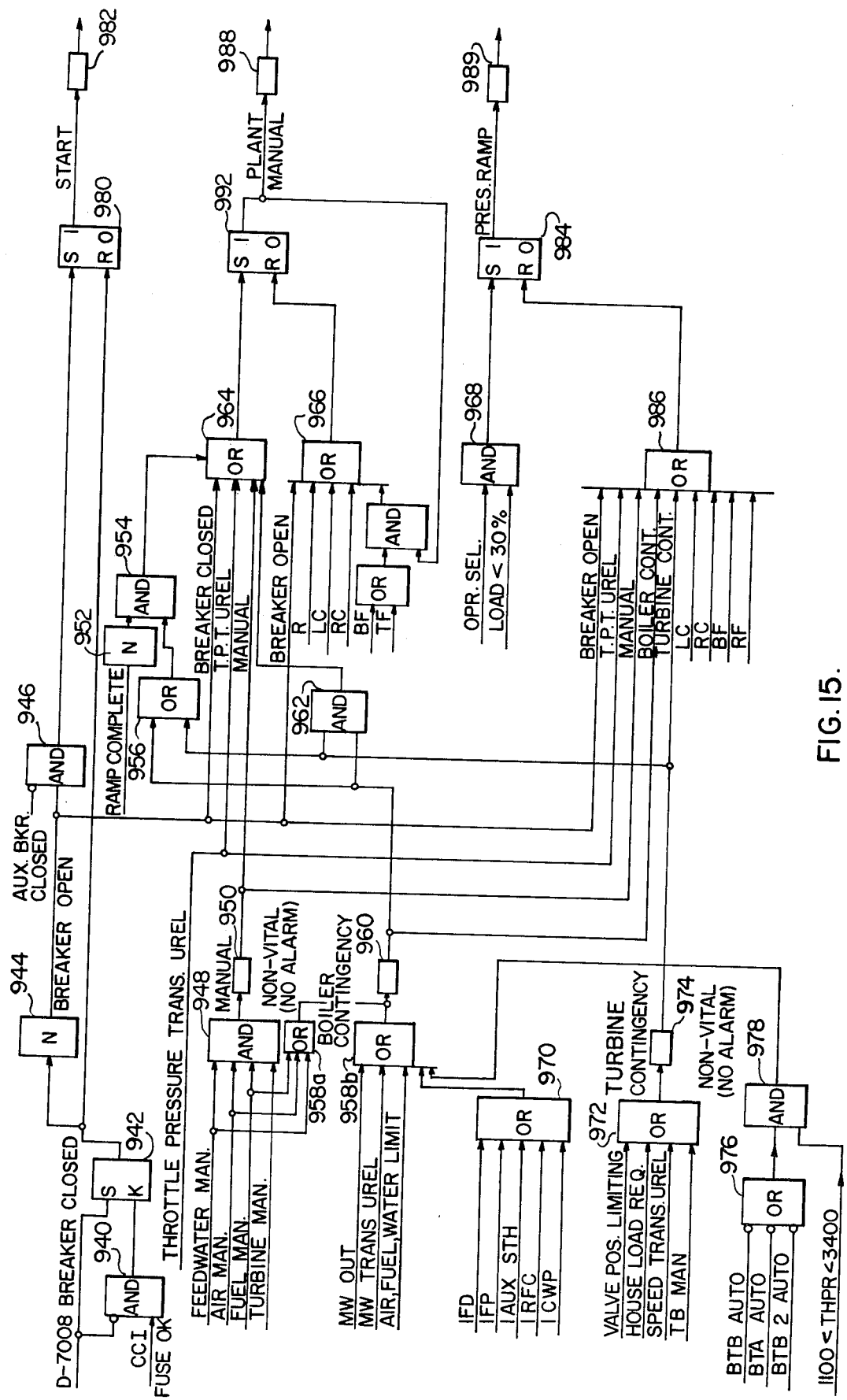
Figure 15A:
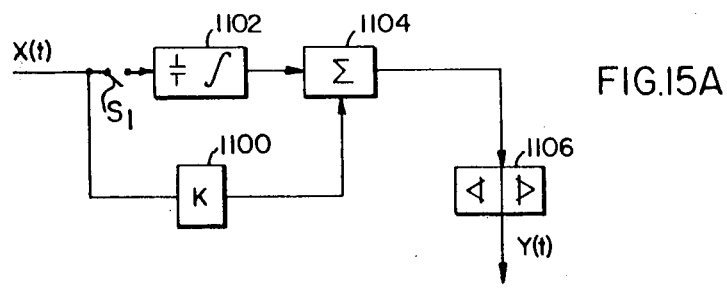
FIGS. 15A and 15B show, respectively, the control systems for implementing a P-PI controller and a linear, ramp generator as incorporated into the plant unit master shown in FIGS. 7A and B.
Figure 15B:
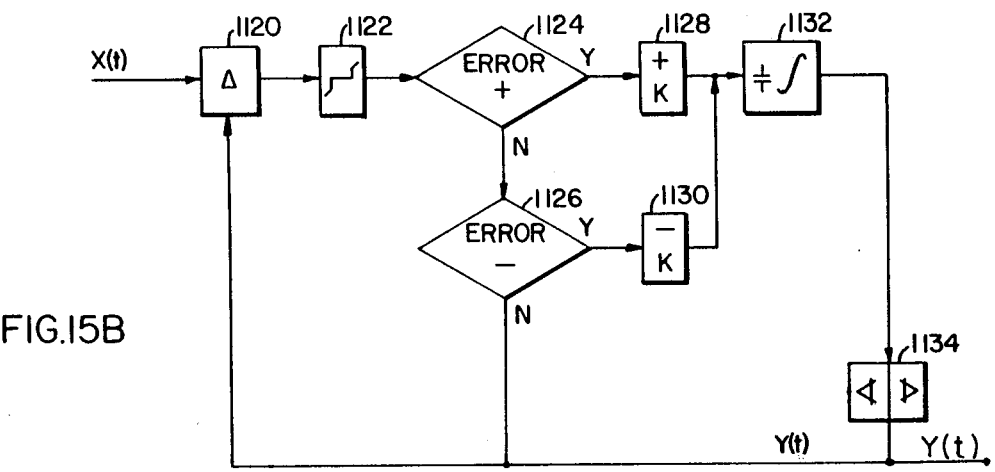

The manner in which the Ramp Mode is effected is explained more specifically with respect to FIG. 9, wherein if the plant unit master is in its Ramp Mode as determined by decision block 800, and the boiler extraction BE valves are closed and the boiler throttle valves are opened to permit steam to pass just once through the boiler as determined by the decision block 804, a ramp generator 802, the details of which are explained later with respect to FIG. 15B, provides a ramp-like signal increasing toward a preset value corresponding to 3500 PSIG. If the plant unit master is not in its Ramp Mode, as decided by the decision block 800, the measured throttle pressure is applied to the ramp generator 802. The ramping signal derived from the generator 802 is applied through the decision block 804 and a decision block 820, if in the Ramp Mode, to be applied to a difference block 826. The difference block 826 compares the ramping signal with a measured value of throttle pressure (PSIG) as entered through point 822 and low limiter 824. If there is a difference between the measured throttle pressure PSIG and the ramping signal, a difference or error signal is generated and applied along conduit 834 to be added in summing block 513 (FIG. 7A) with the feedwater reference. As a result, the demand reference applied to the boiler control, follows the signal ramping toward a value corresponding to 3500 PSIG. Further, the measured throttle pressure is applied through the decision block 800 to the ramp function generator 802, if the plant unit master is not in its Ramp Mode as decided by decision block 800. Thus, when the plant unit master transitions to its Ramp Mode, a reference point will have been established from which ramping commences.

If the BE valves are opened as decided by decision block 804 and the plant unit master is in its Ramp Mode, the ramp generator 806 provides a decreasing output along a ramp function toward a value of 1000 PSI. Thus, if the pressure established within the boiler while the BE valves are open exceeds the nominal initial starting point for the Ramp Mode, e.g. 1000 PSIG, the ramp function generator 806 provides a decreasing ramp signal, whereby the set point decreases toward a value corresponding to 1000 PSIG. In effect, a limit is imposed upon the pressure that may be established within the boiler, while the BE valves are open. On the other hand, if the plant unit master is not in the Ramp Mode as decided by decision block 808, the measured throttle pressure is applied to the ramp generator 806 to provide a reference point for the operation of the generator 806 when the plant unit master is transferred to its Ramp Mode. The ramp-up or ramp-down signals are applied through the decision block 820, if the plant unit master is in its Ramp Mode, to a difference block 826, the output of which is the difference between the ramp signal and a low limited value of throttle pressure. If the plant unit master is not in the Boiler Follow Mode as decided in block 828, the output of the block 826 is applied to the summation block 513 (see FIG. 7A) to effect a trim of the feedwater reference to be applied to the boiler control, whereby an increase (or decrease) in accordance with the ramp signal of the fuel, air and feedwater inputs, is effected.

Figure 15C:
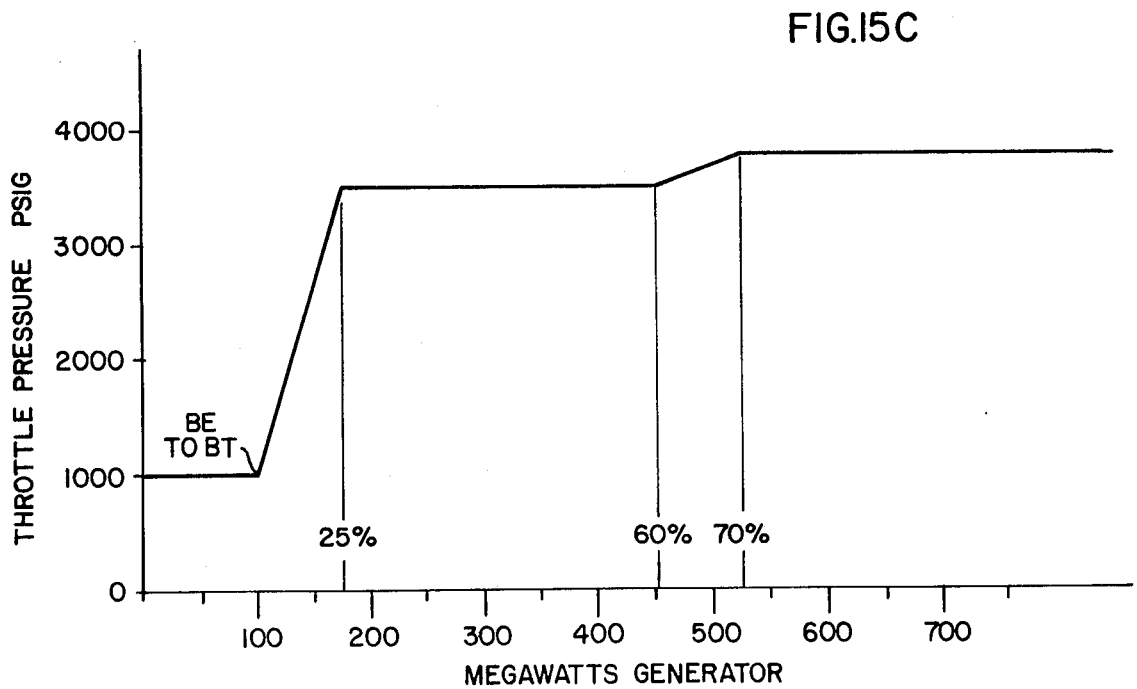
FIG. 15C shows a Throttle Pressure vs. Loading curve.
Figure 16:
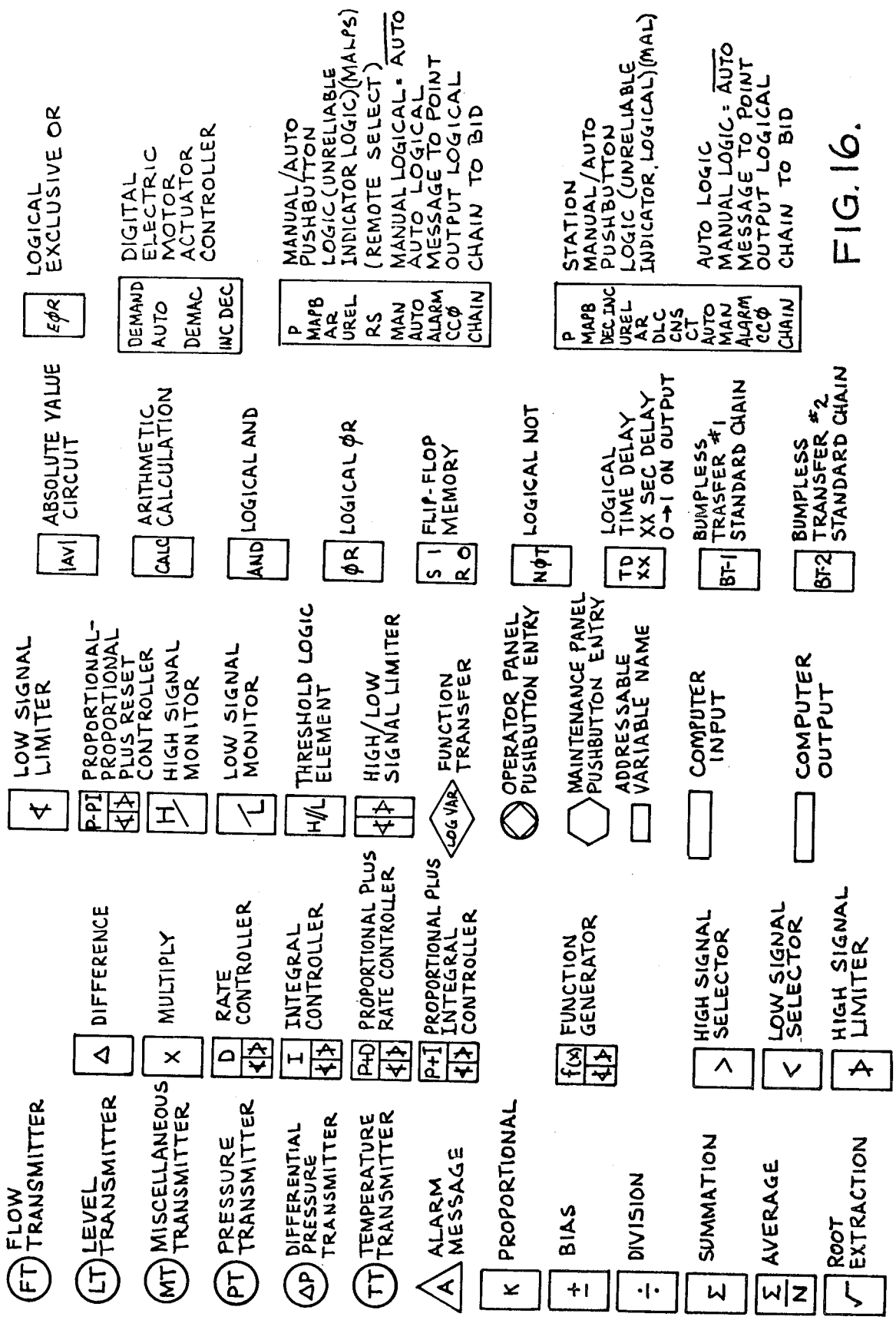
FIG. 16 shows the symbol definitions of the various control elements incorporated into the system of this invention.
Figure 17:
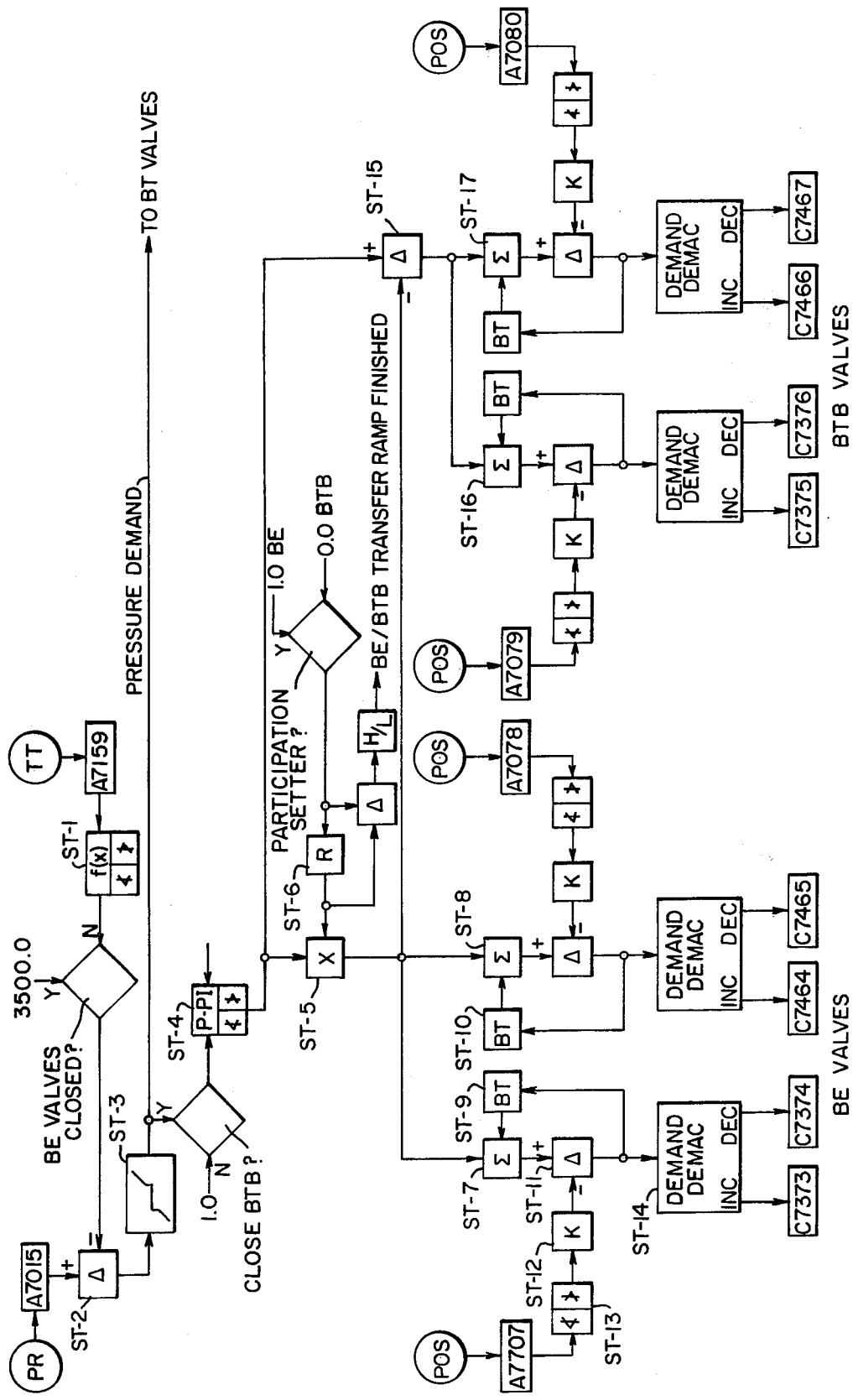
FIGS. 17, 18 and 19 relate to start-up control.
Figure 18:
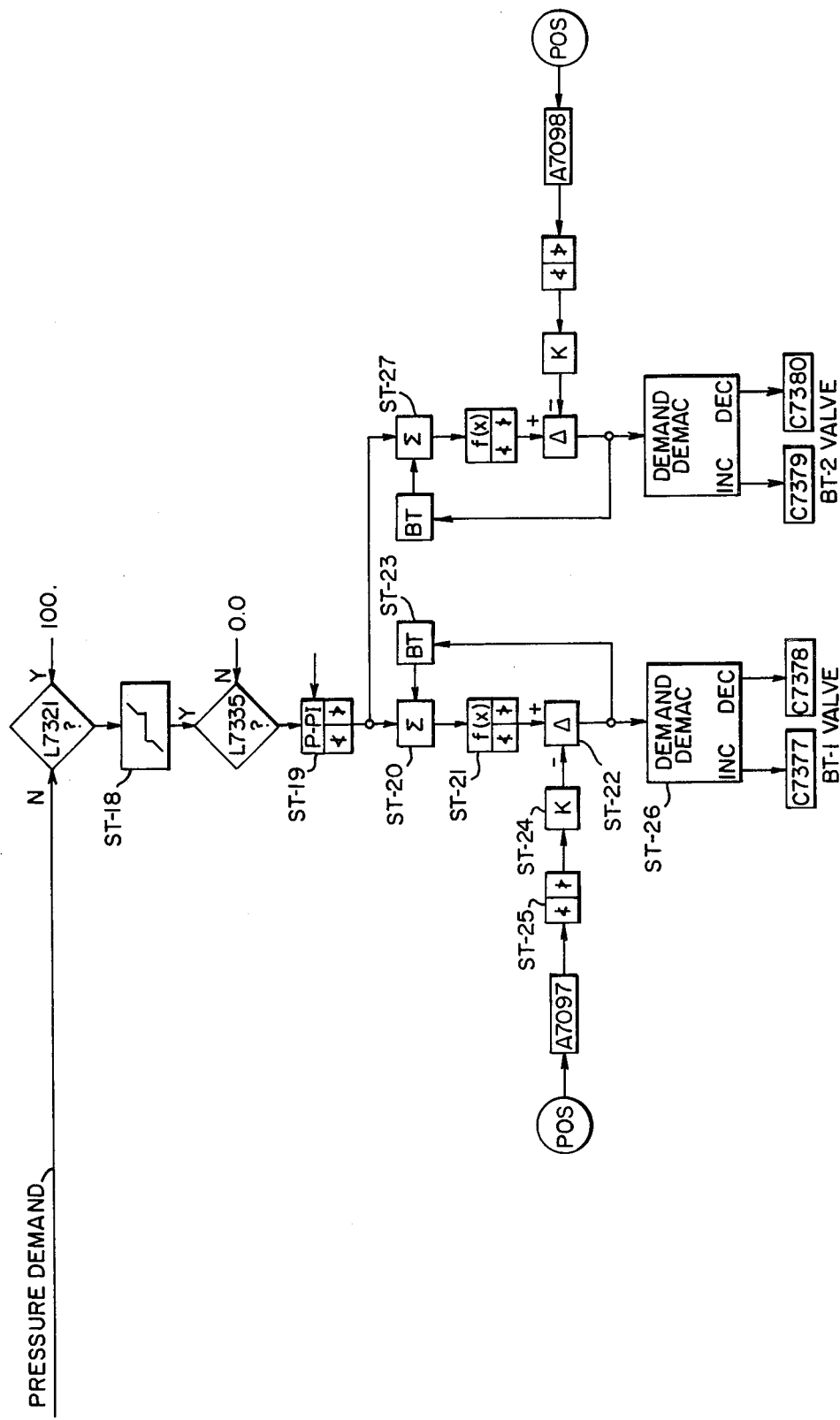
Figure 19:
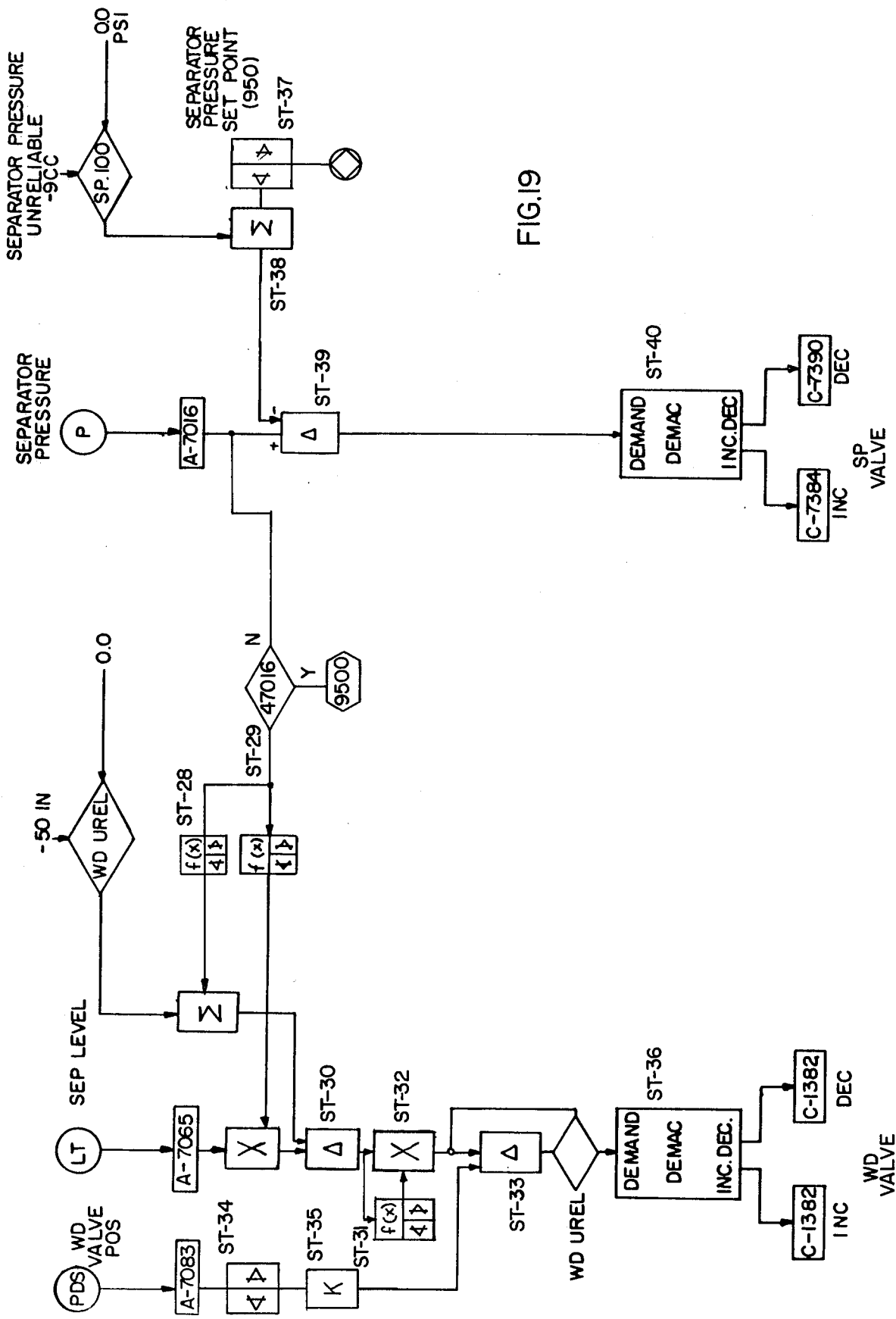
Figure 20:
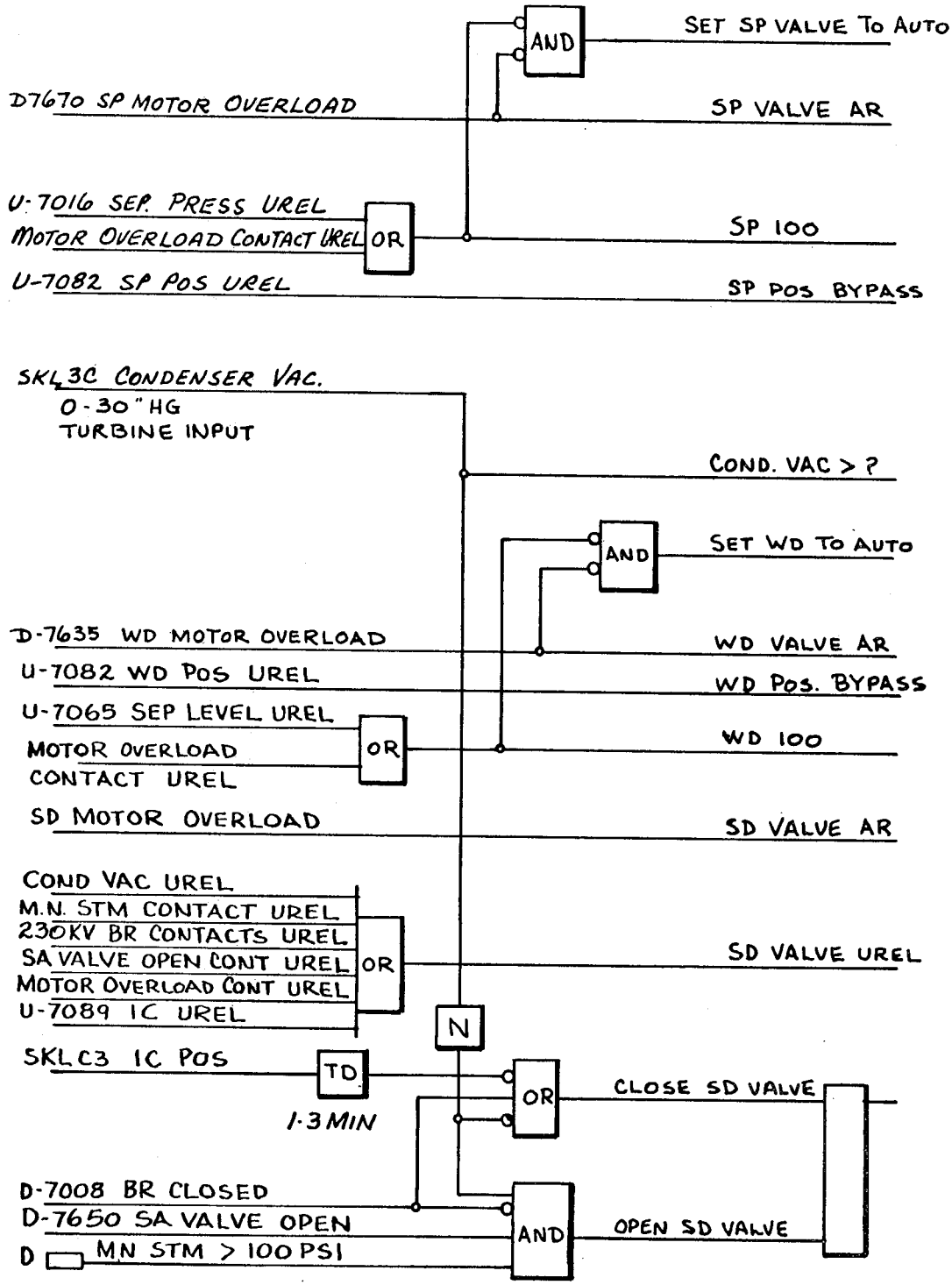
FIGS. 20, 21, 22, 23A and 23B relate to start-up logic.
Figure 21:
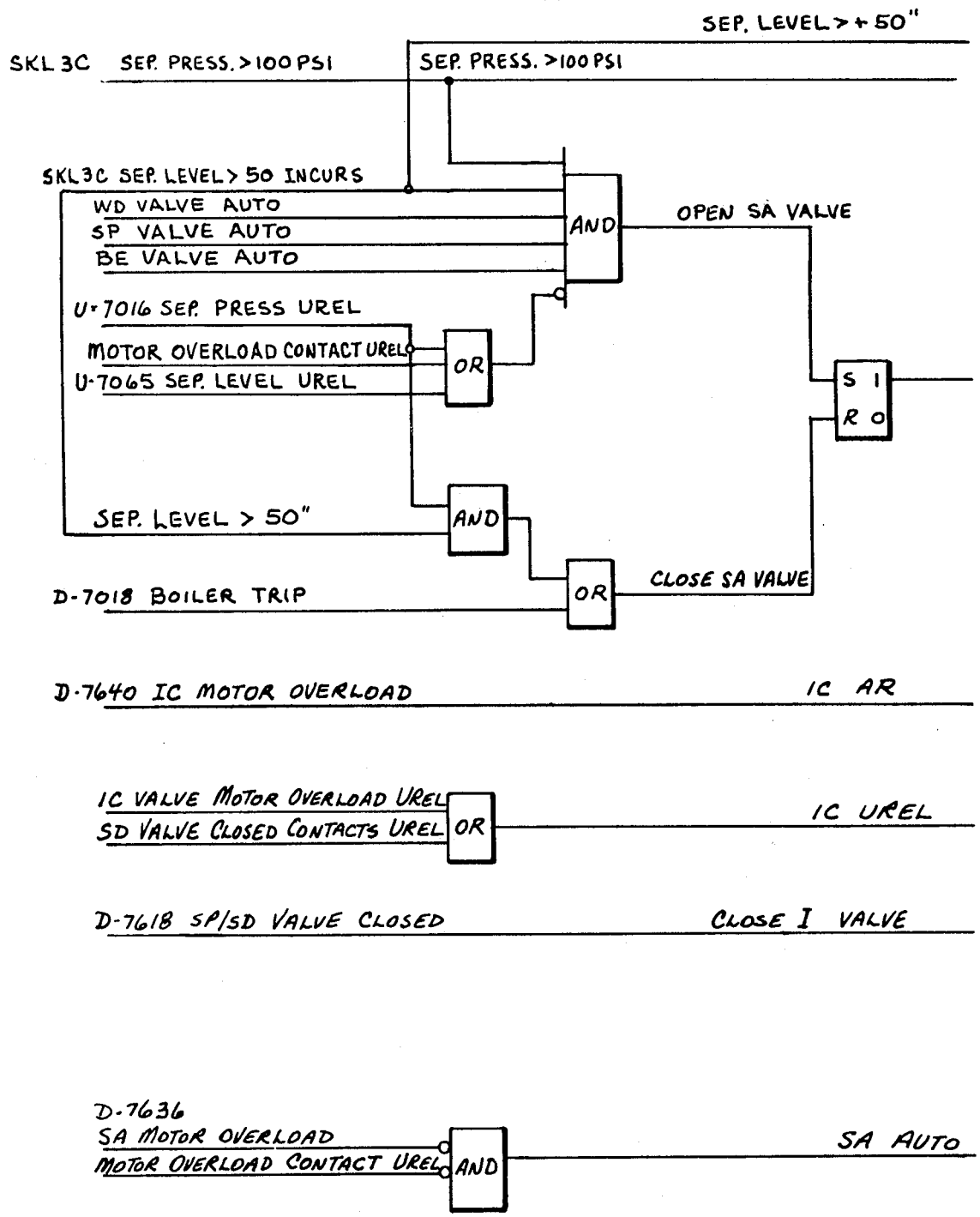
Figure 22:
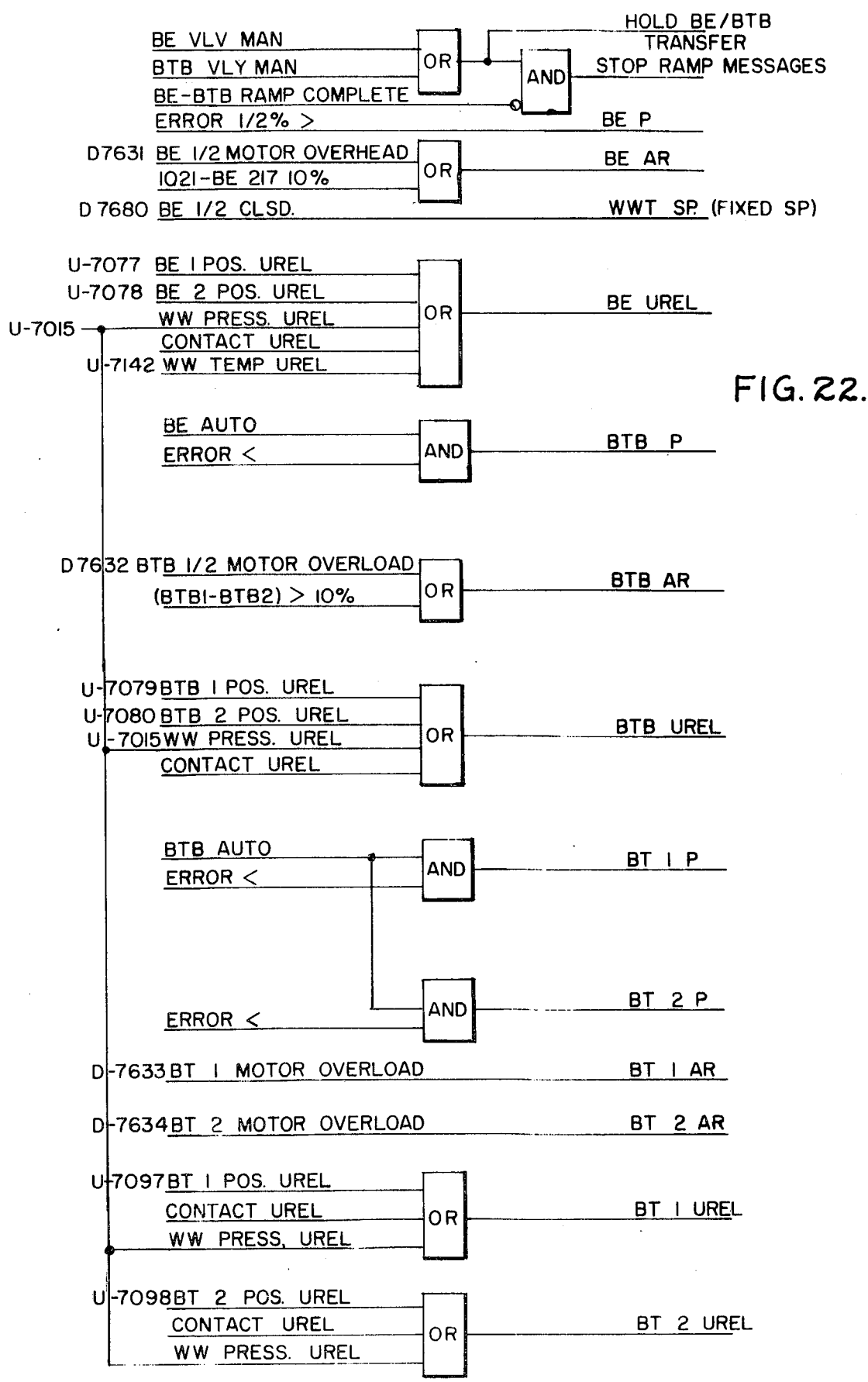
Figure 23A:
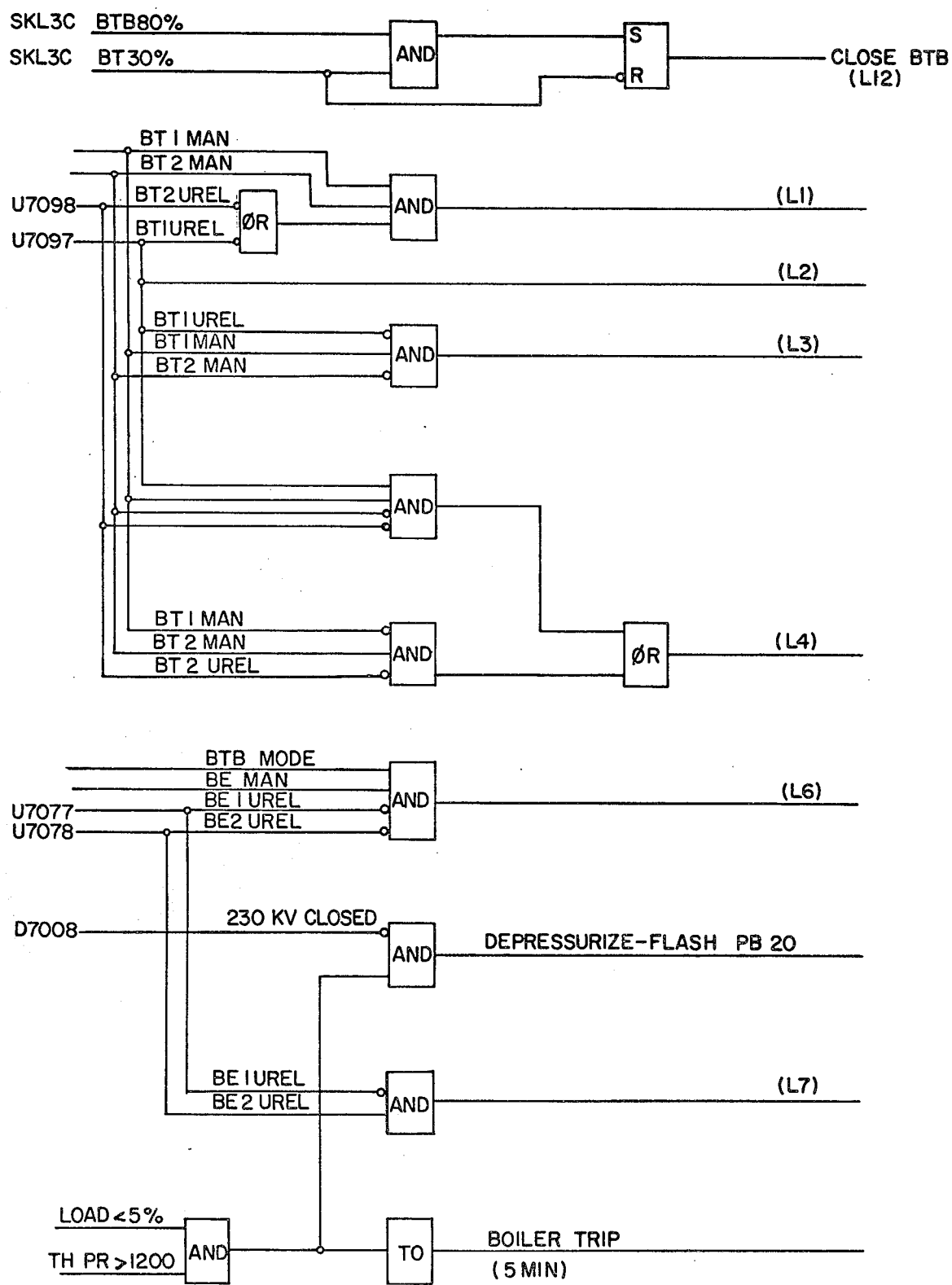
Figure 23B:
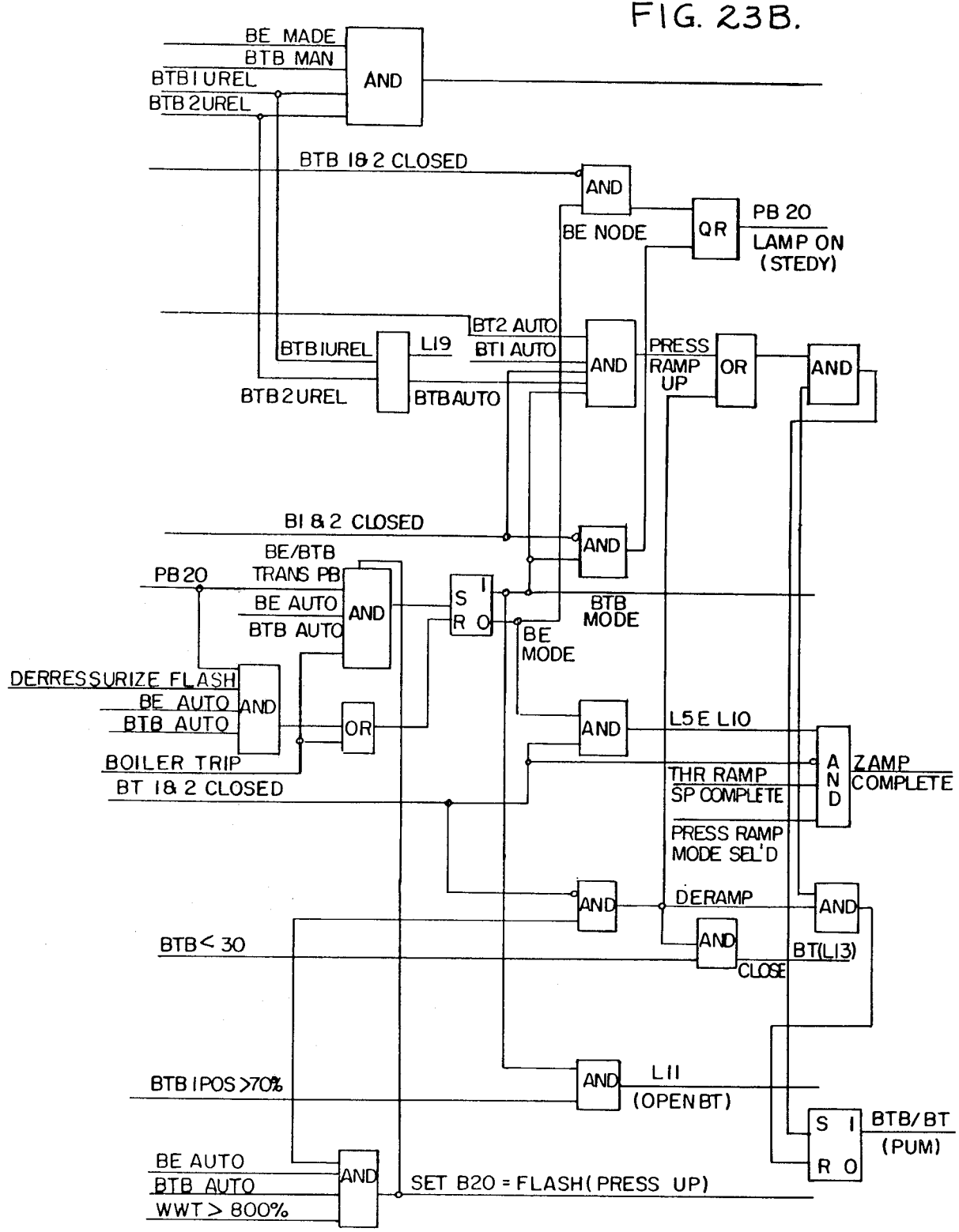
Figure 24:
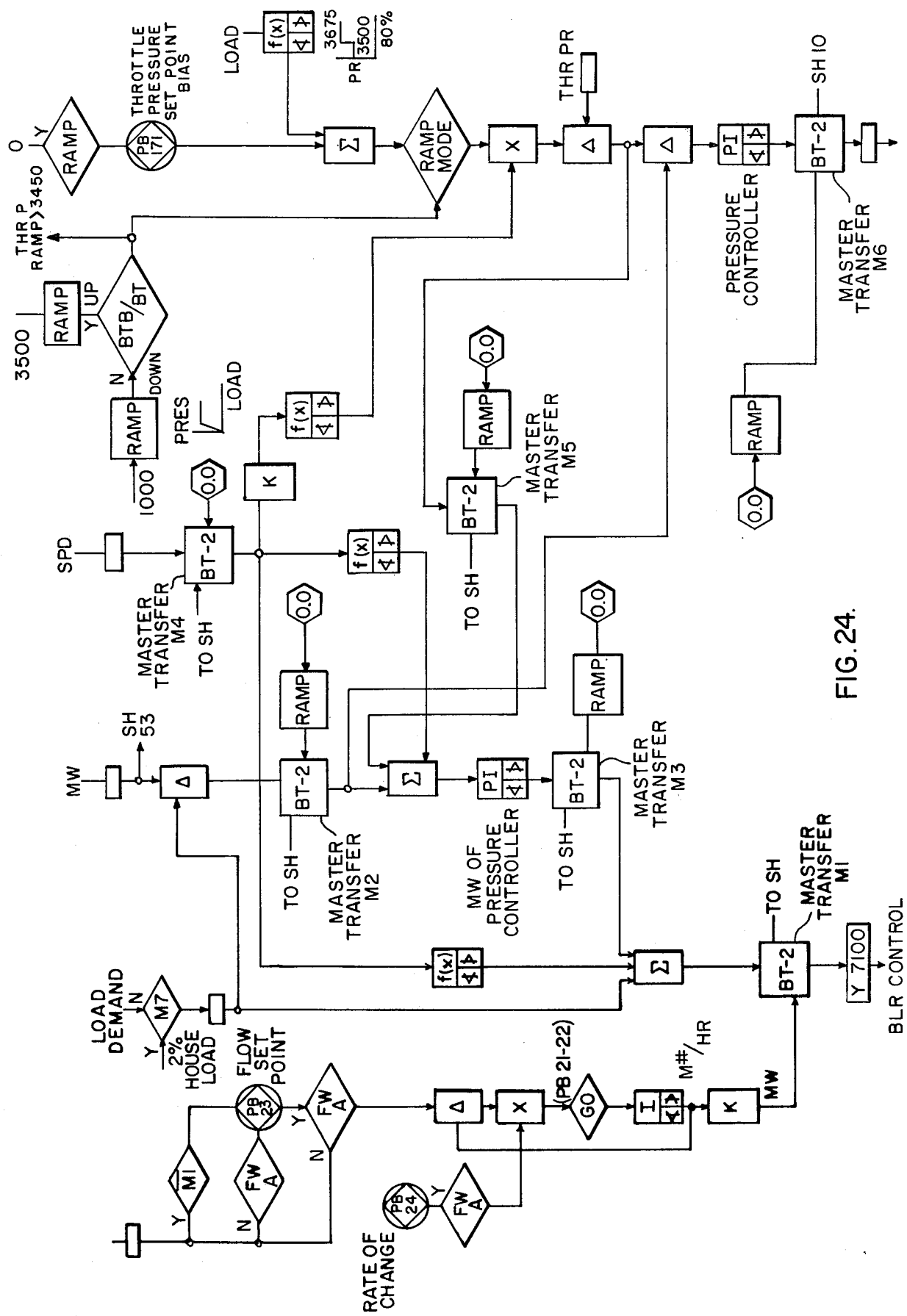
FIG. 24 relates to master control.
Figure 25:
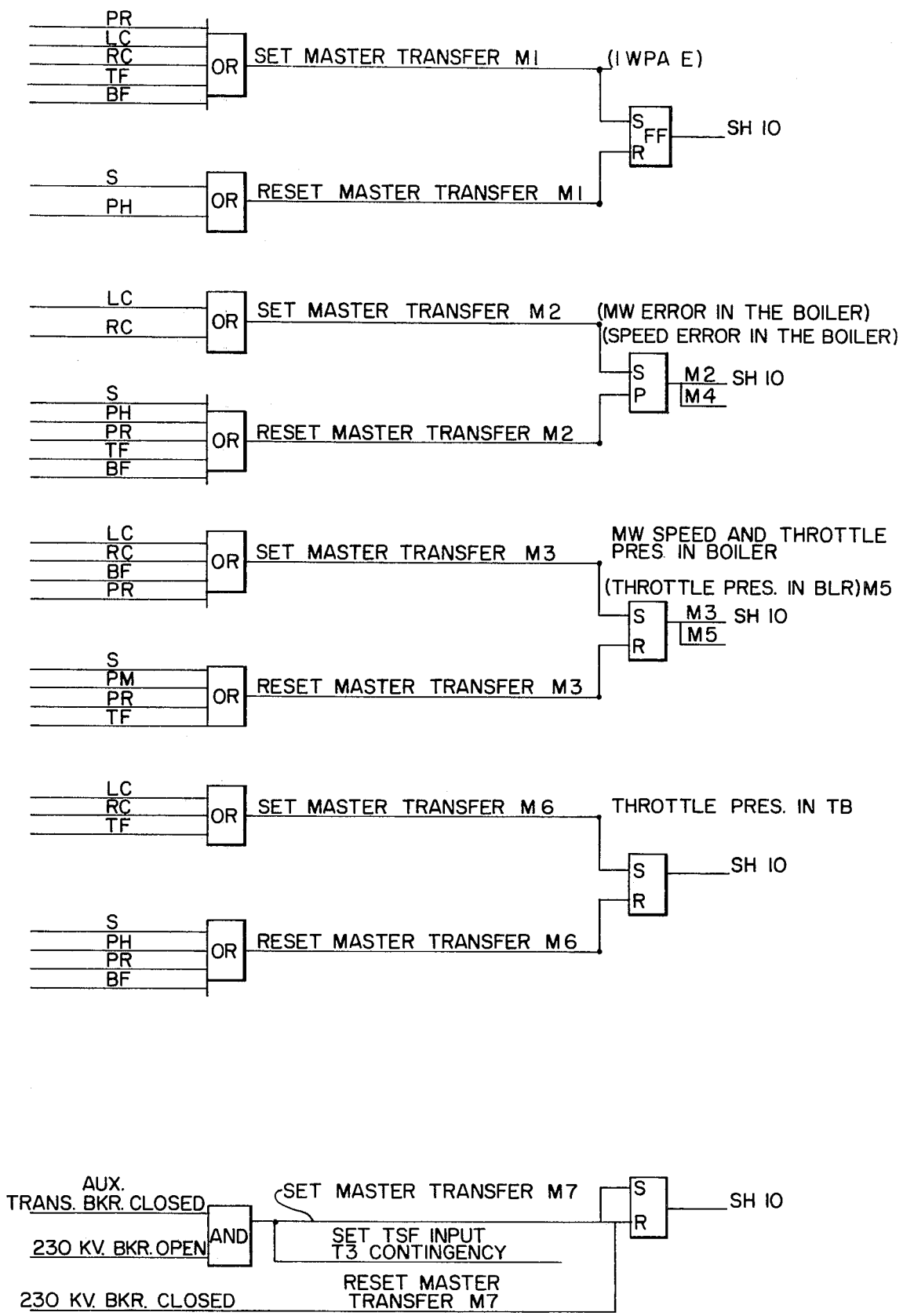
FIG. 25 relates to master transfer logic.
Figure 26:
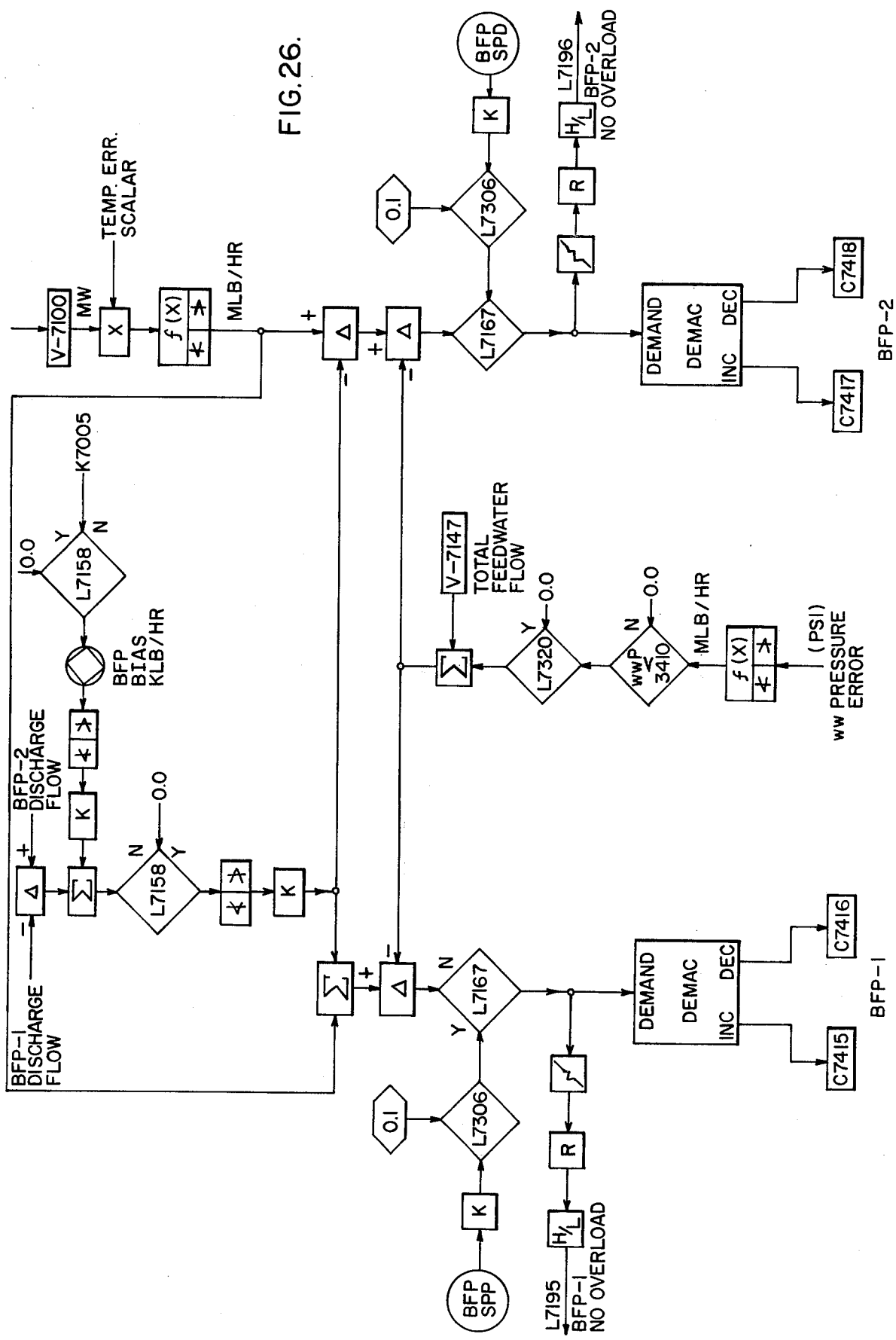
FIGS. 26 and 28 relate to feedwater control.
Figure 27:
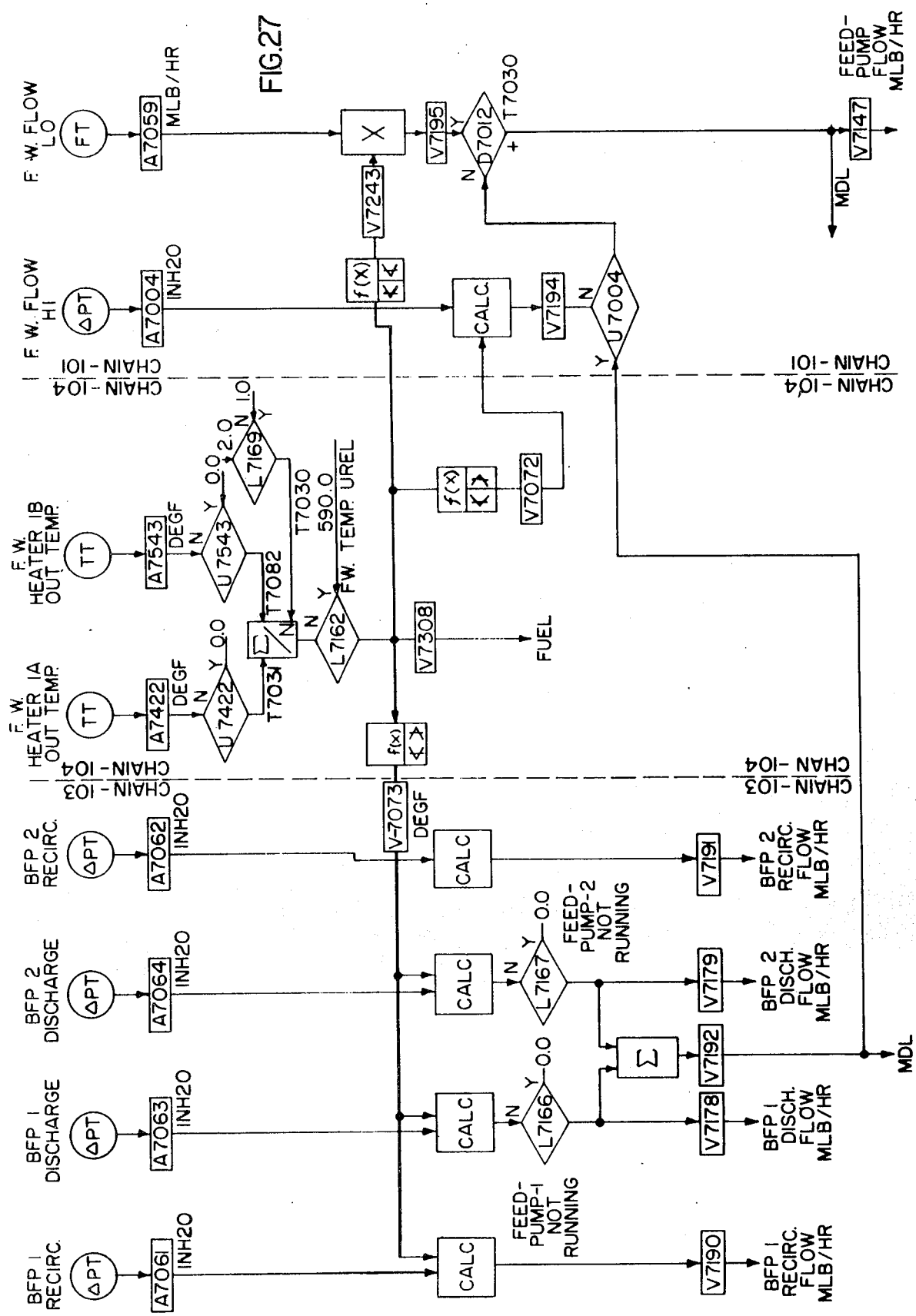
FIGS. 27, 29A and 29B, and 30A and 30B relate to feedwater flow.
Figure 28:
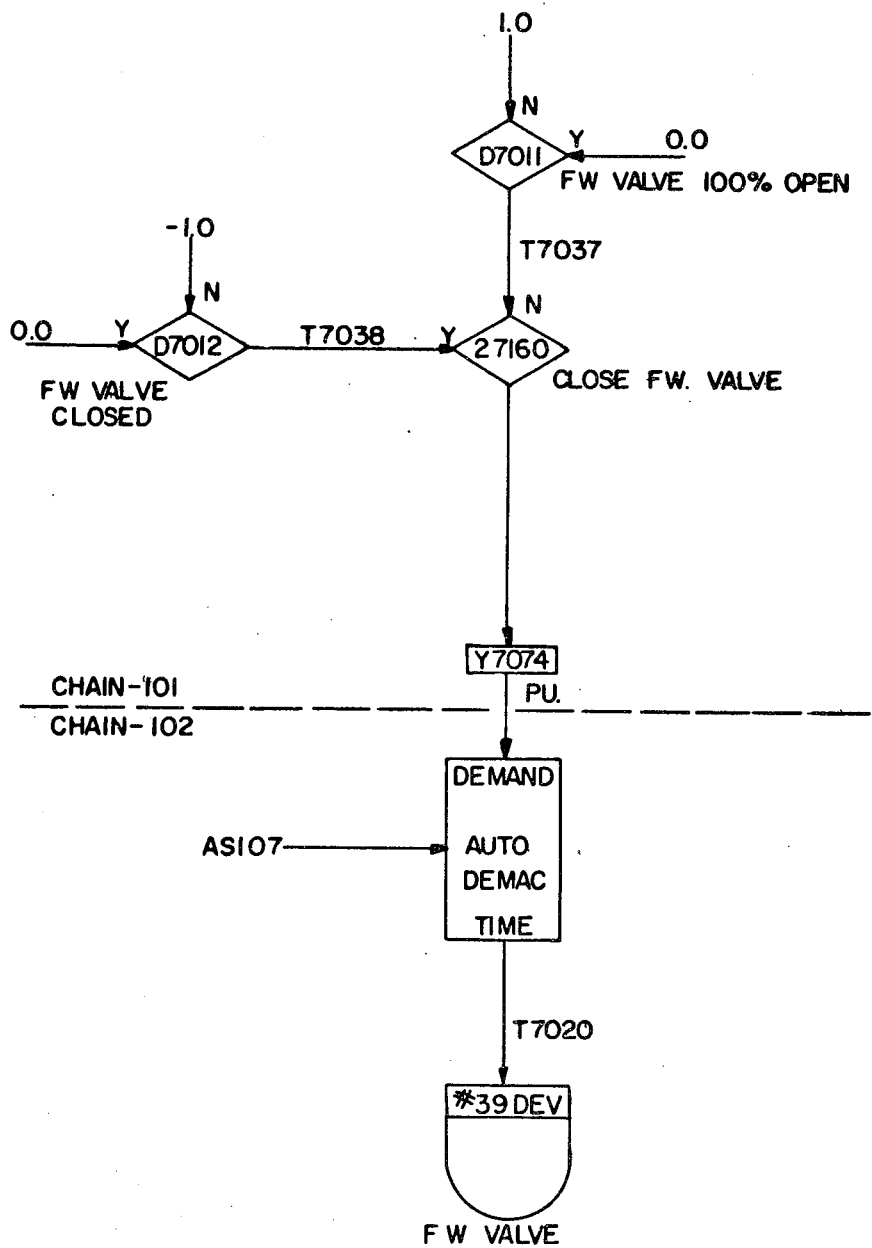
Figure 29A:
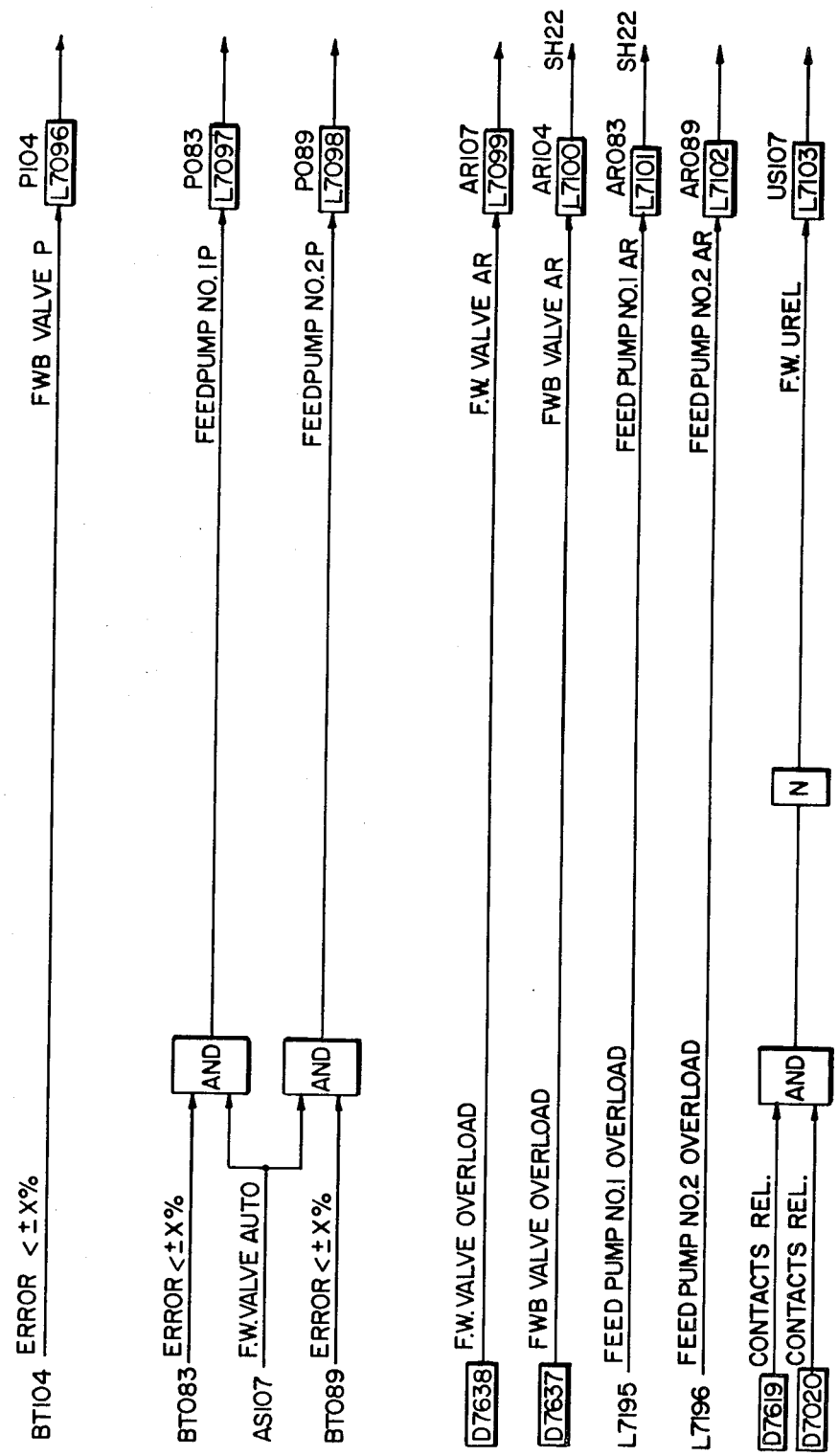
Figure 29B:
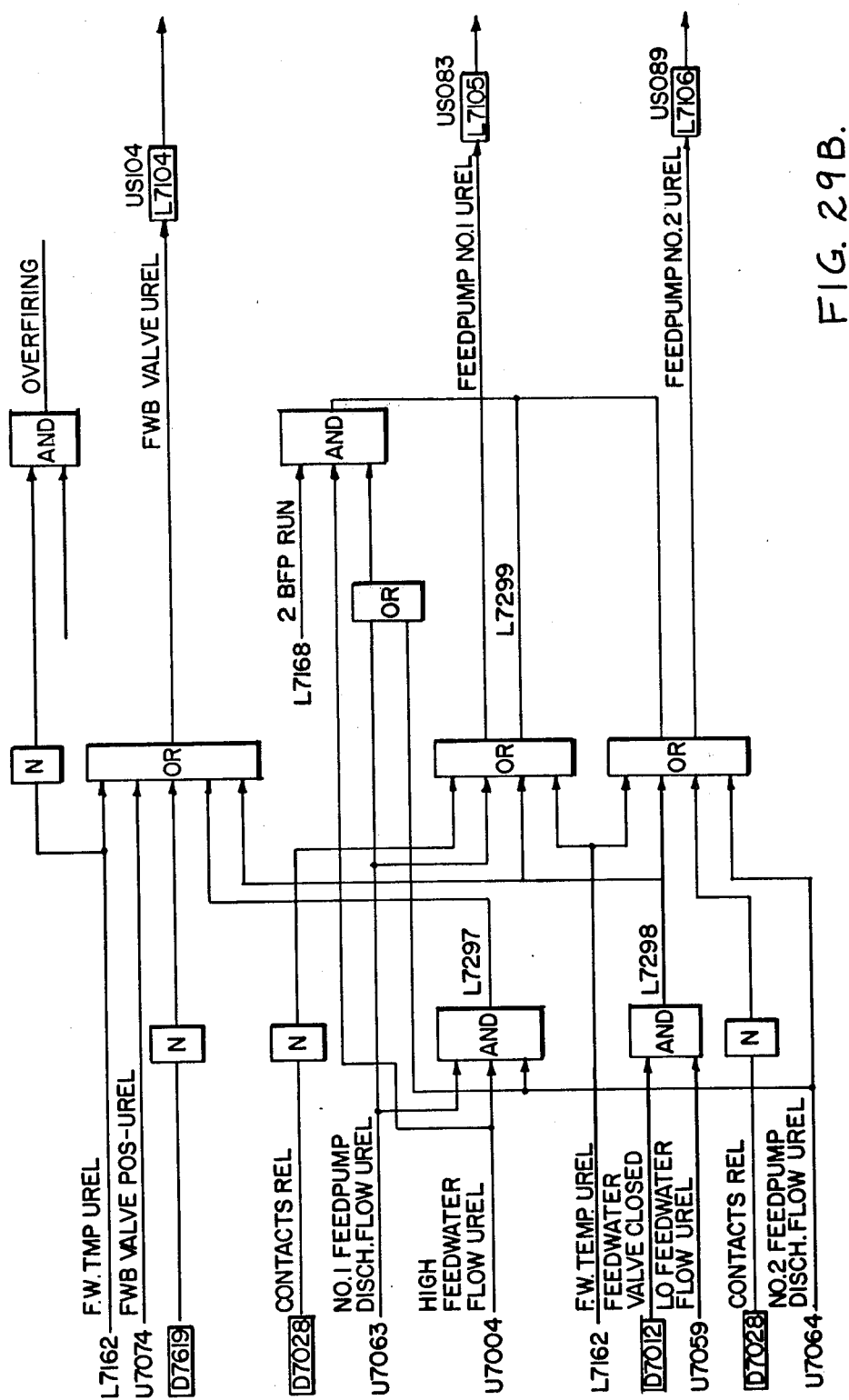
Figure 30A:
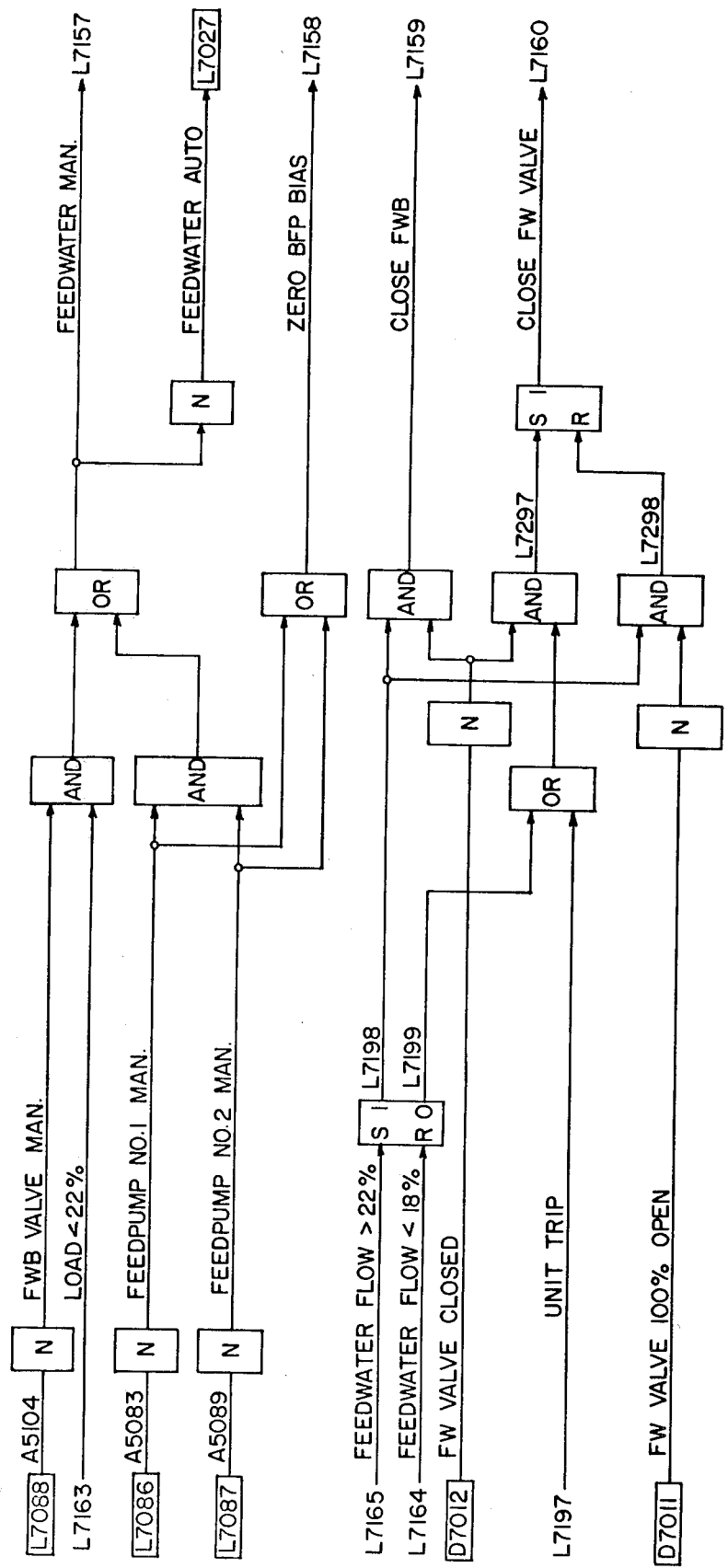
Figure 30B:
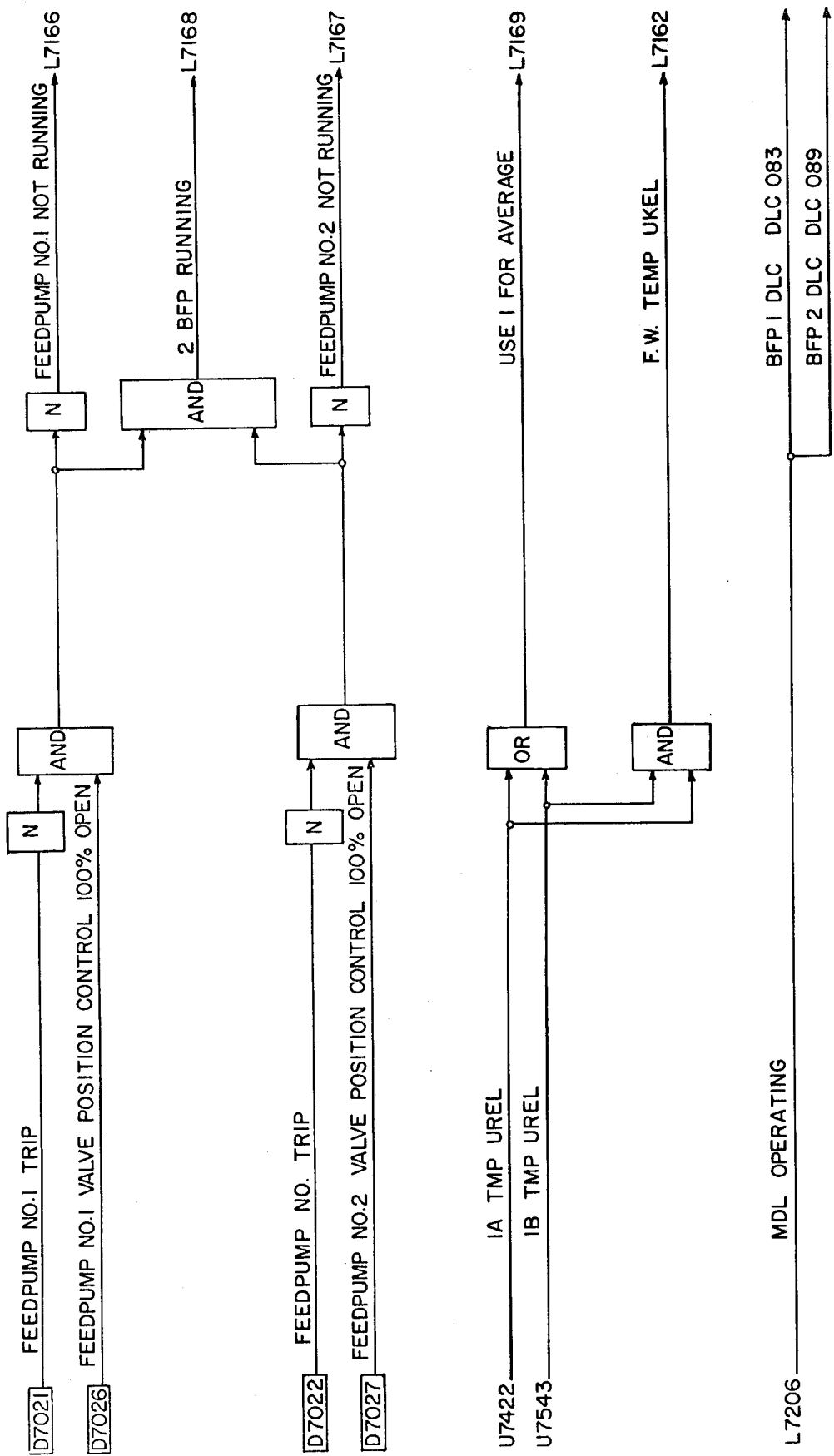
Figure 32:
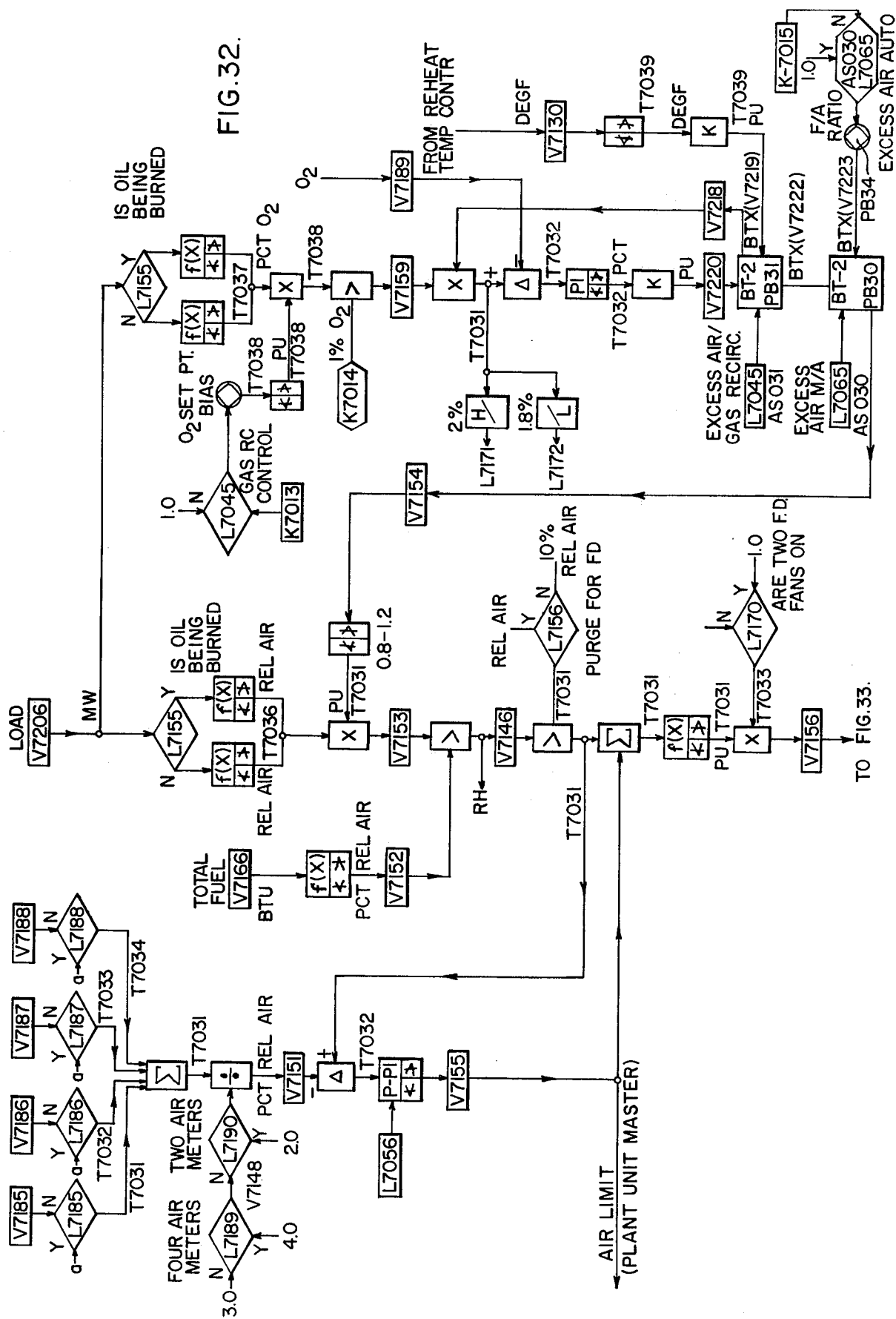
FIGS. 32, 33, 34, 35 and 36 relate to air flow control.
Figure 33:
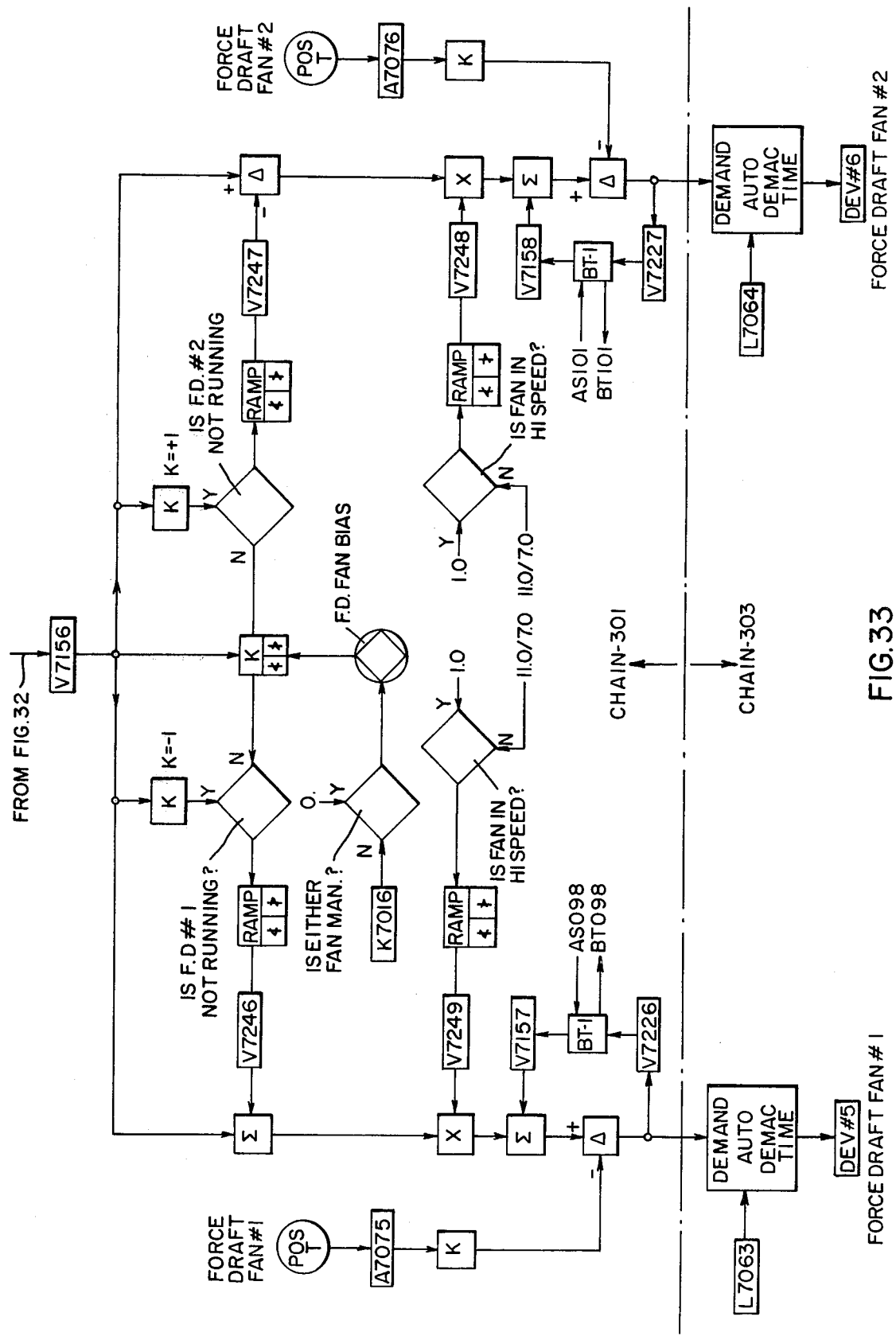
Figure 34:
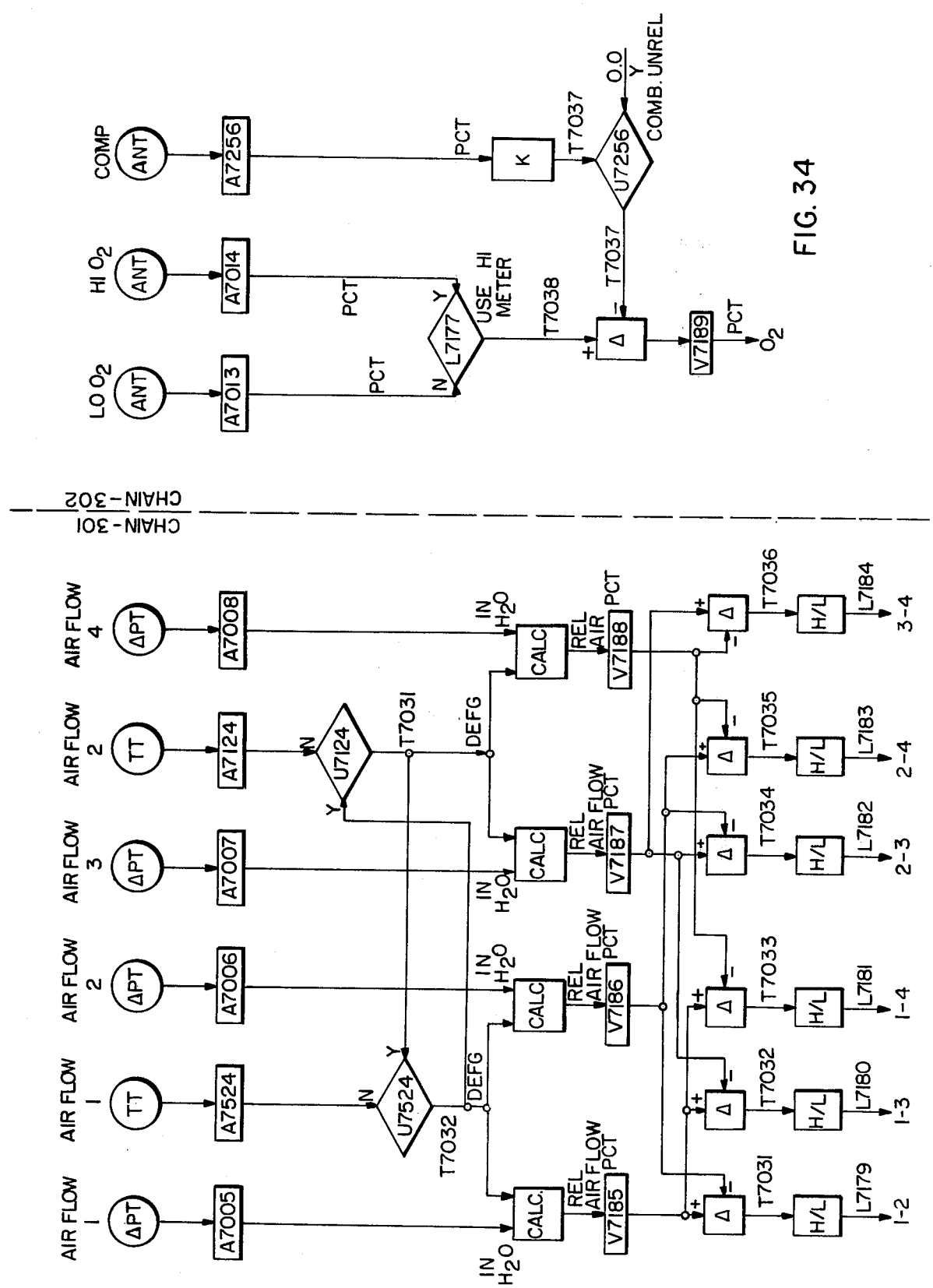
Figure 35:
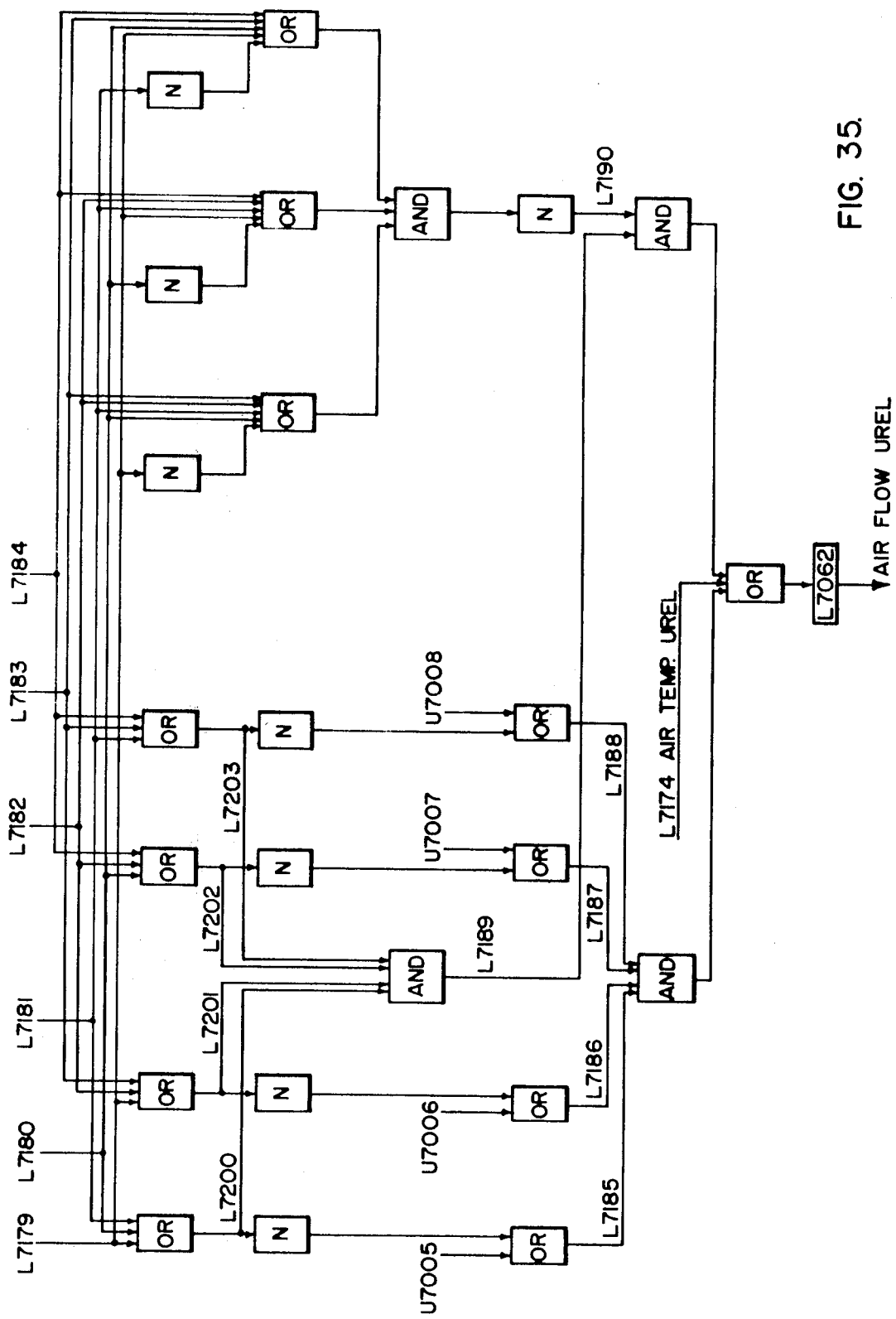
Figure 36:
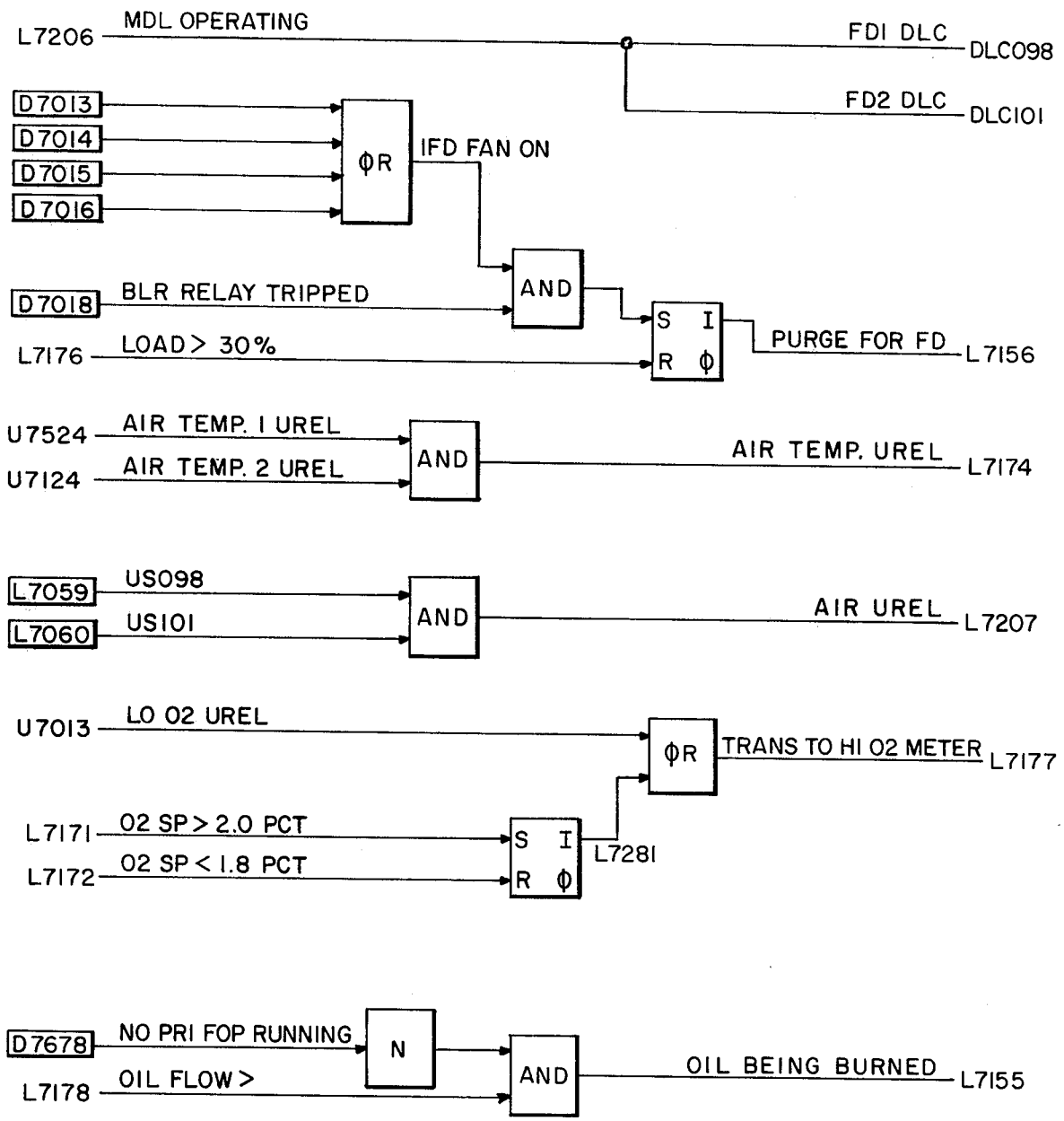
Figure 37:
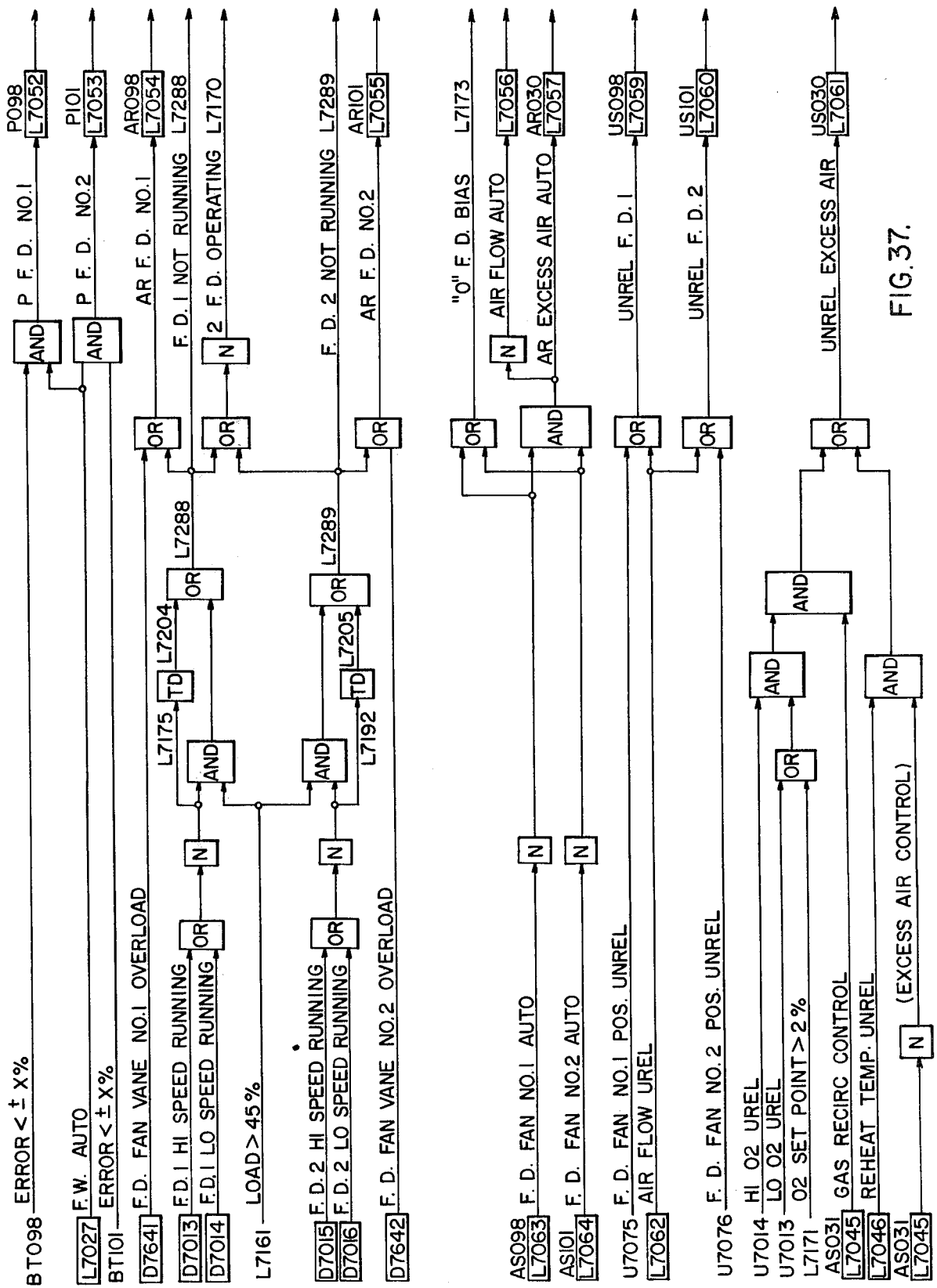
FIG. 37 relates to air flow control logic.

In FIG. 15C, there is shown the throttle pressure set point curve for the operation of the boiler in terms of steam pressure in PSIG, as a function of the megawatts generated, as controlled by the plant unit master. The operation of the power plant is maintained at approximately 1000 PSIG until approximately 50 megawatts of power is generated. At this time, the operation of the boiler is changed in that the boiler extraction valves are closed and the boiler throttle valves are opened to permit the boiler to operate in a once-through mode. Now, the steam pressure is increased from a value of approximately 1000 PSIG under the control of the ramp function generator 802 (as explained above) to a reference value of 3500 PSIG. When the steam pressure within the boiler has been brought to 3500 PSIG, the plant unit master transitions from its Ramp Mode. Then, as the generated load is increased from 25% to 60%, as shown in FIG. 15C, the throttle pressure is maintained at a constant value of 3500 PSIG. At this point, the throttle pressure set point is reset, as will be explained, to increase the pressure along a ramp from 3500 PSIG to 3675 PSIG, as the load is increased from 60% to 70%.

Figure 9:
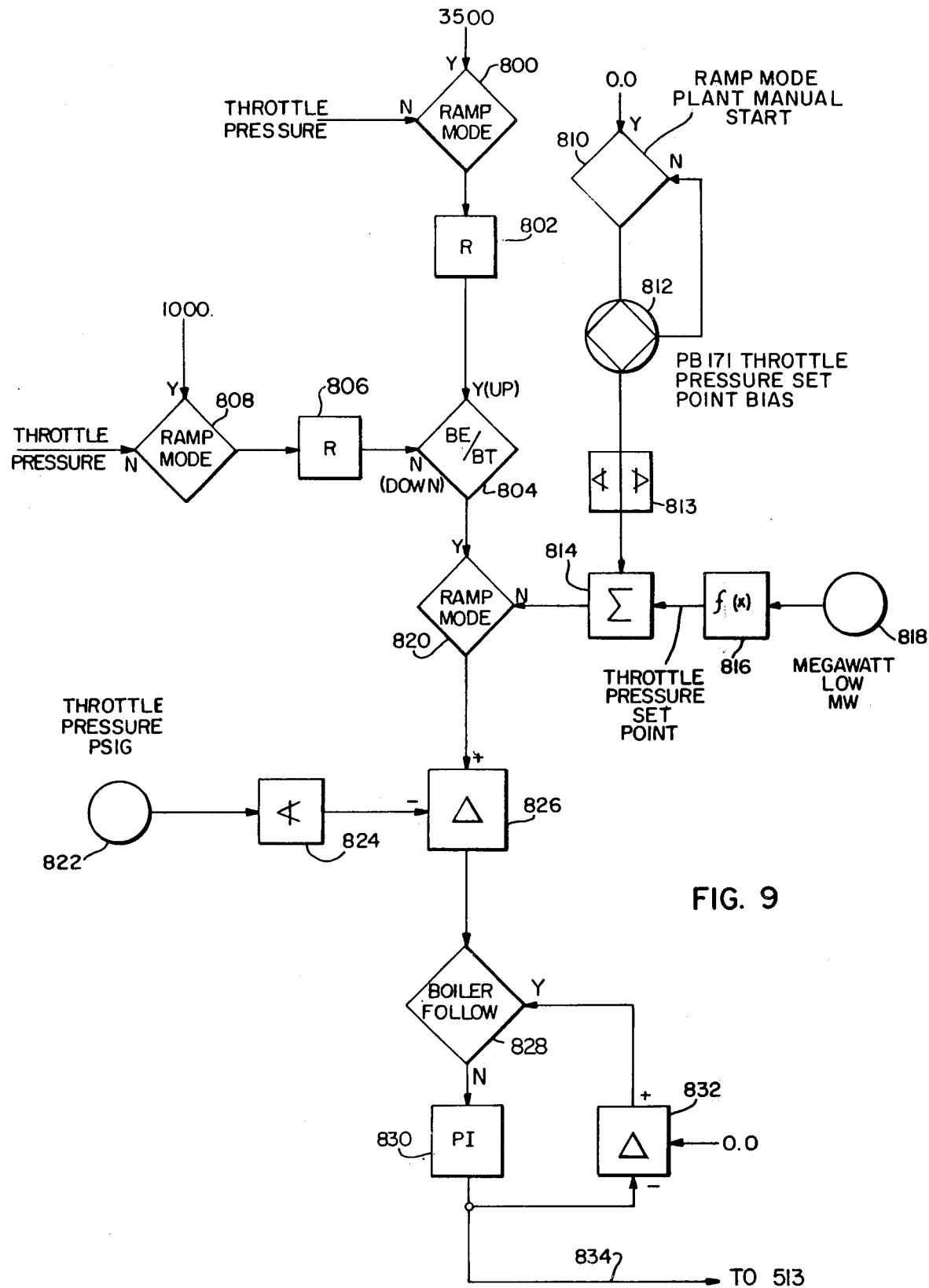
FIG. 9 shows a schematic diagram of the operation of the plant unit master in its Ramp Mode, whereby the feedwater reference entered as shown in FIG. 7A, is modified by the generated ramp signal.

As shown in FIG. 9, a function generator 816 is responsive to measured power generated as entered at point 818 to provide the changing throttle pressure set point as shown in FIG. 15C. As shown in FIG. 7A, the throttle pressure set point is applied to the difference block 456, when the plant unit master is operative in one of its Local Coordinated, Remote Coordinated or Boiler Follow Modes, whereby the boiler control is operated to increase the steam pressure to a value of 3675 PSIG. In this manner, if the plant load reference so requires, an over-pressure condition may be established within the boiler so that maximum generating capability may be realized.

Under certain operating circumstances or contingency conditions, the operator may desire to enter a throttle pressure set point bias through the pushbutton 812, shown in FIG. 9, whereby an increase or decrease is directed through a high-low limiter 813 to be summed in block 814, with the throttle pressure set point as derived from a function generator 816. In this manner, a slight increase or decrease to the value of over-pressure may be established. If the plant unit master is operative in its Ramp Mode, Start Mode or Plant Manual Mode, as decided by decision block 810, a zero reference is applied to disable the effect of the throttle pressure set point bias entered through pushbutton 812.

The Local Coordinated Mode is the normal coordinated mode in which the plant operates in the absence of any contingency or limiting condition. With regard to FIGS. 7A and B, a basic distinction can be grasped readily as to the manner in which the previous operations were effected and that in which the Local Coordinated Mode is effected. As described above, values of feedwater reference and turbine speed/load reference were entered at entry points 500 and 700, respectively; by contrast in a coordinated mode, a single plant load reference is entered either by the operator, as in the Local Coordinated Mode, or by the automatic dispatch system (ADS) in the Remote Coordinated Mode, at entry point 400, to be applied in parallel to the boiler and turbine controls.

The Local Coordinated Mode can be entered by operator selection from the Ramp Mode upon completion of the ramp, or from any of the Boiler Follow, Turbine Follow or Plant Manual Modes, when the contingency has cleared, or from the Remote Coordinated Mode. As will be explained in detail later, the permissives are the boiler fuel, water, air and base manual control stations on Automatic, the turbine control in Automatic with speed correction in service and on load control with the Ramp Mode completed.

During this mode, the MW reference is providing the load reference to the turbine control and to the boiler control. The boiler-turbine coordination control is providing corrections to the turbine and boiler controls for errors in speed, megawatts and throttle pressure. The contingency load limit control and the feedwater base control are not active at this time.

Control is automatically transferred to the Start Mode if the breaker opens, to the Plant Manual Mode if the boiler fuel, water air and turbine control stations are placed on Manual, to the Turbine Follow Mode if any of the contingency load limiting functions occur, or to the Boiler Follow Mode if the turbine valve position limit is operating. Control can be transferred by the operator to Turbine Follow, Boiler Follow, or to Remote Coordinated Mode if the ADS system is available.

With respect to FIG. 7B, the operator in the Local Coordinated Mode enters load demand and rate of change at entry points 400 and 408, respectively. The manner of imposing these values upon the control system is very similar to that previously described with respect to the entry of the feedwater reference. When the output of the integrator block 412 goes to zero, indicating that the value of load reference has been entered, a back lighted GO button 327 on the operator's panel (see FIG. 10B) will be extinguished and a HOLD button 329 will become back-lighted. At this point, the new plant load reference is entered and is applied successively through a proportional block 414, a limiting block 416 and a decision block 418 if the plant unit master is not in the Turbine Follow Mode, along path 420 in parallel to each of a boiler contol path 422 and a turbine control path 632.

With respect to that portion of FIG. 7A designated "Coordinated Boiler Control 440", there is shown schematically the manner in which the entered plant load reference is successively modified as a function of the values of turbine rotor speed, generated load in terms of megawatts, and throttle pressure, as derived respectively from the speed detection system 60, the power detector 18 and the throttle pressure detector 36 (as shown in FIG. 1A). The modified or trimmed value of plant load reference is directed by the decision block 470 to the boiler control system, if the plant unit master is operative in one of its coordinated modes. The logic associated with the summing blocks 480 and 482 relate to a transition of control from a coordinated mode in which the plant load reference would be applied to the boiler control to an uncoordinated mode in which the feedwater reference would be applied to the boiler control; this related logic will be explained later.

With respect to effecting a trim of the plant load reference as a function of turbine speed, the value of turbine speed derived at point 424 is compared by a difference block 426 with a speed reference to develop a speed error signal to be directed through the decision block 428, if the plant unit master is in either the Local or Remote Coordinated Mode, to be integrated in block 432. The integrator 432 is capable of integrating with a variety of constants dependent upon the mode in which the plant unit master is placed, as described in detail later. The output of the integrator 432 is applied through a proportional block 434 to the summation block 436, wherein the plant load reference is trimmed as a function of the measured turbine speed. If the plant unit master is not in one of its coordinated modes as determined by the decision block 428, a feedback circuit including the difference block 430 is connected, whereby the difference between the output of the integrator 432 and a zero reference level signal is fed back through the decision block 428 to the integrator 432, so that the output of the integrator 432 gradually is driven toward zero, dependent upon a selected constant.

In a manner similar to that described with respect to the speed trim, the measured value of generator load in megawatts, as entered at point 438, is compared by a difference block 442 with the plant load referece to provide a difference signal, which is integrated in block 446, if the plant unit master is operative in one of its coordinated modes as determined by decision block 449. The output of the integrator 466 is applied through a proportional block 450 to effect a trim of the plant load reference within the summing block 452. Further, if the plant unit master is not operative in one of its coordinated modes, the difference signal derived from a block 448, drives the output of the integrator 446 to zero to take out of service the trim factor developed as a function of the power generated.

Further, in the Coordinated Boiler Control 440, the value of measured throttle pressure is entered through point 454 to provide, as in block 456, a difference signal with respect to a throttle pressure set point. If in either of the coordinated modes or the Boiler Follow Mode, the difference signal will be integrated by block 460 and applied through a proportional block 462 to the summation block 466, whereby a corresponding trim of the plant load reference is effected. If not in a Coordinated or Boiler Follow Mode, a zero reference level signal is impressed, as explained above, upon the integrator 460 to drive its output towards zero and thereby extract from service the trim processing as a function of throttle pressure.

In a coordinated mode, the throttle pressure set point may be increased from 3500 PSIG to 3675 PSIG along the set point curve as shown in FIG. 15C, under the control of the function generator 816 as explained previously. The throttle pressure set point is applied to the difference block 456.

Thus, in a coordinated mode, the plant load reference signal is effectively trimmed successively as a function of turbine speed, generator load and throttle pressure, to be applied to the boiler control; at the same time, the plant load reference also is applied to a turbine control path 632 (FIG. 7B) to be processed or trimmed as a function of throttle pressure as measured by the throttle pressure detector 36. More specifically, in the Local Coordinated Mode, a difference signal between measured throttle pressure entered at point 620 and a throttle pressure set point, is derived by a difference block 518 to be applied through a decision block 522, if the plant unit master is in one of its coordinated modes or in its Turbine Follow Mode, to a proportional plus integral (P-PI) controller 624, as explained later in detail with respect to FIG. 15A. The output of block 624 is applied through a proportional block 628 to a summation block 630 wherein a trim of the plant load reference is effected in accordance with the measured throttle pressure, before being applied through a decision block 716 to the turbine control along a path 718. If the plant unit master is not in one of its coordinated modes or in its Turbine Follow Mode, the difference between the output of the P-PI controller 624 and a zero reference level signal as determined by block 626, is reapplied to the controller 624 to force its output to zero and to disconnect from service the effect of the measured throttle pressure.

It is necessary to transition gradually between one mode and the next. In order to accomplish this, transition logic circuitry indicated generally by the numerals 302 and 312 in FIGS. 7A and B, are provided to effect a bumpless transfer in and out of one of the coordinated modes. For example, if the plant unit master transitions from the Plant Manual Mode in which the feedwater reference as entered at point 500 is directed to the boiler control, to the Local Coordinated Mode wherein the plant load reference is applied through the decision block 470 to the boiler control, there is a need to withdraw gradually the feedwater reference and to apply gradually the plant load reference to the boiler control. In particular, a difference signal is derived by the block 472 between the feedwater reference and the modified plant load reference to be applied to an integrator 476 if the plant unit master is in one of its coordinated modes as determined by decision block 474. In such instance, the output of the integrator 476 effects a trim of the plant load reference within the summation block 480, whereby a gradual transition between the feedwater reference and the plant load reference is made. However, if the plant unit master is not operative of its coordinated modes, the difference between the output of the integrator 476 and a zero reference level signal is applied to the input of the integrator to drive its output to zero. In effect, the transition is made by tracking the feedwater reference with respect to the plant load reference to develop a gradually-decreasing trim signal.

In a similar fashion, if the plant unit master transitions from a coordinated mode to a non-coordinated mode, a difference signal is derived by the block 489 to be applied to the integrator 488, if the plant unit master is not in its coordinated mode as determined by decision block 486. In turn, the output of the integrator 488 is applied to the summation block 482, whereby a trim operation is performed upon the feedwater reference. Thus, the plant load reference is tracked with respect to the feedwater reference, whereby the transition to the non-coordinated mode is made smoothly. As seen in FIG. 7A, the feedwater reference, in a non-coordinated mode, is applied along paths 517 and 519 through the decision block 470 to the boiler control.

A similar bumpless transfer from a coordinated to a non-coordinated mode by the coordinated/non-coordinated transition block 312 may be made as shown in FIG. 7B. In particular, an output is provided by a block 634 indicative of the difference between the turbine speed/load reference and the plant load reference, and applied to an integrator 638, if the plant unit master is operative in its non-coordinated mode as determined by the decision block 636. The output of the integrator 638 is applied to a summing block 642 whereby a trim is placed upon the plant load reference, thereby diminishing the difference between the plant load reference and the turbine speed/load reference and effecting a balance therebetween. On the other hand, if the plant unit master transfers from a non-coordinated to a coordinated mode, the difference between the output of the integrator 638 and a zero reference level signal is developed by a difference block 640 and applied to the input of the integrator 638, whereby its output is driven to zero. As a result, the trim factor diminishes, thereby permitting the plant load reference to be applied uneffected through the decision block 716 to effect control of the governor valves.

The Remote Coordinated Mode is entered from the Local Coordinated Mode by operator selection on his panel, if the ADS system is available and there are no contingency or limiting conditions. By contrast to the local coordinated mode, the load demand changes are received from the ADS system.

Generally, in a manner similar to that described above with respect to the Local Coordinated Mode, the megawatt reference provides the load reference to the turbine control and to the boiler control. The boiler-turbine coordination control provides corrections to the turbine and boiler controls for errors in measured values of speed, megawatts and throttle pressure.

The plant unit master operates in a Remote Coordinated Mode exactly the same as in the Local Coordinated Mode explained above, with respect to FIGS. 7A and B. The primary difference is that the plant megawatt reference is indexed up or down by time varying pulse widths of intelligence brought to the control system through contact inputs. Time variation of these inputs varies from 1/10th of a second to 1 second. Long pulse condition is detectable when any input pulse exceeds 1 second. If a long pulse condition develops, the control will reject from Remote Coordinated to Local Coordinated and a message printed on the control typewriter. Provision is made to either reject or to leave the system on automatic dispatch when a single random long-pulse occurs due to electrical noise in the distribution system, e.g. a microwave communication system. The electrical noise causes microwave channel communication hardware to make pulse duration longer than that actually transmitted. This feature is implemented by counting the number of long-pulses occurring, and if over an extended period of time, several long-pulses are detected, then the ADS system is rejected. The operator has the ability when using the Remote Coordinated Mode to bracket the plant generation by utilizing the high and low reference limiting features of the operator panel. Such limits may be used when operating with the ADS system to limit the plant load reference if there is an auxiliary out of service, for example. In the event that the operator has bracketed limits and a dispatching system either increases or decreases to the point of trying to bypass a limit, the generation reference will remain fixed at the limit and the respective high or low limit pushbutton on the operator panel will begin flashing, indicating that the unit has come against the limit. When operating on Remote Coordinated control, each time a pulse is received from the dispatching equipment, the megawatt increase or decrease indicator lights located on the turbine portion of the control panel will illuminate for the time period that the pulse contact is closed from the remote dispatching equipment. This feature allows the operator to detect from a distance in the control room when the remote dispatching system is incrementing or decrementing plant reference.

In the Remote Coordinated Mode, the contingency load limit control and feedwater base control are not active at this time.

Control is automatically transferred to the Start Mode if the breaker opens, to Plant Manual if the boiler fuel, water, air and turbine control stations are placed on manual, to Turbine Follow Mode is any of the contingency load limiting functions occur, to Boiler Follow if the turbine valve position limit is operating, or to Local Coordinated if an ADS failure occurs; control can be transferred by the operator to Turbine Follow, Boiler Follow or Local Coordinated control. The permissives for entry and exit from the Remote Coordinated Mode will be explained in detail later.

The Turbine Follow Mode is a coordinated more used when a boiler load limiting function exists, and is entered when a boiler contingency, as defined in the contingency load limit control section, occurs or by operator selection. The conditions under which a boiler contingency exists will be explained in detail later.

In the Turbine Follow Mode, the plant load reference as limited by the contingency load limit control provides the load reference to the turbine and boiler controls. Generally, the boiler-turbine coordination control provides a correction to the turbine control to maintain a constant throttle pressure. In particular with respect to FIG. 7A, it may be seen that the plant load reference is applied directly along path 422 to the boiler control without being trimmed as a function of turbine speed, generated load or throttle pressure; in effect, the decision block 428, 449 and 458 remove these trim functions from service, when the plant unit master is in its Turbine Follow Mode.

By contrast, in the control of the turbine in the Turbine Follow Mode, the plant load reference is not only trimmed as a function of the measured throttle pressure, but also the throttle pressure set point is varied as a function of measured turbine speed and measured generated power, as will now be explained. With regard to FIG. 7B, when the plant unit master is not disposed in one of its Local or Remote Coordinated Modes as determined by decision block 614, but is disposed in its Turbine Follow Mode as determined by decision block 522, the plant load reference is applied along path 607 to be modified successively as a function of measured speed and power generated. In particular, the measured turbine speed is applied to a difference block 604 to be compared with the speed reference. The speed error signal derived from the block 604 is summed in block 506 with the plant load reference. Further, the modified plant load reference is applied to a difference block 510 to be compared with the measured generated power. The output of the difference block 510 is applied through a proportional block 512 to modify the throttle pressure set point in the summing block 616. In this manner, the throttle pressure set point is modified as a function of measured speed and power generated when the plant unit master is in its Turbine Follow Mode. More specifically, the difference signal of block 518 between the measured throttle pressure and a throttle pressure set point is applied to a proportional plus rate controller 624; in turn, the output of the controller 624 is applied to the summation block 630 to trim the plant load reference applied along path 632 through the digital electrohydraulic (DEH) valve control system, as shown in FIG. 8, to the governor valves. As will be explained, the DEH valve control system is operative when the plant unit master is disposed in its Turbine Follow Mode (as well as its Local and Remote Coordinated Modes), to remove its generator load control loop and its impulse pressure control loop from service to prevent any undesirable interaction between it and the operation of the plant unit master. As a result, the coordinated boiler-turbine control tends to maintain a constant throttle pressure through control of the governor valves. The feedwater base control is not active at this time.

Control is transferred automatically to the Start Mode if the breaker opens; to the Plant Manual Mode if feedwater, fuel, air or turbine manual control stations are placed on Manual; or if turbine valve position limits are operating by operator selection; to Local Coordinated if the permissives are satisfied.

The Boiler Follow Mode is a coordinated mode used when a turbine load limiting function exists and is entered automatically when a turbine contingency such as the occurrence of a valve position limit or by operator selection. The boiler control must have fuel, water, air and base on Automatic; the turbine control places megawatt (MW) and Imp out of service; the speed control is either in or out of service and the Ramp Mode has been completed.

Figure 8:
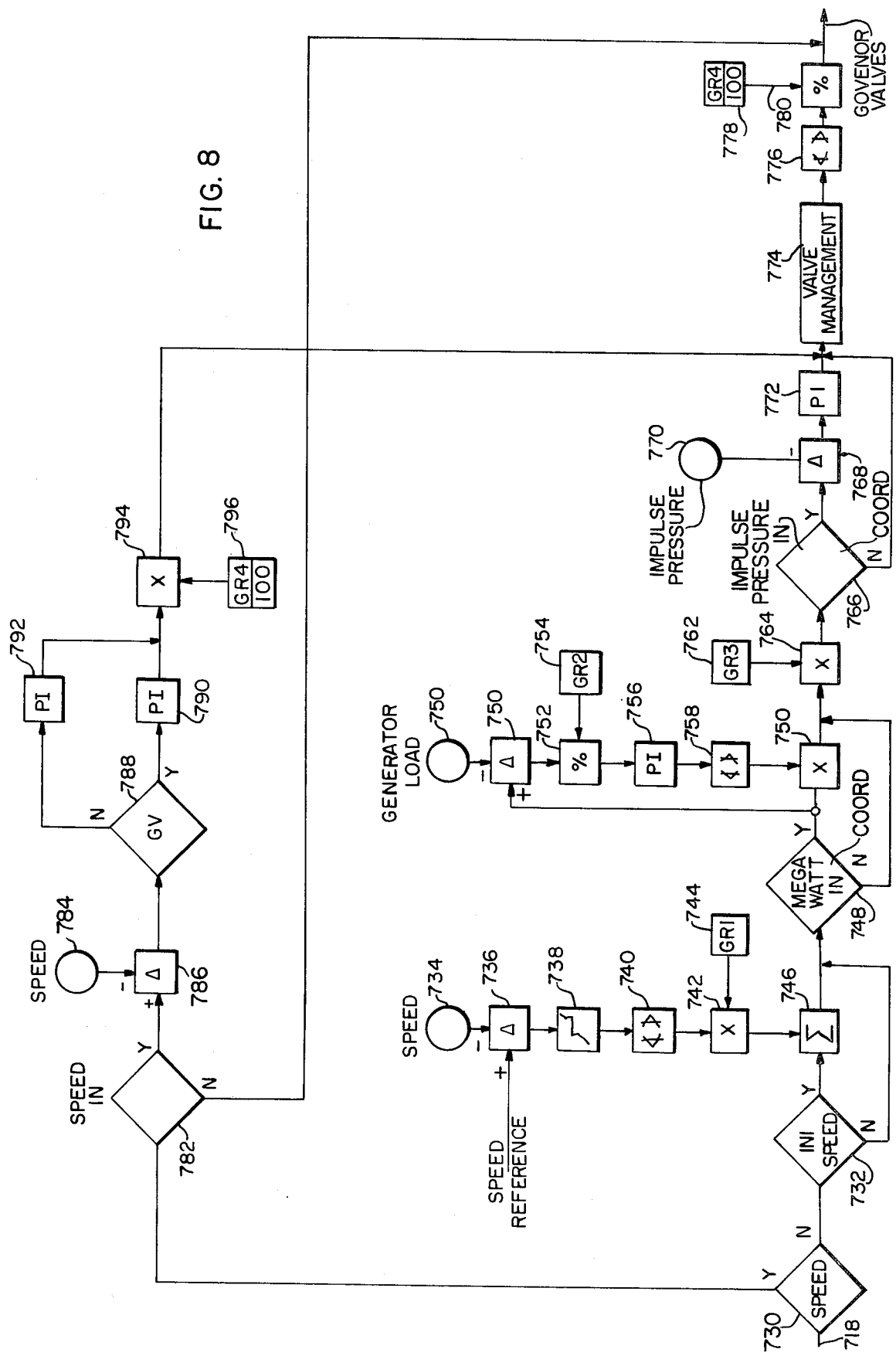
FIG. 8 shows a schematic diagram of the digital electrohydraulic control responsive to the modified load demand reference derived from the plant unit master as shown in FIG. 7B, for controlling the valves employed in the turbine included in the electric power plant of FIG. 1A.

During this mode, the plant load reference is applied in parallel to the boiler control, and as limited by the DEH turbine valve control (as shown in FIG. 8) to the turbine control. The plant unit master as seen in FIG. 7A provides a correction to the boiler control to maintain a substantially constant throttle pressure. In particular, the decision block 458 applies a signal derived from block 456 indicative of the difference between a throttle pressure set point and the measured throttle pressure to the integrator 460. In turn, the integrator 460 applies its output to effect a trim of the plant load reference within the summation block 466, to achieve substantially constant throttle pressure. Speed correction is made only to the turbine control by the speed control loop of the DEH valve control system as shown in FIG. 8.

The feedwater base control and contingency load limit control are not active at this time. Control is automatically transferred to the Start Mode if the breaker opens; to the Plant Manual Mode if the boiler fuel, water, air and turbine control stations are placed on Manual; or by operator selection to Local Coordinated if the permissives are satisfied.

In the above description with respect to FIGS. 7 to 9, there has been described one implementation of the plant unit master and DEH valve control system. It is understood that variations to such a system could be made without departing from the scope of the teachings of this invention. For example, as seen in FIG. 7B, a generated load control loop could be incorporated to trim the plant load reference to be applied through the DEH valve control system to the governor valves, in a manner similar to that incorporated into the Coordinated Boiler Control 440. In particular, a measured value of generated power is compared with the plant load reference by a comparator 1062 to apply a power error signal through a decision block 1064 if the plant unit master is in either of its Local Coordinated or Remote Coordinated Modes, to an integrator 1066. The integrator output is applied to the summing block 1072, wherein a trim is placed upon the plant load reference as a function of the power error. Further, an impulse pressure control loop (not shown in FIG. 7B) could be incorporated between the summing blocks 630 and 642 in a manner similar to that incorporated into the DEH valve control system shown in FIG. 8. Note that the DEH power control loops and the impulse pressure control loops are taken out of service when the plant unit master is operated in either of its Local Coordinated, Remote Coordinated or Turbine Follow Modes to avoid any interference between the corresponding control loops. In addition, the Ramp Mode control, as shown in FIG. 9, may be modified to control the ramping pressure as a function of the ratio of impulse pressure to throttle pressure (Pi/Po). Generally, the throttle pressure applied through entry point 822 would be replaced with a value of the ratio Pi/Po, to be tracked against the ramping signal as derived from the ramp generator 800. By utilizing the ratio of Pi/Po as the measured input value, the power generated by the turbine may be controlled more precisely, i.e. within significantly narrower limits.

In FIG. 8, there is shown the Digital Electrohydraulic (DEH) turbine valve control system to implement the further processing of the load demand signal applied to the control path 718 by either the turbine load reference or the plant load reference, as determined by the decision block 716. For a further description of the DEH turbine valve control system, reference is made to the above-identified, co-pending applications Ser. No. 247,877 which in turn has been abandoned in favor of a continuation application, now identified as U.S. Pat. No. 4,267,458 and Ser. No. 306,752 now abandoned.

Generally, FIG. 8 shows a series of control loops for speed, generator load and impulse pressure operative upon the load demand signal to be applied to the turbine control valves. If the breakers are closed, as decided by the speed control decision block 730, the load reference is applied to the speed control loop, if the speed measuring equipment is in service, as decided by the decision block 732; if not, the load reference signal is applied directly to the next, generator load control loop. In the speed control loop, a speed error signal, as developed by the difference block 736 as the difference between a speed reference set point and a measured value of speed entered at point 734, is applied successively through a dead band block 738 and a limiter block 740 to be multiplied in block 742 by a value set in block 744. The output of the multiplier block 742 is applied to the summation block 746 whereby the load reference is trimmed as a function of the measured speed.

Next, the load reference is applied to the generator load control loop if the power measuring system is operative, as determined in decision block 748; if not operative, the load reference signal is applied directly to block 764. In the generator load control loop, a difference signal is developed by the block 750 as the difference between the load reference and the measured generator load entered at point 750. The difference signal is divided in block 752 by a value set in block 754 to be integrated and limited, successively in a proportional plus integral controller (PI) 756 and a limiter 758. The output of the limiter 758 is applied to a multiplier 760 to trim the load reference as a function of the measured generator load.

Further, the decision block 748 as well as a decision block 766 determined whether the plant unit master is operative in one of its Local or Remote Coordinated Modes to disconnect the generator load control loop and the impulse control loop so that the DEH turbine control valve system does not unduly influence the operation of the plant unit master when it is disposed in one of its Local Coordinated, Remote Coordinated or Turbine Follow Modes. Further, the speed control loop of the DEH control valve system is maintained in service while the plant unit master is disposed in the aforementioned modes.

The multiplier block 764 performs a scaling function whereby the load reference set in terms of megawatts is transformed to a value defined in terms of pressure (PSIG). In particular, the modified load reference is multiplied by a value set in block 762.

The transformed value of load reference, now in terms of PSIG, is applied to the impulse pressure control loop, if the impulse pressure detecting system is operative as determined by decision block 766; if not operative, the modified load reference is applied directly to a valve management system 774. In the impulse pressure control loop, a difference signal is developed in block 768 between the scaled load reference and a measured value of impulse pressure entered at point 770. The difference signal derived from block 768 is applied to a proportional plus integral (PI) controller 772, the output of which is applied to the valve management system 774, which converts the modified load reference set in terms of PSIG to a load reference defined in terms of valve position, i.e. the percentage open to which a valve is to be set. The output of the valve management system 774 is applied successively to a limiter 776 and a divider 780, whereby the load reference, now a valve position signal, is divided by a value set in block 778; in turn, the output of the divider 780 is applied to control the turbine valves.

Returning now to a consideration of the speed control decision block 730, if the breakers are open, speed control is implemented to facilitate the smooth increase of turbine rotor speed in bringing the turbine rotor speed up. Thus, if the speed measuring system is operative as determined by decision block 782, the load reference during the Start Mode is applied to a difference block 786; if not operative, the load reference is applied directly to control the position of the throttle valves. The difference block 786 provides a signal indicative of the difference between the load reference and a measurement of turbine rotor speed entered at point 784. The resultant speed error signal is applied to a proportional plus integral controller 790, if the governor valves are operative as determined by decision block 788, whereby a faster response is obtained due to the constants set in the controller 790. If, on the other hand, the governor valves are inoperative and the throttle valves are operative, the difference signal from block 786 is applied to the proportional plus integral controller 792 which functions more slowly in accordance with the constants set therein. The output of one of the controllers 790 or 792 is applied to a multiplier 794 to be multiplied by a value set in block 796; the output of the multiplier 794 then is applied to the valve management system 774 to provide an appropriate signal to be applied to the turbine valves in a manner similar to that described above.

Thus, there has been described the method in which the speed/load reference may be modified as a function of speed during the start-up of the turbine, i.e. when the plant unit master is in its Start Mode.

Figure 11:
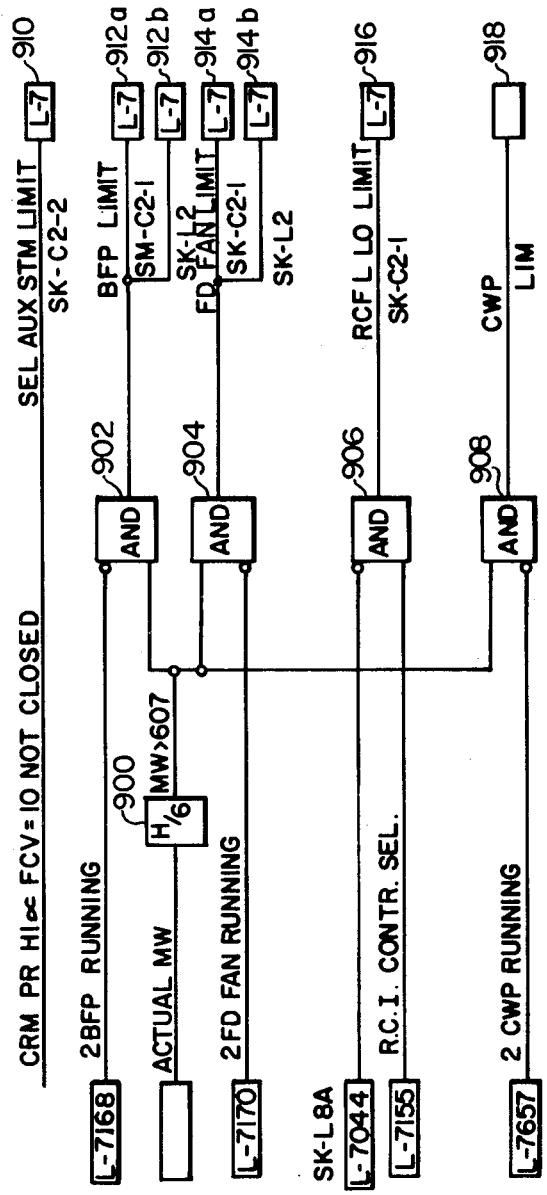
FIG. 11 and 12 show, respectively, the conditions under which various flags are raised as emergency conditions arise and a control system responsive to the raising of the aforementioned flags to impose limits on the load demand reference provided by the plant unit master as shown in FIGS. 7A and B.
Figure 12:
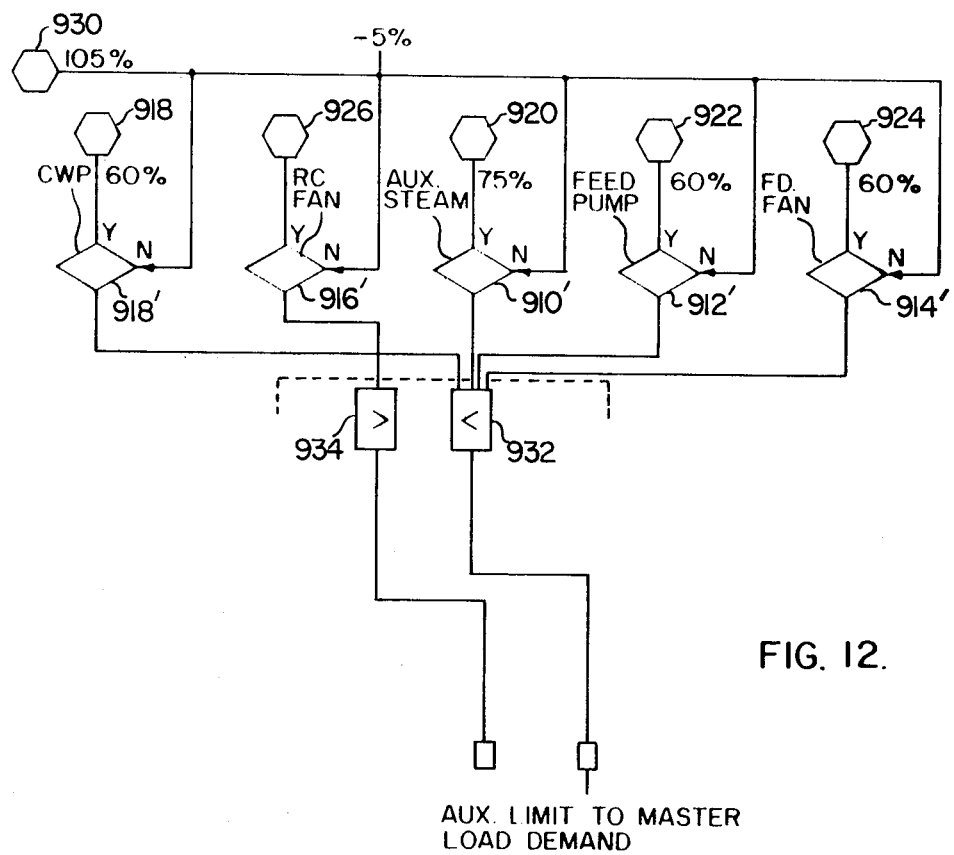

In FIGS. 11 and 12, there is shown the manner in which adjustments are made for run-back, run-up and limit signals as derived from plant auxiliaries, whereby the plant unit master control of the turbine and boiler is limited to the capability of the auxiliaries in service. For example, if one of the auxiliaries, e.g. the boiler feed pump, becomes disabled, it will become necessary to decrease the power generated. As a result, the plant load reference as entered by the plant unit master is changed to reflect a particular auxiliary being out of service. The effected change of the plant load reference may be either an increase, i.e. a run-up, or a decrease, i.e. a run-back.

In FIG. 11, there is shown the various conditions for raising the flags designated 910 to 918. In particular, if the cold reheat pressure is high and a flow control valve is not closed, an auxiliary steam limit flag 910 will be raised. If either of the boiler feed pumps is not running and the measured megawatts generated is above 60% of rated value, the corresponding flags 912a and/or 912b will be raised. Similarly, if either of the force draft fans is not running or if either of the circulating water pumps is not running, and the measured megawatts generated is above 60% of its rated value, the respective flags 914a and 914a and/or 914b, and 918 will be raised. If the recirculation (RC) fan is not running and the Gas Recirculation Mode has been selected, the AND gate 906 raises the corresponding flag 916. FIG. 11 illustrates one of the advantages of havng the plant unit master implemented in the same computer as that in which the turbine and boiler controls are implemented. In particular, various flags are raised in response to conditions present in the boiler and turbine controls, which conditions are stored in a central memory whereby these values are readily available to the computer to carry out the operations of the plant unit master. For example, the condition of the boiler feed fan as detected within the boiler control is readily available to set a flag required for the operation of the plant unit master. Further, the blocks designated as flags 910 to 918 in FIG. 11 correspond to core portions of the central memory, which are readily available to any of the turbine, boiler or plant unit master controls implemented in the same computer.

In FIG. 12, it is seen that the flags 910 to 918, each indicative of a failure of a designated auxiliary, effect a YES decision of the corresponding decision blocks 910' to 918'. Under normal operating conditions where all of the auxiliaries are in service, the plant load reference is free to assume a value as high as 105% of the rated power generation of the boiler-turbine system. In FIG. 12, such a value is entered on the maintenance panel pushbutton 930 so that in the absence of a failure, such a limit is applied through a low selector 932 as an auxiliary unit for the plant load reference. However, if one of the flags 910 to 918 is raised, the corresponding decision block 910' to 918' applies a corresponding limit to the low selector 932. Such an auxiliary limit limts the value of the plant load reference that may be entered as shown in FIG. 7B. For example, if the auxiliary steam flag 910 and the force draft fan flag 914 both are raised, the auxiliary limits as entered on maintenance panel pushbuttons 920 and 924, respectively, are applied to the low selector 932, which selects the lower value of the two, i.e. 60%, to impose this limit on the plant load reference. In this manner, the plant unit master is responsive to an auxiliary failure to limit the value of the plant load reference. Thus, because of implementation in a single computer, such a limit is stored in the central memory and is readily available to be used in the boiler and turbine control operations.

Figure 13:
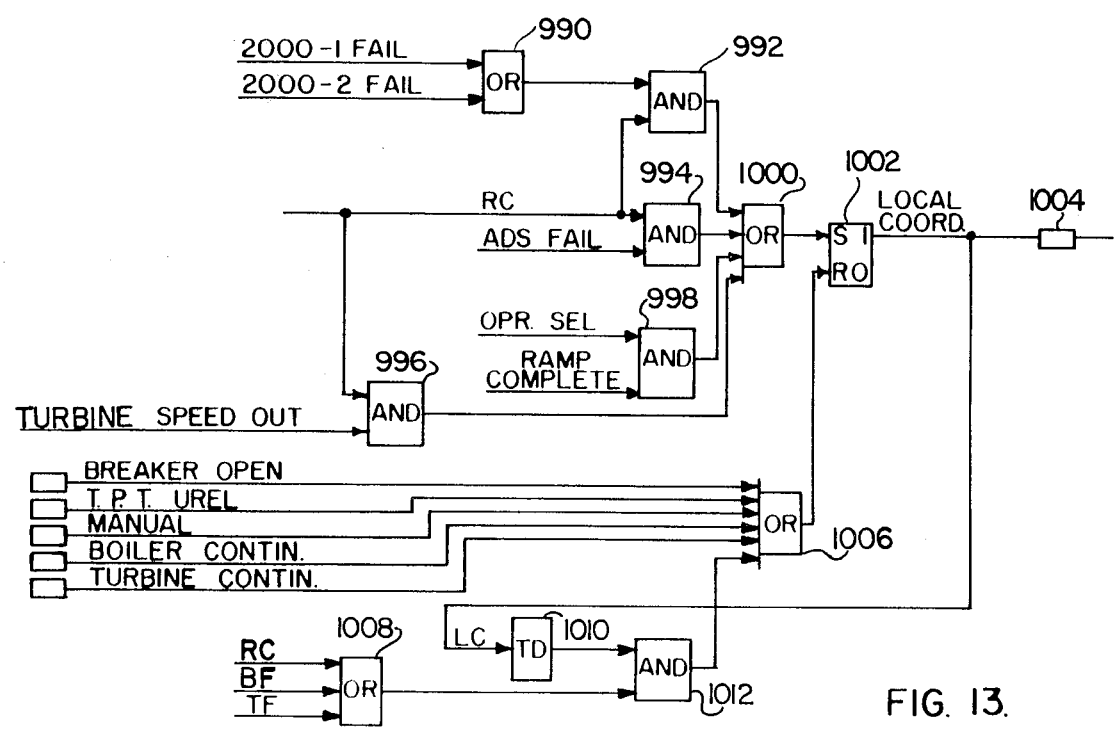
FIGS. 13, 14 and 15 show, respectively, the logical conditions for transitioning the plant unit master as shown in FIG. 8, from one of its modes to the other, and for preventing the transfer of the plant unit master to a designated mode.
Figure 14:
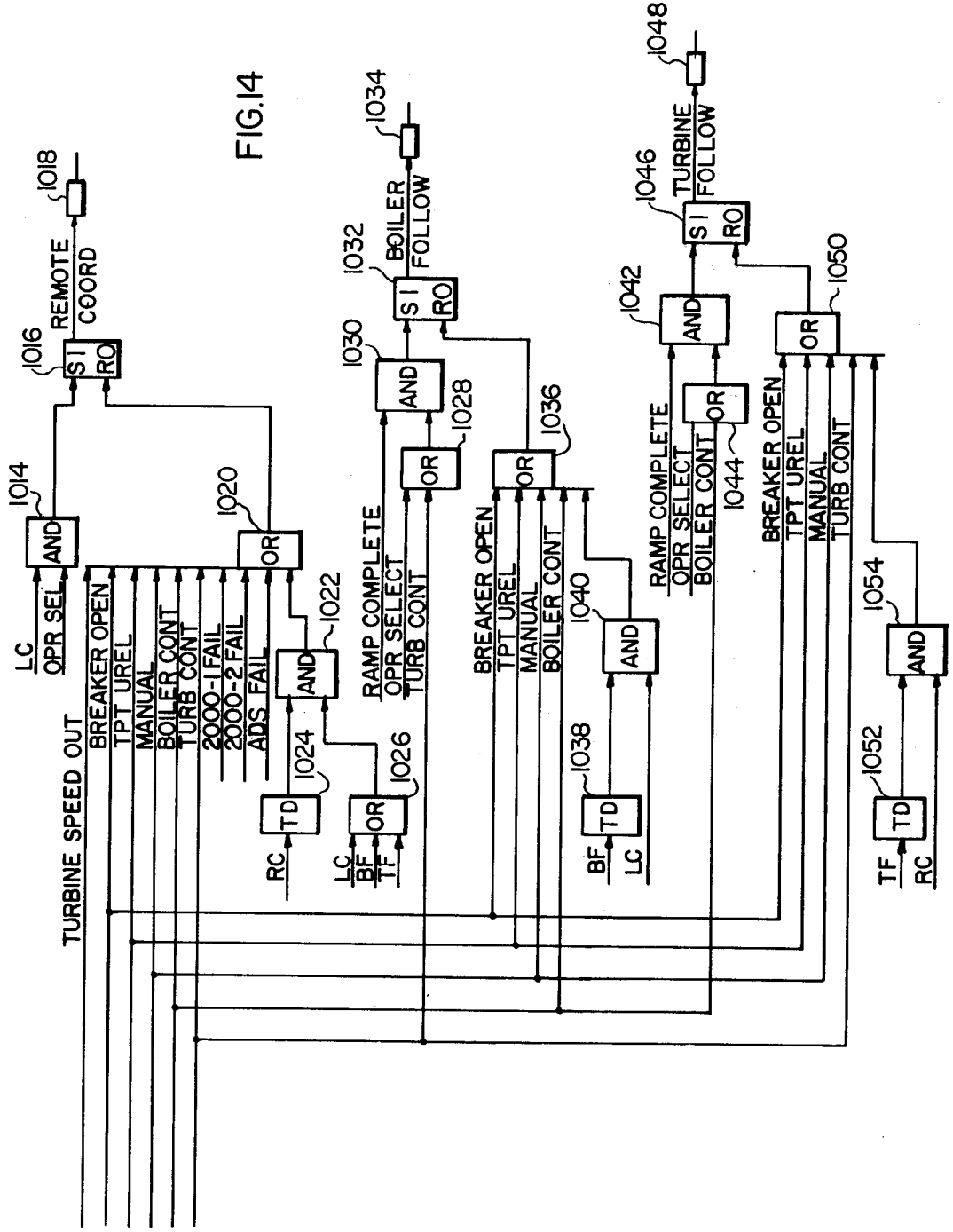

With regard to FIGS. 13, 14 and 15, there is shown the various logical conditions or permissives whereby the plant unit master is set in one of its operating modes or is transitioned to another operative mode. In FIG. 15, there is shown the logical conditions for establishing a boiler contingency, a turbine contingency, and the logical conditions whereby the plant unit master is disposed in either of its Start, Plant Manual or pressure Ramp Modes of operation. In particular, the plant unit master is transferred into its Start Mode when the auxiliary breaker is open, and the main turbine-breaker 20 is open, as determined by the AND gates 940 and 946; when these conditions are met, the flip-flop 980 is set, to store a signal in a portion 986 of the core memory indicating that the plant unit master is in its Start Mode. The computer scans first to determine whether the CCI fuse is operative before carrying out the logical processes indicated in FIGS. 11 to 15. When the main breaker 20 is closed, the flip-flop 942 is set and the flip-flop 970 is reset indicating that the plant unit master no longer is in its Start Mode.

As seen in FIG. 15, the logic for controlling the plant unit master mode sets up a list of priorities whereby the plant unit master may be transferred only between selected modes and in a certain order. For example, the plant unit master is transferred from its Start Mode to its Plant Manual Mode, before being transitioned into the Ramp Mode. The conditions for initiating the Plant Manual Mode are applied to an OR gate 964 and include: (1) the presence of either a boiler or turbine contingency as determined by OR gate 956 and the condition that the Ramp Mode has not been completed as determined by AND gate 954; (2) the main breaker 20 is closed; (3) the turbine pressure transducer is unreliable; (4) the presence of a Manual Mode of operation within the boiler control (the boiler control is operative in each of its Feedwater Manual, Air Manual, Fuel Manual and Turbine Manual Modes as determined by AND gate 948); or (5) the plant unit master senses the presence of both a boiler and turbine contingency as determined by AND gate 962. Upon sensing any of the above conditions, the OR gate 964 applies a signal to set flip-flop 992 to store a signal indicative of the presence of the Plant Manual Mode in core portion 988. The core portions shown in FIG. 15 are disposed within the central memory of the computer, as described above, whereby such an indication that the plant unit master is operative in a particular mode, e.g. the Start Mode, is readily available to effect the operation of the turbine and boiler controls. Further, the computer implementation of the plant unit master permits, as shown in FIG. 15, the extensive use of logical calculation, which would be cumbersome in an analog version of a plant unit master. Thus, the plant unit master as described herein is capable of achieving operation of the turbine-boiler plant from an initial cold condition up to that condition when the turbine is disposed on-line and is generating power at rated levels, with a minimum of attention required from the operator. In FIG. 15, there is further shown that the boiler and turbine contingency conditions are likewise stored in core portions 960 and 974 respectively of the central memory and are therefore readily available to the control functions carried out in the boiler or turbine controls. The plant unit master is transitioned or prevented from being disposed in the Plant Manual Mode if the plant unit master is disposed in any of its other operating states or if the main breaker is opened, as defined by OR gate 966.

As seen in FIG. 15, the plant unit master is disposed in its RAM Mode, when: (1) the operator enters a RAMP SELECT on his panel, and (2) the bypass valve system is ON, indicating that the power generator exceeds 30% indicating that the Ramp Mode has been completed, as determined by AND gate 968. The plant unit master transfers from or prevents a transfer to the Ramp Mode upon detection of any one of the following conditions: (1) the main breaker 20 is open; (2) the turbine plant transducer is in an unreliable condition; (3) the boiler control is in its Manual Mode; (4) there is a boiler contingency; (5) there is a turbine contingency; or (6) the plant unit master is in its Local or Remote Coordinated Mode, its Boiler Follow Mode or its Turbine Follow Mode, as detected by OR gate 986 to provide a reset signal to the flip-flop 984.

Further, as seen in FIG. 15, the turbine contingency condition is defined by an OR gate 972 in response to detection of any of the following conditions: (1) the governor valves are disposed in a limiting position; (2) a house load reject condition is sensed indicating that the main breaker 20 has been opened, but the generator is generating sufficient power for the auxiliaries; (3) the speed transducer is in an unreliable condition; or (4) the turbine is in a manual mode (TB). The output of the OR gate 972 is stored in the portion 974 of core, indicating for use by other operations that the plant unit master is in its turbine contingency condition. In a similar fashion, a boiler contingency is detected by OR gates 958 a and b in response to the sensing of any of the following conditions: (1) the boiler is operating in any of its manual modes; (2) the power detector is inoperative; (3) a low limit of air, fuel or water is detected; (4) any one of the auxiliaries is inoperative as defined by OR gate 970; or (5) one of the boiler-turbine bypass valves is not in its automatic mode and the measured pressure is detected to be within prescribed limits of between 1100 PSIG and 3400 PSIG.

The conditions for transferring to and from the Local Coordinated Mode are defined in FIG. 13. The Local Coordinated Mode is initiated by setting a flip-flop 1002 in response to the detection of any of the following conditions: (1) the failure of either of the primary computer or its back-up as indicated by OR gate 990 and the disposition of the plant unit master in its Remote Coordinated Mode, as detected by an AND gate 992; (2) the disposition of the plant unit master in its Remote Coordinated Mode and the failure of the automatic dispatching system as detected by an AND gate 994; (3) the completion of the Ramp Mode and the selection by the operator of the Local Coordinated Mode, as indicated by an AND gate 998; or (4) the failure of the turbine speed transducer, while the plant unit master is disposed in its Remote Coordinated Mode, as detected by an AND gate 996. The OR gate 100 is responsive to each of these conditions to apply a SET signal to the flip-flop 1002, the output of which is indicative that the plant unit master is disposed in its Local Coordinated Mode. As illustrated in FIG. 13, the true output of the flip-flop 1002 is stored in a core portion 1004 to be used by other steps in the control process (see decision blocks in FIGS. 7 to 9). To effect a transfer from or to prevent an entry into the Local Coordinated Mode, the presence of the following conditions is indicated by an OR gate 1006: (1) the breaker is open; (2) the throttle pressure transducer is unreliable; (3) the boiler is disposed in its manual condition; (4) there is a boiler or turbine contingency; or (5) the operator commands the plant unit master to operate in one of the Remote Coordinated, Boiler Follow or Turbine Follow Modes, and the plant unit master is presently operative in its Local Coordinated Mode, as determined by an AND gate 1012. The time delay 1010 permits a slight delay while the operator is entering his transfer command signals.

FIG. 14 illustrates the various conditions for entering and exiting from each of the Remote Coordinated, Boiler Follow and Turbine Follow Modes of the plant unit master. The plant unit master enters its Remote Coordinated Mode by setting a flip-flop 1016 in response to the operation of the plant unit master in its Local Coordinated Mode and the operator entering a command signal to operate in the Remote Coordinated Mode, as indicated by the AND gate 1014. The flip-flop 1016 responds to these conditions to enter a Remote Coordinated signal into a portion 1018 of the memory core, to be used by other steps and routines within the control program (see the decision blocks within FIGS. 7 to 9). The resetting of the flip-flop 1016 is indicative of those conditions for exiting from or preventing entry into the Remote Coordinated Mode. The flip-flop 1016 is reset in response to any of the following conditions: (1) the turbine speed transducer is inoperative; (2) the main breaker 20 is open; (3) the turbine pressure transducer is inoperative; (4) the boiler is disposed in one of its Manual Modes; (5) a boiler contingency exists; (6) a turbine contingency exists; (7) either of the primary back-up computers is inoperative; (8) the automatic dispatching system has failed; or (9) the operator selects a command signal to transition to any of the Local Coordinated Mode, the Boiler Follow Mode or the Turbine Follow Mode while the plant unit master is disposed in its Remote Coordinated Mode, as determined by the AND gate 1022. Each of the aforementioned conditions is detected by an OR gate 1020 to apply a reset signal to the flip-flop 1016.

The conditions for entry into and exit from the Boiler Follow Mode are illustratively determined by a flip-flop 1032, as shown in FIG. 14. The flip-flop 1032 is set, indicating an entry into the Boiler Follow Mode, in response to (1) the completion of the Ramp Mode, and (2) either the operator selection of the Boiler Follow Mode or the presence of a turbine contingency condition, as indicated by the OR gate 1028. The coincidence of these aforementioned conditions is detected by an AND gate 1030 to apply a set signal to the flip-flop 1032; in response thereto, the flip-flop 1032 generates a true signal to be placed in a core portion 1034 to be used in subsequent routines and steps of the control program, as indicated by the decision blocks in FIGS. 7 to 9. The plant unit master effects a transfer from or prevents a transfer to the Boiler Follow Mode in response to one of the following conditions as detected illustratively by an OR gate 1036: (1) the main breaker 20 is open; (2) the turbine pressure transducer is inoperative; (3) the boiler control is disposed in one of its Manual Modes; (4) there exists a boiler contingency; or (5) the operator sets a command to transfer to the Local Coordinated Mode, while the plant unit master is disposed in its Boiler Follow Mode, as detected by an AND gate 1040. In response to any one of these aforementioned conditions, the OR gate 1036 applies a reset signal to the flip-flop 1032 which, in turn, removes its true signal.

In FIG. 14, a flip-flop 1046 indicates the operation of the plant unit master in a Turbine Follow Mode, in response to the detection by an AND gate 1042 that the Ram Mode has been completed and that either a boiler contingency exists or the operator has entered a Turbine Follow transition signal. In response to the aforementioned conditions, the flip-flop 1046 generates a true signal indicative that the plant unit master is in its Turbine Follow Mode, to be stored in core portion 1048 to influence the operation of other steps and routines. To prevent the transition to or to initiate the transition from the Turbine Follow Mode, the flip-flop 1046 may be reset in response to the output of an OR gate 1050, in response to the occurrence of one of the followinng conditions: (1) the main breaker 20 is open; (2) the turbine-pressure transducer is unreliable; (3) the boiler is disposed in one of its Manual Modes; (4) a turbine contingency exists; or (5) a Remote Coordinated transfer signal is operator-entered, when the plant unit master is disposed in its Turbine Follow condition, as determined by an AND gate 1054. In response to the output of the OR gate 1050, the flip-flop 1046 is reset to remove the true, Turbine Follow indicating signal.

As illustrated in the above discussion with respect to FIGS. 11 to 15, the various contingencies, mode operating signals and flags are stored in designated portions of a central computer. By implementing the plant unit master, turbine control and boiler control in a single computer, it is not necessary to provide interfaces between separate computers to facilitate the transfer of information therebetween; rather, each of the plant unit master, turbine control and boiler control has easy access to the central memory to withdraw and insert various information therein.

In the implementation of the plant unit master as shown in FIGS. 7 and 9, and the digital electrohydraulic valve control as shown in FIG. 8, there are numerous integrating controllers incorporated to process a difference or error signal. Typically, an error signal is developed as the difference between a reference signal and a measured variable of the power generating plant. For example, in FIG. 7A, the integrating controller as shown in block 432 integrates an error signal representative of the difference between a speed reference and the measured speed of the turbine rotor. This error signal is applied to the integrating controller 432 which, in either of the coordinated modes, integrates the error signal to provide an output applied to trim or to modify the plant load reference as explained in detail above. When the plant unit master is disposed from one of the coordinated modes to another mode, for example Boiler Follow, a zero reference level signal is applied through the decision block 428 to the input of the integrating controller 432, whereby the output of the integrating controller 432 is driven toward zero, in an exponential manner, for example. In the transition stage between one mode and the next, it is desired to make the transition smoothly so that a bumpless transfer may be made. To achieve a smooth, bumpless transfer, the integrating controller, as readily implemented in a computer, operates at a relativey slow time constant. On the other hand, when the integrating controller 432 is operative to integrate the speed error signal to effect a trim of the plant load reference, it is desirable to provide a relatively fast time constant, whereby a positive response to the error signal is effected to ensure tight control over the plant load reference so modified. In this instance, a relatively fast constant is inserted into the process represented by the integrating controller 432. Though explained with regard to the speed control loop, it is understood that the control loops responsive to power errors and throttle pressure errors, include similar integrating controllers in which varying time constants and/or gains may be set dependent upon the mode of operation being carried out by that controller.

The integrating controllers as shown in FIGS. 7A and B may be implemented readily with software techniques to improve the basic control. A significant improvement results from the flexibility provided by a software computer, as described above in detail, whereby the various constants or gains may be recalibrated from the operator's panel to permit a particular control process to be critically tuned. In the analog prior art systems, only a limited number of such integrating controllers could be used in that their expense was relatively high and further, such analog controllers required extensive calibration, thereby making it prohibitive in terms of operator time for such a system to include a relatively large number of integrating controllers.

As a review of FIGS. 7A and B, 8 and 9 reveals, the integrating controllers may take various forms dependent upon their position within the overall control system. For example, the integrating controller 624 (FIG. 7B) incorporated in the plant unit master to provide a trim of the plant load reference applied to the digital electrohydraulic valve control system shown in FIG. 8, may be a proportional plus reset controller (P-PI) as shown in FIG. 15A. Further, the integrating controllers 446 and 460 (FIG. 7A) of the power control loop and the throttle pressure control loop may illustratively take the form of the P-PI controller shown in FIG. 15A.

Though not shown in FIGS. 7A and B, the proportional plus reset controller of FIG. 15A is particularly adapted to be used in a control process wherein two integrating controllers are disposed in cascade. Generally, the control procedure is to modify the proportional plus reset controller as shown in FIG. 15A in accordance with a defined logical condition, whereby the input signal is transferred away from the integral portion of the controller by switch $S_1$, when required to be operated in series with a second integrator. For example, when the switch $S_1$ is set open, the operator calibration of the system for the manual tracking of the cascaded network is improved.

Problems arise where two integrating-type controllers are inserted in-series with each other due to oscillating signals that develop. For example, in a manual-/automatic station as incorporated into a boiler control system, where an operator sets a reference for the setting of valves through a bumpless transfer to the valve drive mechanism. Typically in such valve control system, the reference set by the operator is compared with a signal derived from a valve transducer indicative of the valve position to provide an error signal to be applied through the bumpless transfer and a summing block to an integrator. In typical fashion, the integrator provides an output for the direct control of the valve drive mechanism. In the Manual Mode of operation, there arises a potential problem because the integrator included with the bumpless transfer, is disposed in-series with the first-mentioned integrator connected to the valve drive mechanism. Under such conditions, the $S_1$ switch, as shown in FIG. 15A, is opened to permit the error signal to be processed only by the proportional block 1100 of the integrator, the output of which in turn is applied to the valve drive mechanism.

In a normal mode, with switch $S_1$ closed, an input x(t), typically an error signal, is applied through the switch $S_1$ to the integrator 1102, the output of which is summed with that derived from the proportional block 1100. The output of the summer 1104, in turn, is applied through the limiter 1106 to provide an output y(t) of the controller, e.g. controller 624. If the P-PI controller of FIG. 15A is in its true condition and the switch $S_1$ is closed, the following output y(t) is obtained:

$$y(t) = K(n) + y(t - 1) + \frac{\Delta t}{2T} [x(t) = x(t - 1)],$$

where $\Delta t$ is the sampling period of the computer and T is the time constant of the P-PI controller. According to this algorithm, the error input x(t) is integrated to provide an output having a corrective control over the process, e.g. to apply a trim factor to the plant load reference as a function of throttle pressure, as in FIG. 7B. The values of the time constant T, the sampling interval $\Delta t$ and the constant K of the proportional block 1100 are set into the computer program by the operator for ready calibration of the P-PI controller 624.

With respect to the operation of the P-PI controller 624 in the plant unit master, it is seen that in a Local Coordinated Mode, Remote Coordinated Mode or Turbine Follow Mode, the P-PI controller 624 as shown in FIG. 15A will act in a normal manner to integrate, according to the equation given above, the input throttle pressure error signal to trim the load reference. However, when the plant unit master is transitioned to its Boiler Follow Mode, a zero reference signal as derived from the reference level signal will be applied to the input of the P-PI controller 624, whereby the controller 624 will be driven toward zero along a linear ramp. In particular, during the transition, the switch S₁ is opened, whereby the zero reference signal is applied only to the proportional block 1100. In turn, the output of the proportional block 1100 is summed with the output of the integrator 1102, which is driven toward zero along a linear ramp. As shown in FIG. 7B, it is noted that the P-PI controller 624 is made a part of the turbine control portion of the plant unit master. Typically, it is desired to operate the turbine control in a more positive, specific manner than that needed for the boiler control. As a result, the P-PI controller 624 responds in a linear fashion as opposed to an exponential fashion, whereby a specific change in the control operation is effected within a defined period of time at a defined rate. Such a time period and rate are determined by the constant K of the proportional block 1100 as set forth above in the equation and can be set into the control program by the operator from his panel for the particular process to be carried out.

The computer implementation, as described above in detail, of the plant unit master enables the operator to insert time constants which have been calculated for the particular process under control. For example, the control processes of the turbine are generally faster than those carried out in the boiler control. As a result, it is desired to insert time constants for the integrating controllers 432, 446 and 460 that are generally slower than those incorporated for the integrating controller 624 of the throttle pressure control loop or integrating controller 1066 of the power control loop effecting turbine control. Illustrative values for the various time constants are given below:

| Coordinated Boiler Control | | |
|---|---|---|
| Speed Control Loop (Integrating Controller 432) | Power Control Loop (Integrating Controller 446) | Throttle Pressure Control Loop (Integrating Controller 460) |
| 10–15 seconds | 5–10 seconds | 15–25 seconds |

| Coordinated Turbine Control | |
|---|---|
| Throttle Pressure Control Loop (P-PI Controller 626) | Power Control Loop (Integrating Controller 1066) |
| 4–10 seconds | 5–10 seconds |

Though the time constants required for the boiler control may be three to thirty times longer than those required for the turbine control, it is noted that the constants are varied for the particular control loop whose control processes they effect; thus, the computer implementation is significant in that it permits the operator to readily calibrate the constants to fine-tune the particular control process. Though the plant unit master has been described herein with regard to the operation of a once-through boiler, it is realized that this invention is readily adapted to be used with various other types of boilers, including a drum-type and a subcritical, once-through boiler, as well as boilers produced by different manufacturers. By contrast, the prior art plant unit masters implemented by analog techniques are limited in their flexibility and in their use of integrating controllers so that two or more variables may be applied to a single analog integrator to be processed. As a result, the time constant for such an analog integrator is selected as a compromise between the requirements of the control processes for the distinct measured parameters. The plan unit master described herein uses separate control loops and separate integrating controllers which may be calibrated critically according to the particular measured parameter being processed.

Once the control integrators have been calibrated for each of the control loops of the Coordinated Boiler Control and the Coordinated Turbine Control, the plant unit master is capable of responding quickly to rapid changes of load demand. The Coordinated Turbine Control is calibrated to respond to a predetermined error to set the governor valves to 100% open within a very short period of time, e.g. 1 second. When the governor valves are opened, steam is quickly directed to the turbine, thereby rapidly increasing the power generated and in a sense, "borrowing" energy from the boiler. In a compensatory action, the Coordinated Boiler Control, and in particular its speed error control loop, integrates the time period that the governor valves have been opened to increase thereby the plant load reference applied to the boiler control, whereby increased input of fuel, air and water is applied to the boiler. As a result, the borrowed energy is replaced. In this manner, a plant unit master whose control loops have been calibrated finely can respond rapidly to increased load demands in an efficient manner.

Thus, by incorporating a P-PI controller as shown in FIG. 15A, the system may track faster than the prior art systems in that the system may be calibrated manually by disposing the switch S₁ open. Further, the effect of two integrators in series is eliminated. The controller may be implemented readily in software techniques because of the simplified manual tracking and further may be applied to P+D (proportional plus derivative) and P+I+D (proportional plus integral plus derivative) controllers. As explained above, the controller is able to make a bumpless transfer because the output of its integral portion is forced to zero when the switch is open and the controller presents only the proportional block to the input signal.

As a further example of the manner in which the elements of the plant unit master may be selected with regard to its overall control operation, attention is turned to the Ramp Mode control as shown particularly in FIG. 9. In particular, the ramp generators 802 and 806 are selected so that the feedwater reference is trimmed in a manner such that the value of feedwater reference will provide 3500 PSIG from the boiler. In particular, it is desired to ramp at a given rate toward an entered reference value, i.e. a value corresponding to 3500 PSIG.

This is accomplished by incorporating a ramp generator as shown in FIG. 15B for each of the ramp generators 802 and 806. In FIG. 15B, an input x(t) corresponding to the reference level to which the ramp signal is to be driven is applied to a difference block 1120, the output of which is applied through a deadband block 1122 to a decision block 1124. If the output of the deadband block 1122 is positive, a YES decision is made by the block 1124, whereby an input is applied to the +K proportional block 128. In this situation whereby the error difference signal is positive, a constant positive signal is applied to the integrating block 1132 whereby a positive ramp signal is generated, to be applied through the high-low limiter 1134 to provide the output y(t). If the error or difference signal is not positive as decided by the decision block 1124, its output is applied to a decision block 1126, which provides an output to a −K proportional block 1130. A negative, constant signal is applied to the integrator 1132, which generates a negative ramp signal to be applied through the high-low limiter 1134 to provide an output y(t). As shown in FIG. 15B, the output is fed back and is applied to the other input of the difference block 1120. As a result, when the output y(t) equals the input x(t), the output of the difference block 120 is zero, thereby discontinuing either the positive or negative ramp. Thus, a control value may be entered at the input x(t), toward which the ramping signal, either negative or positive, is directed at a fixed rate not dependent upon the value of the input signal. Upon reaching the input reference signal, the output y(t) stops increasing and assumes a level value corresponding thereto. Though the embodiment explained with respect to FIG. 15B has been shown with proportional blocks 1128 and 1130 having the same value K, it is understood that differing values of K could be incorporated into the ramp controller as shown in FIG. 15B by the controller from his operator's panel dependent upon the desired control function.

In general, the use of ramp controllers which move from one point to another in linear fashion is desirable from the point of integrator lead-off, when transferring from one mode of control to another, or assigning corrective signals to a control system that already is in service. The nature of the ramp as defined in the controller of FIG. 15B is moved in a linear fashion between two points at a fixed rate of change to dynamically shift the operation even if the input value changes direction or magnitude. The controller of FIG. 15B is implemented readily by software techniques whereby the rate of movement is calibrated and additionally, high-low limits may be readily imposed upon its output. By contrast, a corresponding circuit is not readily implemented by analog techniques. By implementing the control system as shown in FIG. 15B with computer software techniques, a ramp controller is provided such that prior to ramping, the output of the controller automatically assumes a position corresponding to that of the input variable for the beginning of the ramp. The point to which the control transition is to be made, i.e. the final target value, can be entered and the linear ramp started. At any point in time, the end target can be modified and the existing output of the ramp forms a coordinate point and a straight-line ramp will then occur to the new final target value.

As more fully explained in the above-identified, incorporated by reference application, entitled "Control System With Adaptive Process Controllers Especially Adapted For Electrical Power Plant Operation", the ramp controller as shown in FIG. 15B also is adapted for providing a corrective control signal to a system that already is in service, for example, a boiler control system. Analog-type boiler control systems typically employ analog integrators, the output of which varies exponentially with time. At increasing values of time, the rate of change of the output becomes increasingly steep so that such analog integrators are not particularly suitable for boiler process control. This defect typically is compensated by employing analog integrators with very slow time constants whereby the response of the boiler control is made unduly slow. Thus, if it is desired to shift the load reference in an analog boiler controller, many minutes are required before even an initial response to the new reference load is achieved. By contrast, ramp generators as shown in FIG. 15B as implemented in software techniques are capable of responding immediately in a predetermined, linear fashion, whereby a considerable load shift may be achieved in a known period of time, e.g. 30 megawatts within a single minute.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

APPENDIX

Boiler Control Chains And System Programs

Section 1. Introduction 1.1 General

Power systems have grown from a few isolated machines to the present large interconnecting ties with area load and frequency control. In addition, a trend of major significance in the design of fossil electric utility plants today is the use of once through boilers to provide superheated steam for the turbine generator. In these modern plants it is not possible to use conventional boiler follow or turbine follow control concepts since the boiler and turbine can no longer be operated as separate power plant entities. The once through boiler imposes an ever increasing challenge on the control engineer to develop a control philosophy which includes consideration of all elements of the power plant in a coordinated scheme.

To ensure proper plant operation of such a complex scheme means that all techniques of modern control theory must be used, and a new ones developed. These include nonlinear forward characterization of major plant variables such as load demand, boiler demand, feedwater demand, fuel demand and air demand; calibration of the forward control action by measured variables such as pressures, temperatures and flows; adaptive controllers sensitive to real plant variables and adjusted to operate throughout the entire load range; minor loop feedback control which is coordinated throughout the the entire system; and finally logical interaction of all necessary control loops to ensure bumpless transfer from manual to automatic, and from automatic to manual, modes of operation.

To assist the implementation of the many control techniques this system has made use of a dual computer control organization. This configuration will allow wide range controllability as required for these types of steam plant turbine generator configurations. The digital computers applied to this dual controller configuration have high speed digital capability and utilize sophisticated control techniques necessary for proper plant operation.

Figure 70:
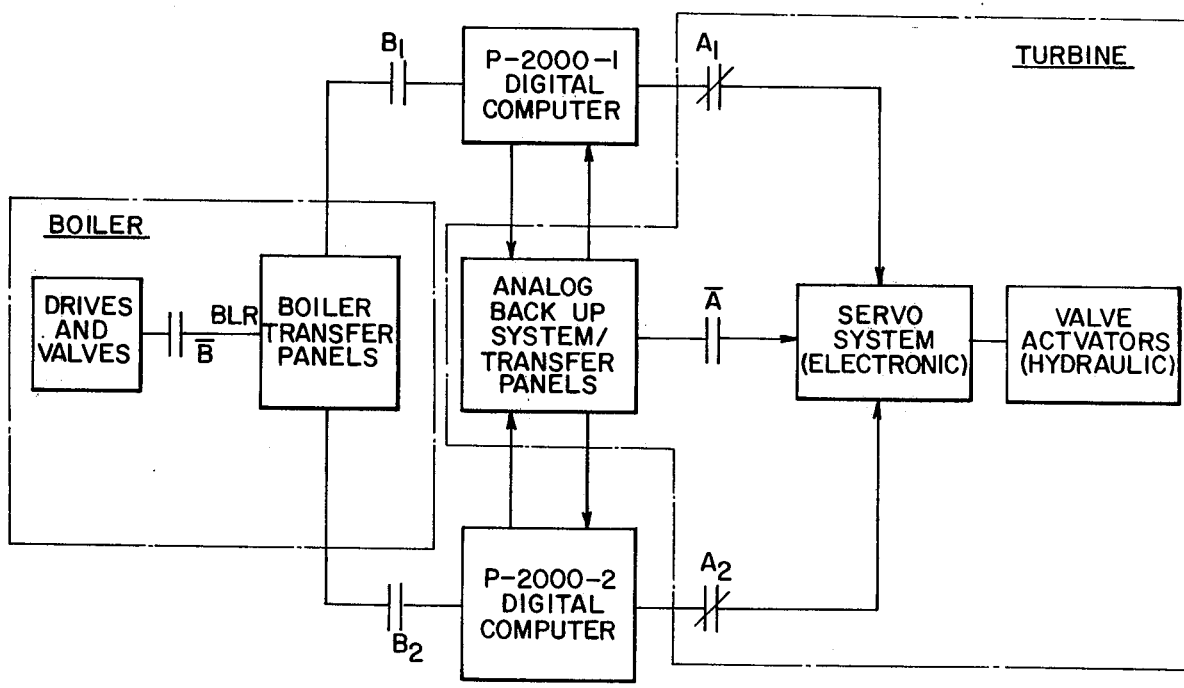
FIG. 70 shows a boiler/DEH system block diagram.

The dual channel boiler/digital electrohydraulic [DEH] system controls a boiler and steam turbine automatically using Westinghouse P2000 Process Control Computers. A block diagram of this system is shown in FIG. 70. The P2000 computers represent the digital portion of the system, the servo-hardware represents the electronic portion of the system, the Moog actuators represent the hydraulic portion of the control, and the transfer panel which connects to drive the valves represents the boiler control portion. During automatic operation contact A1 or A2 in FIG. 70 is normally closed. The DEH control ststem, with the use of a P2000 computer program, sends output signals to the electronic servo system to position the hydraulic valve actuators. These in turn admit steam to the turbine, effectively controlling turbine speed and/or load. During this period of time only one of the two computers is actually controlling the process. The computer in control is operator selected.

An analog backup system maintains the turbine valve position and provides simple raise or lower action in the case of computer contingency and maintenance. The analog system outputs connect the servo system through the contact A which is normally open.

For the boiler control, operation is provided by raise or lower contacts which are output from the computer through transfer panels to final drive and valve units. The backup system for these devices is manual plant operation provided by the control operator directly from the control board. When on automatic the boiler will be controlled through increase-decrease contacts of either controller B1 or controller B2. Manual operation will occur when $\bar{B}$ is being used by the control operator.

For both the boiler and turbine control systems, the process is continually tracked by the backup computer, here, regardless of which one it is. The tracking is in preparation for bumpless transfer of control from automatic to manual, or from manual to automatic. The boiler portion of the control system does not incorporate the full analog backup system as has been provided for the turbine generator control.

1.2 The DEH Dual Channel Digital Control Concept

Figure 68:
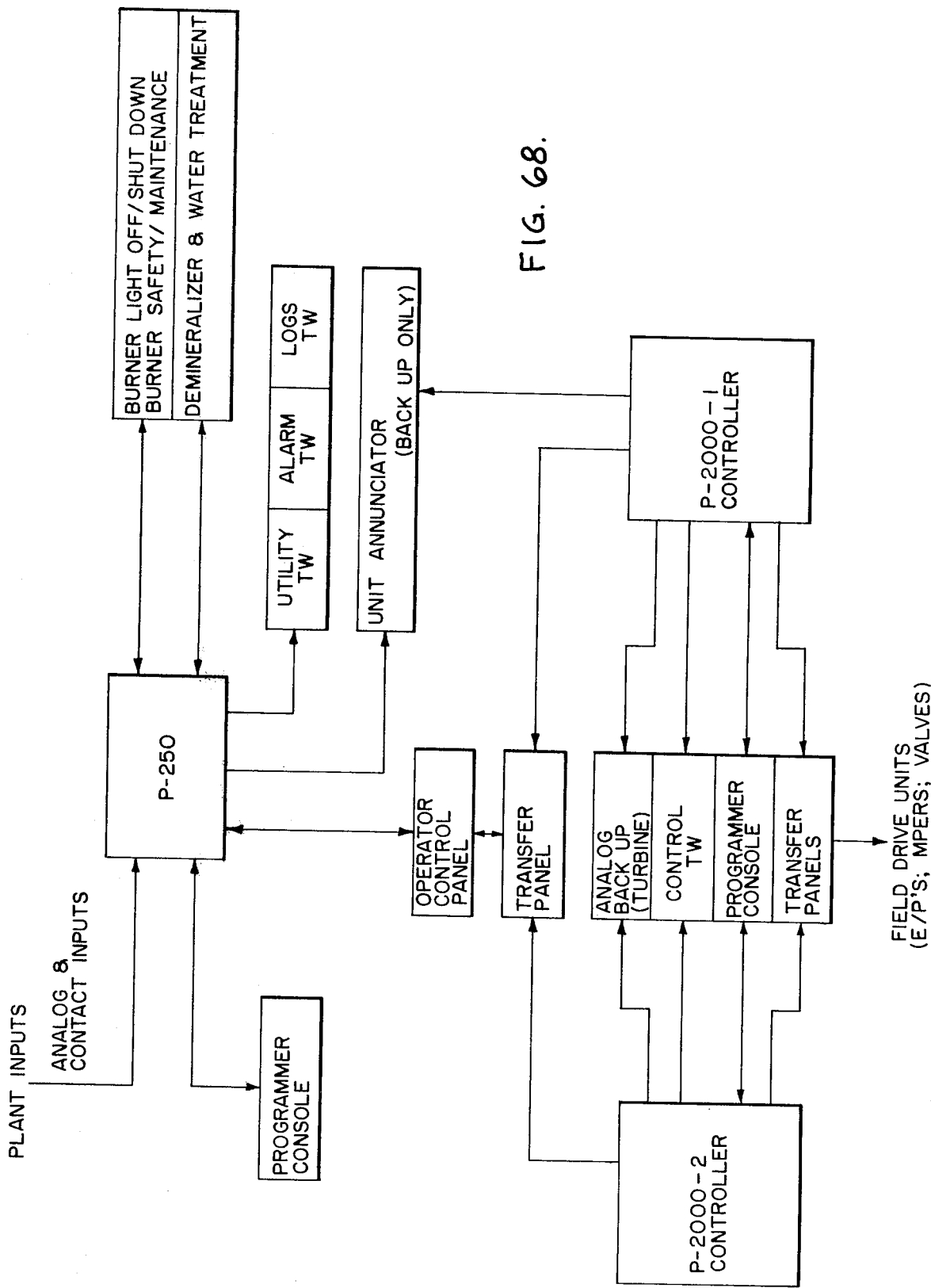
FIG. 68 relates to overall unit concept.

Application of the dual P2000 boiler/digital electrohydraulic turbine controller operating in conjunction with the Prodac-250 power plant computer provides a unique approach to total unit control. The overall concept, in FIG. 68 utilizes modern-day technology of the digital computer to obtain a very workable and economical control system.

This system embodies two single channel DEH Prodac 2000 controllers implemented in a fashinon for both boiler and turbine control. The base single channel DEH P2000 package has been expanded to perform additional functions required for steam generation control in addition to turbine control and provide a truly integrated control configuration. The expansion of the single channel control configuration has utilized additional computer core and mass memory hardware resulting in an extremely powerful control configuration.

To provide ultra high unit operational availability, the electrohydraulic control base features, turbine acceleration program, and steam generator control are duplicated within the second P2000 boiler/DEH computer in a totally redundant manner. In the normal mode of operation one computer will control while the second computer is functioning as a backup to the prime controller in the event of failure. Note in FIG. 68 Overall Unit Concept that the P2000-1 controller functions as a backup to the P250 monitoring unit annunciator. For this reason the P2000-1 controller will normally be the primary control for the boiler-turbine.

Each P2000 controller has its own individual Input-/Output hardware and programs which are duplicates of those existing in the other computer to perform all required control functions. The approach provides two control processing units and complete dual I/O for all critical control.

The steam generator and turbine operational control are integrated to provide thorough central unit control concepts which includes plant coordination, runbacks and plant trouble monitoring.

1.2.1 Control Program—DEH

The following subject matter has been implemented with computer programs which exist in each computer as totally and separately individual packages. These descriptions will discuss the programs as resident within a single computer.

Figure 66:
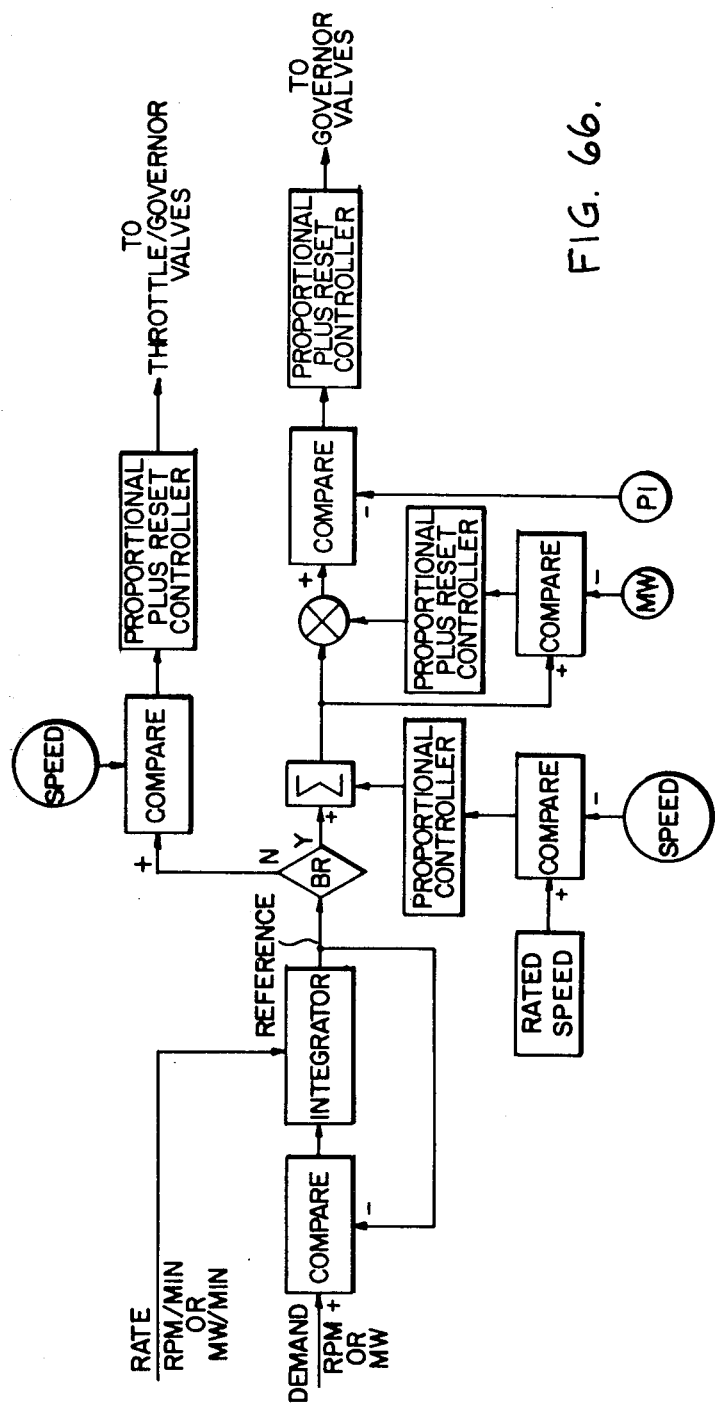
FIG. 66 shows a control TAST block diagram.

The primary function of the DEH system is to automatically position the turbine throttle and governor valves at all times, to maintain turbine speed and/or load. This is accomplished with specially designed P2000 computer program which is called the control task. A block diagram of the control task is shown in FIG. 66. The quantities demand and rate represent the desired turbine setpoints. During wide-range speed control, the demand is the turbine target speed in RPM and the RATE represents the rate of change in RPM/MIN at which the DEH control task achieves the given demand. On load control, the demand is the target load in megawatts [MW] and the rate represents the rate of change in megawatts per minute at which the DEH control task is to achieve the given demand. During automatic control, the demand and rate values may be entered by the operator from a keyboard, or they may be entered from remote control devices such as automatic synchronizing equipment, from an automatic dispatch system, or from another computer or boiler control system. These remote inputs may occur as discrete pulses, as time controlled pulse widths, or as continuous analog inputs.

The demand is compared with the interval turbine reference to generate an error signal [see FIG. 66]. The error signal drives an integrator whose output is the desired speed or load reference. The control task then checks the state of the main generator circuit breaker; if it is open, the upper path is taken to accomplish wide-range speed control. The turbine reference is compared with actual speed to generate an error which drives a proportional-plus-reset controller. The controller output positions the throttle and governor valves to achieve the target demand speed.

Should the main generator circuit breaker be closed, the control task takes the lower path in FIG. 66. The turbine load reference acts as the feedforward signal in a combined feedforward feedback control system. Speed feedback is accomplished by comparing the actual speed with rated speed. The error between the speeds drive a proportional controller whose output modifies the reference, additively. This mechanism allows the turbine to participate in dynamic load sharing as the utility power system frequency varies from second to second in real time.

The speed compensated load reference is then compared to actual load megawatts; this error is used to drive the proportional-plus-reset controller. The controller output trims or modifies [multiplicity] the feed-forward load reference to account for load mismatch. This speed and load compensated reference then serves as the setpoint for turbine impulse chamber pressure controller. The error between this setpoint and actual impulse pressure drives another proportional-plus-reset controller. The controller output positions the governor valves to achieve a desired demand compensated for speed, megawatt and impulse pressure mismatches.

1.2.2 DEH System Organization

Figure 67:
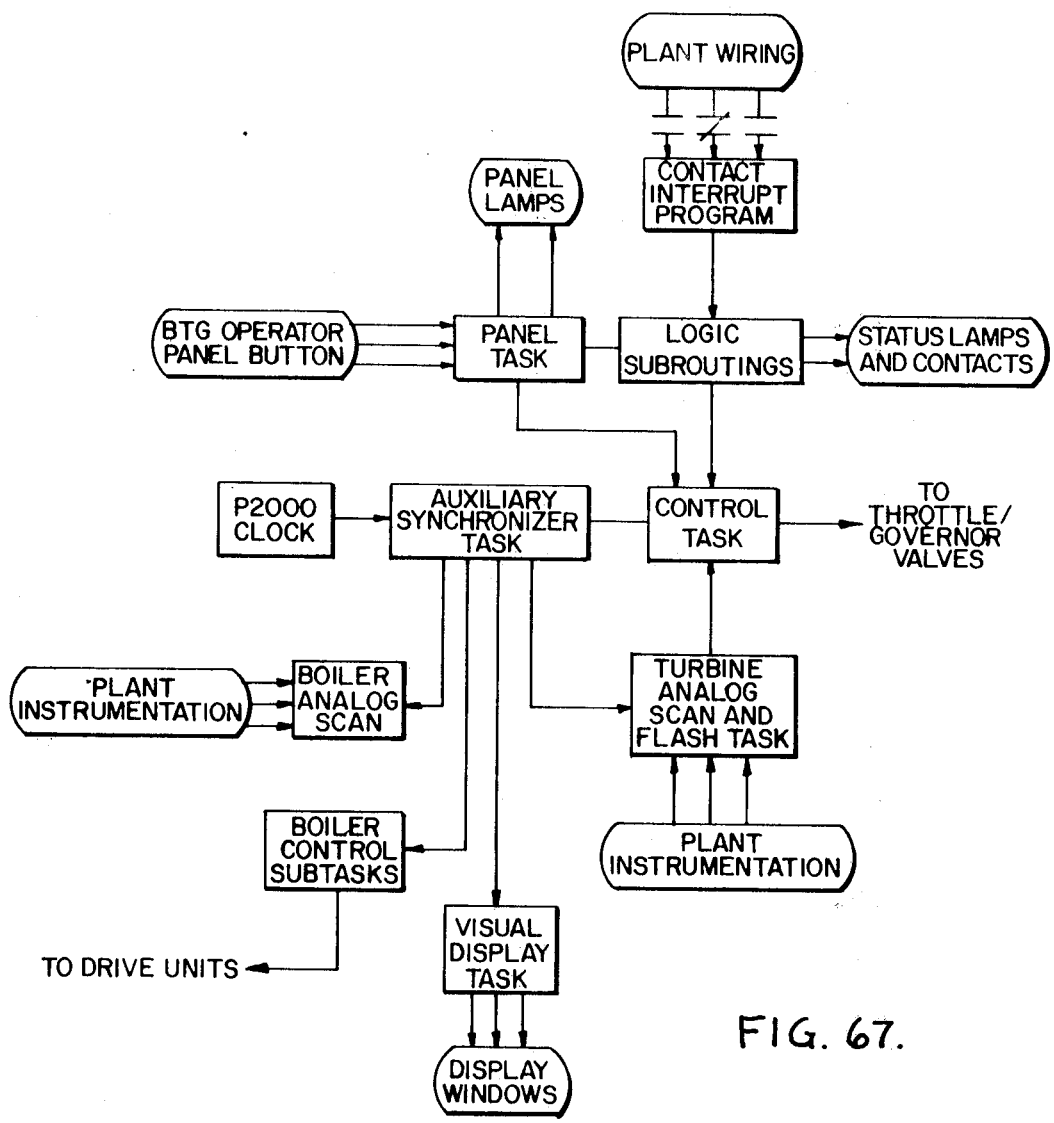
FIG. 67 relates to boiler DEH system organization.

To carry out its assignment, the control task requires various support programs so that it can position the turbine throttle and governor valves at all times. FIG. 67 illustrates the organization of the DEH system to accomplish these functions.

An important requirement of the control task is that numerical quantities be made available to indicate the value of the various feedback variables, such as turbine speed, impulse pressure and megawatts. These are provided by the analog scan program. This program accepts information from plant instrumentation and converts it to proper form for use by the control task and all other DEH control system programs. Note that the analog scan program is combined with a program which will flash buttons on the operator panel or indicator lights. The control task also requires status information in the form of contact inputs from the turbine in the power plant. This is provided by a special interrupt program in conjunction with a logic subroutine. The logic subroutine computes all logical states according to preplanned conditions, and passes these on to the control task. In addition, the logic subroutine manipulates various lamps and status contact outputs in accordance with the states which it has computed.

Another important part of the DEH system is the operator's panel program. The operator communicates through the panel with the boiler/DEH control program by means of various buttons which have assigned functions. When any button is pressed, a special interrupt is generated; this interrupt triggers a panel interrupt program which decodes the button pressed, and then bids the panel task. The panel program processes the button and takes the appropriate action, which usually means manipulating some panel lamps as well as passing on the button information to the logic subroutines and the control task.

The operator's panel has two sets of displays which allow display of all turbine program parameters, variables, and constants. A visual display task, see FIG. 67, presents this information in the windows at the request of the operator through various dedicated display buttons and a numerical keyboard. The visual display values are periodically updated in the windows as the quantities change.

Certain important turbine operating conditions are communicated to the boiler/DEH operator by way of the flashing lamps on the panel. Therefore, a special flash program [shown in FIG. 67] is part of the Boiler/DEH system. Its function is to monitor and detect such contingency conditions, and flash the appropriate lamp to alert the operator to the state.

Finally, another task is required to coordinate all parts of the Boiler/DEH system in a precisely timed pattern. This is the function of the auxiliary synchronizer [AUX SYNC] task. The AUX SYNC task periodically bids or runs the various programs discussed above. The AUX SYNC task is run by the extremely accurate electronic clock which is an integral part of the P2000 computer hardware.

1.2.3 Boiler Control Program

The primary function of the Boiler Control System is to automatically position dampers, drives and valves to control steam generation supplied the turbine-generator. This is accomplished utilizing computer programs which operate in conjunction with DEH turbine programs.

A block diagram of the Boiler Control System is shown in FIG. 3A. A primary difference in relation to turbine control is that the boiler has approximately 44 manual/auto stations, whereas the turbine executes functionally as one large manual/auto station. Depending on the mode of control, quantities called demand and rate represent the desired Boiler setpoint. During wide load control, the demand is the target in megawatts, and the rate represents the rate of change in megawatts per minute at which the Boiler control achieves the given demand. The demand for the boiler is in megawatts regardless of whether the unit is operating on speed or load control. On automatic control, the demand and rate values may be entered by the operator from a keyboard located on the BTG panel. The demand may also be entered for the combined control when the unit is in Remote Coordinated mode of operation and the unit is receiving discrete time controlled pulse widths from the automatic dispatching computer.

The demand is compared with internal boiler reference to generate an error signal. The error signal drives the integrator whose output is the desired load reference. The control then checks and provides coordination of the Boiler-Turbine to accomplish the wide-range control. The Boiler control utilizes a highly interactive feedforward and feedback control system.

In reviewing the Plant Unit Master, FIGS. 6-15, note the use of the many feedback trim controllers such as megawatts, throttle pressure, or speed error.

1.2.4 Boiler System Organization

To provide proper Boiler control the system has two task levels assigned for boiler control programs and logic FIG. 67 illustrates the organization of the Boiler/DEH system to accomplish the desired control functions.

An important requirement of the control is that numerical quantities be made available to indicate the value of various feedback variables such as process pressures, temperatures, and flows necessary for proper Boiler Control. These are provided by the analog scan program. This program accepts information from plant instrumentation and converts it to proper form for use by the Boiler Control subtasks and other system programs.

The Boiler Control system requires process status information in the form of contact inputs from the power plant. This is provided by special interrupt programs which operate in conjunction with the logic subtasks. The logic subtasks communicate all logical states according to preplanned condition and pass these on for use if required by the control subtasks. The logic subtasks may change various status lamps and contact outputs in accordance with the computed variables to provide safe boiler operation. These boiler programs also function with the operator's panel program. The operator communicates with the Boiler much in the way he does with the turbine by entering through the keyboard setpoints, biases, high/low limits for the various Boiler Control functions. The software supporting this area is organized in a fashion similar to that used for the turbine control. The Boiler portion of the control has four displays. Two pair, one pair is associated with the Boiler system, the second pair is associated with the Plant control. A display subtask presents the information to the displays indicating load reference setpoints, etc. The displays for the boiler plant section may also be used for display of boiler analog inputs, calculated values and logical variables.

The boiler programs are all executed as part of the auxiliary synchronizer task. The AUX SYNC task periodically bids and runs programs in a predefined manner. All boiler programs run on a periodic interval which was determined by evaluation of the process time constant associated with the specific control loops.

1.3 Large Central Station Total Unit Automatic And Control Philosophy

Traditionally, Boiler and Turbine controls have been engineered and installed as separate systems. As utility units have increased in size, complexity of control and operating procedures have increased accordingly. No longer is the independent subloop control method of boiler turbine operation acceptable.

With present day utility units tied into large electrical networks, remote centralized coordinated control of power generation for each unit is of utmost importance.

The unit control system provides regulation of feedwater, fuel and air variables to the furnace, spray injections for transient corrections of temperature, and turbine governor valve position to maintain proper generation levels in conjunction with the proper turbine inlet steam pressure and temperature conditions.

The significant operational features of total unit automation and control systems are as outlined below:

Item 1—Enable the turbine-generator and the steam generator to be operated as an integrated package.

Item 2—Apply control action in a coordinated manner so as to minimize interactions between controlled variables, unit generation, steam pressure, flue gas oxygen and steam temperature regulating equipment.

Item 3—Apply spray desuperheaters in a manner such to utilize available thermal energy storage in a Boiler and minimize transient temperature disturbances.

Item 4—Provide the following modes of operation for automatic/manual control and allow for operating contingencies where equipment misoperation may require it:

Item A—Plant manual
Item B—Plant start-up
Item C—Ramp
Item D—Local coordinated
Item E—Remote coordinated
Item F—Turbine follow
Item G—Boiler follow Item 5—Provide the ability where required by the operator to operate the boiler and turbine as separate entities in a separated manner of control.

Plant Unit Master

PUM-1. General

Generation is established by the selection of the appropriate level of firing rate, feedwater flow and governor valve position. The plant unit master provides a signal which is the master demand for total feedwater flow, fuel flow and air flow to the furnace and turbine governor valves.

To change generation level, a given incremental amount of the variables, feedwater, fuel and air are changed directly in the same proportion as the generation change, thus minimizing disturbances in pressure, temperatures or fuel/air ratio.

The unit control system provides adjustments and control functions for:

2.1.1 The establishment of desired generation [either manually or by automatic load control system].

2.1.2 The introduction of frequency bias to accommodate the inherent regulation of the turbine governor.

2.1.3 The establishment of appropriate maximum, minimum generation limits at a maximum rate of change of generated output.

2.1.4 The introduction of appropriate interlocks, limit actions, and runback actions to maintain the unit within the capabilities of the equipment in service.

The unit system receives load demand signals from either an automatic load dispatching system, or inputted locally by the unit operator and sends a characterized load demand signal simultaneously to the boiler and tubine. Adjustments are provided for high limit, low limit and rate of change limits. The system also contains provision for utilizing run up/run down and limit signals from plant auxiliaries for the unit operation is contained within the capability of the auxiliary equipment in service. The unit control operations panel provides a means of selecting the desired operating mode and is able to automatically transfer to contingency modes if required.

The plant unit master receives power setpoints from either the plant operator or the automatic dispatch system. The primary function of the plant unit master is to compute a characterized load demand to be processed simultaneously by the boiler and turbine controllers as a function of the plant logical status.

The plant unit master provides means to select the desired power plant operating mode, or automatically transferred to contingency modes required for plant safety.

The output of the plant unit master is megawatts referenced to the boiler regardless of speed or load operation on the turbine. Calibration of the sytem accounts for the low megawatt value required when the unit is first starting up. Once the main generator breaker is closed the demand for both boiler and turbine is megawatts.

The plant unit master control has two basic modes of operation: coordinated or separated. Coordinated mode for this system is defined to be the operating condition when both boiler and turbine are operating under one plant reference regardless of the existence of a contingency mode or feedbacks in service. For explanation, during contingency mode it is still possible to have either the boiler or the turbine being positioned to pre-set reference and the other portion of the control function to directly support the reference accounting for the contingency condition. Separated control occurs during the time that the plant operator enters a megawatt reference for the boiler and enters a separate megawatt reference for the turbine and maintains the correlation between the two providing proper balance of steam generation and utilization at all times.

Using this approach, the plant unit master operates the turbine valves, fuel input, feedwater flow and air flow simultaneously. Corrective computations for flow, pressure error, generation error and frequency bias are applied to the boiler and turbine in the correct relationship to keep both operating together. The Westinghouse Boiler/Digital Electrohydraulic governing system provides the operational capability required for the plant unit master. During the Start mode before the breaker is closed feedwater flow can be placed on either automatic or manual. In the manual mode of operation each boiler feed pump is indexed from its associated increase/decrease pushbutton. The base mode is not lighted when both feed pumps are on manual control. The base mode indicating light is in the boiler section of the panel.

When either of the boiler feedwater pumps is placed on automatic the bae mode is lighted automatically to transfer feedwater demand control to the boiler reference setter. When feedwater demand is transferred to the base mode the operator sets in the new desired feedwater setpoint from the keyboard. The boiler control package will make a bumpless transfer from feedwater manual to feedwater base automatic control mode.

After the breaker is closed the load demand computation is used to index both the turbine and the boiler when the unit is coordinated. The speed error signal is simultaneously used during on-line opeation in the frequency bias signal to the boiler inputs and speed regulation for the turbine generator unit. The approach minimizes the number of operating stations requiring monitoring and adjustment by the operator, thus simplifying the interlock system between the boiler and turbine.

Selectors or indicators are provided to implement the following modes of the total plant control:

| MODE # | FUNCTION |
|--------|----------|
| 1 | Plant Manual |
| 2 | Start |
| 3 | Ramp |
| 4 | Local Coordinated |
| 5 | Remote Coordinated |
| 6 | Turbine Follow |
| 7 | Boiler Follow |

The above modes are selected so that the operator can properly control the unit from a cold start through all phases of operation with minimum of manual operating stations. The unit is operated using the Remote Coordinated of Local Coordinated mode as the normal operating procedure. The Plant Manual, Start, Ramp and Boiler Follow modes are required for bringing the unit up to synchronous speed, synchronizing, gradual heating of the turbine and boiler and ramping to full rated pressure. The unit load demand signal is transmitted simultaneously to the boiler control system and to the turbine governor control system as a boiler load demand signal and a turbine load demand signal. Thus, in the coordinated control mode the unit demand is applied to the boiler and turbine in a forward manner with minor corrections for throttle pressure, megawatt error, and frequency bias. When operating in a coordinated fashion the reference is entered in the plant portion of the unit operating panel. Refer to FIGS. 10A-10C, which shows the location of the boiler, plant, and turbine portions of the total unit operator control panel.

Any time the generator breaker is closed the plant unit master will transfer from Start to Plant Manual. This action will cause an automatic transfer to boiler manual mode with impulse chamber pressure feedback loop out of circuit. Under these conditions, the boiler demand signal is taken from the feedwater reference in the boiler portion of the panel. The feedwater reference will be established from initial manual operation and a value of feedwater flow currently in the unit prior to the transfer of feedwater system from manual to automatic.

The logic system insures that proper signals are in service for the mode selected. The system is interlocked to prevent an incorrect transfer from one mode to another. If the unit is operating in a corrdinated mode and an unusual turbine condition develops, it will automatically transfer to boiler follow or if an unusual boiler condition develops it will transfer to turbine follow. Thus, turbine follow means turbine following boiler operation due to a boiler contingency.

Megawatt error is integrated to adjust the boiler control system to maintain proper balance between the boiler and the turbine during steady state operation. The megawatt generation is proportional to fuel input. The generation error adjusts throttle pressure at that point to allow for proper usage of the stored energy in the boiler. That is, on an increasing load demand is increased by an amount proportional to the generation error, the governor valves will open, and the energy stored in the boiler will be transferred to the turbine to be used for megawatt generation. This setpoint adjustment gives faster response to changes requested by the load dispatching signal.

Frequency bias is applied to both the turbine and boiler control systems to permit the unit to properly share in the frequency control by increasing or decreasing the boiler and turbine demand signals as required.

2.2.0 Plant Modes of Operation

Total unit modes of control are selected by the operator or by plant interlocking logic devices and are limiting. The modes of control are described as follows:

2.2.1 Start Mode:

Start is an uncoordinated mode used from initial firing up to the closing of the generator breaker. This mode cannot be selected by the operator, but is automatically selected when the unit is tripped in order to be ready for the next startup. During this mode the speed/load reference is providing the speed reference for the turbine control system which is in the wide range speed control mode. The reference for the turbine is entered in the turbine reference pushbuttons. The boiler control can be in feedwater base mode with a load reference coming from the feedwater reference button in the boiler portion of the panel. The control for the boiler may be on automatic or manual control during a startup of the turbine. The boiler turbine coordination control is a contingency load limiting control features are not active during this portion of the startup. Control is automatically transferred to the Plant Manual mode when the breaker is closed. This is the only means of leaving the Start mode.

2.2.2 Plant Manual Mode:

Plant Manual is an uncoordinated mode used after synchronizing and during certain manual operations. This mode cannot be selected by the operator, but it automatically selects boiler fuel, water and air in the turbine are not automatic control. The boiler or turbine mode transfers can be made manually by the operator or automatically by their logic systems. During this mode the load reference is providing the load reference for the turbine which can be operating in operator auto or manual mode. The boiler control can be in feedwater base with the load reference coming from feedwater reference pushbutton. The boiler turbine coordination control and contingency load limiting are not active at this time. Control is automatically transferred to the Start mode if the breaker opens or by operator selection to any of the five coordinated modes if their respective permissives are satisfied.

2.2.3 Ramp Mode:

In the Ramp mode, the boiler control ramps such that the pressure runs in a continuous fahsion from approximately 1000 to 3500 psig. During this time the load generation will increase due to the increased flow. This mode of control is not a coordinated mode.

2.2.4 Local Coordinated Mode:

Local Coordinated is a normal coordinated mode with a plant operating without any contingency or limiting conditions. The load demand and rate of change are established by the operator utilizing the plant reference pushbuttons.

This mode can be entered by operator selection from the Ramp mode upon completion of the pressure ramp; from any of the three modes, Boiler Follow, Turbine Follow, or Plant Manual with contingencies cleared; or from the Remote Coordinated mode, in case of remote coordination rejection. The permissives for this mode are the boiler fuel water and air control stations on automatic, the turbine control on operator auto with speed correction in service and on load control with the pressure ramp completed.

During this mode the megawatt reference is providing the load reference to the turbine control and to the boiler control. The Boiler/Turbine coordination is providing corrections to both boiler and turbine for error in speed, megawatts and throttle pressure. The contingency load limit control and feedwater base control are not active at this time. When operating in local coordinated mode the feedwater reference will be tracking the actual unit feedwater flow in case control rejects to a separated mode thus insuring a bumpless transfer from automatic back to manual.

Control is automatically transferred to the Start mode if the breaker opens, to Plant Manual if boiler feedwater fuel or air, or the turbine control transfers from operator auto to manual. The unit will transfer to Boiler Follow or Turbine Follow if a contingency condition develops. Control can be transferred by the operator to Turbine or Boiler Follow or Remote Coordinated if ADS system is available.

2.2.5 Remote Coordinated Mode:

Remote Coordinated is a coordinate mode with plant operating without any contingency or limiting conditions. The load demand changes at a rate of change being calculated from time variable pulses received from the automatic dispatching system.

This mode can be entered by operator selection from a local coordinated mode if the ADS system has no existing rejects.

During this mode the megawatt reference is providing the load reference to the turbine and boiler controls. The boiler/turbine coordination control is providing corrections to the boiler and turbine for errors in speed, megawatts and throttle pressure.

The contingency load limit control and feedwater base control are not active at this time.

Control is automatically transferred to the Start mode if the breaker opens, to Plant Manual mode if the boiler fuel, water, air or turbine control station is placed on manual, to turbine follow if any of the contingency load limiting functions occur, to boiler follow if the turbine valve position limit is operating, or to Local Coordinated if an ADS failure occurs. Control can be transferred by the operator to the Turbine, Boiler Follow mode or Local Coordinated control.

The boiler/turbine coordination control operates in the remote coordinated mode exactly the same as the local coordinated mode. The primary difference is that the plant megawatt reference is indexed up or down by time varying pulse widths of intelligence brought to the control system through contact input. Time variation of these inputs varies from 1/10 of a second to 1 second. Long pulse condition is detectable when any input pulse exceeds 1 second. If a long pulse condition develops the control will reject from Remote Coordinated to Local Coordinated and a message printed on the control typewriter. The operator has the ability when using Remote Coordinated mode to bracket the plant generation by utilizing the high and low reference limiting features of the operator panel. In the event that the operator has bracketed limits and the dispatching system demand either increases or decreases to the point of trying to bypass a limit, the generation reference will remain fixed at the limit and the respective high or low limit pushbutton on the operator panel will begin flashing indicating that the unit has come against the limit. When operating on remote coordinated control, each time a pulse is received from the dispatching equipment the megawatt increase or decrease indicator lights located on the turbine portion of the control panel will illuminate for the time period that the pulse contact is closed from the remote dispatching equipment. This feature allows the operator to detect at a distance when the remote dispatching system is incrementing or decrementing plant reference.

2.2.6 Turbine Follow Mode:

Turbine follow is a coordinated mode used when a boiler load limiting function exists. This mode is automatically entered when a boiler contingency as defined in the contingency load limit control section occurs or by operator selection.

During this mode the megawatt reference as limited by the contingency load limit control is providing the load reference to the turbine and boiler control. The boiler/turbine coordination control is providing a correction to the turbine controls to maintain a constant throttle pressure. The feedwater base control is not active at this time.

Control is automatically transferred to Start mode if the breaker opens, to Plant Manual if feedwater, fuel, air or turbine manual control station is placed on manual, or if turbine valve position limits is operating by operator selection to local coordinated if the permissives are satisfied.

2.2.7 Boiler Follow Mode:

Boiler Follow is a coordinated mode used when a turbine load limiting function exists. This mode is automatically entered when a turbine contingency such as valve position limit or operator action occurs. The boiler must have fuel, water, and air on automatic, the turbine control with megawatts and impulse pressure feedback loops out of service and speed either in or out of service and the ramp completed.

During this mode the megawatt reference as limited by the DEH turbine control is providing the load reference to the turbine and boiler. The reference is entered using the plant reference pushbutton. The boiler/turbine coordination control is providing a correction to the boiler control to maintain a constant throttle pressure. Speed regulation is made only to the turbine control.

The feedwater base control and contingency load limit control are not active at this time.

Control is automatically transferred to the Start mode if the breaker opens, to Plant Manual if feedwater, fuel, air or turbine control station is placed on manual or by operator selection of the Local Coordinated if the permissives are satisfied.

2.3.0 Boiler Turbine Coordination Control:

The purpose of the boiler turbine coordination control is to balance the turbine and the boiler control systems during steady state operation so the unit will generate the desired electrical load, to permit the unit to share properly in frequency control by increasing or decreasing the boiler and turbine load references, and to properly adjust the relationship between the turbine and boiler references during transients to account for the stored energy of the system. Speed error, megawatts, and throttle pressure are used in the coordination control to accomplish the above requirement.

During steady state operation, megawatts generation is proportional to fuel input so that megawatt error is integrated and modifies the boiler control reference. Throttle pressure error is integrated and modifies the turbine control reference. Load is used by the turbine control system is determined by the valve position demand which has been characterized to be linear for both single and sequential valve operation.

Speed error adjusts the turbine and boiler references and the megawatt setpoints so the unit can share in the system frequency control during transient conditions, throttle pressure error adjusts the megawatt setpoint and megawatt error adjust the throttle pressure setpoint. The use of these two setpoint adjustments allows for proper usage of the stored energy in the boiler and gives faster response to load changes. If the throttle pressure is high the megawatt stepoint is increased, and if megawatts are high the throttle pressure setpoint is increased.

2.3.1 Boiler Modes of Operation:

Three modes of operation and 5 submodes are used to satisfy the various boiler turbine operating requirements. Two modes are provided for separated operation, manual and base plus the coordinated mode to operate with the five plant coordinated configurations. Base mode has three submodes. The boiler modes are as follows:

(1) Manual
(2) Base
(3) Coordinated

Feedwater base control provides a means of establishing a boiler reference signal and a rate of change of that signal when the boiler is operated separately from the turbine.

2.3.2 Manual:

Manual control for the boiler is operated with feedwater flow controls on manual. The boiler control logic, described in other sections, prevents air, fuel in the FR/FW ratio control from being placed on automatic with the feedwater on manual. The boiler reference is equal to the feedwater flow during this mode. This permits the feedwater to be placed on automatic control bumplessly.

2.3.3 Base:

Base mode is provided to permit an orderly and safe procedure for placing the various boiler subloops on automatic. The interlocking logic used with this procedure is described in other sections of the boiler control. During this mode, the boiler reference is established by the operator. Four modes are provided:

(A) Feedwater flow on automatic
(B) Feedwater and air flow on automatic
(C) Feedwater, air and fuel flow on automatic
(D) Feedwater, air, fuel and the FR/FW ratio controls on automatic 2.3.4 Coordinated:

The coordinated mode for the boiler provides operation with the five plant coordinated modes described above. The boiler reference is generated by the megawatt load reference.

2.4.0 Turbine Modes Of Operation:

Three modes of operation with three symbols are used to satisfy the various turbine operating requirements. Two of these modes, manual and operator automatic, and the submodes are the same as for the standard DEH turbine control system and are used when operating in a separated fashion. Coordinated control has been applied and is described in Section 2.2, plant modes of operation. The turbine operating modes are as follows:

(1) Manual
(2) Operator Auto
(2A) Speed correction in service
(2B) Megawatt correction in service
(2C) Impulse pressure correction in service
(3) Coordinated The speed/load reference portion of the standard DEH turbine provides the speed/load reference for the turbine control system when it is operated separately from the boiler.

2.4.1 Manual:

In the manual mode, the operator positions the turbine valves by means of 5 pushbuttons on the panel and the DEH hybrid system. The computers are not used during this type of operation. This system is described in detail in the turbine control system descriptions.

2.4.2 Operator Automatic:

In this mode the operator initiates the speed or load demand and the computer is used with the hybrid system to position the turbine valves to obtain the desired speed or load. When operating in load control, three corrections are applied to the control system. They are speed error, megawatts and impulse pressure. These corrections are automatically removed in the event of a transducer failure and the operator can remove megawatts or impulse corrections. The turbine can be operated operator automatic mode with any combination of these corrections in service or with all out of service. The system as set forth is described in detail in the DEH turbine control system.

2.4.3 Coordinated:

The coordinated mode for the turbine provides operation with the five plant coordinated modes as described above.

2.5.0 Contingency Load Limit Control:

2.5.1 General:

The contingency load limit control produces a maximum or minimum load limit based on the boiler auxiliaries in service or their ability to provide fuel, water or air to the boiler in the required quantity.

Auxiliary limits or runbacks are based on the auxiliaries in service. The following auxiliaries are monitored for high limit conditions:

(1) FD fan
(2) Boiler feed pump
(3) Recirc fan (lower limit)
(4) Cold reheat steam (boiler feed pump limit)
(5) Condenser circulating pump In the case of high limits, the operator is free to adjust the load demand to any value below the limit value; if all auxiliaries are in service the high limit is 105%. If the unit is operating at a value greater than one of the limits and that auxiliary fails the load will reduce to the predetermined value corresponding to the capacity of the remaining auxiliaries. The rate of change of the DEH will be set to the predetermined value at this time. Limiting is accomplished by a low signal selector in the case of high limits and a high signal selector for low limits.

The feedwater and air flow control systems are feedforward with limit correction for flow errors. The correction signals are compared with setpoints to slightly less than the correct limit, $9\frac{1}{2}\%$ to 10% correction. If this value is equalled, the error is integrated and the load demand reduced to maintain the control variable within the correction limit. The fuel gas burner pressure and fuel oil burner pressure are compared with setpoints equal to the maximum desired burner pressure. If either of these values is equalled, the error is integrated and the load demand is reduced to maintain the burner pressure within safe limits.

The fuel gas burner pressure and fuel oil return pressure are also compared with setpoints equal to the minimum desired burner pressure. If either of these values is equal to the minimum, the error is integrated and the load demand is increased to maintain the burner pressure within safe limits.

Limiting is accomplished by subtracting or adding to load demand. The load demand signal will be returned to the operator when the contingency condition is cleared.

Auxiliary Synchronizer Task [AUX SYNC] General

The auxiliary synchronizer task has two functions, it performs accurate counting to determine the time duration of certain important events, and it synchronizes the execution of all periodic tasks in the boiler/DEH system on a predetermined schedule. The auxiliary sync task is on priority level $E_{16}[14_{10}]$ and is initiated by the 60 Hz synccountdown routine of the monitor every 1/10 second.

Theory

Computers used in process control require highly accurate and stable timing devices to align all parts of the system in a repetitive working pattern. Such timing sources are called clocks or synchronizers. These devices may generate their timing pulses in a number of ways; the most common clocks consist either of a very accurate electronic oscillator, or a timing circuit triggered by the 60 Hz supply frequency to the computer.

Figure 69:
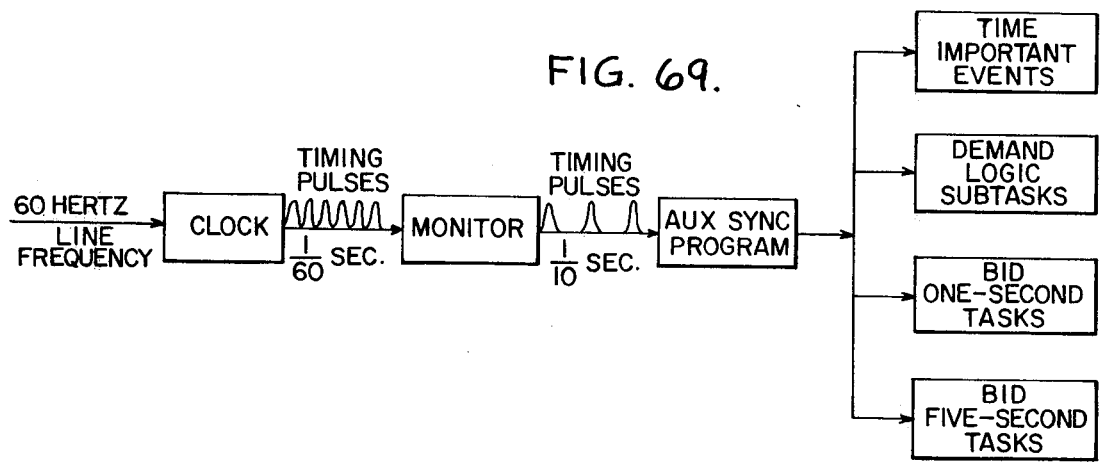
FIG. 69 relates to AS-1 synchronization method.

The Boiler/DEH control system utilizes the line frequency as its timing source. As shown in FIG. 69, a clock pulse is generated every cycle [1/60 sec], and triggers a counting circuit in the computer monitor system. The monitor is initialized to generate an interrupt every 6 cycles [1/10 sec]. When this interrupt occurs, the monitor executes its own initial scheduling functions and then bids the auxiliary sync task to run. Auxiliary sync proceeds to carry out its various timing calculations and bids all remaining Boiler/DEH programs as shown in FIG. 69.

For the dual channel computer controller, the AUX SYNC task has been modified to contain additional functions when compared to the single channel DEH program. The program as now modified basically embodies the same program as the single channel DEH system uses, however, the entire PROGEN system auxiliary sync task has been modified slightly and merged with the DEH auxiliary sync. To be able to mix the two together, the PROGEN auxiliary sync task was modified from a task program into a subroutine and is called as a subroutine by the DEH auxiliary sync task. Other less important modifications do exist and are tabulated under comments of the program as single-dual channel program differences.

Program

The program first checks that initialization is complete and that the computer status is proper with no malfunctions prior to any program execution. Logic is included at the beginning of the program which affects the operator startup of the computer. Prior to operation of the computer reset panel pushbutton no system execution will occur on a periodic basis.

The computer failure pushbutton light is lit steady when the computer has failed or has been taken out of service by the plant engineers or technicans. As the computer has been initialized and is starting up the failure back light will begin flashing when the initialization program has run its course. When the operator is satisfied that initialization is complete and the pushbutton back light is flashing he may then actuate the pushbutton resetting the computer for control. If neither computer has been reset then resetting of the first computer will automatically select it for control of the plant. If the computer is reset both boiler and turbine programs systems are enabled at the same time. If problems are encountered in either package a transfer to the backup controller will be attempted, however, if the attempted transfer does not work the control will end up in manual mode.

Dual computer configuration differences are as follows:

Item 1—1/10 second calls for boiler logic subroutine which will function on a demand basis.

Item 2—Call for boiler system programs which is the auxiliary sync routine called PAUXSYN. The call for this subroutine is made to each 1/10 second.

Item 3—Logic which effects bidding the ATS programs was modified. The change will allow computer transfer to be completed without upsetting conditions in the turbine startup programs.

Note Items 1 and 3 above were implemented to allow the computer transfer to be executed when necessary. Number 2 was implemented when expanding the base DEH programming to include the boiler package and does not directly affect the computer transfer program.

The program checks three counters for timing. IVPL is incremented in 1/10 second steps as long as the valve position limit raise or lower buttons are pressed. CADSUP is similarly incremented as long as the Automatic Dispatch System raise contact input is set. CADSDOWn is incremented while ADS lower contact input is set. Finally, when the run logic variable is set, auxiliary sync bids the logic subroutine to run.

The program then initiates a FORTRAN do loop to check for normal execution in the DEH system periodic tasks. Each entry in the array counter ICOUNTER is incremented and tested against its maximum count [IMAX]. If ICOUNTER has expired, it is reset to zero and transfer is made to appropriate portions of the remaining program. Otherwise, the next counter is examined in the same way until all have been tested; at this time the AUX SYNC task exits until the next bid from the monitor [1/10 sec].

When the first ICOUNTER expires, the control task is bid and a flag ISCAN is set for further in both the AUX SYNC and the analog scan tasks.

When the ICOUNTER expires, logical decisions are made on ISCAN and ITSCAN to set up necessary information to properly execute the analog scan task. This task and flash CCO task have been combined for this dual channel system and are executed together in one call. Both the analog scan and the flash CCO tasks are on task level of 12 or $C_{16}$.

When the third ICOUNTER expires, the Automatic Turbine Startup task is bid. In addition, the Visual Display task is bid if no key entry is being made on the operator's panel keyboard. The plant CCI (PLANT-CCI) subroutine is called if a constant PERCCI has been set on zero from the keyboard to request a periodic contact input scan.

The AUX SYNC program communicates with various counters, flags and variables in the Boiler/DEH system through the common areas identified as BETA, DELTA, ZETA, THETA, BLRPNL, COMPSTAT. The program size is 267 words and the data pool size is 56 words, and the task header is 9 words for required minimum storage of 332 locations. AUX SYNC is linked as a separate task loaded into the computer through the tape reader. The core area assigned to the task is from (7EAO to 7FEB)$_{16}$. This space allows some room for expansion.

Note that for the boiler package when calling the PAUXSYNC subroutine that the call is for all 1/10 second, one second or multiples of either interval programs which are associated with the boiler package. The auxiliary sync task also includes the necessary counters for the incremental time check utilized with variable time pulse width contact closures that operate all boiler drive devices.

Monitor Modifications To Bid The Auxiliary Sync Task

To arrange for the bidding of the AUX SYNC task at the proper time, the monitor is initialized with a set of special insert instructions. These begin at location 1009 in the complte monitor assembly program and are listed below:

| 1009 | INS | Bid for DEH aux sync task |
|------|-----|---------------------------|
|      | LDB | Equal sign IAUX           |
|      | SST | *$+3,B                    |
|      | DAT | 1                         |
|      | JMP | IAUX 1                    |
|      | DAT | S:IN                      |
|      | RPT | 6                         |
|      | DAT | 0                         |
| IAUX | DAT | 0                         |
|      | DAT | 14                        |
| IAUX1| EQU | $                         |

After assembly of the Boiler/DEH monitor, the above group of instructions reside in core memory. This provides the mechanism necessary to bid the AUX SYNC task from the monitor on occurrence of the base synchronizing interrupt every 1/10 second.

Sequence Of Events Interrupt Program

SEI-1. General

The sequence of events interrupt program activates a scan of all contact inputs to the DEH system as a result of one or more of these contacts changing state. The sequence of events program is initiated by the monitor interrupt handler.

SEI-2. Theory

In order to carry out its functions properly, a computer control system must be provided with status input signals which represent the various states of the process or plant which is to be controlled. These status signals represent contacts which are normally open or closed [set or reset]. Traditionally such contacts have been periodically scanned at some reasonable rate such as every one second. However, this method of processing contact inputs has two drawbacks. First, periodic contact scannings imposes a regular duty cycle on the computer; even though it may be small it is unnecessary for the largest percentage of time when status contacts are not changing at a hgh rate. Secondly, when a contact does change state the periodic scanning method [in the worst case] may not make this information available to the computer control system until a full scan period later. This situation clearly is undesirable for those control systems in which fast response is a necessity.

Figure 77A:
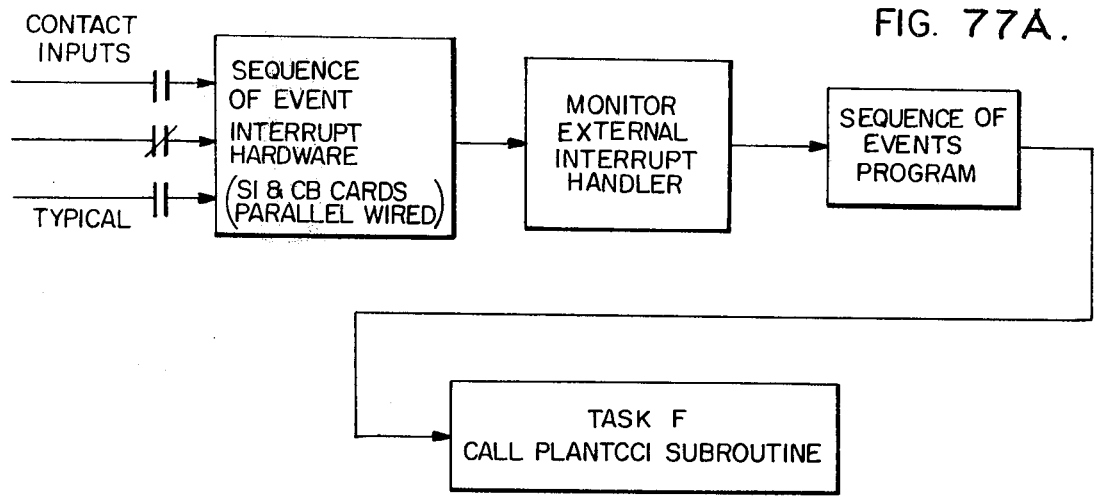
FIG. 77A shows a contact input scan block diagram.
Figure 77B:
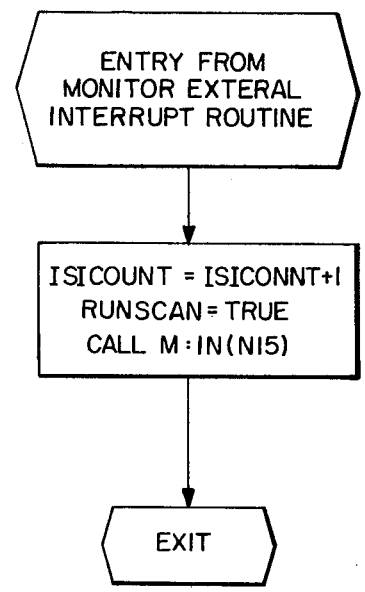
FIG. 77B shows a sequence of events interrupt flow chart.
Figure 78A:
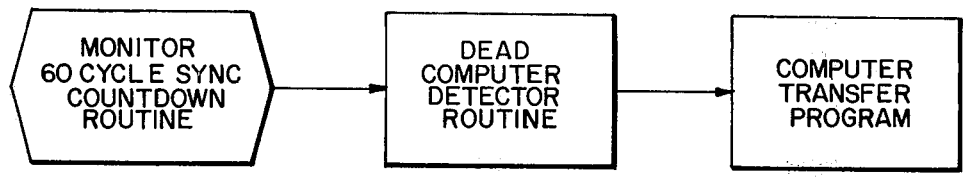
FIG. 78A shows a dead computer detection block diagram.
Figure 78B:
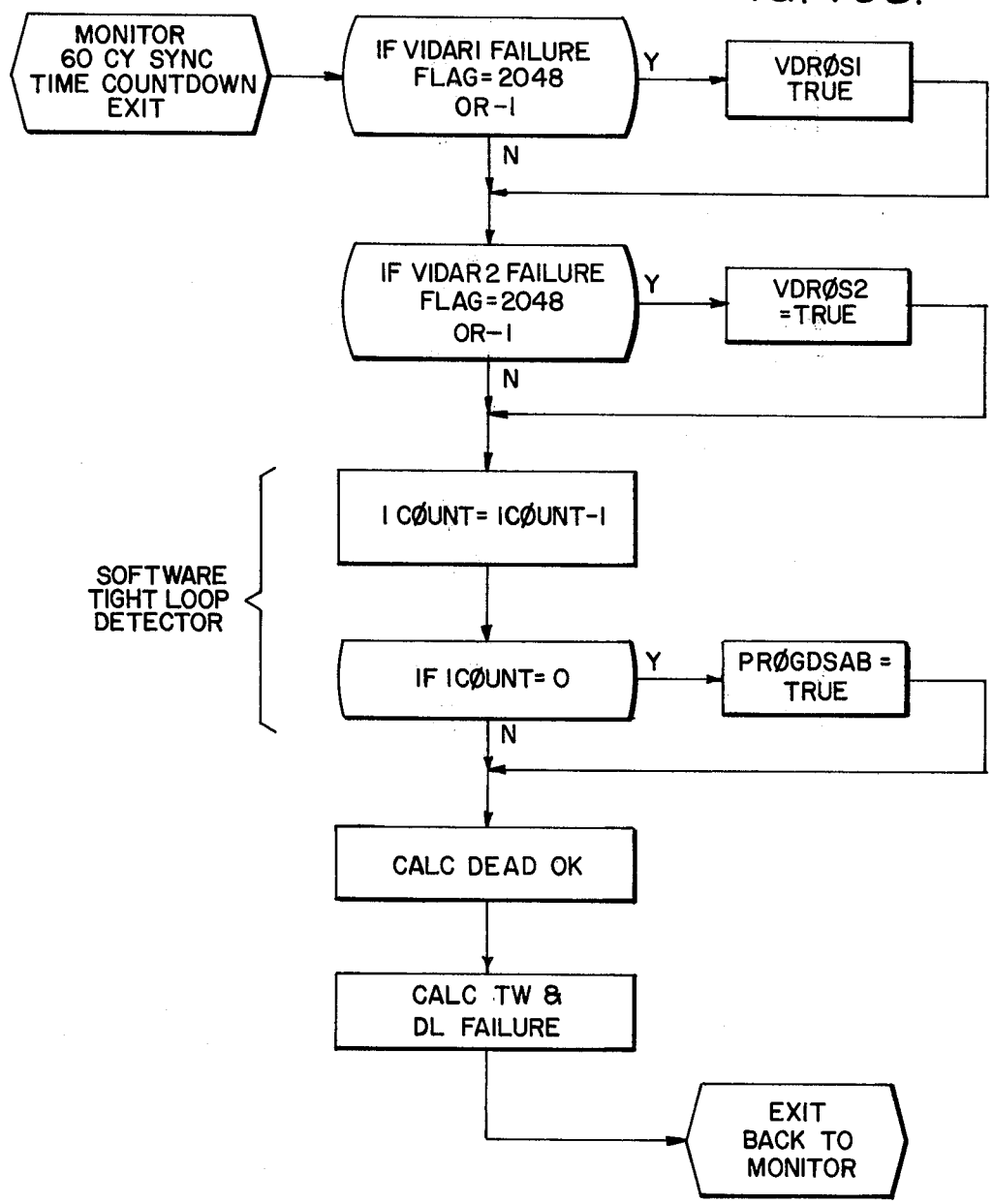
FIG. 78B shows a dead computer detection program flow chart.

To minimize these effects the DEH contact input scan is organized on a demand basis. A scan is initiated by a change of state of any of the field contact inputs. FIG. 77-A shows a diagram of the various parts of this system. Any contact status change generates a sequence of events interrupt, which is processed by the monitor interrupt handler. Identification of the interrupt causes the monitor to run the sequence of events interrupt program which initiates task $15_{10}$ to do the actual contact scanning.

SEI-3. Program

A flow chart for the sequence events program is shown in FIG. 77-B. A call is made to task $15_{10}$ which will in turn make a call to PLANTCCI subroutine to do the contact scanning. Return is then to the monitor interrupt handler indirectly through location OODF$_{16}$ [0223$_{10}$] in the monitor zero table. The program size is 18 words and the data pool size is 3 words for required storage of 21 locations. The program is normally linked separately and loaded into the computer through the tape reader. The sequence of events program has been assigned to the core area from [2575 to 2589]$_{16}$.

The sequence of events interrupt is number $11_8$ in the total list of in*errupts in the Boiler/DEH system. The monitor interrupt transfer table [INTB] must be initialized to contain the location of the sequence of events interrupt program. This interrupt table is normally initialized as part of the computer load procedure when loading the entire computer with software. The procedure need not be repeated once the system has been loaded and the information written away onto disc for permanent storage on the mass storage device.

Breaker Open Interrupt Program

BKR-1. General

The breaker open interrupt program closes the turbine governor valves immediately after the main generator circuit breaker opens. This program is intended to maintain turbine shaft speed regulation near 3600 rpm, synchronous machine speed. The program is initiated by the monitor interrupt handler.

BKR-2. Theory

When a generator is tied to a power system in supplying load, the turbine as prime mover is supplying an equal amount of power to the generator ignoring losses. Should the main breaker connecting the machine to the line suddenly open the load is removed from the generator but the turbine input steam flow still exists. This power immediately begins to accelerate the turbine shaft speed to potentially dangerous values in a very short period of time. It is mandatory that the turbine governor valves be closed an instant after the breaker opens to cut off steam flow. The control system then reverts from load to speed control and positions the governor valves to maintain synchronous speed after the shaft speed has reduced below synchronous value. In other words, once the breaker interrupt has begun closing the valves, the valves will close until a speed error exists below rated shaft speed at which time the governor valves begin opening again.

Figure 76A:
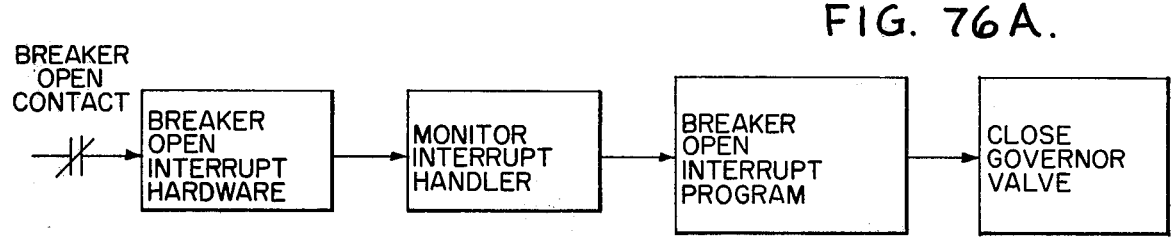
FIG. 76A shows a breaker open interrupt block diagram.
Figure 76B:
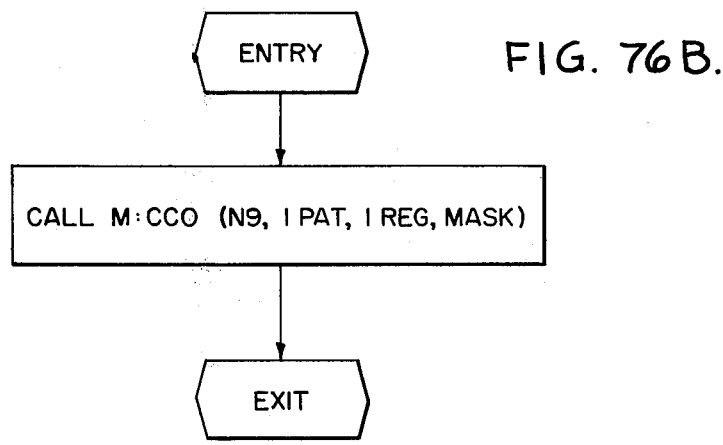
FIG. 76B shows a breaker open interrupt flow chart.

To accomplish this fast action in the DEH system the breaker open contact is used to produce an interrupt as shown in FIG. 76-A. The monitor interrupt handler that runs the breaker open interrupt program switch immediately closes the governor valves by setting the appropriate analog outputs to zero.

BKR-3. Program

A flow chart for the breaker open interrupt program is shown in FIG. 76-B. A call is made to the contact output handler to send a zero analog output to the governor valve. (NOTE: Analog outputs are processed, as implied, by the Contact Output Handlers) Return is made to the monitor interrupt handler indirectly through location 00DF$_{16}$ [0223$_{10}$] in the monitor zero table. The program size is 17 words and the data pool size is 5 words for required storage of 22 locations. The program is normally linked separately and loaded into the computer through the tape reader. The breaker open interrupt program has been assigned to core area [258A to 259F].

The breaker open interrupt is number 45$_8$ in the total list of interrupts in the Boiler/DEH system. The monitor interrupt transfer table [INTB] must be initialized to contain the location of the breaker open interrupt program. After being loaded into the machine this program is written permanently onto the mass memory storage device.

Disabled Program Routine

DPR-1. General

The task error routine of the monitor switches control of the Boiler/Turbine to the backup controller when important control tasks are disabled by the monitor during Input/Output hardware activity. The task error program starting address is initialized in the monitor error handler table.

DPR-2. Theory

The P2000 monitor is composed of a variety of programs which handle all I/O activity for the Boiler/DEH system. Thus, when some Boiler or Turbine control programs wish to use the I/O system it calls the proper monitor handler with a set of arguments describing the function to be performed. The handler then carries out the request and returns to the calling task at the completion of the function.

However, if the handler finds erroneous information in the arguments passed along by the calling task, then the I/O request is ignored and the calling task is disabled. An example of such an error is a zero negative or non-existent register number when calling the contact output handler. The monitor reference manual TP043 describes in detail most possible error conditions.

To give the Boiler/DEH control system the ability to take appropriate action if such an error occurs, the monitor initialization is provided with an option SERO to indicate that a special task error program is included. This variable has been initialized with a zero value to indicate the option is selected and the task error table [Z:EROR] is filled out with transfer addresses of the task error program. Reference to the Boiler/DEH monitor listing indicates which tasks will switch control to the backup computer, or to manual if the backup is unavailable.

Figure 79A:
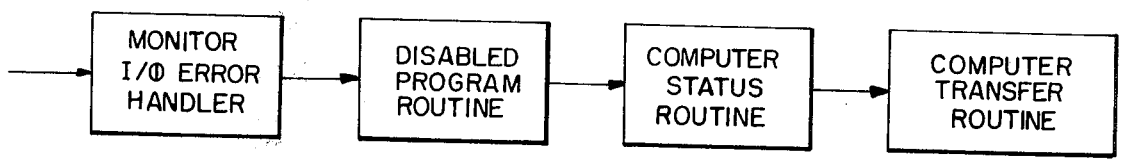
FIG. 79A shows a block diagram of disabled program routine.
Figure 79B:
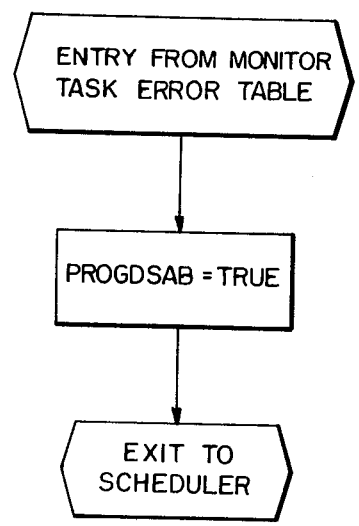
FIG. 79B shows a disabled program routine flow chart.

A diagram of the steps taken when such an error occurs is shown in FIG. 79-A. When the monitor handler detects an error condition, it aborts the I/O request, disables the calling task, and runs the task error program which switches the control to the backup computer or to manual.

DPR-3. Program

The flow chart for the Disabled Program routine is shown in FIG. 79-B where program logical variable is set which will cause the computer to transfer to the backup machine or force the control to manual. The exit from this routine is made directly to the monitor through the C register.

The Disabled Program size is 19 words and the data pool size is 3 words for required total storage of 22 words. The program is normally linked separately and loaded into the computer through the tape reader. Disabled Program routine is loaded in core location [9778 to 978D]$_{16}$. The program is written away onto disc for permanent mass memory storage and the monitor transfer error and task error table locations are initialized at the time the system is loaded.

Turbine Trip Interrupt Program

TTI-1. General

The turbine trip interrupt program closes the throttle and governor valves immediately after the turbine latch mechanism is released. The turbine trip interrupt program is initiated by the monitor interrupt handler.

TTI-2. Theory

The mechanical latching mechanism of a turbine has a series of interlocks which are designed to trip the turbine off the line when any serious discrepancy is found in the system. Such factors as hydraulic fluid system, mechanical levers, emergency trip button and solenoids operated by detection circuits may unlatch the turbine. When this happens all throttle and governor valves must be closed to cut off steam flow immediately after which the turbine will begin to decelerate.

Figure 74A:
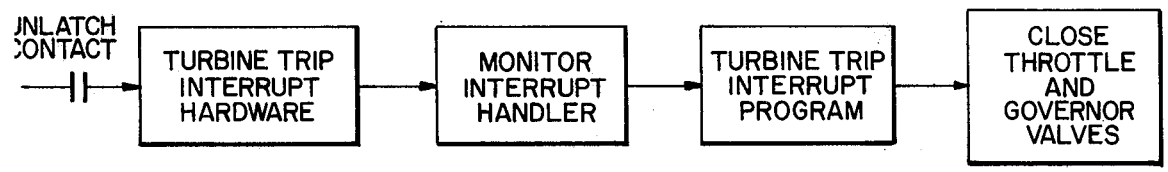
FIG. 74A shows a turbine trip interrupt block diagram.
Figure 74B:
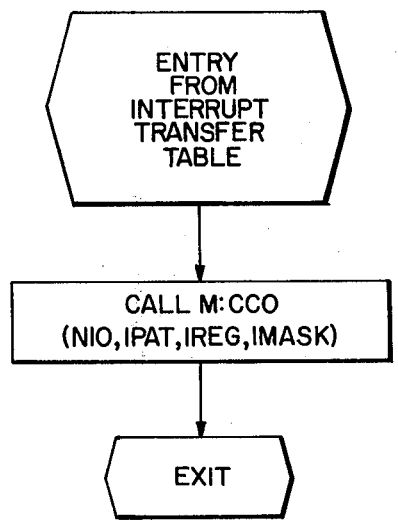
FIG. 74B shows a turbine trip interrupt program flow chart.

To accomplish this function in the DEH system, the latch open contact is used to generate and interrupt as shown in FIG. 74-A. The monitor interrupt handler runs the turbine trip interrupt program which immediately closes the throttle and governor valves. Simultaneously, the analog backup system will detect the trip condition and provide a large closing bias voltage to the throttle and governor valve servo system, thus assuring by redundant circuits that all valves will be closed.

TTI-3. Program

The flow chart for the turbine interrupt program is shown in FIG. 74-B, where a call is made to the contact output handler to set a zero analog output to the throttle and governor valves. Return is made to the monitor interrupt handler indirectly through location 00DF$_{16}$ [0223$_{10}$] in the monitor zero table. The program size is 17 words and the data pool size is 5 words for a required storage of 22 locations. The program is normally linked separately and loaded into the computer through the tape reader. Once in the computer, the program is written away in the mass memory device for permanent storage. The turbine trip interrupt program is assigned to core area [25A0 to 25B5]$_{16}$.

The turbine trip interrupt is number 42$_8$ in the total list of interrupts in the Boiler/DEH system. The monitor interrupt transfer table [INTB] must be initialized to contain the location of the turbine trip interrupt program. The table entry for transfer to the turbine trip interrupt is loaded and written away on the mass storage device at the time the computer programs were all loaded.

DEH Panel Interrupt Program

DEHPI-1. General

The panel interrupt program responds to the operator panels pushbutton request by decoding the pushbutton identification in bidding the panel task to carry out the appropriate response. The panel interrupt program is initiated by the monitor interrupt handler.

DEHPI-2. Theory

The DEH turbine control system is designed to provide maximum flexibility to plant personnel in performing their function of operating the turbine generator. This flexibility is evidenced by an operator's panel with an array of pushbuttons arranged in functional groups and an internal software organization which responds immediately to pushbutton requests by the operator. The heart of this immediate response is the interrupt capability of the DEH control system.

Figure 71A:
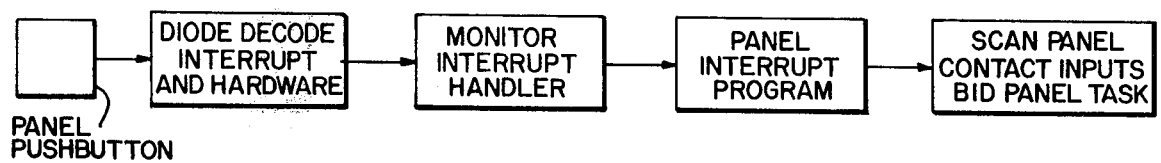
FIG. 71A shows a DEH panel interrupt block diagram.
Figure 71B:
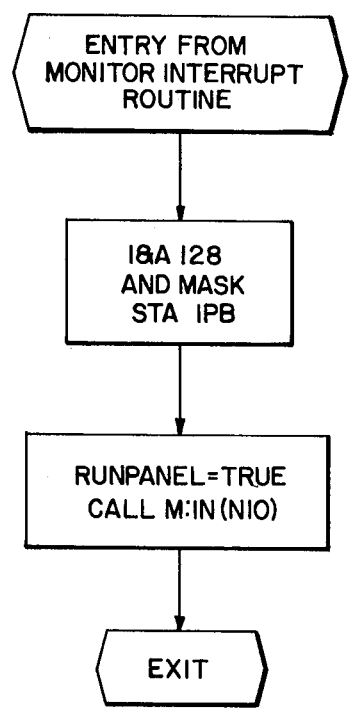
FIG. 71B shows a DEH panel interrupt program flow chart.

As shown in FIG. 71-A, pressing any panel pushbutton activates the diode-decoding network which identifies the pushbutton, sets a group of six contacts to an appropriate coded pattern, and generates an interrupt to the computer. The monitor interrupt responds within microseconds and runs the panel interrupt program which does a demand contact input scan of the special pushbutton contact and bids the panel task to carry out the function requested by the operator.

DEHPI-3. Program

The flow chart for the panel interrupt program is shown in FIG. 71-B, where a scan of the panel contact inputs [which are on channel zero] is performed with an IOA instruction. The higher-order bits are than masked out so that their six contacts on bits zero through five remain to identify the pushbutton pressed. This information is then stored in location IPB in the BETA common area. The panel task is bid and return is made to the monitor interrupt handler indirectly through location $00DF_{16}$ [$0223_{10}$] in the monitor zero table. The program size is 21 words and the data pool size is 4 words for a required storage of 25 words. The panel is normally linked separately and loaded into the computer through the tape reader. The panel interrupt program has been assigned core area [$25B8$ to $25DO]_{16}$.

The panel interrupt is number $40_8$ in the total list of interrupts in the DEH system. The monitor interrupt transfer table [INTB] must be initialized to contain the location of the panel interrupt program. Once entered this information can be written away on the mass storage device. Normally the interrupt transer table program location is loaded when the computer is first loaded.

Valve Interrupt Program

VI-1. General

The valve interrupt program terminates the valve test and the valve position limit program in the DEH control system when the operator releases any one of the pushbuttons which initiate such activities. The valve interrupt program is run by the monitor interrupt handler.

VI-2. Theory

Certain valve testing and limiting functions have been a traditional turbine control feature over the years to provide assurance of their emergency performance of balance and to give the operator a final override on the control valve position, thus on-line testing of throttle valves periodically will detect potential malfunctions of the throttle valve mechanism which could be dangerous if not corrected. In addition, valve position limiting of the governor valves during on-line operation provides a manual means of limiting steam flow from the operator's panel.

Figure 75A:
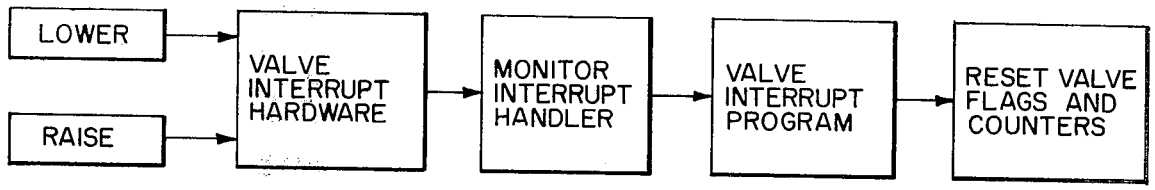
FIG. 75A shows a valve interrupt program block diagram.
Figure 75B:
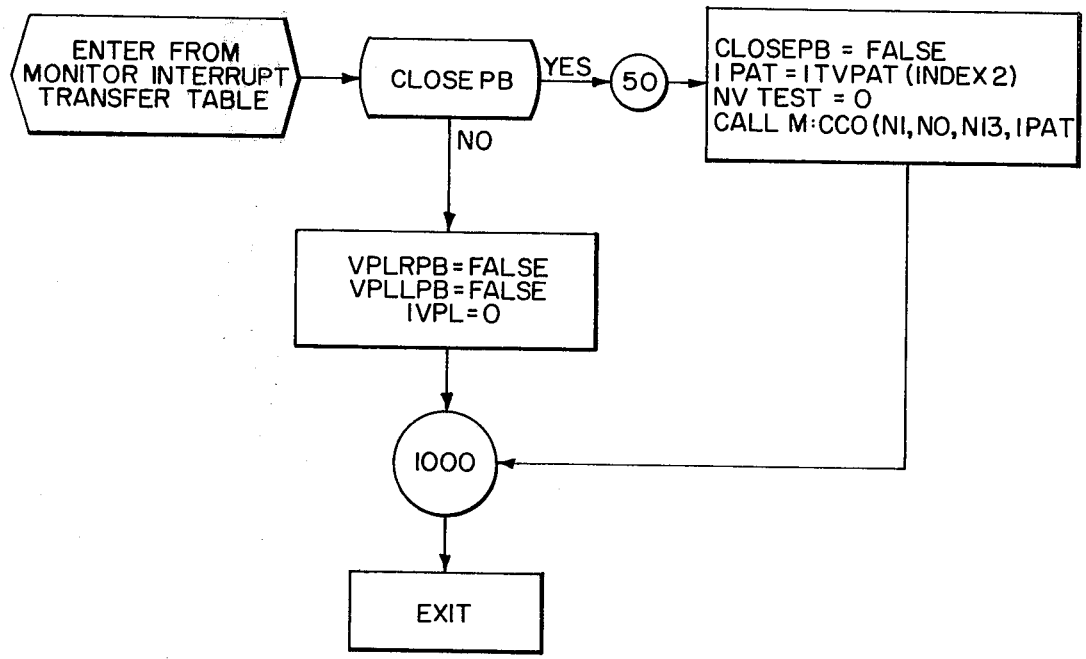
FIG. 75B shows a valve interrupt program flow chart.

In the DEH control system these two important features are initiated by appropriate pushbuttons on the panel as described in the operating instructions. As long as the operator presses one of these pushbuttons the proper action is carried out by the control program. When the operator releases any of these puchbuttons this generates a special interrupt as shown in FIG. 75-A to terminate the action which had been performed. The monitor interrupt handler runs the valve interrupt program which resets various flags and counters thus signaling to the control task that the action is to cease.

VI-3. Program

Where the valve test CLOSEPB is interrogated to determine if it was the pushbutton released. If so, the pushbutton flag is reset and the contact output holding the trottle valve in a test close state is reset. The number of the valve [NVTEST] is also reset to zero when the close pushbutton is released. The contact output that connected test signals to the governor valve servo amplifier associated with the valve of this test is also reset.

If the CLOSEPB had not been released then the valve interrupt program concludes the valve position limit raise or lower pushbutton was operated. Therefore, both of these are reset and return is made to the monitor interrupt indirectly through location $00DF_{16}$ [$0223_{10}$] in the monitor zero table.

The valve interrupt program size is 41 words, data pool size is 13 words for a required storage of 54 locations. The program is normally linked separately and loaded into the computer to the tape reader. The valve interrupt program is assigned to core area [$B800$ to $B835]_{16}$. Once loaded the program is written away on the mass storage device.

The valve interrupt is number $43_8$ in the total list of interrupts in the Boiler/DEH system. The monitor interrupt transfer table [INTB] must be initialized to contain the location of the valve interrupt program. This table once initialized is also written away on the mass storage device.

Boiler Panel Interrupt Program

BLRPI-1. General

The boiler panel interrupt program responds to the operator's panel pushbutton request by decoding a pushbutton identification in bidding the panel task to carry out the appropriate response. The panel interrupt program is inititated by the monitor interrupt handler.

BLRPI-2. Theory

The boiler control system is designed to provide maximum flexibility to plant personnel in performing their function of operating the boiler. This flexibility is evidenced by an operator's panel with array of pushbuttons arranged in functional groups and an internal software organization which responds immediately to pushbutton requests by the operator. The panel is divided into three sections the first two of which are processed by this program. The boiler and plant sections function through the diode decode board and associated interrupt hardware that operate with this program.

Figure 72A:
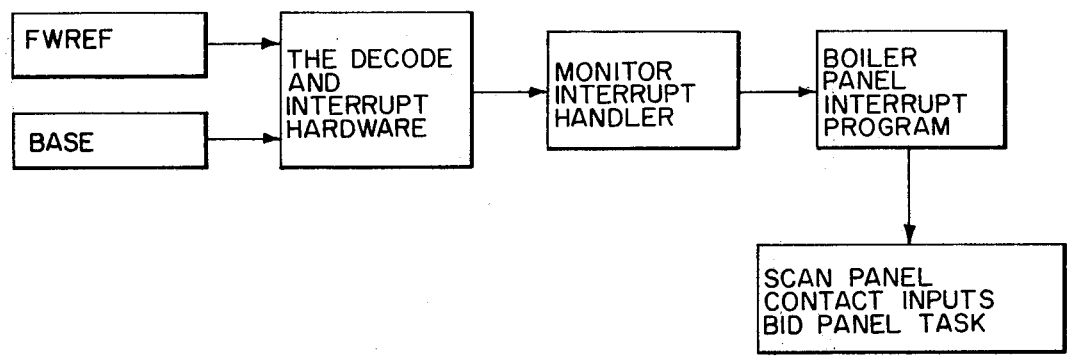
FIG. 72A shows a boiler panel interrupt block diagram.
Figure 72B:
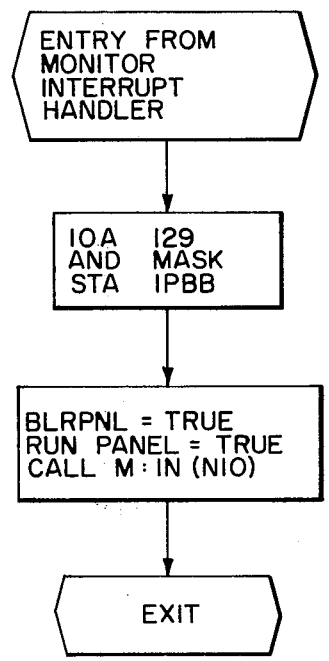
FIG. 72B shows a boiler panel interrupt program flow chart.

As shown in FIG. 72-A pressing any of the panel pushbuttons activates a diode decoding network which identifies the pushbutton, sets a group of six contacts to an appropriate coded pattern and generates an interrupt to the computer. The monitor interrupt handler responds within microseconds and runs the boiler panel interrupt program which does a demand contact input scan of the special pushbutton contacts and bids the panel task to carry out the function requested by the operator.

BLRPI-3. Program

The flow chart for the boiler panel interrupt program is shown in FIG. 72-B where a scan of the panel contact inputs [which are on channel 1] is performed with an IOA instruction. The high-order bids are then masked out so that the six contacts on bits 0 through 5 remain to identify the pushbutton pressed. This information is then stored in location IPBB in the BLRPNL Common area. The panel task is bid and return is made to the monitor interrupt handler indirectly through location $00DF_{16}$ [$0223_{10}$] in the monitor zero table. The program size is 23 words and the data code size is 4 words for a required storage of 27 words. The program is normally linked separately and loaded into the computer through the tape reader. The boiler panel interrupt program has been assigned core area [25D1 to 25EB]$_{16}$.

The boiler panel interrupt is number $41_8$ in the total list of interrupts in the Boiler/DEH system. The monitor interrupt transfer table [INTB] must be initialized to contain the location of the boiler panel interrupt program. Once loaded this program is written away on the mass memory storage device and need not be reloaded unless reloading the entire system.

Turbine Analog Trap Interrupt Program

ANITRP1-1. General

The turbine analog trap interrupt program is used to detect one type of misoperation in the analog input multiplexing system. The turbine analog trap interrupt program is initiated by the monitor interrupt handler and provides information used in the dead computer routine.

ANITRP1-2. Theory

The analog input subsystem operates by closing multiplexer point relays that contact a single transducer to the analog/digital converter. The value converted is a bit pattern utilized by the computer main frame and normally scaled in engineering units.

When two or more point relays close at the same time the A/D converter works on a signal that is an electrical average depending on the transducer output impedances. When an average value is converted the computer stores in the appropriate core location a value in engineering units which may have an improper value. For this reason it is important to detect the malfunction of the multiplexing point relays which could cause an erroneous converted value.

Figure 73A:
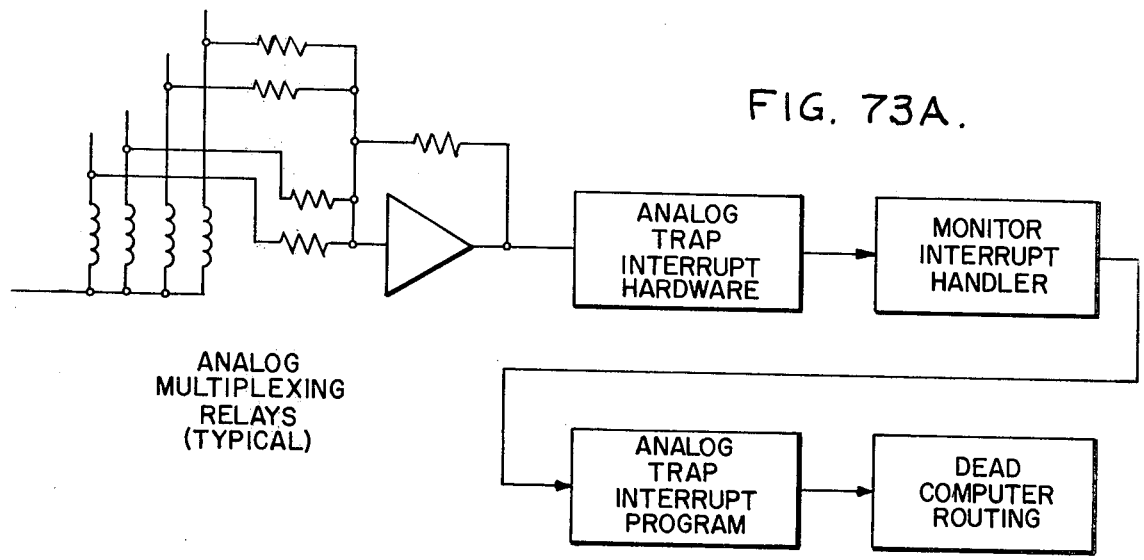
FIG. 73A shows a boiler analog trap interrupt program block diagram.
Figure 73B:
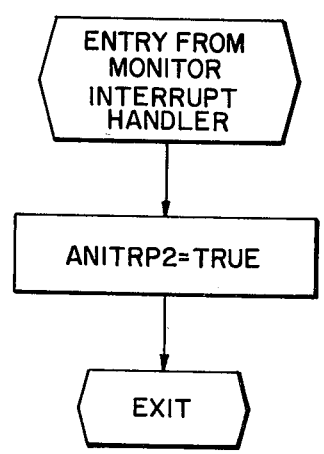
FIG. 73B shows a boiler analog trap interrupt program flow chart.
Figure 73C:
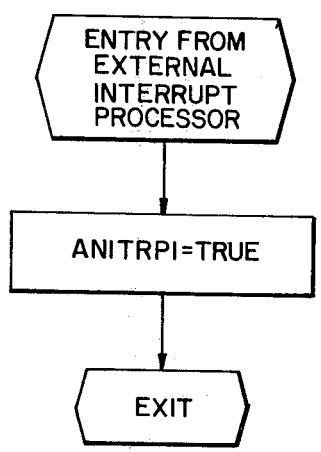
FIG. 73C shows a turbine analog trap interrupt program flow chart.

Analog trap hardware has been included to detect this type of malfunction by utilizing summing amplifiers that are sensitive to the number of multiplexer point relays closed at any one time. The hardware is wired to the circuits of word drivers and channel drivers that are used by the analog multiplexing system. When more than one relay is closed the trap hardware generates an interrupt to the computer. FIG. 73-A shows a block diagram of the functioning system. The monitor interrupt handler initiates the analog trap interrupt program which sets a logical flag ANITRP1 used by the computer status routine. Detection of this type of Input/Output subsystem misoperation will cause an internally initiated transfer to the backup computer, if it is available.

ANITRP1-3. Program

The flow chart for the turbine analog trap interrupt program is shown in FIG. 73-C, where a logical flag is set indicating the trap condition has occurred and exit is made to the monitor interrupt handler indirectly through location $00DF_{16}$ [$0223_{10}$] in the monitor zero table. The program is 15 words in size and the data pool size to 2 locations for total storage of 17 locations. The program is normally linked separately and loaded into the computer through the tape reader. The turbine analog trap interrupt program is assigned to core area [9748 to 9758]$_{16}$.

The turbine analog trap interrupt is number $50_8$ in the total list of interrupts in the Boiler/DEH system. The monitor interrupt transfer table [INTB] must be initialized to contain the location of the turbine trip interrupt program. Once loaded the program is written away on a mask memory storage device. The interrupt table transfer locations are usually loaded at the time of loading the entire software system and written away on a mass memory storage device.

Boiler Analog Trap Interrupt Program

ANITRP2-2. General

The boiler analog trap interrupt program is used to detect one type of misoperation in the analog input multiplexing system. The turbine analog trap interrupt program is initiated by the monitor interrupt handler and provides information used in the dead computer routine. This routine is very similar to that used for turbine protection.

ANITRP2-2. Theory

The analog input subsystem operates by closing multiplexer point relays that contact a single transducer to the analog/digital converter. The value converted is a bit pattern utilized by the computer main frame and normally scaled in engineering units.

When two or more point relays close at the same time the A/D converter works on a signal that is an electrical average depending on the transducer output impedances. When an average value is converted the computer stores in the appropriate core location a value in engineering units which may have an improper value. For this reason it is important to detect the malfunction of the multiplexing point relays which could cause an erroneous converted value.

Analog trap hardware has been included to detect this type of malfunction by utilizing summing amplifiers that are sensitive to the number of multiplexer point relays closed at any one time. The hardware is wired to the circuits of word drivers and channel drivers that are used by the analog multiplexing system. When more than one relay is closed the trap hardware generates an interrupt to the computer. FIG. 73-A shows a block diagram of the functioning system. The monitor interrupt handler initiates the analog trap interrupt program which sets a logical flag ANITRP2 used by the computer status routine. Detection of this type of Input/Output subsystem misoperation will cause an internally initiated transfer to the backup computer, if it is available.

ANITRP2-3. Program

The flow chart for the turbine analog trap interrupt program is shown in FIG. 73-B, where a logical flag is set indicating the trap condition has occurred and exit is made to the monitor interrupt handler indirectly through location 00DF16 [$0223_{10}$] in the monitor zero table. The program is 15 words in size and the data pool size to 2 locations for total storage of 17 locations. The program is normally linked separately and loaded into the computer through the tape reader. The boiler analog trap interrupt program is assigned to core area [9759 to 975A]$_{16}$.

The boiler analog trap interrupt is number $51_8$ in the total list of interrupts in the Boiler/DEH system. The monitor interrupt transfer table [INTB] must be initialized to contain the location of the turbine trip interrupt program. Once loaded the program is written away on a mask memory storage device. The interrupt table transfer locations are usually loaded at the time of loading the entire software system and written away on a mass memory storage device.

Failures in the boiler will not effect the hardware used for scanning the turbine Analog Inputs and vice versa. If, and when a failure of this nature occurs the machine will halt very quickly, usually in 0.5 second from time of occurrence.

Data Link Transfers

General:

Transmittal of various forms of information is necessary to enable the automatic computer transfer features required for increased system security if the controlling computer.

The computer to computer unidirectional data transmission capability of the DT/DR card hardware is used for sending or receiving three forms of data which accommodate system program execution. The areas of use are: (a) Boiler/DEH control program information/status change, (2) Automatic Turbine Startup (ATS) information, and (3) the parameter data required to establish a reasonable base for "increased system availability".

Theory:

Data link transfers perform transmit of information from the control computer to standby computer or vice versa. Transfers are arranged to provide a functional requirement. Three categories of transfer operations exist, the first is one minute computer transfers required for boiler-turbine status control, the second category is five minute transfers for the turbine ATS programs, the third category is initialization variables transmitted when initializing the backup computer.

Boiler/DEH Transfers

Values transmitted on a one minute basis for the boiler and turbine control system are broken down below and reasons for each are stated along with the definition of the transfer variables.

1. Manual/Auto Status Boiler (44 Locations)

Each location represents the current status of one manual/auto station, either three pushbutton or single pushbutton style on the boiler panel, or a mode state such as Local Coordinated, Turbine Follow, etc. These variables are transferred as a binary pattern with a zero value representing manual status and $8000_{16}$ value representing automatic. Transmission of data other than the two defined states would be a meaningless transfer and will be found by check sum or data link format errors.

2. Acceleration Rate/Load Rate For The DEH For Locations Of Transfer Information These values are real arithmetic parameters, each consisting of two core memory locations, one is the acceleration rate for the unit and the second is load rate for the unit. It is interesting to note that both the speed and load reference are not transferred as these values are obtained from back calculations against the process when manually tracking.

3. Valve Position Limit DEH

This transfer consists of two core locations representing the real value of the valve position limit on the turbine. This value is transmitted because it is operator adjustable from the operator control panel and when starting up a computer or modifying a computer from the panel this value must be changed and updated. Likewise, the backup computer should have the same value.

4. Valve Mode Status DEH

This is a single core location transmitted as a Fortran logical. The primary information of interest here is the single or sequential valve status of the DEH control. When the logical value is $FFFF_{16}$ the value indicates single valve operation on the turbine. If the value is zero, then the turbine is operating in a sequential valve operation mode.

5. Turbine Supervision Off DEH

This variable is used to indicate that the turbine supervision programs have been turned off. When the value is $FFFF_{16}$ turbine supervision off, if the value is a zero, then the turbine supervision programs are operating and monitoring continually the status of the turbine generator hardware.

Automatic Turbine Startup

The five minute data link contains values which are transmitted primarily for purposes of use by the ATS Automatic Turbine Startup program package. Without the transfer of these values it would be necessary for the tracking or backup computer to be in service running for a minimum of two hours prior to use in controlling the turbine or as turbine monitor. Five items are transferred on a periodic basis utilizing this ATS data link program.

1. Soak Completed Status Of The Turbine Heat Soak Calculation

This flag is an $FFFF_{16}$ value when the turbine heat soak is completed. The flag mnemonic is called SOAK-DUN. When the value is a zero the turbine startup programs are currently in heat soak period of time.

2. Time In Service For ATS

The value transferred is a single location integer value which represents the number of minutes that the program has been in service. This variable counts from 0 up to 120, and at that point the counter is no longer incremented. The ATS program package employs this variable for purposes of determining when the computer has been in service for two hours. The counter is incremented each minute. When the counter equals 120 the computer has been in service and reading, in a reliable fashion, the important temperature inputs required by the Automatic Turbine Startup package.

3. Rate Index

This is a single location transfer which is an integer value. This integer value takes the range from 1 to 9 and represents an index that multiplied by 50 provides the maximum acceleration rate allowable on the turbine generator during the startup period. The index when 1 indicates that the turbine may accelerate at the rate of 50 rpm a minute, while an index of 9 indicates turbine acceleration rate of 450 rpm per minute. The mnemonic indicator for this variable is rate index (RATEINDX).

4. Soak Time Required For Heat Soaking Of The Turbine

This transfer is two locations and indicates the amount of time calculated by the Automatic Turbine Startup program to heat soak the turbine prior to rolling from 2200 rpm to 3600 rpm. The number calculated is based upon the inlet steam temperature and metal conditions. Each time the turbine starts up this value is calculated, each time the turbine is rolled off the turning gear, or the temperature deviates beyond allowable limits.

5. T and TP Values

These values are averages required to establish the history and method of anticipating temperature deviations based on sampled interrogation of the inputs. These values are stored in a historical table and indicate temperature for the past 15 minutes of history and anticipated temperature based on the current rate of change for the next 15 minutes. These values are used in rotor strain and stress calculations. To assure similarity between the control computer and its operating backup is the reason that these values are transmitted.

Stop/Initialize

When initializing the computer after it has been shutdown for either short or long periods of time, several values must be obtained from the on-line controlling computer to minimize the time required to reestablish operating history and minimize transfer time to get the unit available for automatic control. Ten groups of information are transmitted across the data link from the controlling computer into the backup computer prior to any program execution and initialization. The values transmitted across the data link are not disturbed by the following parts of the initialization procedure. The values which are brought across the data link concerns three areas. First, the DEH control data for the turbine generator control package, the second are the Automatic Turbine Startup common data values for the turbine startup program, and last are the boiler digital inputs, logical inputs, and calculated constants required for proper boiler operation.

1. Boiler Logical Variables And Digital Inputs

These values are defined as D7XXX or L7XXX. The XXX denote addresses which range from approximately 000 through 400. These numbers represent either contact inputs from the process or calculated logical states which identify status of various hardware subsystems for the boiler control. The number of locations is $430_{16}$.

2. Boiler Variable Constants

These $95_{16}$ values are used by the boiler control programs as setpoints, limits, multipliers, etc., used by the control package. Many of these numbers are operator enterable from the control panel and would be lost during the outage of a backup computer with a control machine in service. The numbers when entered are entered into both computers if both are available for control. If shutdown occurs, the computer which is shutdown loses the information as entered by the operator into the controlling computer, and such information is gained by transfer.

3. Digital Image and Status Of The Boiler

This information represents the contact status and past digital image of $D1_{16}$ field contacts at logicals. This information is used by the boiler programs in the PROGEN software system utilized by the boiler control package.

4. Analog Input Status For The Boiler

These $1A5_{16}$ values represent the analog inputs as currently read from the status on the previous sample and their associated reliability status. The status reading of these inputs is transmitted to allow the backup computer being initialized to recognize reliable or unreliable inputs.

5. DEH Common

These locations represent the DELTA and EPSILON common for the DEH control programs. These values are brought across for proper DEH operation.

6. ATS [Automatic Turbine Startup Program] Common Locations

These $66_{16}$ locations are calculated logical and real variable values for the automatic turbine startup program.

7. ATS CommonLocations

These $350_{16}$ locations represent many other calculated logical and real locations and values for ATS common information and status of current analog inputs which directly affect turbine well being.

8. Calendar, Time and Date For The Monitor

This $9_{16}$ information locations establishes, and is used by the programs and their associated message writer to print out the time and date when alarming plant messages on the typewriter. The time may be updated and initialized by the control operator and is of value to him in establishing proper documentation on the control typewriter for the legal purposes.

9. Locations ATS Common

This area is used to reset the table of Automatic Turbine Startup program message flag indication. The values in this area indicate either the set or reset status of many of the automatic turbine startup control and alarm messages.

10. DEH Common

These $106_{16}$ locations represent the KAPPA common and establish information relative to the valve management and control portions of the DEH Control program.

Program:

The data link transfer programs relate to the Boiler DEH and Automatic Turbine Startup (ATS). Each program is identical just after the top decision block which evaluates the condition "NOT (ONEALIVE)" which is used to prevent program bids unless both computers are alive and available for control.

It will be helpful at this point to understand that the data link programs are resident in the number 2 computer only for both the periodic subtasks used by the computer transfer system which is in the BLOGIC subroutines. Data link hardware was organized to be half duplex, which means that single directional transfers only are allowable at any one particular time. Residency of the programs in the computer number 2 establishes it as the data link master and computer number 1 as data link slave program. Each program interrogates the integer called DLCOUNT which must be necessarily decremented to zero before the programs will perform any data transfers. The testing of four computer control status inputs are evaluated which will give the program necessary information to determine if computer 1 is in control or standby.

If computer 1 is in control, which means that logical flags ONEALIVE and SELOK1 are both true ($FFFF_{16}$), will cause the data transfers to be read from computer number 1 into computer number 2.

If computer 2 is in control, which means that logical flags ONEALIVE, TWOALIVE and SELOK2 are all true ($FFFF_{16}$), the data transfers will be written from computer 2 into computer 1 core memory locations. The condition cannot exist where both SELOK1 and SELOK2 are true at the same time unless a hardware failure exists on the CC1 system.

The program call which uses arguments "(5,2,F,L)" as follows: (1) "5" argument establishes monitor input- /output handler device number 5; (2) "2" argument indicates intention to read the core locations as specified by range of F through L; (3) "F" argument is the first core location to be transferred in the range of locations; and (4) "L" argument is the last core location in the range to be transferred.

Arguments used for the second data link handler call are "(5,1,F,L)" and described as follows: (1) "5" argument establishes monitor input/output handler device number 5; (2) "1" argument specifies the data link is to write core locations specified by the range F through L; (3) "F" argument is the first core location to be transferred in the range of locations; and (4) "L" argument is the last core location to be transferred in the range of locations.

The program calls SDLY subroutine and delays if it sees the handler busy flag IDATFLG set true (FFFF$_{16}$).

The programs are periodically bid from the PROGEN auxiliary sync subroutine as subtasks 101E and 101F on one and five minute basis respectively.

The data link failure hardware detection programming is part of the BLOGIC and COMPSTAT routines which are described elsewhere. For sake of a little redundancy the software status failure will cause a logical flag DLFAIL to be set true (FFFF$_{16}$) when failure exists. Since the software can fail in one computer and not the other; a CCO/CCI hardware interconnection technique was applied that will indicate by a closed contact input that the data link has failed and is called DLFAILCI which is true (FFFF$_{16}$) when failed. Refer to FIG. 13B.

Superheater Spray Logic and Control—FIGS. 50A, 50B, 51, 52

9.1. General

The load demand signal from the plant coordination contingency control program is characterized into superheater and desuperheater temperature setpoints. This is performed in blocks SH-1 and SH-2.

The superheater temperature setpoint is sent in parallel to paths 1 and 2 of the final superheat steam temperature controllers, and also to the 1 and 2 desuperheater outlet temperature controllers in a feedforward manner. The final superheat steam temperature controllers provide a trim on the feedforward signal to the desuperheater outlet temperature controllers and the proportional plus integral output of the desuperheater outlet temperature controller is sent to the individual spray valves.

The controller which is a function generator identified as SH-2 is used to characterize interstage temperature setpoint. Difference block SH-3 is used to determine temperature error between setpoint and final superheat temperature which is then fed into SH-4 deadband device which prevents control action unless sufficient error exists. The proportional plus integral controller SH-5 is utilized to integrate final superheat temperature error. When the system is on manual the controller is a proportional only controller with no reset action. When the control station for the particular spray valve transfers to automatic, the controller converts itself using logical L7001 to a proportional plus reset controller. The output of controller SH-5 is then summed with interstage temperature setpoint to develop interstage temperature setpoint modified by superheat temperature error. This is then compared against desuperheater outlet temperature. The error resulting from controller SH-7 is then fed to the proportional plus reset controller SH-8. This controller then integrates for control of desuperheater outlet temperature.

Summation block SH-9 is used by the bumpless transfer to sum in necessary offset required to track the control system described above to achieve a manual automatic transfer without bumping the valve or shocking the process. Proportional gain SH-10 is utilized to convert from DEGF temperature demand into per unitized valve position demand. Block SH-11 sums and actually takes a difference of the valve position feedback against position demand to obtain an error signal used in driving the valve open or closed in response to control system demand.

Block SH-12 is utilized as a high-low limit feature. Significance of SH-12 is that when a valve achieves nearly closed or closed position it prevents any negative position indication from entering the computer and confusing the tracking control system.

The configuration as arranged for superheat spray valves 1 and 2 are similar in nature and responds accordingly. The logic for this control has rejects identified as AR (automatic reject), and are derived from the motor overload contact, unreliability of the analog inputs and contact inputs. When both IS1 and IS2 valves are on automatic the superheat spray auto indicator on the main unit control panel is set. The permissive to transfer either IS1 or IS2 valve to automatic is that the control has tracked within ±3%, that the base mode B condition exists, that feedwater and firing rate is in automatic and that the number 2 spray valve control has tracked to within ±3% deadband. Significance of this control system in comparison to previous analog control systems is that it takes advantage of using the proportional plus reset controllers (P-PI) when tracking the process between manual and automatic. This method achieves faster in-line cascaded tracking then would be possible with analog hardware.

9.2 Superheater Spray Interlock Logic 9.2.1 Permissives

The boiler control is on base mode B, firing rate, feedwater ratio is automatic and the control has tracked to within ±3% allowable tolerance.

9.2.2 Automatic Rejects

1. Firing rate, feedwater ratio control is on manual.
2. Computer not selected.
3. Boiler tripped.
4. Unit load less than 25% of MCR (maximum continuous rating).
5. Either IS spray control valve is overloaded.
6. Automatic rejection due to unreliable sensors, either analog inputs or contact inputs.

Reheat Temperature Logic And Control 10.1 General

Reheat temperature control is accomplished by reheat spray control, gas recirculation flow control or use of excess air.

A characterized load demand signal by the function generator becomes the reheat temperature setpoint which is compared with actual reheat temperature. The output of the reheat temperature contrroller is sequenced by the spray sequence controller and the gas recirculation sequence controller or excess air controller to insure that the spray controls begin operation when gas recirculation flow is minimum.

In normal operation, control is by gas recirculation rather than spray. Thus, optimally, spray flow will be zero with gas recirculation handling reheat temperature control. The control operator can select either gas recirculation or excess air method of control by pushbutton selection on the main control panel.

Figure 44A:
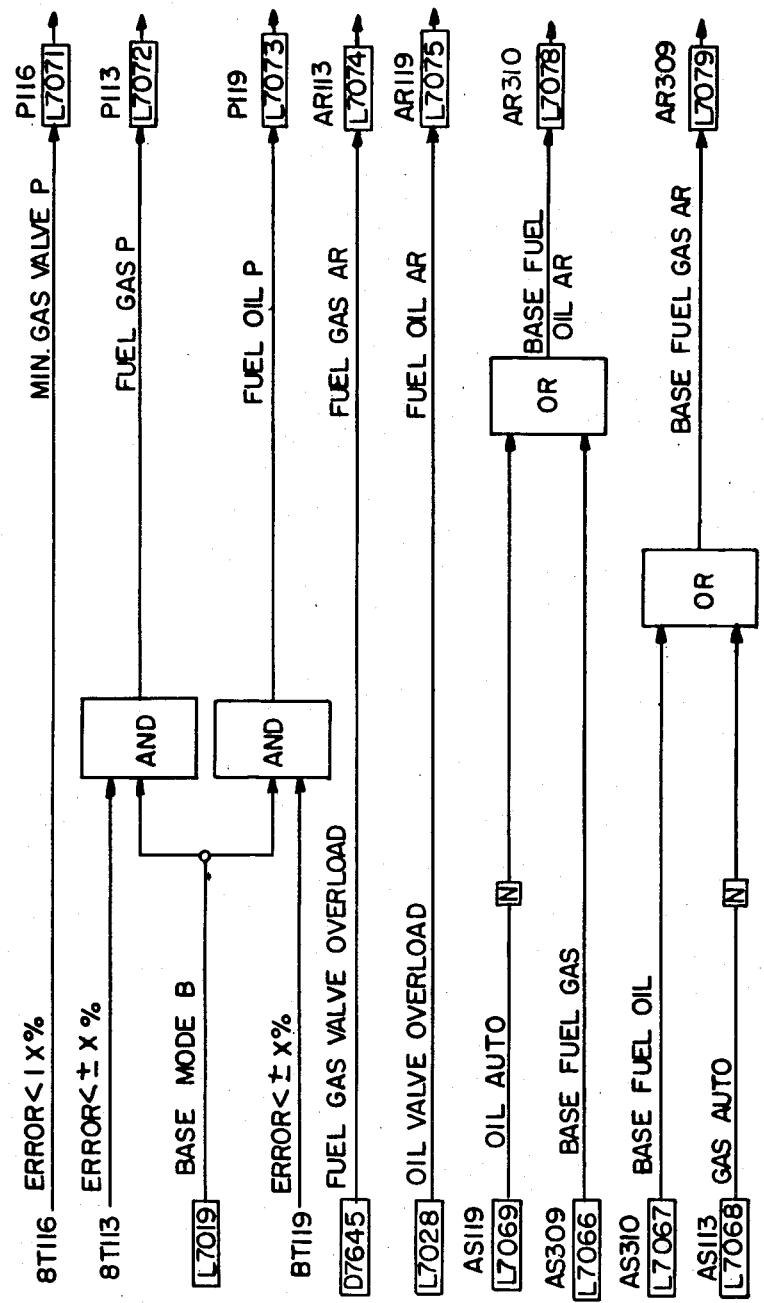
Figure 44B:
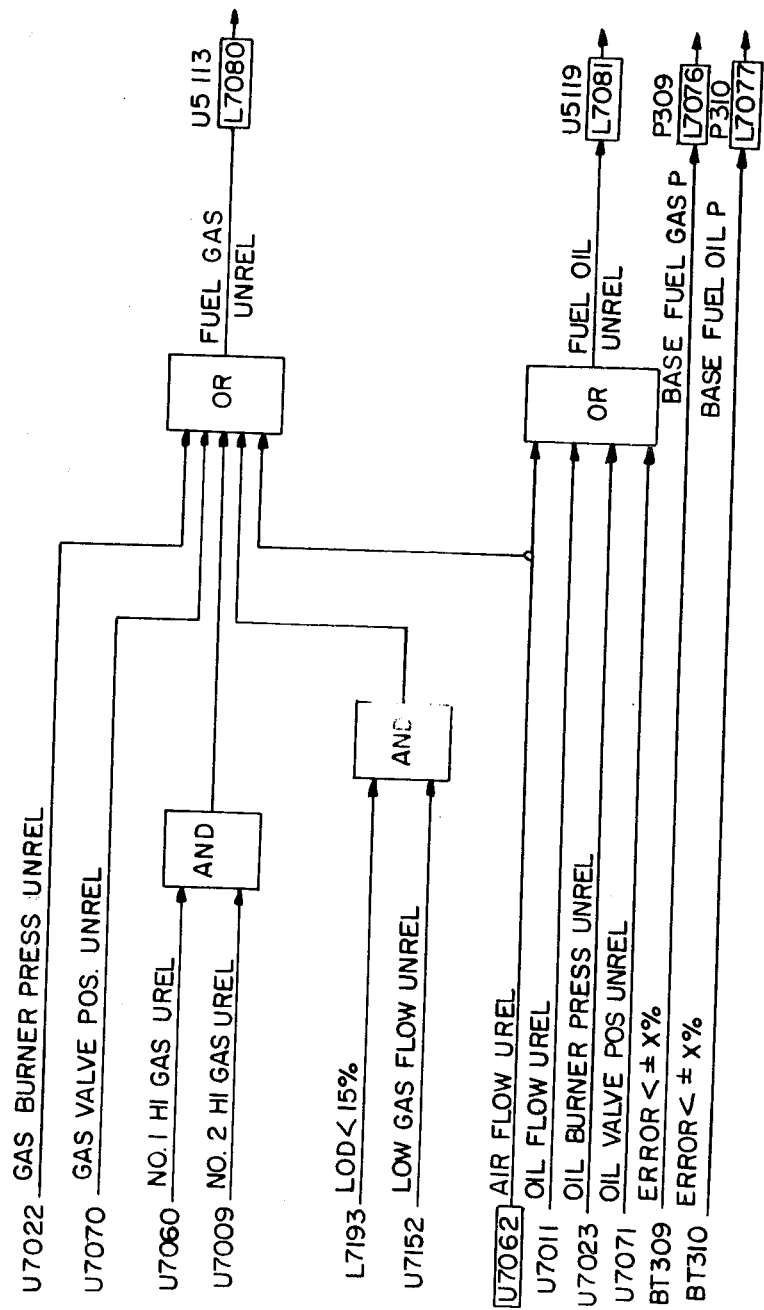
Figure 45:
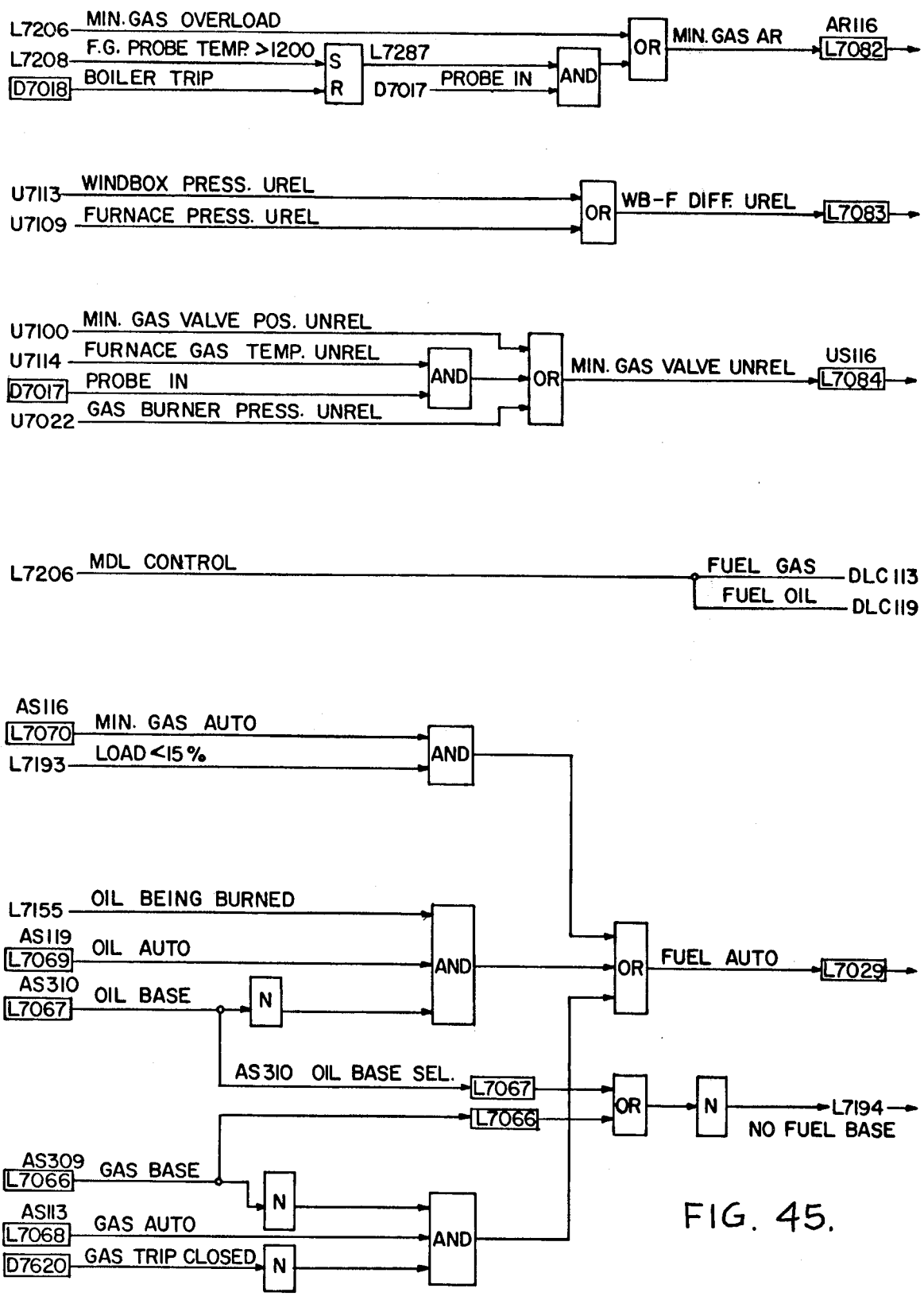
Figure 47:
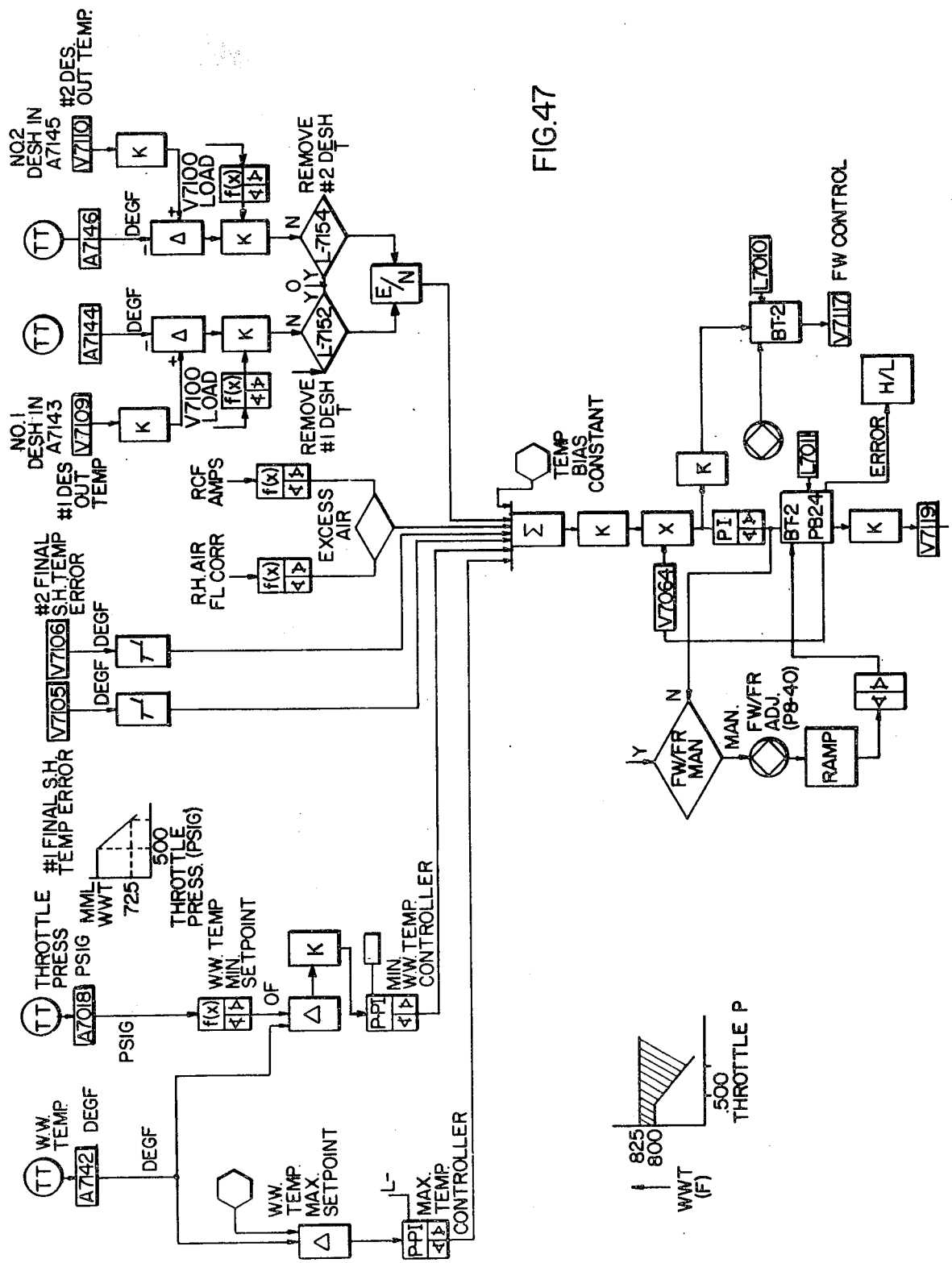
FIGS. 47, 48 and 49A and B relate to temperature error correction control.
Figure 48:
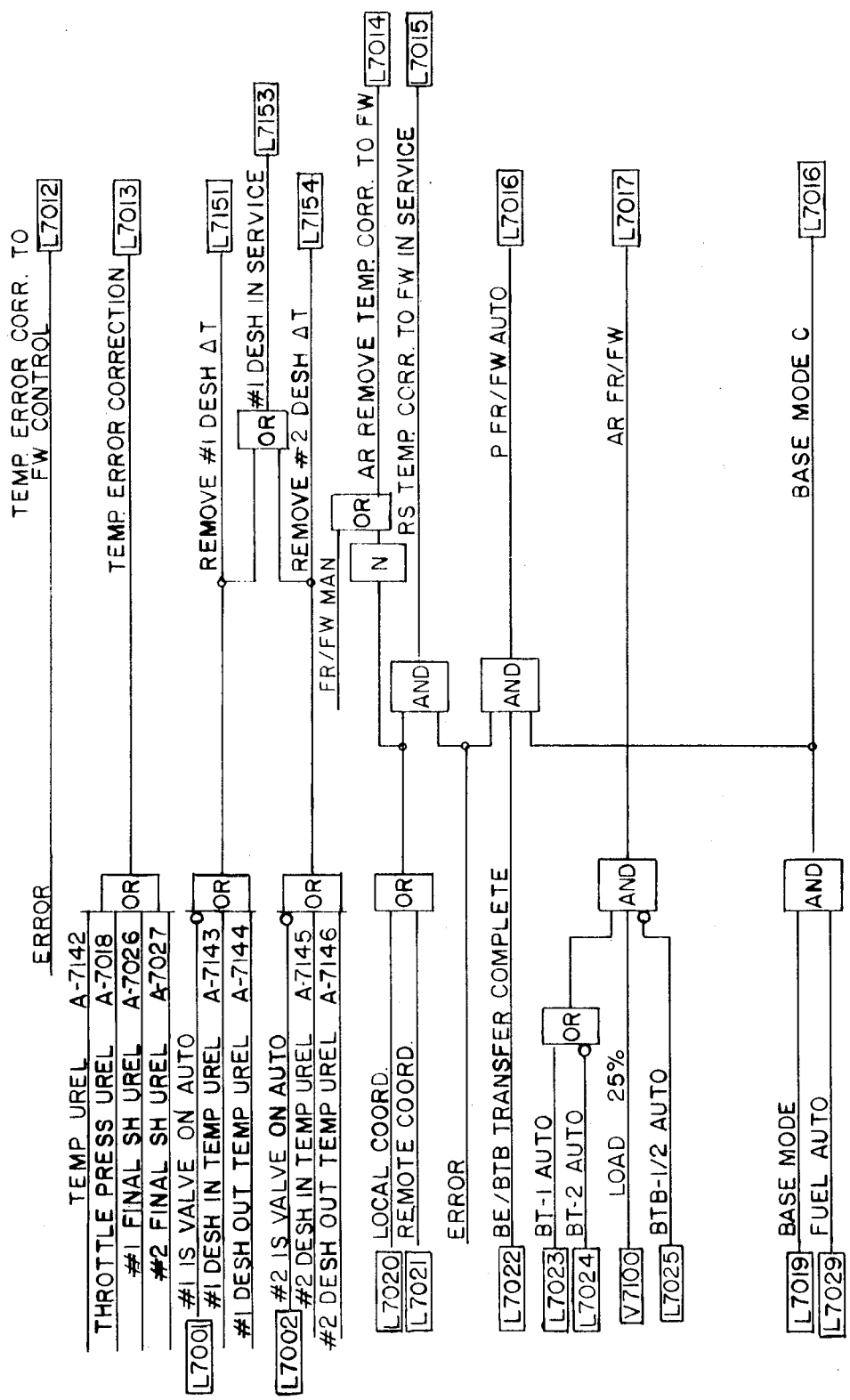
Figure 49B:
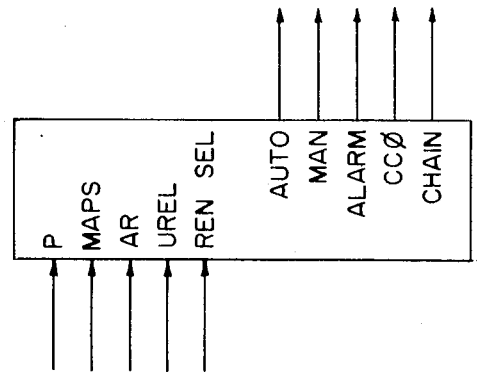
Figure 49A:
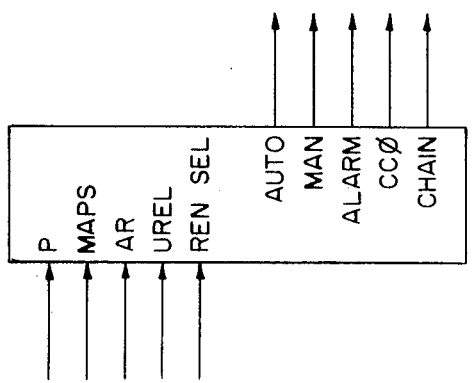
Figure 50A:
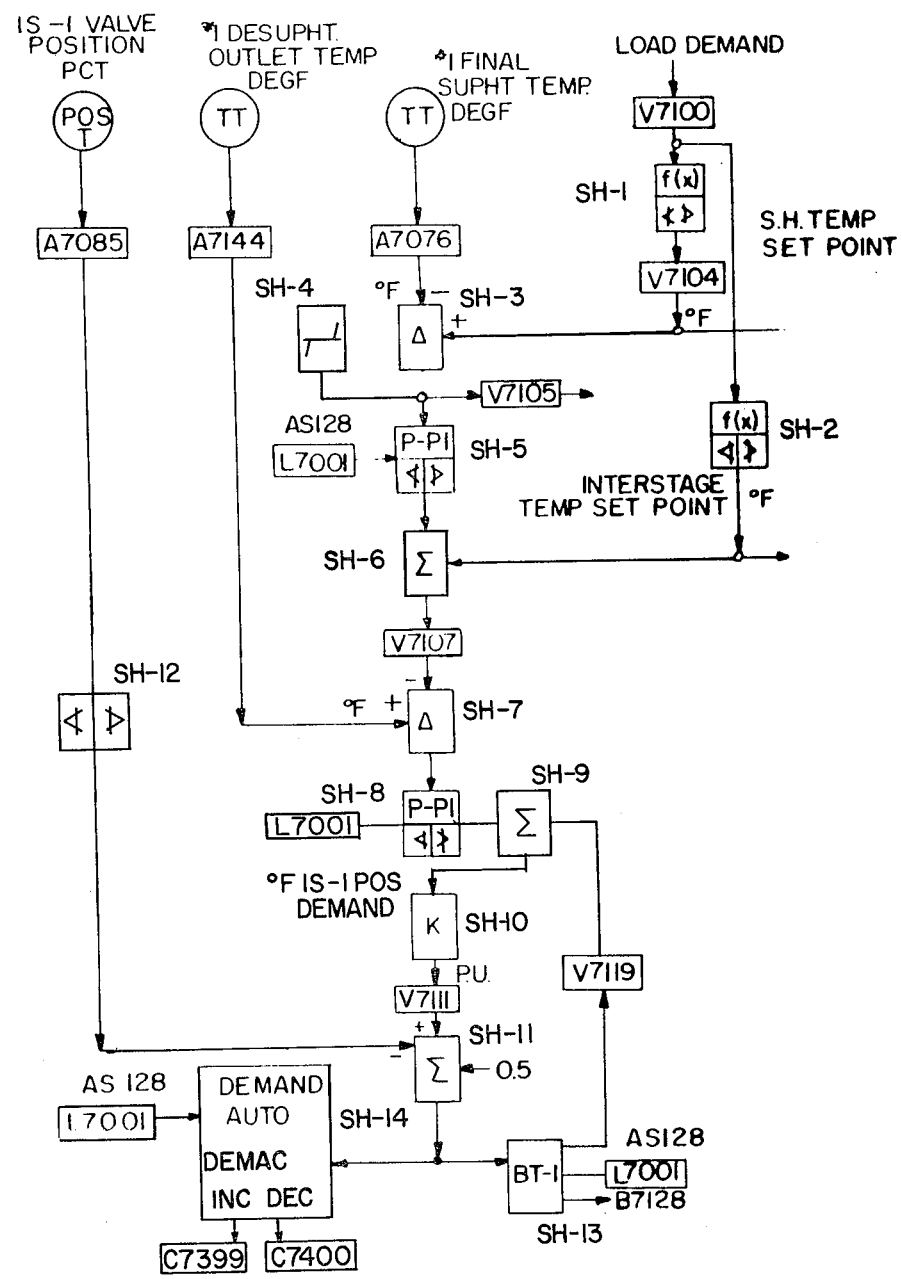
FIGS. 50A and 50B relate to superheat spray control logic.
Figure 50B:
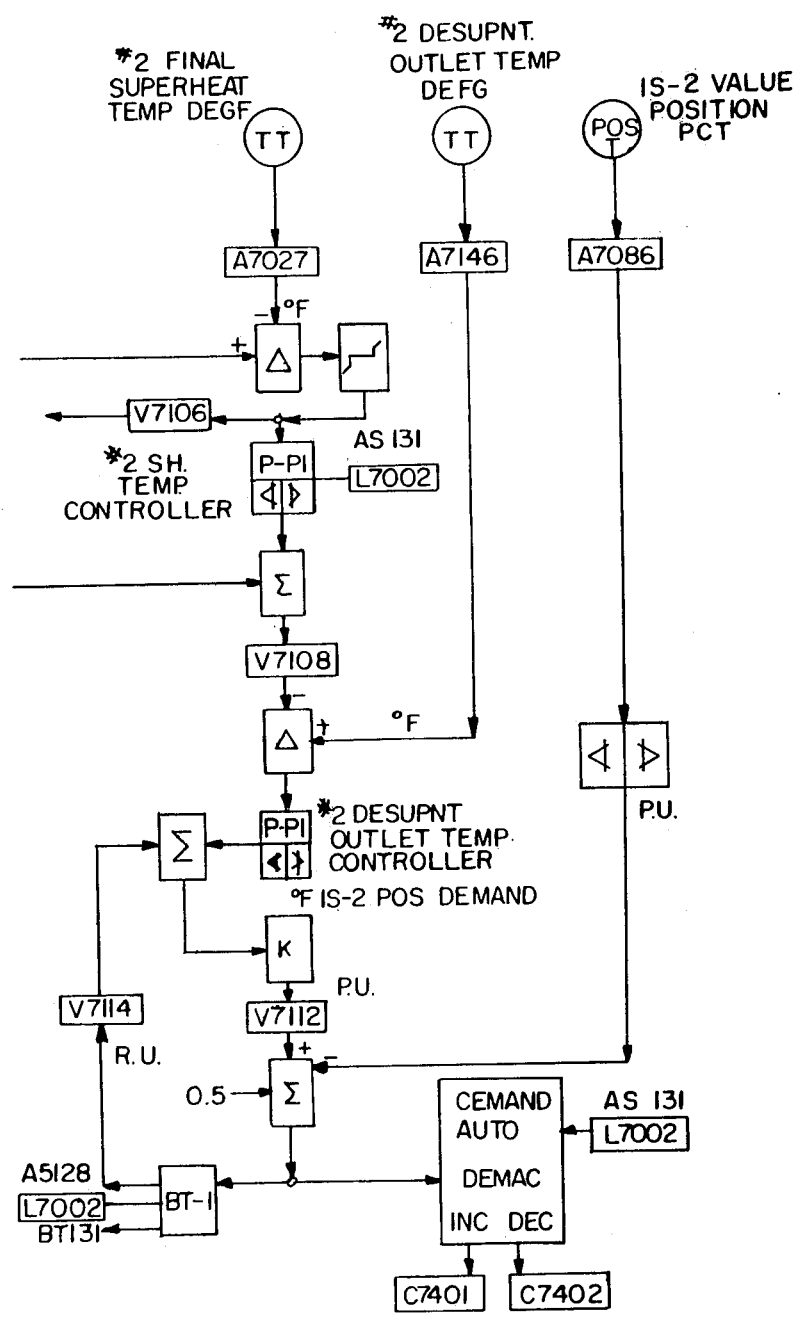
Figure 51:
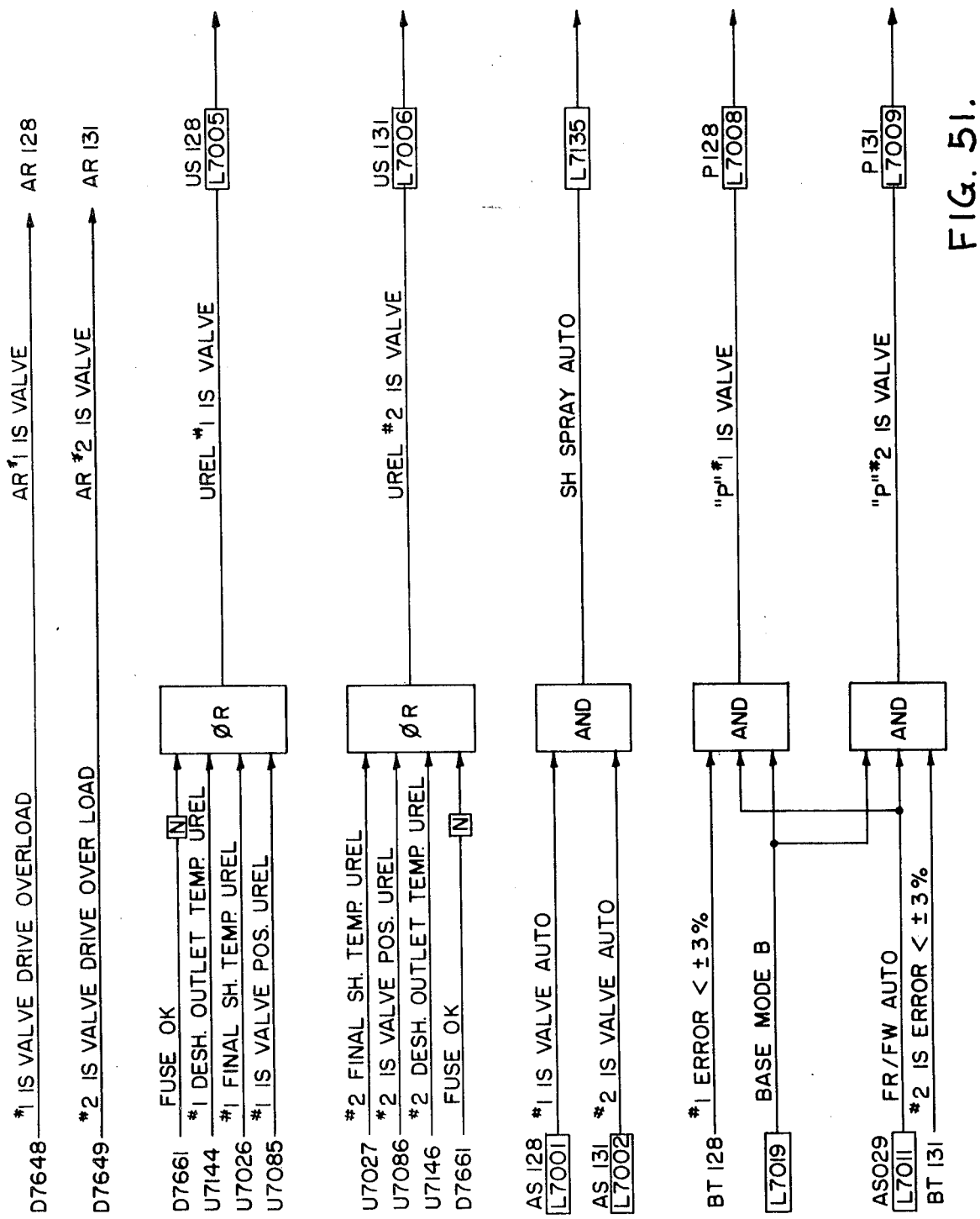
FIGS. 51, 52A and B relate to superheater spray control logic.
Figure 52B:
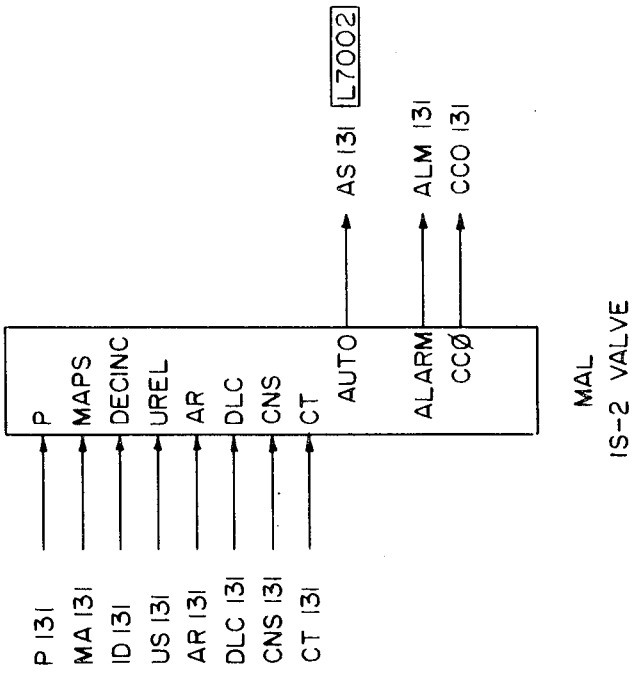
Figure 52A:
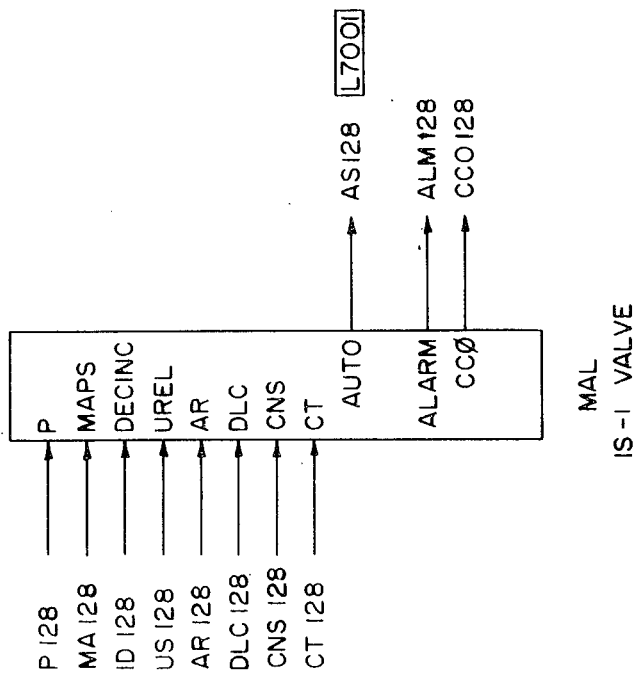
Figure 53:
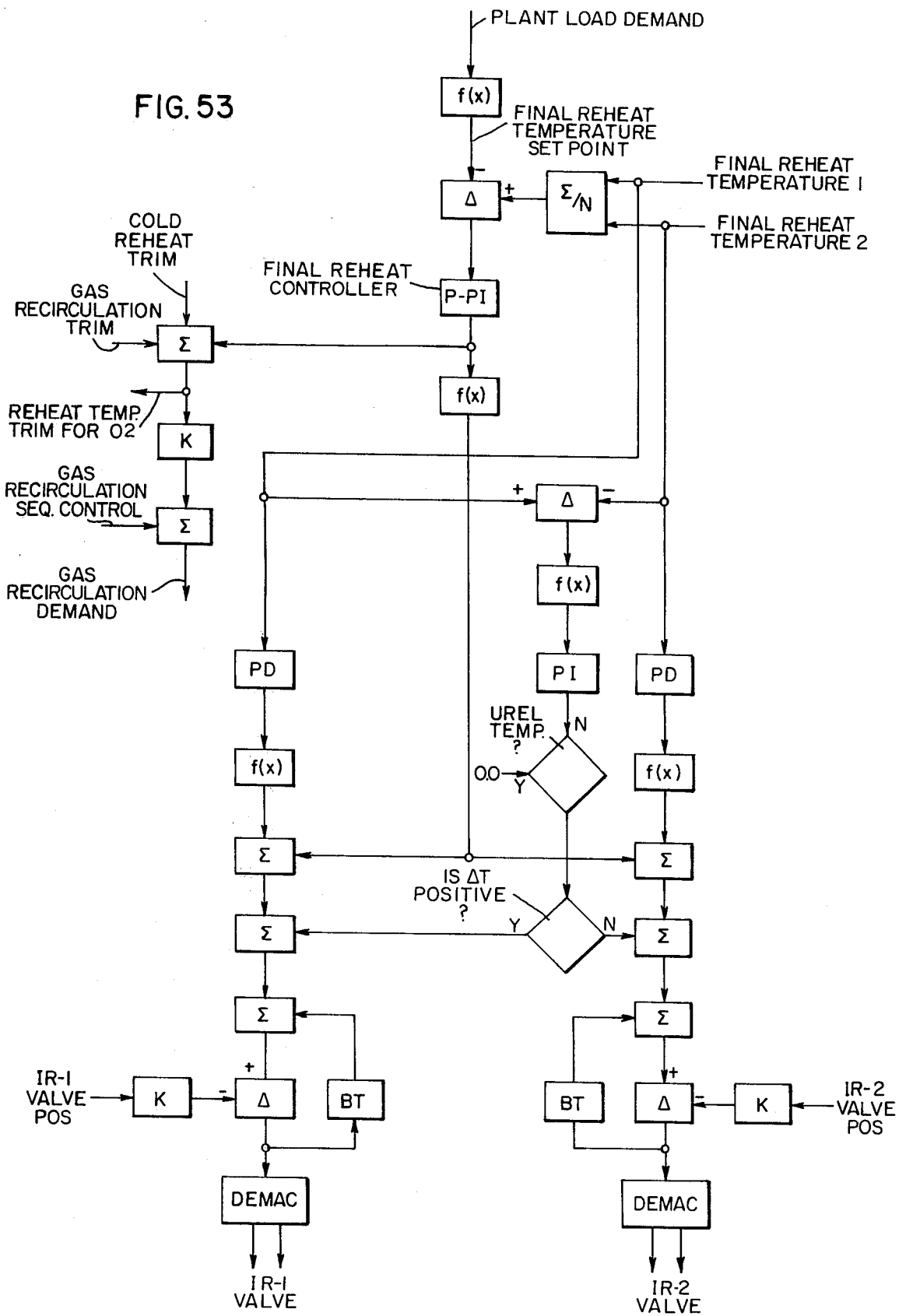
FIG. 53 relate to reheat spray control.
Figure 54:
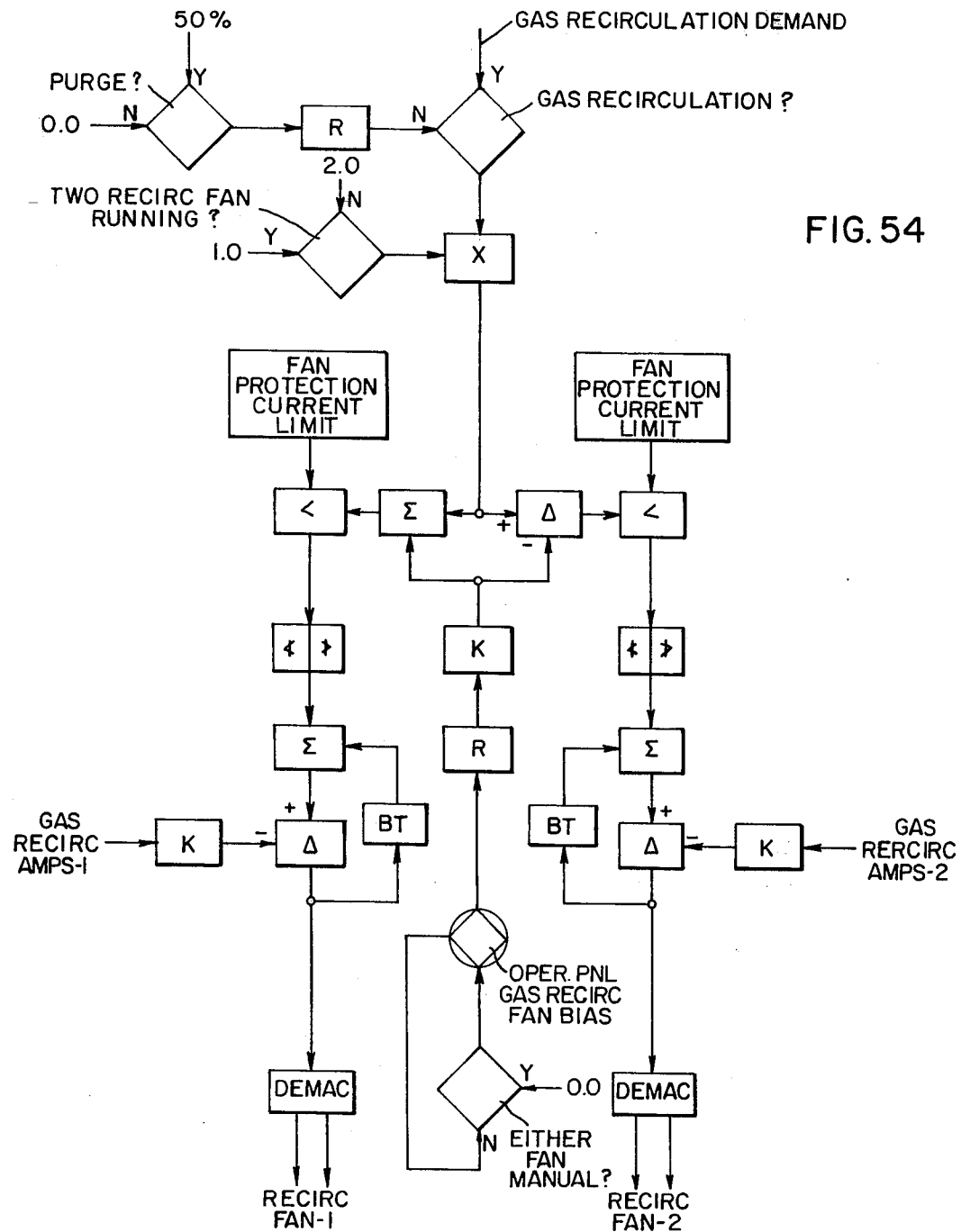
FIG. 54 relates to gas recirculation control.
Figure 56:
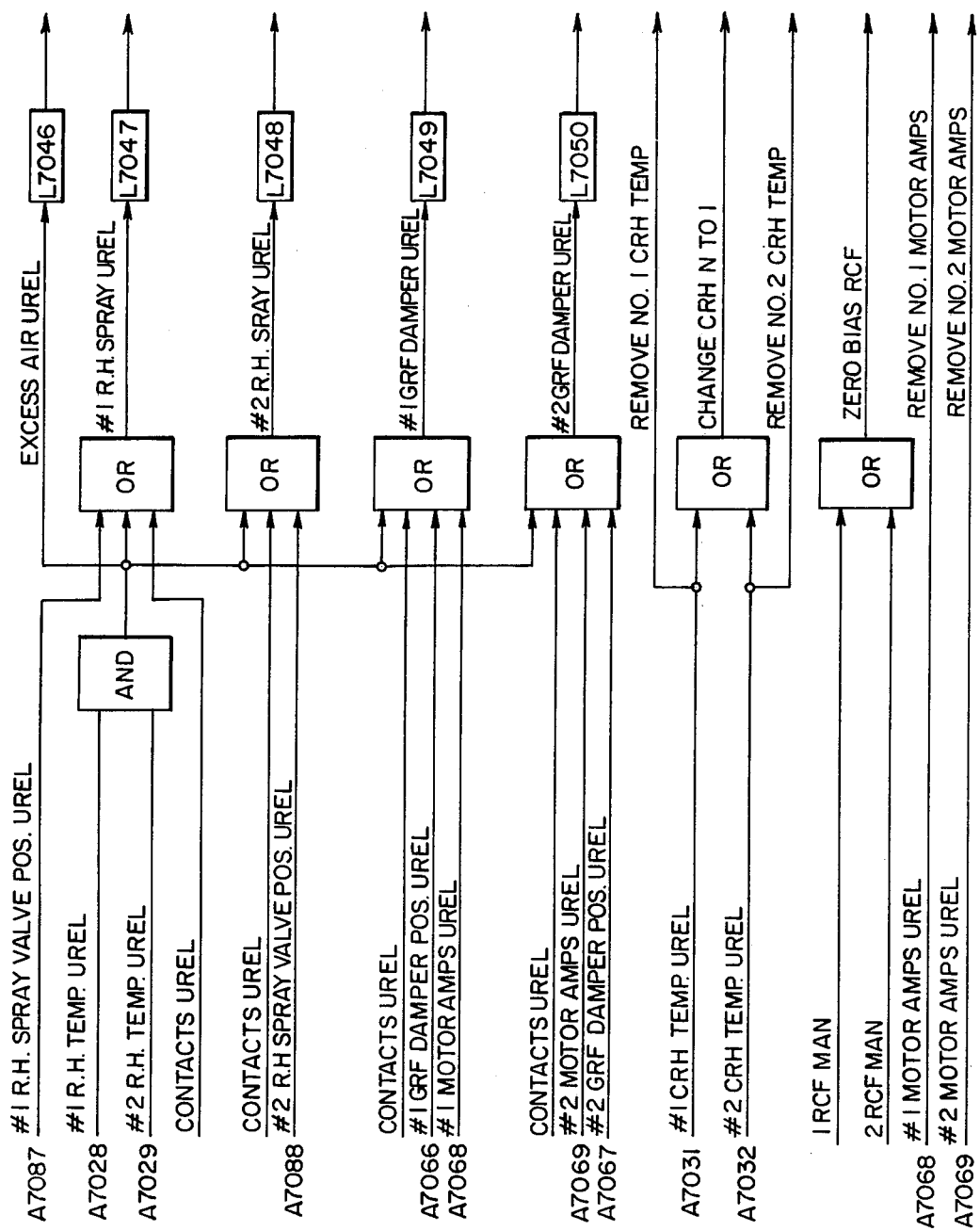
Figure 57B:
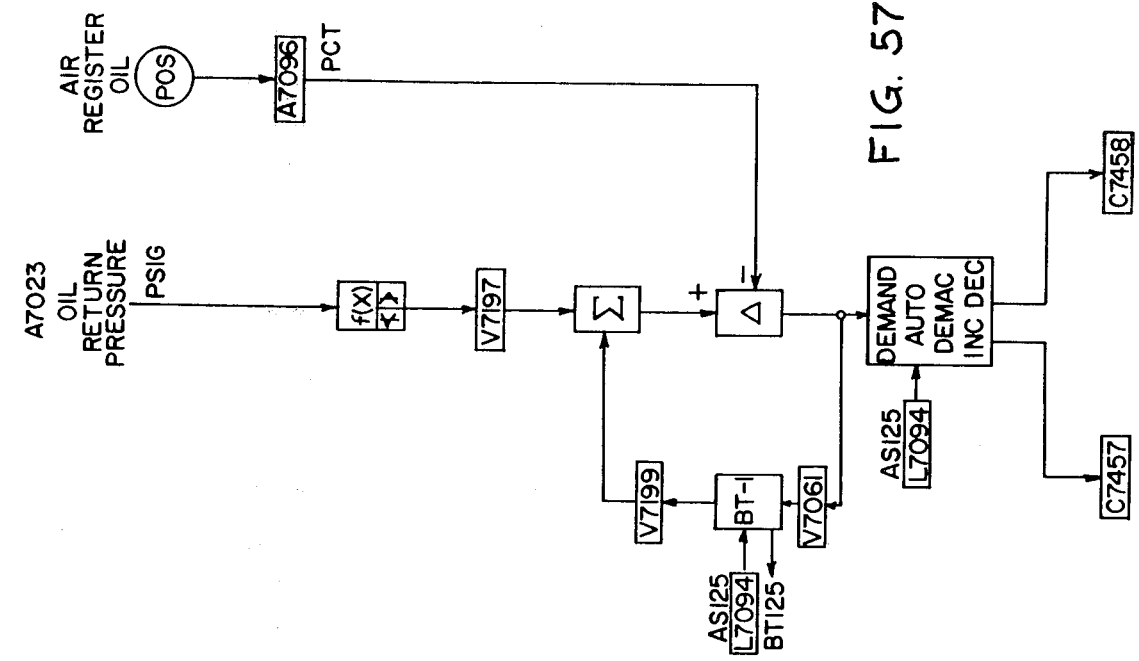
FIGS. 57A and B, and 58 relate to air register control.
Figure 57A:
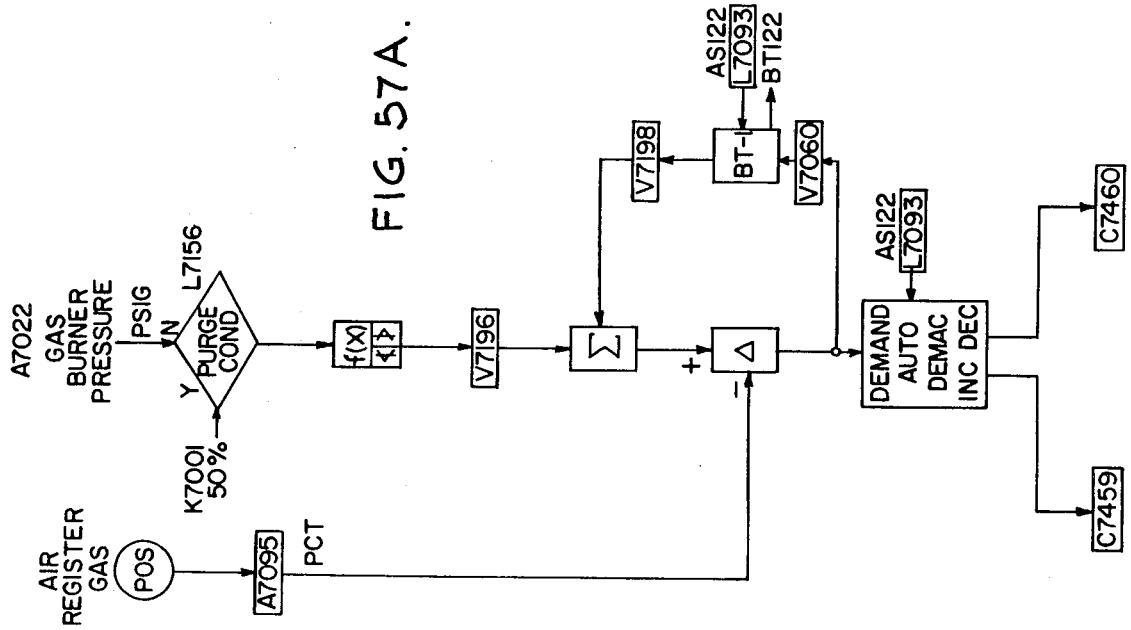
Figure 58:
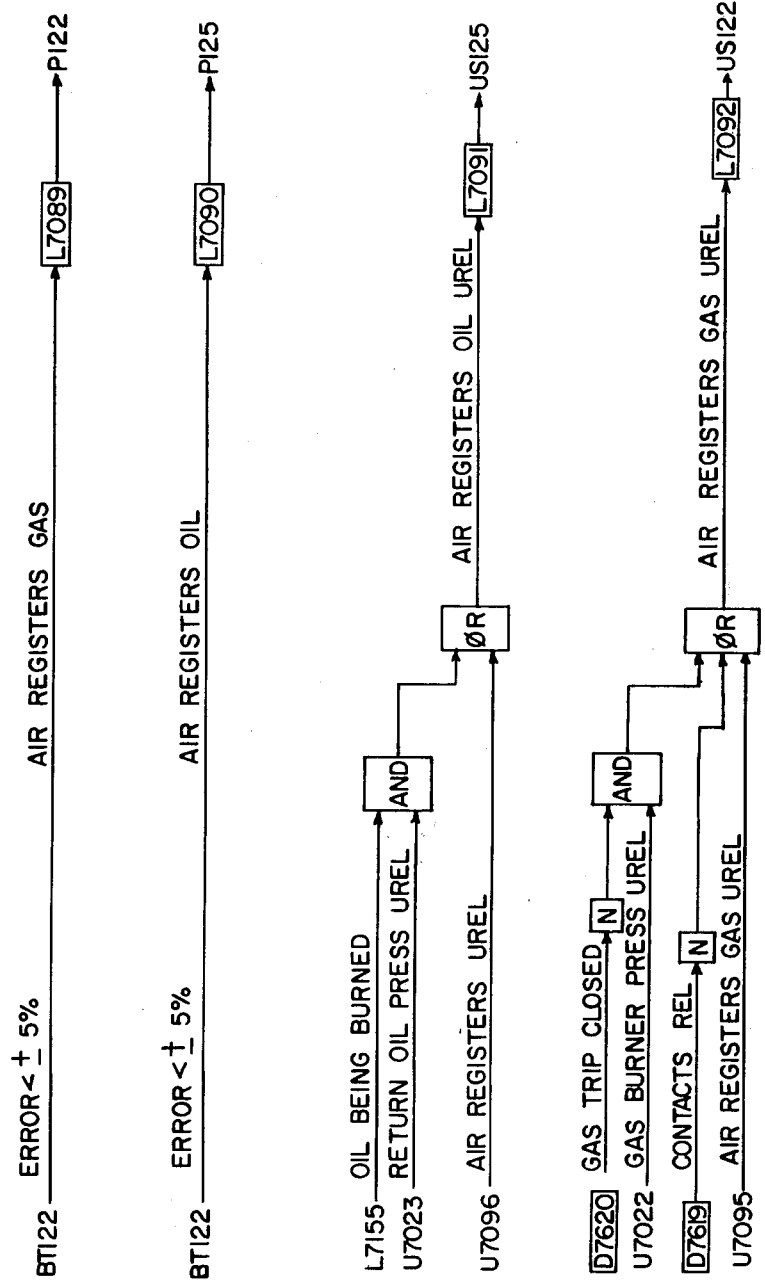
Figure 59B:
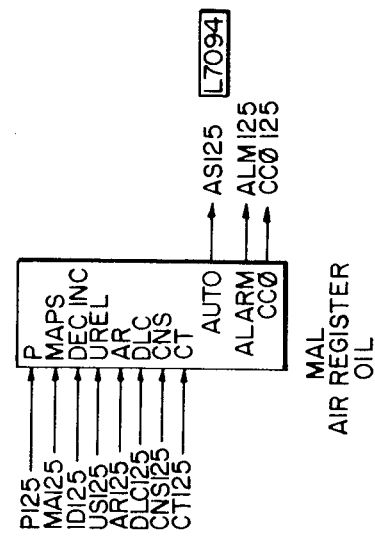
FIGS. 59A and B relate to air register control logic.
Figure 59A:
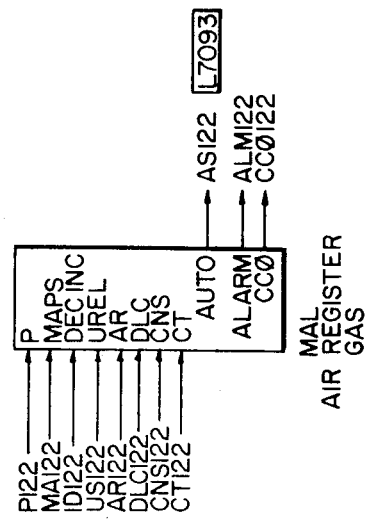
Figure 60:
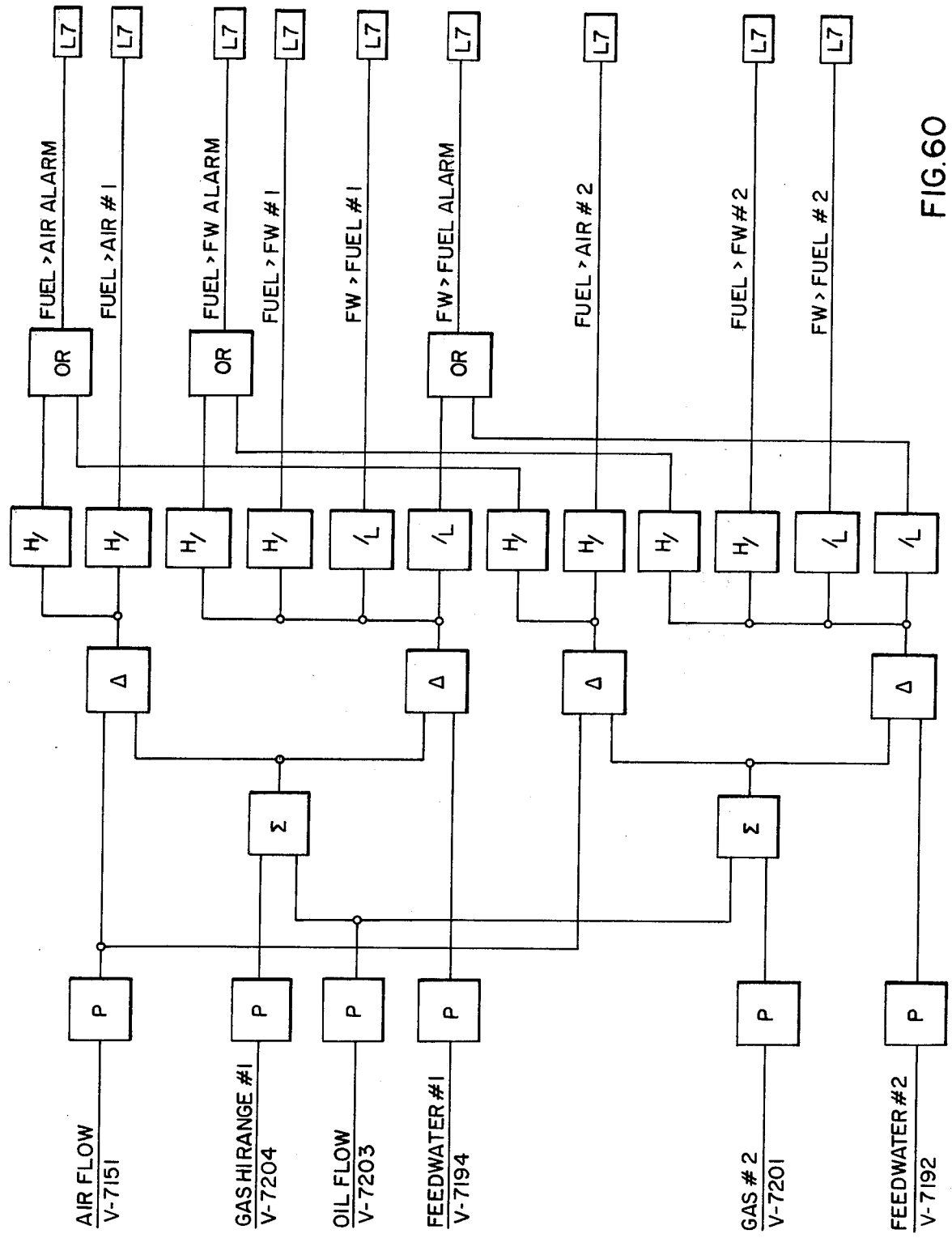
FIG. 60 relates to maximum deviation limit control.
Figure 61:
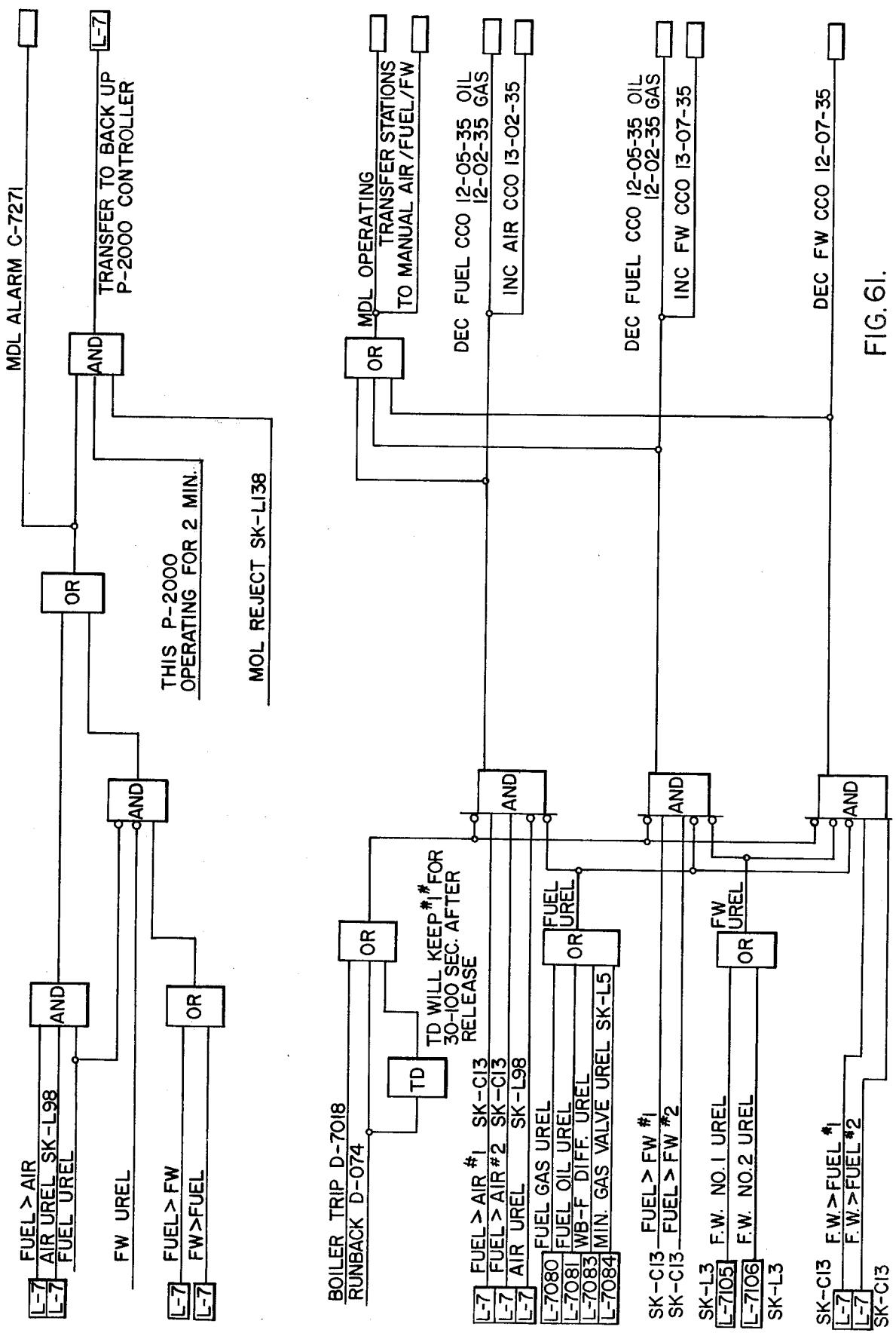
FIG. 61 relates to maximum deviation limit logic.
Figure 62:
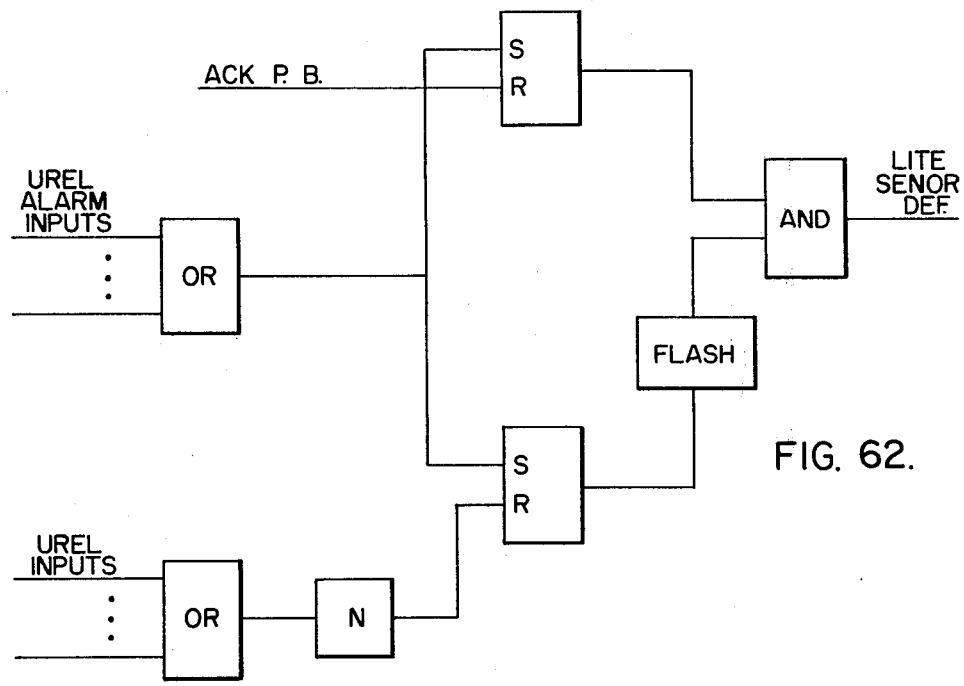
FIGS. 62 and 63 relate to alarm lite logic.
Figure 63:
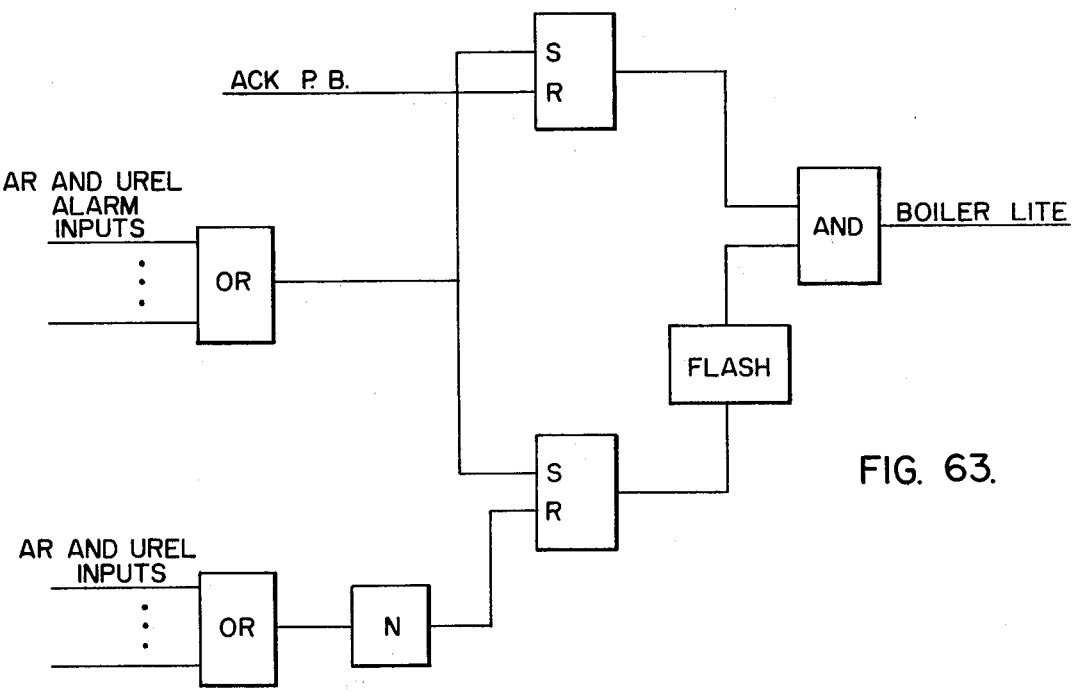

10.2 Reheat Temperature Interlock Logic—FIGS. 44, 55, 56 Limits

1. The spray control system is limited by capacity of desuperheating equipment provided.
2. Gas recirculaton system is limited by maximum recirculation flow characterized by load demand and also by maximum motor current.

Permissives

Gas recirculation control is allowable with the following conditions: (1) both recirculating fans operating, (2) operator selects gas recirculation mode, (3) tracking error of the bumpless transfers within ±3% tolerance control, and (4) base mode B operation with feedwater and air on automatic.

Reheat spray control is accomplished with the following conditions: (1) the boiler is in base mode B, (2) tracking error of the bumpless transfer is within ±3% tolerance, (3) control has reached minimum gas recirculation position.

Automatic Rejects (1) The boiler control is rejected from base mode B. (2) Drive unit power failure or overload condition. (3) Unit load less than 10% MCR. (4) Automatic rejection is completed with computer not selected.

10.3 Reheat Temperature Control

Load demand from the plant coordination contingency program is provided to a reheat temperature function generator where it is characterized. This characterized load demand then becomes a setpoint for reheat steam temperature and compared with number 1, number 2 final reheat temperatures with the resultant errors being presented to the common reheat temperature controller.

The P-PI controller integral output of reheat temperature is sent to number 1, number 2 spray valve sequence controller and gas recirculation fan damper sequence controller in parallel. The sequence controller's function is to insure that when gas recirculation fan dampers are on automatic the spray valves are sequenced to begin with operation when gas recirculation fan dampers or excess air is in the minimum position. The output of the gas recirculation damper sequence controller is trimmed by the output of the cold reheat temperature controller whose setpoint is also characterized by load demand.

The demand for gas recirculation or excess air is adjusted for changes in the cold reheat temperature. For excess air control, this signal modifies the air flow demand to increase the excess air and thereby increase reheat steam temperature. For gas recirculation control, the lower of the adjusted sequence reheat control signal and characterized load demand signal becomes the demand for gas recirculation fan motor current.

The sequenced demand signal, for gas recirculation or excess air control is adjusted for changes in cold reheat temperature.

For excess air control, this signal modifies the air flow demand signal to increase the excess air by increasing reheat steam temperature.

For gas recirculation control, the lower of the adjusted, sequenced reheat control signal and a characterized load demand signal becomes demand for recirculation fan motor current.

This signal is trimmed by the output of the gas recirculation fan damper controller which responds to the error between this demand and total gas recirculation flow as measured as the sum of the currents of both recirculation fan motors and sent to number 1, number 2 gas recirculation dampers in parallel. Each position demand signal is compared with the current limit controller output for protection of the motors.

The output of the spray valve sequence controller is accelerated by the output of number 1, number 2 derivative controller and sent to each valve positioner. If the operator selects excess air in control position instead of gas recirculation control, the output of the gas recirculation fan sequence controller is sent to the air program in the gas recirculation reheat steam temperature control.

5.0 Startup Control And Logic 5.1 General

The boiler extraction valve [BE] is initially used to maintain the waterwall pressure at 3500 psig. The waterwall transducer signal is sampled once each two seconds and used to compute waterwall pressure.

The setpoint used to compute the waterwall pressure cannot be adjusted by the operator. Pressure error is processed by waterwall pressure controller through the BE valve participation controller through the BE valve operator.

The boiler throttle bypass valves [BTB] and the boiler throttle valves [BT] are initially closed. When conditions permit waterwall temperature greater than 800 DEGF at approximately 10% load, the BE valve is started closed and the BTB valves started open by the operator initiating the BE/BTB transfer. To initiate this transfer the operator actuates operator panel pushbutton entitled BE/BTB transfer.

The BTB valves were interlocked to prevent them from opening before the waterwall temperature reaches a preset value of 800 DEGF. This is accomplished by preventing the BE/BTB valve participation setter transfer below the prescribed temperature. At approximately 20% load, 100% BTB valve participation, the BTB valves are 70% open at that time. A setpoint slightly lower [3490 psig] a 3500 psig is switched into the BT valve error controller. The switching of the lower setpoint into the BT valve error controller causes the BT-2 valve to open to control the lower pressure setpoint. The opening of the BT-2 valve causes the BTB valves, which were trying to be held at 3500 psig waterwall outlet pressure to close. As load is increased to approximately 25% the BT-1 valve begins opening. From this point on, both BT valves will initially open to approximately 15% toggling back and forth, each opening about 3% per movement.

When the BT valves begin taking over pressure control, the BT valves will maintain pressure for a short period of time and then ramp wide open. Pressure control from this point on is regulated through the operation of the feedwater system. This method uses pump speed control to effectively control boiler pressure.

Note that there are two valves per M/A station for both the BE and BTB valves. The position indicator will be connected to the number 1 drive unit in each case.

5.2 Startup Valve Logic

5.2.1 BE Valve Interlocks

Item A — The BE valve is interlocked with BTB valves such that the proportion of pressure regulation can be varied between BE and BTB. When the participation setter is at 100% the BE valve regulates waterwall pressure and BTB valves are closed. When transferring from BE to BTB valve control, the intermediate positions effectively divide the total required valve area in proportion to setting. During the BE/BTB valve transfer, the pushbutton on the panel will flash off and on indicating the transfer is in progress. Once complete, the light will go out.

Item B — In order to put the BE control on automatic, four analog inputs must be reliable. The inputs are: (1) BE valve position A7077, (2) BE-2 valve position A7078, (3) Waterwall pressure A7015 and (4) Waterwall temperature A7159. Loss of reliable inputs will cause BE valve control to reject from automatic to manual.

5.2.2 BTB Valve Interlocks

Item A — Participation setter at 100% BE will close BTB valves.

Item B — On initial opening, these valves when on automatic or manual are interlocked to prevent their operation below 800° waterwall outlet temperature. Both BE and BTB valve stations should be on automatic for the BE/BTB transfer. Rejection to manual occurs if either valve rejects.

Item C — Analog inputs must be reliable. Those required are: (1) BTB-1 valve position A7079, (2) BTB-2 valve position A7080, (3) Waterwall pressure A7015, and (4) Waterwall temperature A7159.

5.2.3 Valve Logic

Logic interlocks are as follows:

Item A — The BT valves are arranged open sequentially on automatic control. When on automatic the first BT valve will open approximately 3%. Position is held in the second valve opens 3%. Its position is then held. Next, the first valve will again move further to about 5% at which time effective flow through the valve has swamped the effect of the BTB valves. At this point in time, both BT valves will be run to a wide open position.

Item B — The BT valves are interlocked to prevent their openings on manual or automatic below preset waterwall temperature outlet condition of 800°.

Item C — Automatic operation of the BTB valve is dependent on BE and BTB valves being on automatic and computer inputs reliable. Computer inputs required for the BT valve operation are: (1) A7097 BT-1 valve position, (2) A7098 BT-2 valve position, (3) A7015 Waterwall pressure, and (4) A7159 Waterwall temperature.

5.3 Program Operation

Referring to FIGS. 17–23B, note the function generator which is used to convert waterwall temperature into a setpoint for waterwall pressure. Thus, as heat is built up in the system, pressure setpoint is also increased to 3500 psig. The pressure setpoint is then compared against actual pressure and a pressure error developed. Block ST-2 develops that pressure error. The pressure error is then fed through a deadband device which effectively filters off any noise as identified by ST-3 on the diagram. The resultant waterwall pressure error is then fed to three sets of valves, directly to the BE/BTB combination and to the second diagram for the BT valves. The waterwall controller used for operation when on BE or BTB valves is controller ST-4. Note that it is a (P-PI) controller and is proportional only when BE/BTB valves are on manual. When on automatic the controller automatically converts to a proportional plus reset type of controller. The output of this controller is then fed through a multiplier which signal is modified by the output of the ramp which is effectively a request for BE or BTB valve operation. The ramp is identified as ST-6. The output of that controller is then fed down to two summing blocks which are identified as ST-7 and ST-8, respectively, for the BE-1 and BE-2 valve control. At this level a bumpless transfer is applied and identified as ST-9 and ST-10 respectively, for the BE-1 and BE-2 valves. Note on BE-1 valve that a difference block ST-11 compares the value of the position feedback after process through a high/low limiter ST-13 and converting to preunit demand through proportional device ST-12. An error is developed in block ST-11 which is the position change required for the valve when on automatic control. The error is then processed through the DEMAC block ST-14 asking for either increase or decrease on valve position. The BE-2 valve operates in a similar fashion in this area. Looking now at the BTB valve operation, note the difference block identified as ST-15 observing that it receives a signal before and after the participation setter is introduced onto the position demand at ST-5. Through this interaction the BE/BTB valves share the total steam flow. The output of the error block ST-15 is fed into summing blocks ST-16 and 17. The rest of the BTB valve control functions identically to the BE valves as previously described.

Program description for the BT valves follows similar to BE and BTB. Note that the pressure error fed into the BE BTB valves is deadbanded and applied to the BT valves through (P-PI) controller identified as ST-19. The controller ST-19 is proportional only when the BT valves are on manual, when the BT valves are on auto it is proportional plus reset controller. The output of this controller is fed to two summing devices identified ST-20 and ST-27. The summers take the demand signal and the output of the bumpless transfer and then feed the summated value into function generator as identified as ST-21. The output of this function generator is then applied to ST-22 which is a difference block looking at position feedback. Note here that the position feedback has high/low limit and is also scaled from percent position to per unit value. The output of the error block is then fed to the DEMAC device which will provide an increase or decrease contact causing valve movement of the position dependent upon the amount of error from ST-22.

WD Valve Control

The separator level is maintained by the WD valve. Note that for this valve and the SP valve there are no manual/auto stations. The control is totally computer controlled and either one or the other computers must be on automatic to achieve a startup on the system when operation of this valve is required.

The control functions by beginning with function generator ST-28 which develops a setpoint for the separator level. The setpoint is compared against actual separator level feedback which is multiplied by a correction factor due to separator pressure through function generator ST-29. A difference is taken between setpoint and feedback in difference block ST-30. The output is then fed into a multiplier and an off-line function generator to develop final valve demand which is compared against valve position feedback. A comparison is made in ST-33. The position feedback is limited and scaled in blocks ST-34 and ST-35. The output is then processed through DEMAC identified as ST-36 which results in either an increase or a decrease CCO operation. Note that the separator pressure is controlled through use of the SP valve through whose panel entered setpoint is provided by the operator. The setpoint is high/low limit checked in ST-37 and summed in block ST-38 for any unreliable conditions. A difference is taken in block ST-39 where comparison is made between setpoint and process feedback. The error is then fed to the DEMAC at ST-40 for valve movement either in the increase or decrease direction. To have proper control all the analog inputs must be reliable as is true in other control loops.

14.0 DEMAC Controller 14.1 General

The control system requires an interface with the process which occurs through operation of increase-decrease CCO's resulting from the control system.

Contact outputs, which have no "live" analog value, have been designed into the system due to fail safe design when power is lost.

14.2 Theory

Field damper drive, or valve units are powered from momentarily closed increase-decrease contacts which require both to be open if the drive unit isn't moving. Time closure of either the increase or decrease contacts can vary from 0.1 to 2.5 seconds in 0.1 second increments. The thought here is the use of variable time width pulses which will move the drive units by a varying degree, hopefully with some degree of linearity.

The method employed uses the position error which is calculated by the control chain to establish a time for either increase or decrease contact closure which is dependent on the arithmetic value and whether it is positive for increase or negative for decrease. The amount of error is passed through a function generator to provide linearization effects for small movements or exponential sloped values if desired when the error begins to increase any great degree.

This DEMAC algorithm, (Digital Electric Motor Automatic Control), will cause both CCO's to immediately open if the control loop rejects to manual and either CCO happens to be closed at the time. This method of operating control movement devices is not any different than using the increase-decrease M/A station buttons, and in fact is identical.

The program cooling as organized requires four inputs defined as follows: (1) TMAX, a value which is the maximum time in seconds that a particular CCO may be allowed to be closed, this value applies equally to either an up or down contact closure; (2) TIME, the calculated value of time closure for a contact which is developed through use of a function generator using the position error that approximates a curve by using straight line segments; (3) DEVNUM, a number that identifies the particular pair of increasedecrease CCO's used to position a damper drive unit, or valve mechanism; (4) AUMAN, the auto/manual logical value that will open both COO's if value is false, ($0000_{16}$). If true, ($8000_{16}$), it will allow control as required by the control system.

14.3 Program

This program is used as an algorithm for the Boiler damper, drive, or valve units. The coding is in assembly language and executes in conjunction with the base software package.

6.0 Feedwater Control and Logic—FIGS. 26—31

6.1 General

Demand for feedwater flow is developed on a feedforward basis through a function generator which provides demand of feedwater flow on the basis of megawatts. The demand for feedwater flow is modified on a proportional basis by the temperature error system multiplier. This modification from the temperature error is to reduce the temperature excursions during transient boiler conditions. Any permanent change to boiler inputs to maintain temperature setpoint will be made to fuel and air. The feedwater flow system is primarily used to sustain boiler pressure. The saying "pump for pressure, fire for temperature" is followed here. A change of either feedwater or fuel by one percent while holding the other constant will give the boiler an offset of 10 DEGF if allowed to stabilize out.

The demand for feedwater flow is then divided off and sent to each system on a per pump basis. The demand for feedwater flow is then altered depending on the operator entered boiler feed pump bias. The bias functions by biasing pump number 1 with respect to number 2. Thus a positive entry of the number would increase the discharge flow on number 1 pump over number 2. A negative value would have the opposite effect.

Total feedwater flow is developed and summed with a value of feedwater correction as a result of waterwall pressure error. This value is summed or taken as a difference against main feedforward demand which has been altered by boiler feed pump bias. The output of this difference block is then used to drive for either an increase or a decrease in pump speed demand.

Below 25% unit load the FWB valve is positioned as a function of load. Above 28% the FWB valve is closed and not modulated due to piping connections with the spray flow system.

Feedwater used in conjunction with fuel and air is primarily regulated as required to maintain proper generation with trimming of the feedwater fuel/air relationships to maintain steam pressure temperature. Feedwater flow is measured and this signal is used to maintain actual feedwater flow equal to feedwater flow demand by regulation of boiler feed pump speed. The FWB valve is positioned to ensure controllability of the feed pumps during low unit operation. The unit is equipped with low range feedwater flowmeter and used during periods of low load operation [below 23% MCR].

During the period when the startup valve [FWB] is being positioned the FW valve is closed. At approximately 22% load, metering is transferred from low to high range with no correction from the low range meter. The FW valve is then rammed open. Once load is above 28% the FWB valve will close off with the spray interlocking as mentioned above.

6.2 Feedwater Logic

To achieve automatic operation of the feedwater control the following conditions must be satisfied. Load demand and corrected feedwater flow are compared to determine proper tracking. The necessary tolerance for tracking can be field adjusted using the boiler maintenance panel. If the proper permissive is set to allow transfer of either pump to automatic, the FWB valve can be placed on auto if either boiler feed pump is auto. Last in the sequence for automatic operation is the FW valve. Automatic rejection of the feedwater system occurs if the following inputs are not properly verified.

(1) Feedwater flow A704 high range, (2) feedwater flow A7059 low range, (3) BFP-1 discharge flow A7063, (4) BFP-2 discharge flow A7064, (5) contact inputs reliable. Rejection of individual manual/auto stations on the boiler feed pump turbines will occur at the time drive overload or power failure is indicated. This is also true for the FWB and FW valves.

6.3 Feedwater Control Program

The value of feedwater demand is in units of MLB/HR, millions pounds per hour flow. Left load demand is established for each pump and converted to speed using function generators. The function generator is inside the block on the diagram as indicated DEMAC. The speed reference is compared to pump discharge flow. Feed pump flow offset or balance can be established by using BFP bias on the operator's control panel. If entering a positive number, the result is an increase in flow for pump 1 when compared to pump 2.

Basic positioning of the FWB valve is in a feedforward manner. Due to the piping diagram, the FWB valve will close above loads 28% MCR for proper control of the spray circuits.

FW valve operation functions logically in regard to current value of feedwater flow. Except for deviation limit operation, the FW will not be actuated until on automatic control.

The boiler feed pump system which maintains feedwater flow lacks process integrators. This application of control using the digital computer with the process has created the condition such that no PI controllers are included. The control is permanently based on feedforward demand positioning of each of the boiler feed pump turbines in speed and corresponding flow comparison made with the process performing integration functions due to modified demand.

8.0 Fuel Flow Control and Logic—FIGS. 39–46 and 48–50

8.1 General

Demand for fuel is provided on a feedforward basis on the Plant Unit Master. Megawatts are converted into MBTU/HR demand as a function of load. This load demand or total fuel demand is then corrected as a function of steam temperature through a scaling multiplier. The demand is then low selected against the demand based on total air flow into the furnace. The low selected fuel demand is then compared against total fuel input which consists of fuel gas flow, fuel oil flow and ignited gas flow. The demand for total fuel is corrected by an off-line P-PI controller. Demand for total fuel is developed based on BTU error from demand and feedback on a feedforward basis and multiplied against percent fuel demand on per fuel basis. A function generator then converts the fuel demand into fuel per burner basis. The fuel per burner basis is then sent directly through with a comparison made against gas burner pressure which converts from pressure into MBTU/HR. Actual gas valve position is then converted to BTU equivalent content and compared against demand and then valve position moved is a function of the BTU error.

The minimum gas valve control comprises several features. Total feedforward load demand is converted through a function generator from megawatts into MBTU/HR demand. This demand is then combined with the combination of furnace exit gas temperature difference against waterwall temperature and also modified by total steam temperature error. The result is the demand for fuel flow which is compared against actual flow and integrated in the startup gas controller. Furnace exit gas is checked to determine that gas is less than high temperature limitations. This value is then summed with the integrated demand for fuel converted to actual valve position demand and then used to drive the valve to open or close.

Air register control for both gas and oil is sent up to adjust for proper mixture of air based on current level of fuel flow into the furnace. Control for either gas air registers or oil air registers converts fuel flow indication through a function generator to a position demand for the air register. This demand is then compared with actual air register position and open or close requests made for the register until demand is met.

8.2 Fuel Logic

To achieve automatic operation of the fuel control the following must be satisfied: (1) feedwater on automatic (2) error on automatic, and (3) one fuel available for automatic. Rejection to manual occurs if error flow system rejects to manual, that is a boiler trip. The feedwater system rejects to manual or process inputs are unreliable.

8.3 Fuel Program

The fuel program is calibrated as a function of MBTU/HR which is millions BTU's per hour. The demand as received either from base reference or from plant unit master reference is in megawatts and converted to BTU's per hour through a function generator curve. Low selection is made against fuel demand based on either total feedforward reference or a limiting value due to existing error flow conditions. The demand for total fuel is fed forward in a positive manner with no in-line controller. The process itself will perform an integrating function. The system has capability of using either gas or oil fuel as a base load. If this condition exists, one fuel will be base-loaded to some percentage of total unit fuel while the other is used to swing for temperature regulation on the unit. Where split fuel operation occurs, the prime fuel demand is multiplied by a factor which accounts for the number of burners as a percentage basis on the particular fuel. The minimum gas valve control positions the gas valves as on 4 or 5 basic conditions. (1) Feedforward from the unit reference, (2) temperature error, (3) waterwall to furnace gas temperature differential, (4) actual gas pressure versus flow comparison, and (5) furnace exit gas temperature cutback controller.

7.0 Air Flow Control and Logic—FIGS. 32–38

7.1 General

Air flow for the boiler is developed as a demand from either the boiler or the plant unit master reference and is calibrated based on oil with corrections added for fuel firing. The feedforward reference is used to develop the demand which is compared against actual air flow measured by the amount of excess 02. An 02 controller then provides correction to the prime feedforward demand for air flow. This value is then checked against high selection for either air flow as a result of current fuel level or actual demand as calculated. A selection is then made against low load condition to check against 10% relative air flow. This ultimate demand of air flow is then compared against actual corner air flow and summed by an off-line controller with the integrated air. This value representing relative air is then sent as a feedforward signal to the individual damper control systems. The dampers are then positioned from this feedforward signal and increased or decreased as the result of any error in position demand against actual position. The dampers have the capability of being biased where a positive bias value biases FD fan damper 1 with respect to damper 2.

7.2 Logic

To achieve automatic operation of the air flow control system, the following interlocks must be satisfied: (1) feedwater control on automatic, (2) at least one FD fan available for automatic control, (3) operation of the inner line provided to prevent air flow from decrease below actual measured fuel input, and (4) reliability of the related analog inputs from the process.

7.3 Air Program

The air flow system converts basic megawatt demand through function generators into a demand for relative air. The 02 feedback is compared against a value of 02 demand as converted through function generators from the basic feedforward megawatt reference. This error 02 demand is checked against an 02 low limit of 1%. Transfer between low and high range meter is made when load conditions allow the transfer to occur. The two integrated offsets provided by the PI controller used for 02 are used to modify the air flow feedforward demand. The demand after being high selected against fuel flow requirements is then off-line integrated with the total relative air demand error added with the feedforward signal. Conversion is then made from relative error to damper position demand. The damper positioning is then converted dependent on the number of fans in service. The value of the feedforward demand is then summed with any bias if it exists. The feedforward demand is then sent to the process allowing the process itself to integrate against damper demand for actual position.

Figure 38:
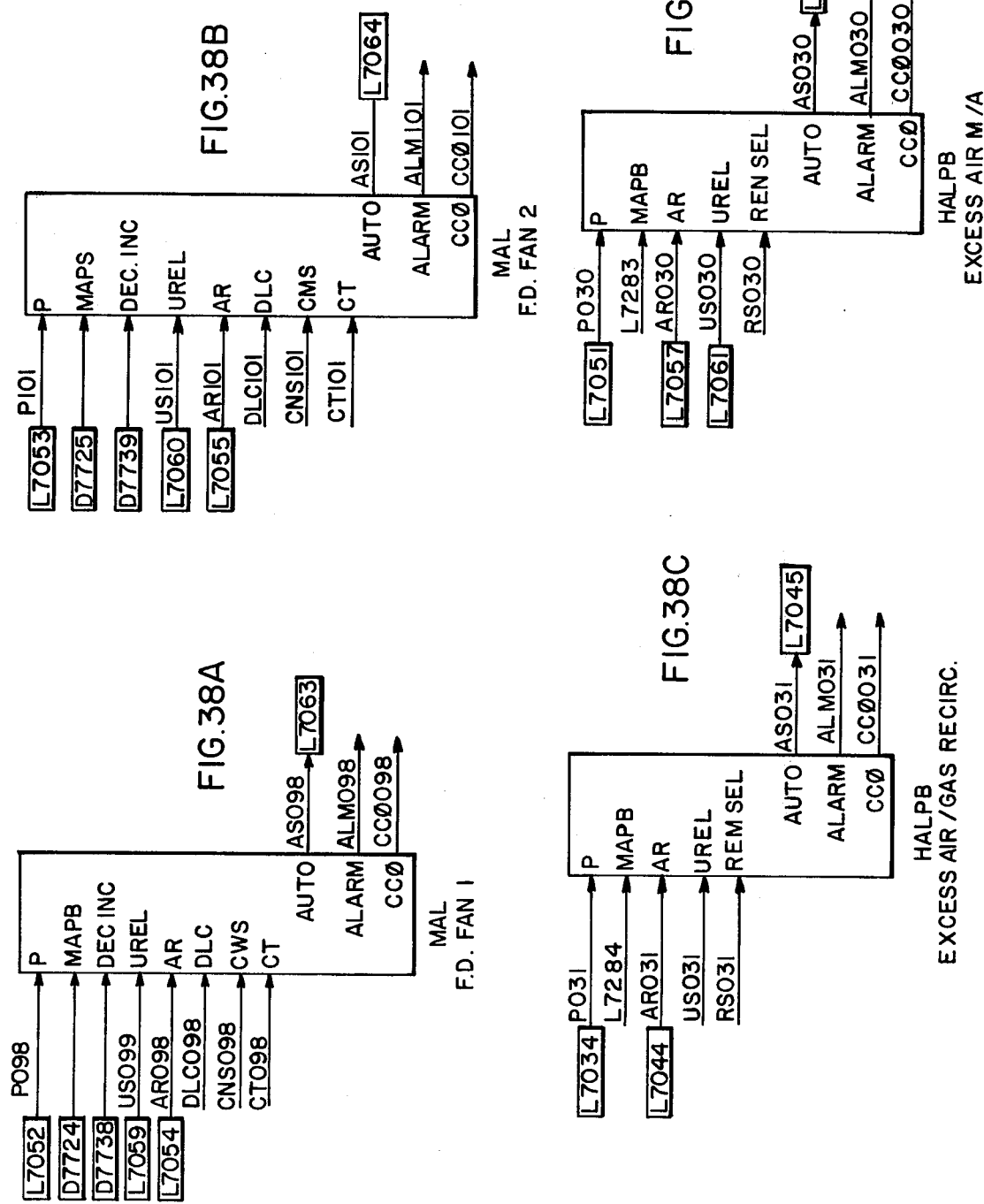
FIGS. 38A, B, C and D relate to air flow logic.
Figure 39:
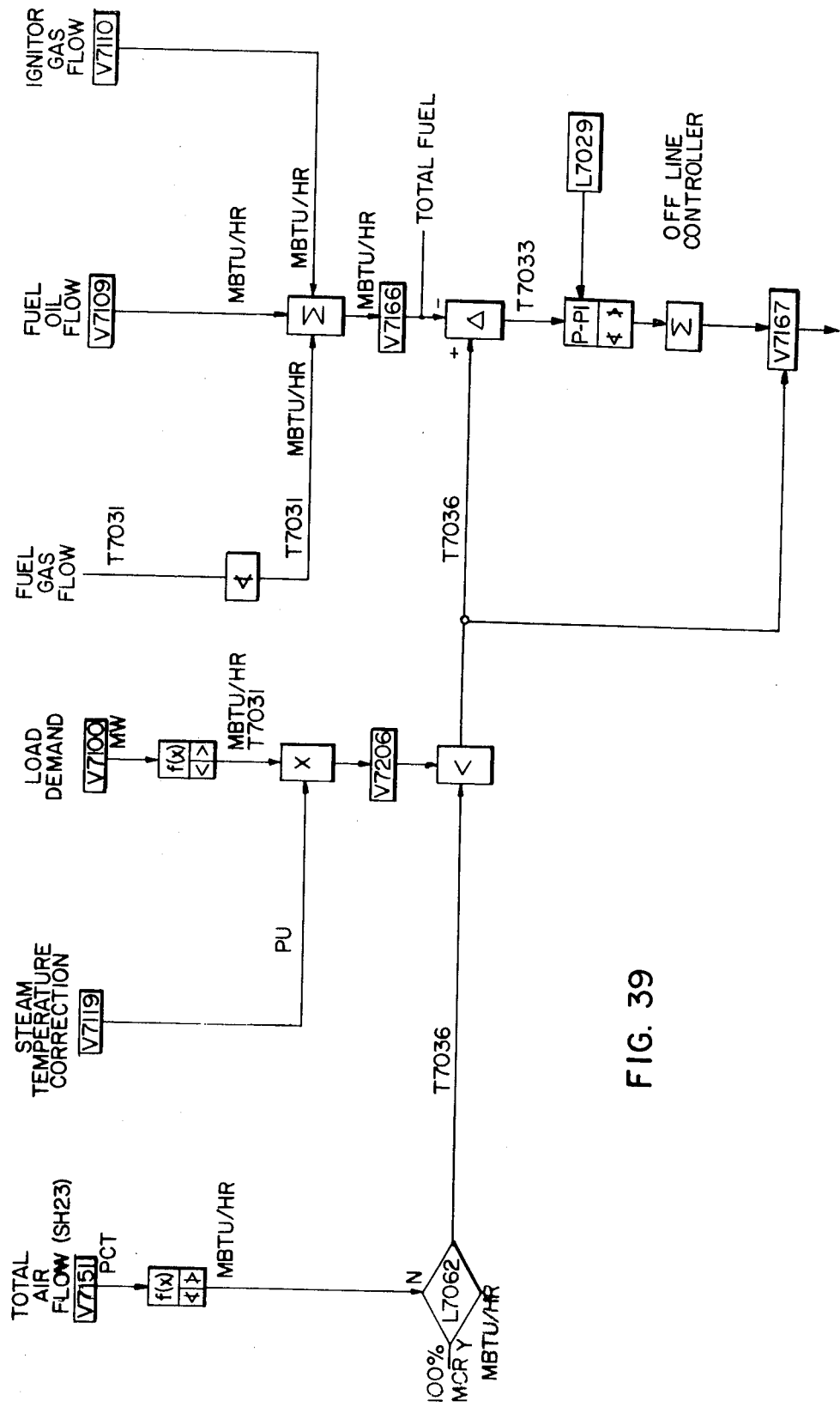
FIG. 39 relates to fuel control logic.
Figure 40A:
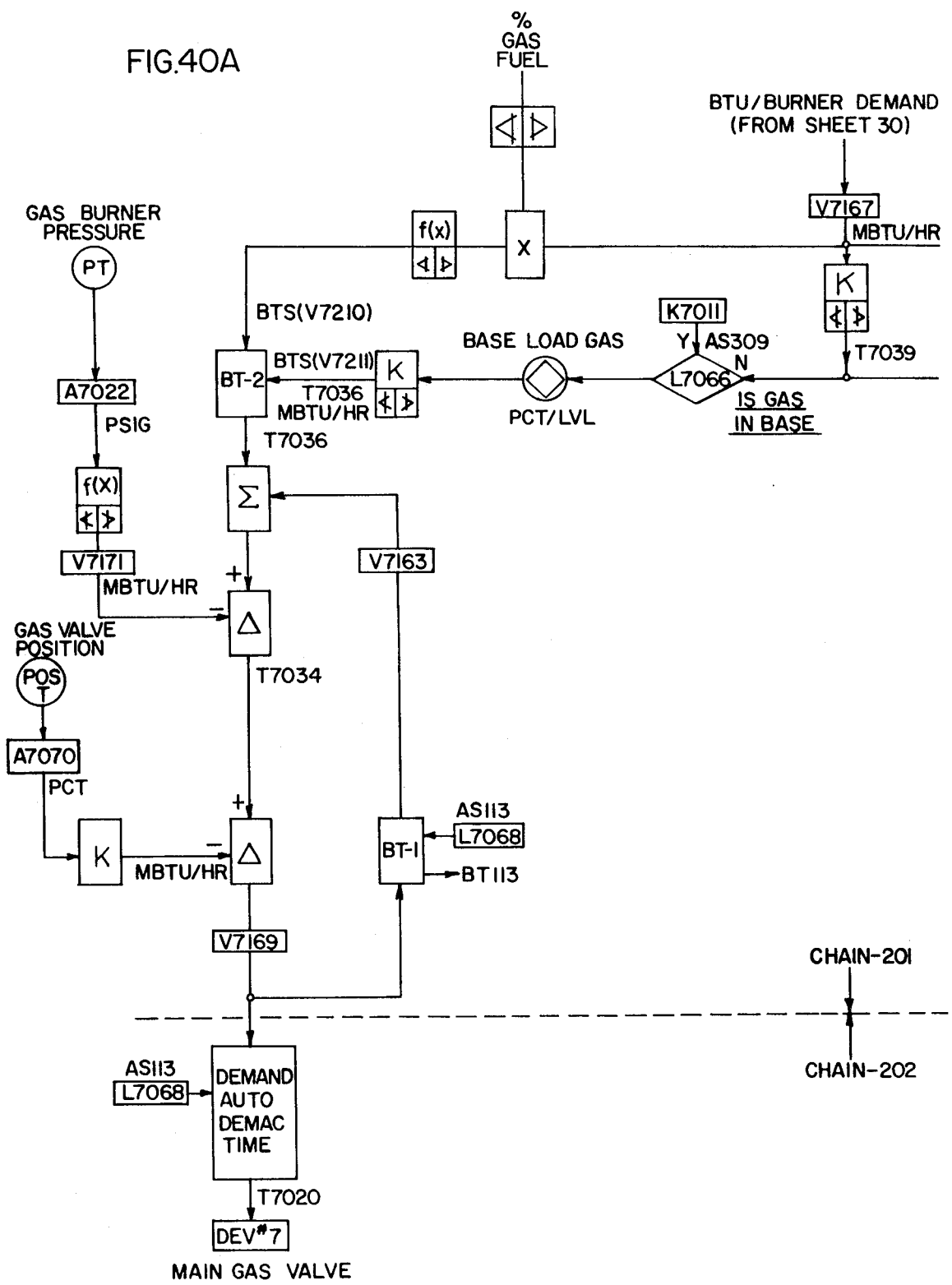
Figure 40B:
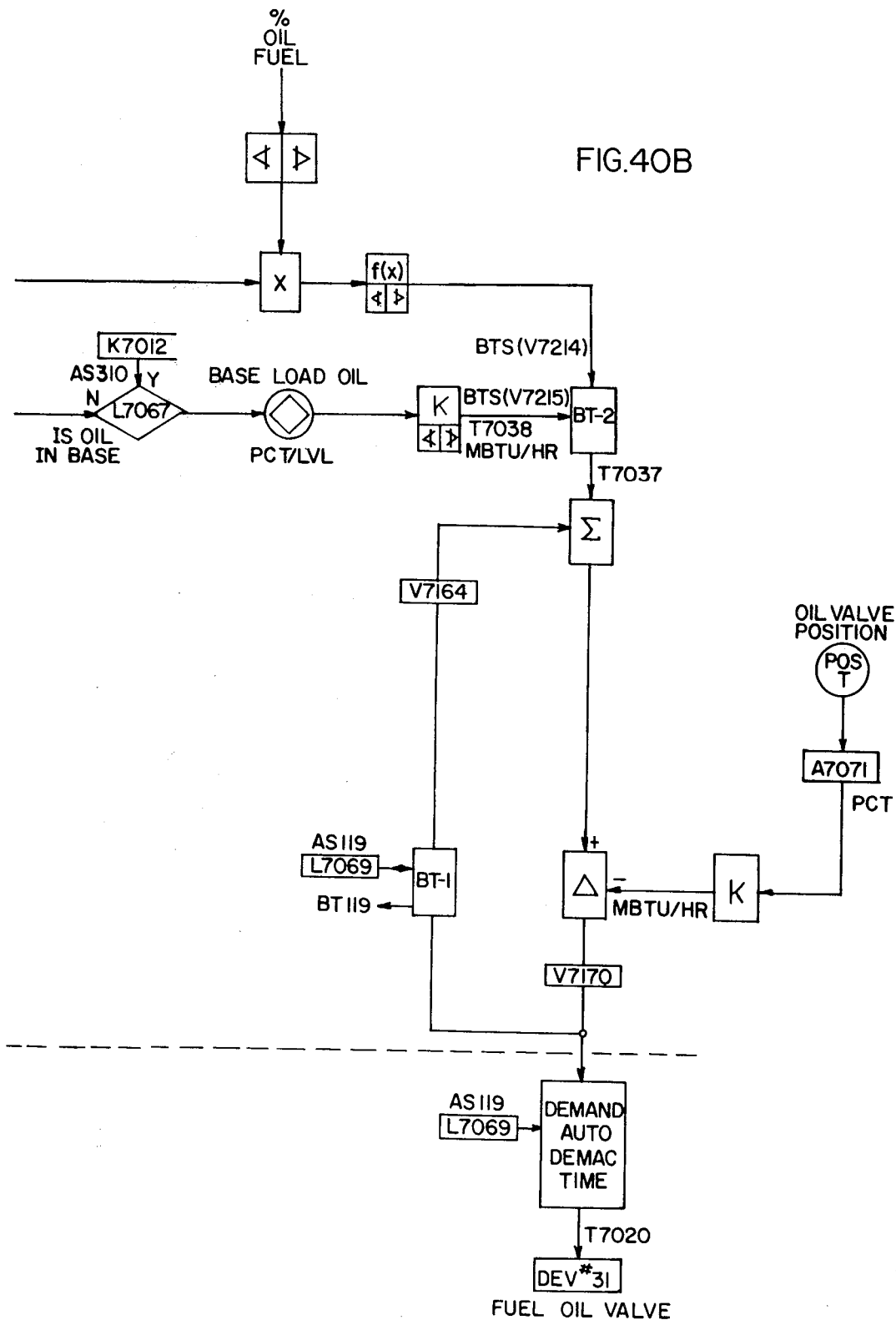
Figure 41B:
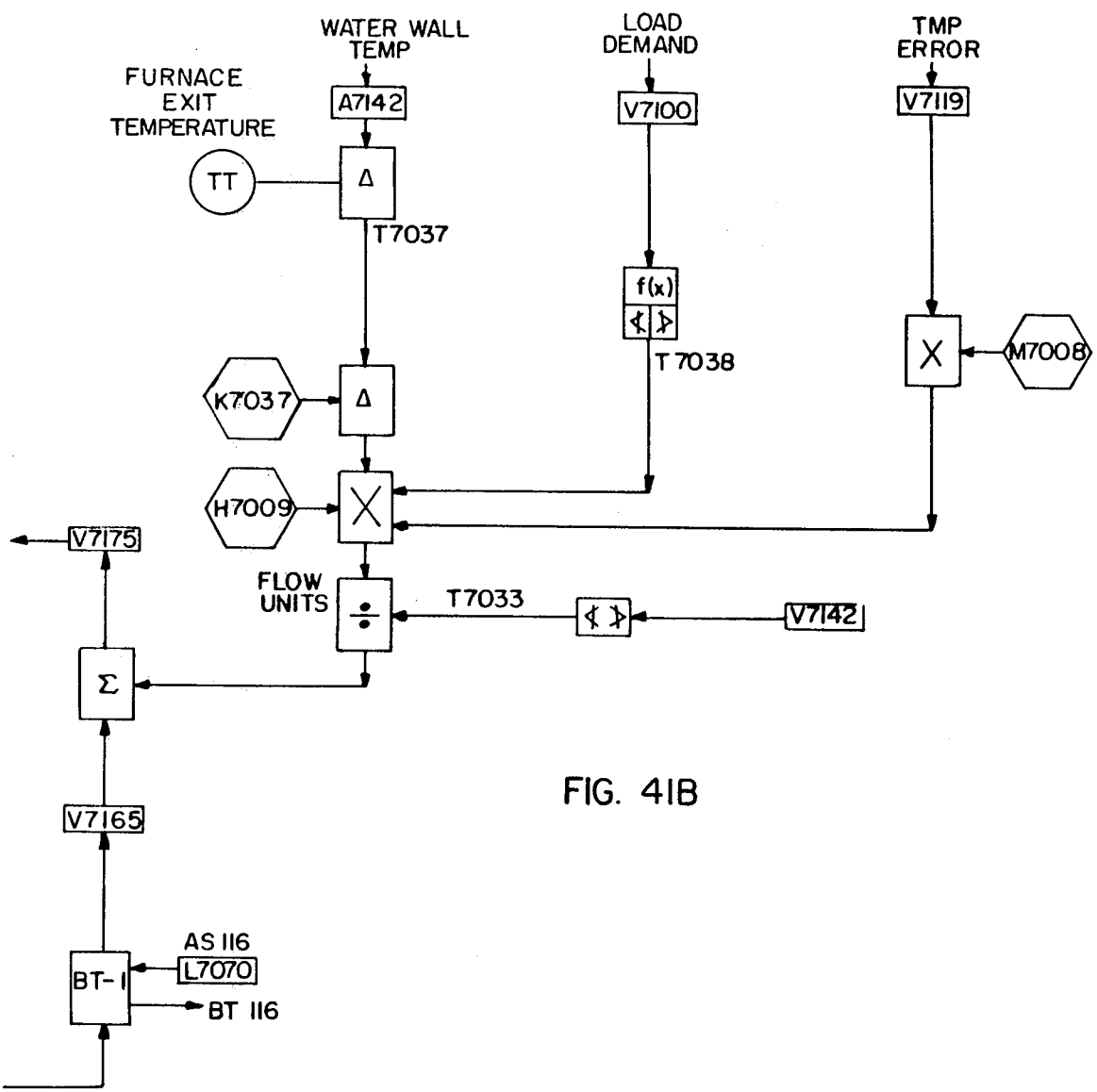
Figure 42:
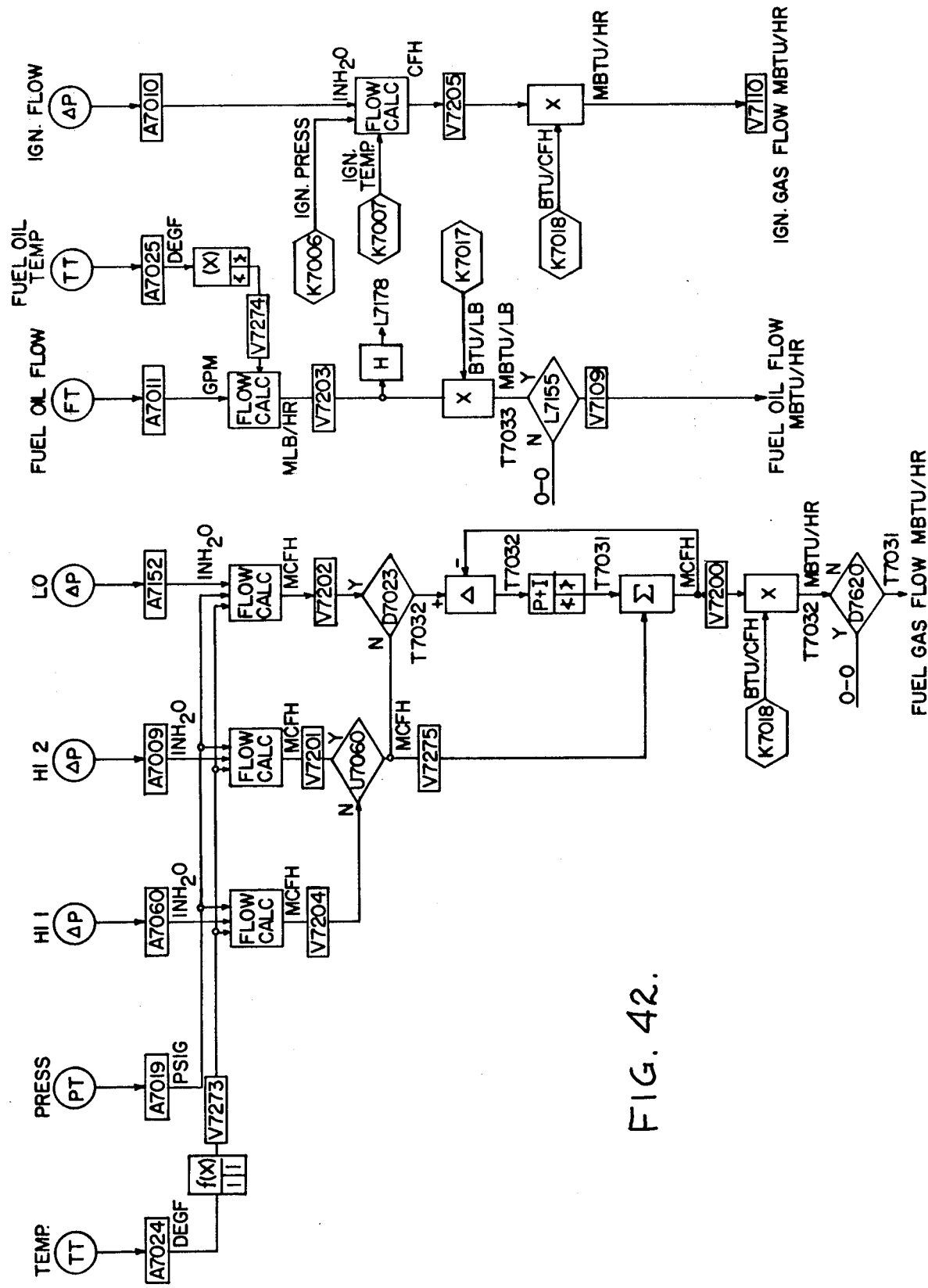
Figure 43:
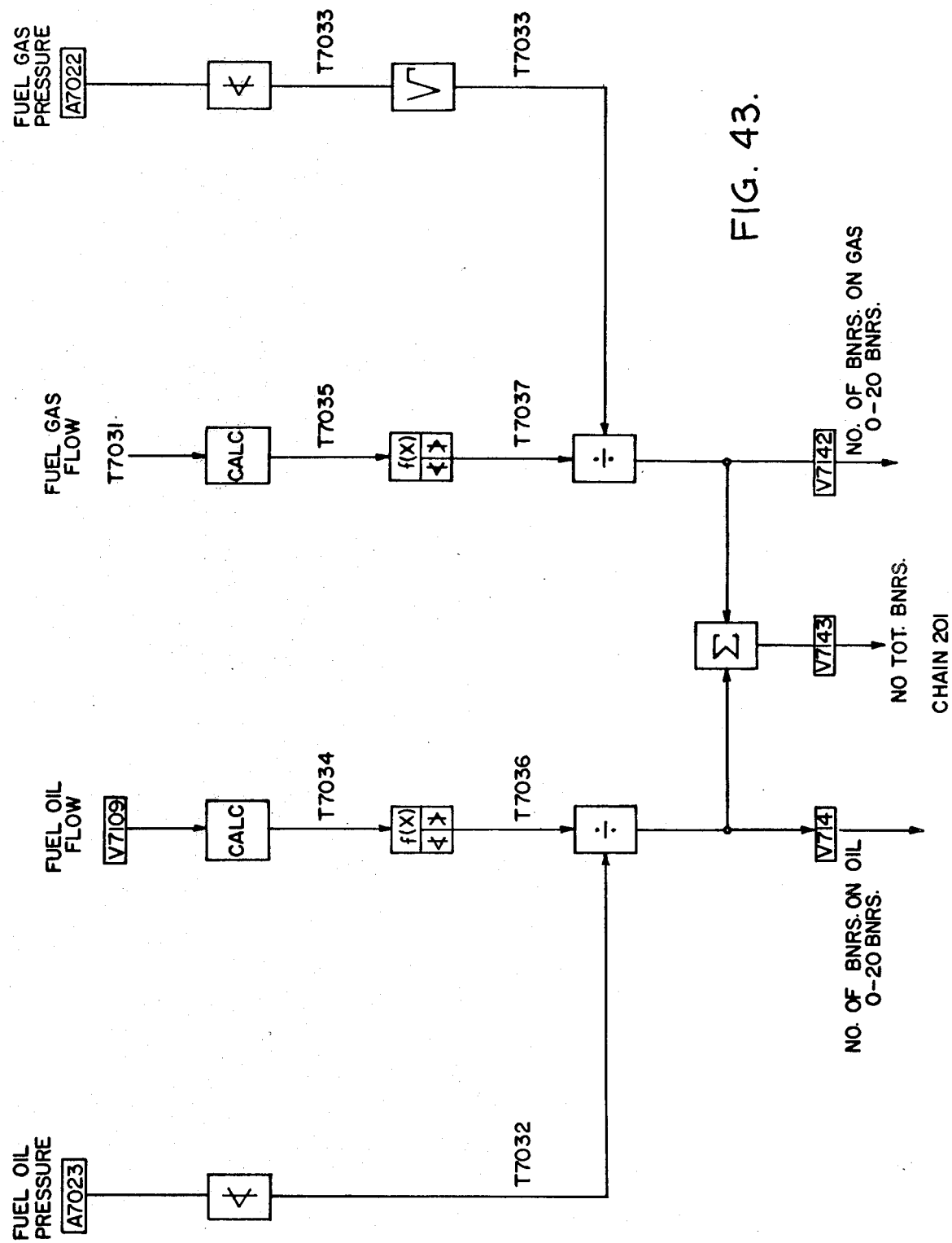

11.0 Temperature Error Control And Logic—FIGS. 38–40

11.1 General

Correct steam temperature results from providing the proper balance between feedwater input and the firing rate. The main outlet steam temperature is measured and compared with its setpoint. Any deviation in temperature is used in trimming the balance between feedwater and firing rate. The firing rate and feedwater controller provides the signal to both fuel and feedwater system increasing one while decreasing the other as required to maintain uniform final steam temperature. Steam temperature is stabilized by spray injection to minimize temperature deviations during transient disturbances and maintain uniform outlet temperatures throughout. These controls are arranged so that when temperature is returned to setpoint through operation of feedwater firing rate system, the injection spray returns to its normal setting. This is accomplished by comparing the average temperature difference across the desuperheaters against the setpoint. Any deviation is summed with final superheat steam temperature error and used to trim the firing rate feedwater ratio as described above.

Temperature control anticipation is provided by measurements of waterwall outlet temperature. This temperature is used as an auxiliary signal to the firing rate feedwater controller causing its output to change proportionally with the rate of change in waterwall temperature. This improves control on upsets from wall blowing and feedwater temperature excursions caused by changes in the heat cycle performance. A cavitation protection monitor for the recirculating pump provides alarm closure if the waterwall pressure falls below a safe value for the existing temperature.

11.2 Temperature Error Logic

Conditions required to have automatic control of the temperature error system are as follows: (1) firing rate feedwater rate controller selected automatic by the operator, (2) bumpless transfer error tracking is within specified tolerance, (3) the boiler control is on base mode C operation, (4) waterwall pressure control is on automatic, (5) the boiler is not tripped, and (6) the computer is selected.

Item 1—Rejects from this mode will occur if the boiler is tripped.

Item 2—Boiler control rejects from space mode C or higher operation.

Item 3—Waterwall pressure control is on manual.

Item 4—Arrow associated analog inputs become unreliable.

11.3 Temperature Error Program

Temperature error of both lanes superheater outlet and the temperature difference across both desuperheaters are set to a summer and averaged. This average value is then used in the total temperature summation controller.

Waterwall temperature is controlled to keep it within the limit which is characterized by waterwall pressure.

Two P-PI controllers sum the error condition off of waterwall and feed the total temperature error controller.

The total temperature error is sent to feedwater and firing rate control systems in parallel. The signal which functions as a trim in the feedwater system is based about 1.0 and increased or decreased depending on temperature error. This effect is proportional and will modify the feedwater control only as long as temperature error exists. Meanwhile, the correction fed to the fuel system is integrated and long term temperature error conditions will create an offset in the temperature controller. This temperature error controller thus provides for long term temperature error correction and may deviate up and down somewhat with the amount of BTU content changes as seen in the fuel being burned. Bumpless transfers are provided for the scale values which are provided to either feedwater or fuel systems such that transfers can be made back and forth from temperature error without upsetting the system.

P2000 Dual Channel Monitor Modification

Introduction

The modifications of the monitor for the P2000 computers includes addition of a second analog input handler, a second contact output handler, and other miscellaneous changes to expand base features as required by a total DDC process controller. This description will list in detail modifications to P2000 standard monitor as expanded to handle the additional input/output devices. Material described includes symbolic dump disc sectors for the P2000 monitor, card listing of modified initialization deck, written description of each of the areas which required revision, and printout of revised monitor assembly.

General Information

A handler in the P2000 monitor functions to control hardware subsystems by utilizing specific hardware parameters to operate this subsystem. The analog input handler triggers the hardware to read a word-channel and bit combination which defines a transducer input and recognizes a completion interrupt when the operation is finished. The operation is broken into two parts.

First, the analog input executive program services the hardware for the number of points to be read and stores the value of the points in a value table. The second operation is recognition of a completion interrupt by separate programming which includes protection against failure of the interrupt to occur from the hardware subsystem. Both of these areas require modification in the software to make the dual VIDAR system capable of operating with separate analog handlers in an asynchronous fashion.

The computer contact output handler was modified in a manner similar to that of the analog input handler. Here again, the handler consists of two main categories. First, the control program portion which operates the main hardware subsystem and second, the completion interrupt software. As above the computer software must both control output operations and provide protective features to attempt to define when misoperation has occurred, for example lost completion interrupts.

Specific Analog Handler Modifications

The following is a list of features which are affected in the analog handler subsystem:

Item 1—Refer to initialization card deck listing included as part of this description.

Item 2—Throughout descriptions, handler indicated as number 1 will be allocated for use by the DEH Control and Turbine programs. The Boiler control package in both cases use handler number 2.

Item 3—Each of the handlers are required to have specific addresses for hardware image tables, and each handler will additionally have specially identified channel-word driver in the interrupt assignment numbers.

Item 4—Analog Input Executive handler number 2 and Span and Offset handler number 2 are fully documented in the initialization card listing. This is due to the fact that each of the additional handlers is a duplicate of the original with specifically defined names and addresses which have been included in the revised monitor by use of insert statement codes. In most cases the secondary handler contains mnemonic identification which addends a 2 to the end of the symbol which is defined for use in the number 1 handler. Where symbols have been defined in the number one handler which use all eight available characters, the end character has been dropped and reused to define the second handler mnemonic.

Detailed Analog Input Handler Modifications

Item 1—Addition of analog input executive number 2.

Item 2—Addition of span and offset handler number 2.

Item 3—Interrupt 1 [octal] is completion interrupt for analog system number 1 used by the turbine. Interrupt 5 [octal] is used by the analog input system number 2 and is used in conjunction with boiler analog inputs.

Item 4—Addition of the second analog handler required modification of 60-cycle sync and time countdown routines which are part of the P2000 monitor. By comparing the initialization card deck listing against the symbolic dump of a standard P2000 monitor for cards numbered 1168 through 1248, statement additions and modifications can be determined. For this portion of the handler it was necessary not only to add additional codes with two's addended, but also to modify original coding addresses in mnemonics to be able to insert the additional handler coding and achieve desired results.

Item 5—Modifications were also required in the power fall routine such that at any time that power is reapplied to the computer, the power fail request processor must rreinitialize flags in the analog input handler. These flags are: PANIF, PIFLG, PLVAL for the handler number 1 and for handler number 2 PANIF2, PIFLG2 and PLVAL2.

Item 6—The external interrupt processor routine normally included as part of the standard monitor additionally required insertion and modification of some of the addresses within the standard routine to accommodate the second analog input handler.

Item 7—Program calling sequence for analog input handler number 2 will be by use of a call statement for Fortran language: CALL M:ANI2 [N, ADBUF, VALBUF, FLGWRD]. The similar language call is: SST M:ANI2,B. The calling sequence is identical to that referred to in monitor reference manual [TP043], paragraph 5-17. The only modification is that handler number 1 is called using M:ANI while handler number 2 is called using M:ANI2.

Item 8—The calling sequence for the span and offset calculations in Fortran language is CALL M:SPNADJ. For the second span and offset handler the calling sequence in Fortran is CALL M:SPNAD2. The assembly language calling sequence is SST *M:SPNADJ,B and for the second handler it is SST *M:SPNAD2,B. Both span and offset calculation routines function as described in paragraph 5-19 of the monitor reference manual TP043.

CCO Handler

Item 1—Refer to monitor initialization card listing or listing of second CCO handler.

Item 2—The comments made regarding input handler coding changes between number 1 and number 2 applies similarly to the CCO handler number 1. The basic handler and image table is handled as an insert of statement at card location 2910 in the symbolic dump P2000 monitor card listing.

Item 3—Each of the additional routines required for processing the extra interrupt for the analog system has also been modified for the contact output handler number 2.

Item 4—The contact output handler calling sequence for handler number 1 is described in the monitor reference manual TP043. Here also the contact output handler in TP043 describes the calling sequence for handler number 1 in paragraph 5-14. Modification of the calling sequence for Fortran coding is CALL M:CCO2[N,PATBL, REGTBL, MSKTBL]. The assembly coding is SST *M:CCO2,B with four following data statements.

Diagnostic Hardware Testing

Item 1—The standard P2000 diagnostic test loaded with normal P2000 monitors may also be used for this specially modified P2000 monitor. The primary difference between loading and using either the analog number 1 or number 2 handler are the addresses that must be initialized in the diagnostic test when loading. In using the monitor in this manner it must be remembered that each handler has specific hardware assignments and coupling between handler number 1 and handler number 2 or vice versa cannot be performed. If attempted, meaningless results will be obtained from the hardware.

Item 2—In reference to monitor initialization card decks each of the image tables for the analog and contact output hardware is divided into two groups, turbine inputs or outputs and boiler input/output. Use of the remarks tabulated on the monitor listing in conjunction with the system drawings will enable quick identification of boiler or turbine hardware and associated addresses which will indicate the respective test handler to be used in the diagnostic tests.

Item 3—In attempting to use this monitor for diagnostic tests more difficulty will be encountered than if using diagnostic monitored tests provided as part of a single channel system. Normally diagnostic testing with this dual handler monitor would be performed to develop confidence or reliability factors for the secondary handlers and their specific hardware.

Other Modifications

Item 1—Modification in the disc handler zero transfer status error detection.

Item 2—Elimination of the "2" stop as associated with disc transfers.

Item 3—Elimination of the "EE" stop as associated with extraneous interrupts.

Item 4—Modification of the 60-cycle sync countdown routine to process the DD card more frequently [at one-half second intervals] than is normally performed on P2000 systems.

3.0 Total Unit Operation Panel 3.1 General

The total unit operator's panel as shown in FIGS. 10A, B and C is the focal point of the power plant Boiler/Turbine operation. It has been designed to make use of the latest digital techniques to provide maximum operational capability.

The total unit panel is divided functionally into four sections: turbine automation and control, boiler automation and control, plant unit master, and the power plant supervisory computer. Each section of the panel contains two digital displays with five windows each along with setpoint and control action pushbuttons. One keyboard is provided which is common for data entry for the entire system.

The panel concept is unique in that during the startup phase of the plant the turbine is controlled as individual systems from the TURBINE portion of the panel and the boiler as an individual system from the BOILER portion of the panel. During the plant startup the PLANT unit master panel only has the plant START lamp lighted. Boiler manual may or may not be lighted depending if feedwater is on automatic or manual.

Once the main breaker is closed, plant control may be transferred to the plant unit master section of the panel. The plant supervisory (COMPUTER) panel is in service at all times.

The panel contains two methods of communicating information and control action between the operator and the plant controller programs. The first method is through a series of pushbuttons and keyboard which may initiate a number of diverse actions, while the second method is through a group of monitor lights and meters which continually display important operating information.

Most pushbuttons have momentary action and their single normally open contact is connected to a diode matrix. Operation of a pushbutton energizes a common interrupt for the operator's panel and applies voltage to a unique combination of 6 bits assigned to a pushbutton decoder. The diode matrix may be used to identify up to 60 pushbuttons; when a pushbutton is pushed the interrupt will be read within a matter of milliseconds and the bit combination stored in core memory for further processing.

The pushbutton interrupt causes the panel bit pattern to be interrogated by appropriate controller programs repetitively until a pattern change indicating the pushbutton has been released. This scheme allows raise, lower or test action to be continued as long as the button is depressed.

The two operator panel interrupts cause the PANEL INTERRUPT PROGRAM to run which in turn bids the operator control program after determining which CCI has operated. The Operator Panel Program is divided into three subroutines named BOILER, PLANT and TURBINE.

For the boiler portion of the panel all pushbuttons used as Manual/Auto, increase, or decrease are directly wired to the computer. Both contacts from the increase/decrease pushbuttons are wired in parallel and presented as a single contact. All contacts are handled as non-multiplexed inputs which are wired internally in the computer, to sequence interrupts. The sequence interrupt occurs when going from open to closed, or closed to open.

Each of the buttons on the operator's panel are backlighted. When a button is pushed the backlight will turn on if certain logical conditions are met, thus acknowledging to the operator that the action being initiated has been carried out. If the logical conditions are not met the backlight is not turned on indicating that the action being initiated cannot be carried out. The only exception to this is the increase/decrease buttons used with the boiler M/A stations which aren't back lighted.

A few of the buttons are digital push-push type which, when pushed once, initiate an action and when pushed again, initiate the action. Some of these also contain a split lens which indicates one action in the upper half of the backlight and another action in the lower half. In addition, certain backlights will be continuously flashed under particular operating circumstances or conditions. Dark lines on either side indicate a light only indicator.

Each of these latter special cases will be discussed in detail below where appropriate.

The buttons and keys on the operator panel may be listed in broad functional groups according to the type of action associated with these buttons. Typical groups follow, within individual button descriptions to be given in a later section.

Initiate Action

When any of these buttons are pushed they will initiate major operating changes in the plant control system. Typical changes are permitting an automatic dispatch or a remote computer to control the turbine, initiate auto or manual control of the turbine, and automatic synchronizing of the turbine or boiler manual/automatic station operation.

Display/Change System Parameters

These buttons allow changes to be made in the important parameters which affect the operation of this system. Examples are high and low limits, speed/load reference, and speed/load minimum settings, boiler control setpoints or plant unit master information.

Interrupt Action

These buttons will start or stop certain features of the control system. The most important case is that of speed/load reference adjustment process, which is carried out through use of the GO/HOLD buttons for the turbine or similar GO/HOLD buttons for the boiler control and for the Plant Unit Master.

Control System Switching

These buttons will alter the configuration of the control system by switching in or out certain control functions. Examples are: (1) for the turbine, megawatt feedback control and impulse chamber pressure control, (2) for the boiler, the placing of boiler stations on automatic or manual and the use of single pushbutton stations such as firing rate, feedwater or excess air auto/manual stations.

Manual Operation

These buttons allow the operator to control the position of the turbine valves directly from the operator's panel, and to control directly the electric motor actuators [EMA's] for the boiler valves.

Valving Testing/Limiting

The first group of these buttons allow automatic testing of the throttle valves during normal operation of the turbine; the second group adjust the valve position limit setting through raise/lower action.

Maintenance Test

This key lock switch allows certain special maintenance and test procedures to be carried out by the operator. Among these are tuning of the turbine control system during startup or shutdown periods. Selection of maintenance test transfers the turbine from automatic to manual control wherein the action also causes a rejection to separated control mode.

Keyboard

These keys and buttons allow numerical information to be sent into the P2000 and P250 computer programs. The operator need not know which buttons precisely go to the 250 computer or to the P2000 computers. Where necessary the pushbuttons make use of double wired contacts and the wiring system allocates circuitry to the particular computer such that the operators can only concern its plant operation and not which computer he is talking to or communicating with thorough use of the pushbuttons. Examples are control setpoints, speed/load limits, and status request information.

3.1.1 Data Entry Philosophy For The Total Panel

When the operator desires to display and/or change any of the total plant system parameters, he must execute a sequence of events which will culminate in the desired actions. The keyboard in its mode of operation is common to all sections of the panel. The P250 panel section operates from the same keyboard; however, its application is described elsewhere.

In normal operation the keyboard will belong to the COMPUTER portion of the panel. When desiring to enter setpoints in the control or turbine control constants the following pushbutton sequence is used: (refer to drawing 708J050).

1. Push setpoint FD BIAS, this will cause this value to display in appropriate windows. The pushbutton will backlight. The previous light will go out when changing displays.

2. Push BOILER, PLANT, TURBINE SET PT which will backlight indicating the keyboard belongs to the last operated setpoint on data entry.

3. Use the keyboard to enter the appropriate number. The new value will appear in the demand window (right most of pair).

4. The number will be entered when operating the EXECUTE/ENTER pushbutton, or canceled when using STOP/CANCEL button. If the number is canceled backlighting of BOILER, PLANT, TURBINE SET PT is terminated returning use at the keyboard to the COMPUTER panel.

In normal use the keyboard belongs to the COMPUTER section. However, the BOILER, PLANT and TURBINE take precedence over COMPUTER uses of the pushbuttons. For example, if during sequence of VISUAL display for a COMPUTER input it is desired to change MW REF operation of BOILER PLANT TURBINE SET PT will cause termination of visual display operation which if desired must be reinitiated.

The operator pushes the appropriate button; the programs then display the current value of the parameter in the REFERENCE window while the DEMAND window is cleared to allow for keyboard entry.

If the operator wishes only to observe the parameter value, he will then do nothing else. The value remains in the REFERENCE window until some new action is initiated.

If the operator wishes to change the parameter, he will then type in on the keyboard the new value which he desires. This will be displayed in the DEMAND window on the panel but will not yet be entered into the programs.

If the operator is satisfied with the new value as it appears in the DEMAND window, he may then enter the quantity into the operating system by pushing the ENTER button [which will be described in more detail below].

If for some reason the operator is not satisfied with the value as it appears in the DEMAND window, he may push the CANCEL button [which will be described in more detail below]. This will remove the number from the DEMAND window and allow the operator to begin a new sequence of events for the parameter if he so desires.

Assuming that the operator was satisfied with the number and that he pushes the ENTER button, the new value of the parameter will also appear in the REFERENCE window. This is an acknowledgment that the programs have accepted the number and are using the new value from that moment on.

If for any reason the numerical value entered into the program violates programmed conditions [such as high limits, less than low limits], then the entire operation is aborted and the INVALID REQUEST light is turned on.

If for any reason the operator does not desire to retain the value he entered, he can press the RESTORE button and obtain the original value before entry. The restore button is functioned with a few setpoints which are described below.

3.1.2 Method Operation For The Reference Display And The Center Display

The above description of data entry is modified somewhat when the operator wishes to change the reference. Because this reference controls the values or critical loops directly, it is essential that the operator have a unique handle on this quantity so that he may start or stop reference changes quickly and easily. This is accomplished by the use of the GO and HOLD buttons in conjunction with the reference [REF] button.

The GO and HOLD buttons control two possible reference states. These states indicate whether the reference and the demand are equal or unequal. When these quantities are equal, both the GO and HOLD backlights are off; when the quantities are unequal, either the GO or the HOLD backlight is on. If the GO light is on this means that the reference will be changing to meet the demand. Should the operator wish to stop the reference he simply pushes the HOLD button, which then backlights and holds the reference at its current value. When the operator wishes to start the reference moving toward the demand he must push the GO button, which backlights and enables the reference to begin adjustment.

The sequence of events for changing the reference follows.

The operator pushes the REF button; the programs then display the current value of reference in the REFERENCE window and the current value of demand in the DEMAND window.

If the operator wishes to change the demand, he types on a keyboard a new value. This will be displayed in the DEMAND window, but will not yet be entered into the programs.

If the operator is satisfied with the new value he pushes the ENTER button; this will place the new demand value in the programs and turn on the HOLD light. Actually, the HOLD LIGHT will turn on with the first entered digit of the new demand value.

In the normal mode of operation the reference and demand displays contain the following information:

TABLE 1

| Display | Boiler | Plant Unit Master | Turbine |
|---|---|---|---|
| Reference | Actual Feedwater Flow | Actual MW | Actual Speed/Load |
| Demand | Desired Feedwater Flow | Desired MW | Desired Speed/Load |

3.1.3 Data Display Operation

The operator's panel also contains six digital displays which are provided with five windows each. The left display, labeled reference, presents information that is either scanned or computed by the programs. The right display, labeled DEMAND, presents information that is being entered as setpoint data from either the operator's panel or the remote devices.

Under certain operating conditions these displays will present special information according to preplanned logical situations. For example, during wide-range speed control the REFERENCE display contains the rate-limited and the high-limited turbine speed setpoint. The DEMAND display contains the desired final speed setpoint entered by the operator or computed by a turbine acceleration program.

When the generator circuit breaker is closed the display values are megawatt units and the Plant Unit Master, prior megawatts will be zero but a low tracking limit of approximately 20 will be displayed in the window.

3.2 DEH Turbine Operator's Panel Section
3.2.1 Operator Panel Monitor Lights and Mirrors There are 11 monitor lights on the DEH panel which display the status of important variables, transducers or system conditions. The lights automatically turn on when programmed logical conditions exist, indicating to the operator failures in equipment. Under normal operating condition these lights are off.

In addition, the panel contains meters for aggregate throttle valve position and aggregate governor valve position.

3.2.2 DEH Turbine Button Operation

A brief description of the operation of each button on the turbine panel section.

Initiate Action Buttons

Auto Sync Option

When pushed, this button permits the automatic synchronizer equipment to synchronize the generator power system by indexing the reference. This feature is being programmed by the customer reference his documentation.

Remote Coordinated
[Automatic Dispatching System]

With this button the boiler turbine operator gives permission for an Automatic Dispatching System to operate the turbine load reference. Rejection to Local Coordinated occurs when a computer transfer is in progress.

Operator Auto

When he pushes this button the operator takes control of the turbine on automatic. Prior to obtaining control, the button must be flashing, indicating that the control has tracked and is ready to assume automatic control.

Display/Change System Parameter Buttons

Reference

This button inititates a display for change of the DEH reference value for speed or load.

RPM/MW Per Min

This button is used for entry of two types of values speed and load rate of change per minute. The value being entered is dependent upon the present status of the main generator breaker. If open the entry through this button is RPM per minute. If closed the entry is megawatts [MW] per minute.

This button initiates a display or change of minimum RPM rate used in the DEH programs. A new value which is greater than the maximum permissible acceleration rate of 800 RPM per minute is not accepted, and the invalid request light is turned on.

This button initiates a display or change in the minimum MW rate used in the DEH programs. A new value which is greater than the maximum rate of 15% per minute is not accepted, and the invalid request light is turned on.

It should be noted that for this group of buttons which display or change DEH system parameters, consecutive changes of a given quantity such as reference will not require pushing the button repeatedly. Once any button has been pushed, the new data may be entered continuously as long as no other button has been pushed. The backlight on the last button pushed stays on until some other button is pressed.

Interrupt Action Buttons

GO

When this button is pushed the DEH programs will proceed to adjust at reference value [which positions the turbine valves] until the reference equals the demand requested by the operator. The updated reference will be displayed in the reference window so that the operator may observe it changing to meet the demand, which will be displayed in the demand window.

HOLD

Pushing this button will interrupt the reference adjustment process and will hold the reference at the value it had at the instant the HOLD button was pushed. In order to continue adjustment of the reference the operator must push the GO button in.

Control System Switching Buttons

Transfer TV to GV

When the operator pushes this button, he will switch control of the turbine throttle valves to governor valves. In turbine language this is part full arc to part partial arc admission. This pushbutton has a split lense; when control is on the throttle valves the upper half of the lense is backlighted. When the button is pushed to transfer control the entire lense will be backlighted during the time of transfer. At the completion of the transfer the bottom half of the backlight will be turned on to indicate governor valve control. Transfer back to TV control will occur only if the turbine is tripped. When the turbine is tripped or prior to latching neither TV or GV portions of the backlight are lit.

IMP In/IMP Out

This is a digital pushbutton with split lense which will switch impulse chamber pressure into or out of the DEH control system, with appropriate backlighting of the button. The DEH control system will automatically revert to IMP out on loss of the impulse pressure transducer.

MW In/MW Out

This is a digital pushbutton with split lense which will switch the MW feedback loop into or out of the DEH control system, with appropriate backlighting from the button. The DEH system will automatically switch to MW out on loss of the MW megawatt transducer.

Speed In/Speed Out

This button will replace the speed feedback loop into the DEH control system. Normally the speed feedback loop is in service; however, the DEH programs detect an unreliable speed input signal, the speed feedback loop is disabled and the speed channel monitor light is turned on. When the speed input becomes reliable, the DEH programs will backlight the speed control button, indicating to the operator that he may place speed feedback in service by pushing the button. When this is done the backlight is turned down.

Single Valve/Sequential Valve

This is a digital push-pushbutton with split lense with the upper portion indicating single valve turbine operation and the lower portion indicating sequential valve operation. The operator may transfer the single valve to sequential valve or from sequential valve back to single valve as he desires. This transfer takes approximately 3 to 4 minutes of time during which the button is flashing. The flashing is effectively a toggling action between the upper and lower portion of the button. Refer to the turbine operation manual for discussion when a plan should be in single or sequential valve and appropriate reasons.

TPC In/TPC Out

For this particular system the DEH control is provided with throttle pressure action. This button indicates the status of the associated control. This is digital push-pushbutton with split lense lighting.

Individual Monitor Light Description

Turbine Trip

This monitor indicates that the turbine auto stop system has been tripped. In fact, this means that the turbine is tripped in that either the house load breaker or the main unit breakers are open.

Control Channel Monitor

This light indicates a failure in the speed channel used with the DEH control system.

OPC Speed Channel Monitor

This light indicates the failure in the speed channel hybrid OPC control system.

Megawatt Transducer

This light indicates the failure of the megawatt transducer. Transducer failure is detected by analog comparators looking at either high or low limit failure condition.

OPC Pressure Transducer Monitor

This light indicates the failure of the reheat pressure transducer. This transducer is checked against high or low limit failure condition.

OPC Monitor

This light indicates failure in the OPC system and is turned on any time one or the other OPC monitor conditions exists as determined by the hardware.

Impulse Pressure Transducer Monitor

This light indicates the failure of the impulse pressure transducer monitor when compared against high or low limit values.

24V Transfer Monitor

This light indicates the power to the control system as being furnished by the emergency power supplies.

Throttle Pressure Monitor

This light indicates a failure in the throttle pressure transducer as compared against high or low level transducer values.

Hybrid Not Tracking

After a transfer from manual to automatic on a turbine has been made the hybrid system, which is the analog backup, continuously tracks to attempt a smooth automatic to manual transfer. In the event this analog hardware circuit cannot maintain tracking within specified limits of the automatic system the light will turn on. If an extremely fast load rate of change is made on the unit this light will probably come on for a period of time and then turn off when tracking reaches tolerance of the specified limits.

Maintenance Test Buttons

Turbine Maintenance

This is a key-lock switch which allows the operator to perform maintenance tests on the DEH system. It has two positions as follows:

Off

In this position no maintenance operations can be performed.

Test

This position switches the turbine to manual control and gives the operator access to certain of the system quantities. Among these are controller constants for turning or adjustments such as gains, time constants limits or other numerical data.

OPC [Overspeed Protection Controller]

This is a three-position dash-lock switch which allows the operator to perform tests on the OPC system. The positions are as follows:

Test Position
Initiates OPC action prior to startup.
In Service For Normal Operation
Overspeed Test
Lockout to permit test of mechanical auto stop trip.
Manual Operations Buttons
Turbine Manual This button will put the turbine under manual control of the operator. It is possible that the DEH logic system will detect a contingency condition and also place the turbine in manual control.

TV Lower

This is a decrease or lower button which as long as it is held down, will lower the throttle valves at a fixed rate.

TV Raise

This is an increase or raise button which, as long as it is held down, will open the throttle valves at a fixed rate.

GV Lower

This is a decrease or lower button which as long as it is held down, will close governor valves at a fixed rate.

GV Raise

This is an increase or raise button which, as long as it is held down, will open the governor valves at a fixed rate.

Fast Action

This button provides for a fast rate of opening or closing of the throttle or governor valves when in manual control. The fast action button must be held down at the same time as any of the four buttons described immediately above to achieve the fast action fact.

Valve Testing/Limiting Buttons

The first group of these buttons may be used to test the turbine valves or to display the status [position] in any valve. The keyboard is used in conjunction with these buttons to address a particular valve for test or status. Examples of operation are given after a description of each button.

Valve Test

This button initiates a valve test sequence.

Valve Status

This button initiates a valve status sequence.

Throttle Valve

This button indicates throttle valve tests where status sequence is to be carried out.

Governor Valve

This button indicates governor valve test where status sequence is to be carried out.

Close

This button initiates the test closing of a throttle and/or group of control valves at a controlled rate.

Valve Position Limit

This button displays the current value of the valve position limit setting. In addition, if the total valve position at the limit during operation this button will be flashed at an appropriate rate.

This button is also used in conjunction with the following raise and lower buttons to change the valve position limit setting.

Valve Position Limit Lower

This button is used to lower the valve position limit setting as long as it is held down the limit setting will be lowered at a predetermined rate built into the DEH programs. The limit setting will be continuously displayed in the demand window during the adjustment process.

Valve Position Limit Raise

This button is used to raise the valve position limit setting as long as held down the limit setting will be raised at a predetermined rate built into the DEH programs. The limit setting will be continuously displayed in the demand window during the adjustment process.

Keyboard

The DEH keyboard contains 12 buttons for numerical data entry into the programs. These include the integers 0 through 9, a decimal point and a minus sign. When the operator pushes these buttons the corresponding values are displayed in the demand window, moving from the right to left until the window is filled. There are also three additional buttons available for use with the keyboard.

Execute/Enter

When this button is pushed the DEH programs enter the value residing in the demand window into core memory for immediate use by the DEH system providing the value satisfies preprogrammed conditions discussed in other sections of this description.

Stop/Cancel

When this button is pushed, programs will delete any value in the demand window and abort the entire process for the keyboard entry of the variable selected heading.

TURB TROG Display

This button is used to initiate a display of any DEH program quantity not otherwise directly addressable with the unique button.

Boiler-Plant-Turbine Setpoint

This button is used to initiate action which allows the keyboard to be used by the control computers, rather than the plant monitoring computer. When addressing any functions in the BOILER, PLANT, TURBINE sections of the panel for data entry, this button must be pushed prior to any other actions. These quantities include pressures, temperatures and related variables. A dictionary will be provided so that the address of these quantities may be entered from the keyboard.

Turbine Automatic Startup
Turbine Auto Start

This button initiates the turbine acceleration program which will start, and accelerate, the turbine generator automatically. Once this button is selected, while in the operator auto mode, the periodic supervision programs will function.

Turbine Supervision

This button allows the operator to suppress supervisory messages which are part of the turbine auto start program during periods of turbine supervision. Once turbine auto start is selected the periodic supervision program will function. At any time a message is prevented it will automatically come out.

This button also has the additional feature that any time the operator wishes a review of any alarm messages he merely pushes turbine supervision button off and then on again. The result is a listing of all turbine messages on the control typewriter.

Override Alarm

This button will override certain alarm stops which the turbine startup program may detect. When this happens, the program waits for operator action before proceeding with turbine acceleration. If the operator decides to continue the startup he pushes this override button. The program will then resume execution.

Override Sensor Alarm

This button will override certain sensor alarm conditions which the turbine startup programs detect. When an input fails or is considered past limit conditions the program waits for the operator action before proceeding further with the turbine acceleration. If the operator decides to continue the startup he pushes this override button.

Return Sensor to Scan

When an input transducer, which is used by the turbine startup program, passes beyond limit conditions the sensor has failed and is considered unreliable. When this button is back lit the program is signifying to the operator that a sensor is out of scan conditions. Once the transducer has been returned to a serviceable state the operator presses this button and the sensor will be automatically added back to the scan of the inputs. All sensors currently out of scan will be returned to service if back in limits.

Miscellaneous Turbine Pushbuttons

Generator Control

This light is on when the special program being written by PG&E is executed.

4KV Transfer

This light is on when the special program being written by PG&E is being executed. The program is used to adjust bus voltage.

Latch

The turbine may be latched from the control room by operation of this latch contact providing permissive conditions required by plant logic are met. This button performs the same functions as the switches and levers on the front of the turbine.

Miscellaneous Backlight Indicators

COORD

This backlight indicates that the boiler and turbine are in a coordinated state receiving a boiler and plant reference from the plant portion of this overall operator control panel. When this light is on, the attempts to enter reference for RPM/MW must be made in the plant section. Attempts to enter a reference while the turbine is coordinated in the turbine reference will cause the invalid request light to flash.

When this light is on, load control of the turbine is from the plant section. This light is an indication of Boiler/Turbine load coordination being in service.

DECR SPD/MW

This light is lighted when the turbine startup program is decreasing speed reference. The light also indicates when the unit is operating on the automatic dispatch system and flashes as decreased pulses from the dispatch system are received by the plant. The light will turn on only as long as the increase or decrease automatic dispatch contact exists.

INCR SPD/MW

When turbine speed is being increased by the turbine program this light will be on. Similarly, if the Automatic Dispatch System is increasing the load reference, the light will be on as long as the dispatching system is increasing the reference. The light will turn on in pulse width periods from bearing from 1/10 of a second to a full second.

HOLD SPD/MW

This light is on when the turbine startup program is holding speed changes for example during heat soak periods.

3.3 Boiler Control Operator's Panel Section

The same philosophy applied to the turbine control panel is used for the boiler panel. The operational rules applied to the GO/HOLD and reference center operation apply to this section. For this panel section FW REF replaces the speed/load reference used by the turbine.

The GO/HOLD function is disabled from the boiler panel once the breaker is closed and control has been transferred to the plant unit master section.

Initiate Action

GO

When this button is pushed the boiler programs will proceed to adjust the reference value [which positions the boiler demand] until the reference equals the demand requested by the operator. The updated reference will be displayed in the REFERENCE window so the operator may observe it changing to meet the demand, which will be displayed in the DEMAND window.

HOLD

Pressing this button will interrupt the reference adjustment process and will hold the reference at the value it had at the instant the HOLD button was pushed. In order to continue the adjustment of the reference the operator must push the GO button again.

Boiler Manual Auto Stations

All of the automatic/manual [EMA] buttons can initiate logical sequence and [EMA] control position action. If a station is on automatic and either the increase or decrease button is depressed, automatic software transfer to manual takes place along with a respective increase decrease signal to the electric motor actuator.

In addition, other control logic may reject to manual states as required by the interlocking functions. Refer to FIG. 10 of the above identified, incorporated application Ser. No. 413,275, for typical diagram of manual auto station logic.

BE/BTB Transfer

This button initiates the transfer from BE to BTB valve operation on the boiler. The transfer causes change of participation of control from BE valve to BTB valve. This participation change is non-reversible and once complete can only be reset by a boiler trip.

Display of the BE/BTB participation is performed by pushing the BE/BTB valve transfer. The demand display above the boiler section will contain the BE/BTB participation value until another setpoint is selected.

Any attempt to enter a value for BE/BTB participation will create an invalid request condition.

Display/Change Boiler Control System Parameter Button

Setpoint Entry

The operator pushes the appropriate button, the program then displays the current value of the parameter in the REFERENCE window while the DEMAND window is cleared to allow for keyboard entry.

If the operator wishes only to observe the parameter value then he will do nothing else. The value remains in the REFERENCE window until some new action is initiated.

If satisfied with the new value in the DEMAND window, it may be entered by pushing the EXECUTE/ENTER button. However, when the operator is dissatisfied with the value as it appears he may push the STOP/CANCEL button. The new value, if entered, will be used in the very next calculation for that particular control loop.

After entry of a new setpoint the operator will be able to restore the prior value when operating the RESTORE function within one minute.

Procedural steps to perform this operation are: (1) Press BPT setpoint pushbutton, (2) Press setpoint to be entered, (3) Enter new setpoint value, (4) Press EXECUTE/ENTER button, (5) Press RESTORE button within allotted time period and observe return of the old value for setpoint condition.

The tabulation below can be used to describe a particular setpoint and its associated engineering units.

TABLE

| Setpoint | Engineering Units |
|---|---|
| FW REF | MLB/HR |
| *BFP-1 Bias | MLB/HR |
| *FD1 Bias | MLB/HR |
| *02 Setpoint | PCT |
| *Base Fuel Setpoint | MLB/HR |
| *FR/FW | Scalar |
| Excess Air Bias | % |
| Separator Press | PSIG |
| 1-BFP Lube Oil | DEGF |
| 2-BFP Lube Oil | DEGF |
| TURB Lube Oil | DEGF |
| TURB HYD | DEGF |
| Fuel Oil | DEGF |
| Generator H2 | DEGF |
| COND Cooler | DEGF |
| BRG CLG WTR | DEGF |

*Note: The setpoints so indicated make use of ramping which is described below.

At the time the EXECUTE/ENTER button is operated the HOLD light will be lit and the entry will not be complete until the GO light pushbutton is operated.

Interrupt Action Buttons

GO

When this button is pushed, the boiler programs will proceed to adjust the REFERENCE value until the REFERENCE equals the DEMAND requested by the operator. The updated REFERENCE value will be displayed in the REFERENCE window so the operator may observe it changing to meet the DEMAND, which will be displayed in the DEMAND window.

HOLD

Pushing the button will interrupt the reference adjustment process and will hold the reference at the value it had at the instant the HOLD button was pushed. In order to continue adjustment of the reference the operator must push the GO button.

FW MLB/HR [Rate of Change]

This button initiates a display or change of the rate used by the boiler control programs for base automatic. New values are accepted by the computer if ramping is currently in process. The maximum value which functions as a high limit can be modified through use of the maintenance panel.

Manual/Auto Operation

Figure 65:
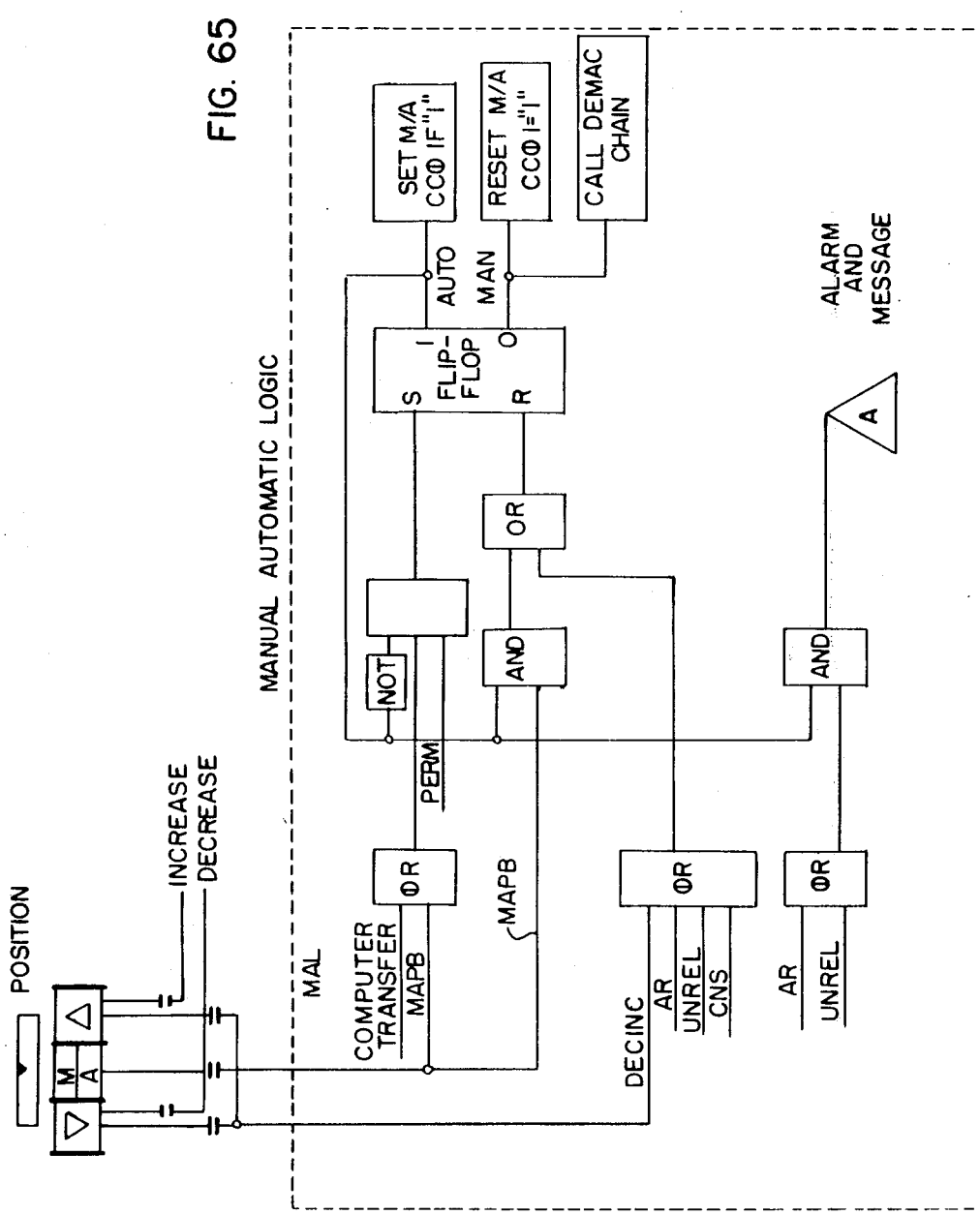
FIG. 65 relates to M/A station control.

All manual/auto stations perform the function described in Section 14.0, supra, and illustrated in FIGS. 64 and 65 and FIG. 10 of the above identified, incorporated application Ser. No. 413,275 of this design specification.

Several manual/auto pushbuttons exist and have no increase decrease buttons for position indicating meters. These pushbuttons provide only logical inputs that are used to vary the mode of control. Operation of each particular button will be described relative to its control, however each button is listed below:

FR/FW Ratio
Excess Air
Gas RECIRC/EXCESS Air
Base Load Gas
Base Load Oil
Base
Manual
Coordinated The last three lights are described for indication only. Each indicate a particular level of operation. The manual light is powered by a computer CCO which is responsive to cumulative MA status of the feedwater control loop.

Base

Indication is led when the feedwater base control is on automatic for the base mode of control FW REF provides the boiler reference which is reason for treating it like the load reference.

When the COORD light is on it represents that the boiler/turbine are in coordinated control. For this condition the load reference must be changed by the pushbuttons in the plant section of the panel. When in coordinated control the FW REF value may be displayed but not changed. The rate of change may be altered up to its upper limit.

Boiler Panel Monitor Light

Several panel lights are provided to indicate status of automatic control modes or plant contingency conditions.

COND RB

This light indicates that only one condensate pump is running and load has increased above its capability. The light is also lit from condenser circulation or booster pump failure.

FD Fan RB

Failure of an FD fan is compared to megawatt load and when insufficient capacity exists a runback will occur, this light will be lit as long as the runback exists.

BFP RB

Failure of a boiler feed pump turbine [BFP] is compared to megawatt load and when insufficient capacity exists this light will be lit.

Water

When this light is on this is indication that the feedwater loop is on automatic control.

Fuel

This light being on indicates that the fuel control is on automatic.

Air

Automatic control of air is indicated by this light.

Startup

This light being on indicates that the startup valve system is on automatic.

SH Auto

This light being on indicated the superheat temperature control system is on automatic and incorporates the two injection spray valves.

RH Auto

This light being on indicates that the reheat temperature control system is on automatic.

For all lights regarding water, fuel and air temperature indication is not affected by the level of coordinated control. As each prime control section is put on automatic the indicating light in both the BOILER and PLANT panel sections will be lit.

Plant Control

Operation of the plant using coordinated control is accomplished when any of the LOCAL COORD, REMOTE COORD, BOILER FOLLOW, or TURBINE FOLLOW pushbuttons are lit. For coordinated operation megawatt reference is set or adjusted by pushbuttons in the plant area of the control panel.

The plant section is not used until main generator breaker is closed and unit has transferred to coordinated control. All pushbuttons are disabled until the breaker is closed with only START and MANUAL lights being lit.

Display/Change System Parameter Buttons
MW/MIN

This button initiates a display or change of the megawatt [MW] rate used in the control programs. A new value which is greater than the maximum rate of some percentage per minute is not accepted and the INVALID REQUEST light will be turned on.

It should be noted that for this group of buttons which display or change plant parameters, consecutive changes of a given quantity such as REFERENCE require pushing the boiler plant turbine setpoint prior to entry. Once the Boiler Plant Turbine setpoint has been pushed, the new data must be entered and the execution button operated within 15 seconds. Otherwise invalid operation will occur. This timeout feature is primarily due to the innerface of the keyboard with three central references.

Interrupt Action Button
GO

When this button is pushed the plant reference program will proceed to adjust the reference value, [which positions feedforward to the boiler and turbine valves], until the reference equals the demand requested by the operator. The updated reference will be displayed in the REFERENCE window so that the operator may observe it changing to meet the DEMAND, which will be displayed in the DEMAND window.

HOLD

Pushing this button will interrupt the reference adjustment process and will hold the reference at the value it had at the instant the HOLD button was pushed. In order to continue the adjustment of the reference the operator must push the GO button again.

REFERENCE

This button initiates a display or change of the plant reference value for load.

High Limit

This button initiates a display or change of the high limit setting of the PLANT load reference. A new value of high limit which is less than the current value of reference is not accepted and the INVALID REQUEST light is flashed. Flashing continues until the operator cancels the operation.

Low Limit

This button initiates a display or change of the low limit setting of the PLANT load reference. A new value of low limit which is greater than the current value of reference is not accepted and the INVALID REQUEST light is flashed. During initial operation the reference will move until it is above the low limit. The reference will not be affected since normally this value is never in effect unless on coordinated control. At low reference conditions coordinated control is very unlikely.

Throttle Pressure Setpoint Bias

Throttle pressure setpoint bias is value entered to bias throttle pressure setpoint up or down as determined by the operator entry. The system calibration is in PSIG engineering units and the bias entry is on that basis.

Initiate Action
P2000-1 Computer Comp Failure

This pushbutton monitor light is used to indicate the control status of the P2000-1 computer. When this light is lit solidly or is lit steady the computer has failed. If the light is reset the computer controller is available for plant control. If the light is flashing this indication means that the controller has been recently reset and must be returned to service by operator actuation of the flashing pushbutton.

P2000-2 Comp Failure

The function of this button is identical to the one previously described above however the indication here represents the states of the P2000-2 computer.

Start

Start is a separated mode used from initial firing up to the closing of the generator breaker. This mode cannot be selected by the operator but is automatically selected when the unit is tripped in order to be ready for the next startup. During this mode the Speed/Load reference is providing the speed reference for the turbine control system which is in wide range speed control or on manual. The boiler control can be in any of the feedwater base modes with mode reference coming from the feedwater reference or on manual initiation. The boiler/turbine coordination control and contingency load limiting controls are not active at this time.

Control is automatically transferred to the Plant Manual mode when the breaker is closed. This is the only means of leaving this the START mode.

Plant Manual

Plant Manual is the separated mode used after synchronizing the generator and during certain contingency conditions. This mode cannot be selected by the operator but is automatically selected when the base manual control stations are transferred to manual or the turbine is not an automatic control.

Ramp

Ramp is coordinated mode used to increase the load on the unit from synchronizing conditions of 1000 psig to 3500 psig. Ramp mode is used only to ramp the pressure between the two values specified and in the increasing direction only. Pressure will not be ramped down for this unit. This mode can be entered only by operator selection and only from plant manual mode when the boiler is on the bypass system. The boiler fuel, water, air and base must be auto and turbine control with speed and temperature corrections in. During this mode the feedwater reference is providing a demand to the boiler control system.

Local Coordinated

Local Coordinated is one of the coordinated modes when the plant is operating without any contingency or limiting conditions. The load demand and rate of change are established by the operator using the pushbuttons in the PLANT section. This mode can be entered by operator selection from the Ramp mode upon completion of the ramp or from any of the three contingency modes Boiler Follow, Turbine Follow or Plant Manual [when off the ramp].

Remote Coordinated

Remote Coordinated is another coordinated mode when the plant is operating without any contingency or limiting conditions. The load demand and change and megawatt rate of change are being received from the automatic dispatching system.

This mode can be entered by operator selection from the local coordinated mode only if the ADS system is available and has not failed. During this mode the megawatt reference in the plant section is being increased or decreased from the remote dispatching system.

Turbine Follow

Turbine Follow is a coordinated mode used when a boiler load limiting or contingency function exists. This mode is automatically entered when a boiler contingency as defined in the plant unit master section occurs or by operator selection.

Boiler Follow

Boiler Follow is a coordinated mode used when a turbine load limiting or contingency function exists. This mode is automatically entered when a turbine contingency exists such as valve position limit or by operator selection. The boiler must have fuel, water and air and base on automatic, the turbine with speed and megawatts correction out of service and the ramp completed.

During this mode the reference is entered in the plant reference and limited by High/Low Limit buttons.

Startup Light

Light indicating startup controls are on automatic. Refer to Section 5, supra. for description of Startup system. For this and the other automatic status buttons the operator has the capability of interrogating the control system to determine any lack of permissives of automatic rejects which may exist which prevent automatic operation of the plant. By pressing the particular button desired the operator can receive a printed review on the control typewriter indicating all permissives or rejects are currently in alarm.

Feedwater Auto

This light indicates the automatic status of the feedwater system and also has interrogation features as mentioned immediately above.

Air Auto

This light indicates air dampers are on automatic and the system also has capability of interrogation as mentioned above.

Fuel Auto

This section light indicates that the fuel system is on automatic. This sytem also has interrogation features on limiting condition.

Superheat Auto

This light indicates when the superheat controls are on automatic and interrogation features are also provided.

Reheat Auto

This light indicates reheat temperature controls are on automatic. Interrogation features are provided for the logic.

Select P2000-1 To Control

When this button is lit operator receives indication that the P2000-1 BOILER/DEH computer is in service and controller the plant. If this light is not lit the operator should observe the monitor failure light above on the plant section of the panel to determine the status of P2000-1 computer in regards to availability as a backup. If unit control were to be concurrently on P2000-2 the operator may initiate a transfer of the control system from 2 to 1 by operating this pushbutton.

Select P2000-2 To Control

This button when backlighted indicates that P2000-2 computer is in control of the boiler/turbine process.

When P2000-1 is in control a transfer may be initiated by operating this button. As soon as it is backlit the transfer has completed. If this light is out the operator must look at the P2000-2 computer failure monitor light above to observe the actual status of the computer.

Individual Monitor Light Description

Computer Transfer Disable

When this light is lit the data link which transmits pertinent information relative to automatic computer transfer is unavailable. Restoration of the data link may be attempted by actuating this pushbutton when it is backlighted. If the light does not go out within 10 seconds after pushbutton operation the maintenance technicians should be advised to begin diagnostic testing of the data link system. When restarting either P2000 computer after a shutdown it may be necessary to push the computer tranfer disable pushbutton prior to restoration of service on the data link.

Max. Limit

Light to indicate when a runback has occurred causing maximum load restriction to a safe value.

Min. Limit

Light indicating a run up has occured causing minimum load restriction to a safe value.

Boiler Contingency

Light showing when any runback or run up is in effect. Also, the light is lit for BFP, FD, Condensate Pump, Condenser Booster pump runbacks.

Turbine Contingency

The only contingency causing initiation with this light is a governor valve limit indication.

Deviation Limit Control

This light is lit when a deviation limit system is in operation.

Control T/W Failure

This light is lit when a control typewriter is failed out of service. The operator has the capability of actuating this pushbutton. A toggling effect will occur. The computer will respond to an operator initiation and either remove from service or restored to service the typewriter device. This feature is provided for the benefit of maintenance personnel. If the light is back lit, the typewriter is failed. Operating the pushbutton when this condition exists will restore the device to service. If the button has not backlighted then actuation will fail the device for maintenance purposes.

Computer Transfer Program (BLOGIC Subroutine)

General:

This program performs three functions while interacting with several other programs. The prime feature is the calculation of "computer selected" for control. Once a computer has been "selected", or in some cases "unselected", logic must be performed which properly aligns the computer programs to its status as regards being in control or standby mode.

The final function performed is that of processing logic associated with the operator panel GO/HOLD pushbuttons for the Boiler Feedwater Reference, and the Plant Load Reference.

Theory:

The operating status and mode of control is extremely critical to the Boiler/Turbine operation. Thus, when a computer is brought into service or taken out of service, transitioned from control to standby, or transitioned from standby to control, precautionary steps are employed which protect the plant from misoperation or tripping.

Logical calculation used by this subroutine require the input status (CCI's) of both controllers, i.e. controller reset for control or not operational, and which of the two computers is selected for control. From evaluation of these items above and others, the calculation is made that determines if the particular controller is SELECTED FOR CONTROL.

Additionally, when a transfer is performed, the computer must take appropriate steps to see that certain programs operate once a transfer has occured.

If the transfer is from standby to control the logic will effectively push the forty-four (44) M/A station pushbuttons attempting to transfer them from manual to auto (if the P2000-1 to P2000-2 data link was in service prior to the transfer). Other functions, such as ATS program initiation, bidding of Boiler/DEH logic programs, resetting a message writer alarm bit table, disabling the data link for a ten minute period, and resetting of the M/A status update table also occur.

If transfer is from control to standby, the logic will effectively reject all M/A pushbuttons to manual by setting the logical COMPUTER NOT SELECTED which holds all stations in manual tracking mode. The turbine control will be rejected by setting of the NOT-SEL logical value.

Program:

Computer transfer logic utilizes a combination of contact inputs, operator action and calculated logicals to determine if a particular computer is to be SELECTED FOR CONTROL. Refer to FIGS. 11A and 11B in Ser. No. 413,275.

Computer 1:

In order to SELECT1, computer 1 for control, the contact ONEALIVE must be true, and the machine RESET and ready for control. For this condition, the computer 2 is in control and computer 1 as standby. Two events can now initiate the transfer; first, a failure of computer 2 is detected as FAILTWO being true and TWOALIVE CCI reset causing the setting of SELECT1, and second is operator action of panel pushbutton 178 asking computer 1 to be selected. The logic is designed such that a reject will override a select for these conditions.

Note that if the computer 2 is not failed, FAILTWO reset, and computer 1 not failed, FAILONE reset, the operator can select computer 2 for control by operation of pushbutton 179.

If plant control is on computer 2 and computer 1 is not presently reset, CCI ONEALIVE is reset, the operator can set SELECT1 by use of pushbutton 178, as the reset overrides him and contact ONEALIVE being false, causes the attempted transfer to be ignored by computer 2.

Computer 2:

Features of transfer for computer 2 are the same as for the computer 1, however the names will change from one to two, etc.

Computer Selection Transfer:

When transferring from standby to control, the following items are processed and according to the plant conditions may effect control transfers back to automatic.

For standby to control transfers, the computer 1 to computer 2 data link must be operational thus allowing the automatic status past history to be updated in the standby computer's memory. (1) Once this has occurred, any transfer initialization will result in bidding of control logic programs and placement of all stations on auto if proper permissives are satisfied. (2) A message will be printed on the control typewriter that a transfer has occured and what time it occurred. The control room annunciator is also alarmed. (3) The demand CCI scan for the turbine is placed into service. (4) ATS programs are initiated after a two-minute period which allows all inputs to be scanned and checked for reliability. (5) Alarm message flags are reset causing every message in alarm to be reprinted after a transfer.

When transferring from the control to the backup machine all M/A stations for the boiler will reject to manual and the turbine will transfer to manual.

Panel Reference Subroutine

General

This program is utilized as its name indicates to develop the feedwater reference and plant reference for the boiler and combustion control systems. This program executes on a one second interval and is also used to transmit real and logical data between the boiler and turbine controls. The transmission of data between the boiler and turbine is bi-directional and is internal to one computer and should not be confused with data link transfers which they are not.

Theory

The panel reference program develops a value of feedwater operator demand. The program then ramps the value of feedwater reference demand [FWREFDMD] up or down as the case may be, to the desired value entered by the plant control operator. The program receives from the panel program a value of feedwater rate of change. This rate of change value is limit checked against constant K7064 which functions as a high limit. Constraints are placed upon the plant operator for the value enterable on feedwater reference demand and is also dependent upon the mode of plant operation. A value for Feedwater Reference can only be entered if the plant is in Feedwater Base Automatic mode or in the ramp mode. Attempts to enter a value for Feedwater Reference Demand will cause Invalid Request light to flash on the operator's panel. Any value that is entered by the operator for feedwater reference demand is high/low limit checked. If beyond the limits, the Invalid Request light will also flash but the value that was being attempted to enter into core will not reach the program.

The mechanism used to ramp the feedwater reference is identical to the procedure used on the turbine reference and is documented there.

The Plant Reference function is entered using the same criteria that was applied to the Feedwater Reference Demand. The value of Plant Reference is checked and is capable of being entered only when the unit is operating on coordinated control. If the unit is not coordinated and a reference is attempted to be entered the Invalid Request light will be flashed.

When the unit is operating in separated control the Plant Reference Demand tracks the value of the Feedwater Reference Demand [FWREFDMD] and the plant high and low limit are set equal to the feedwater system high and low load limits.

Within coordinated control there are four modes Local Coordinated, Remote Coordinated, Boiler Follow, and Turbine Follow during which the plant operator can enter the plant load reference using the plant reference pushbuttons. The value that the operator enters for plant rate of change will be limit checked against calibration constant K7065.

The plant reference demand is utilized when operating in the Remote Coordinated mode. For this mode the automatic dispatch computer will be entering a value to recalibrate the plant reference demand [PREFDMD] and will be accomplishing this function from a remote location. The ADS system is designed to operate with time variable pulse width signals whose maximum time is one second in duration. The program will test each pulse and alarm the operator panel annunciator if a long pulse condition occurs, i.e. pulses longer than one second. The program also rejects from Remote Coordinated to Local Coordinated mode of plant control if a long pulse condition occurs. The Remote Coordinated mode will also reject if the DEH turbine program which scan the contact inputs are rejected from demand to a periodic scan basis.

The final feature included in this program is operation of the panel visual displays for the boiler and turbine windows.

Program

Data transfers occur each second between boiler and turbine programs for proper unit coordination and communication. The purpose of these transfers is to exchange necessary logical flags and data values to perform coordinated control. The panel reference program operates as the vehicle to accomplish these data transfers.

Boiler Turbine Transfer Data
Real Data to Boiler
Item 1—Low pressure turbine exhaust.
Item 2—Turbine speed.
Item 3—Plant Reference Demand.
Item 4—Feedwater Reference Demand.
Item 5—Speed feedback factor on load control.
Item 6—Megawatts.
Item 7—Turbine Reference Demand.
Real Data To Turbine
Item 1—Plant load reference, adjusted for contingency conditions.
Logicals to Boiler
Item 1—Combination ADS reject logical, which contains the following logical variables: ADSPERM, ADSREJ, PERSCAN.
Item 2—Low pressure exhaust analog input unreliability.
Item 3—Turbine manaul.
Item 4—Combination reject MWI, IPI and LPCORR logical variables.
Item 5—Valve position limiting.
Item 6—Digital speed channel hardware failure.
Item 7—Throttle pressure transducer unreliability.
Item 8—Megawatt transducer unreliability.
Logicals to Turbine
Item 1—Coordinated mode.
Item 2—Automatic Dispatch system mode.
Item 3—Ramp mode.
Item 4—Feedwater Auto submode.
Operator Panel In FIGS. 10A, B, and C there is shown a schematic representation of the operator panel 73 which is divided into a boiler section 73B, a plant and computer section 73P, and a turbine section 73T. In the lower part of the panel, there are provided a plurality of boiler manual/auto stations, and only the BFP7-1 lube oil temperature station is detailed. Thus, an indicator 73B1 is provided to display the temperature and a manual/automatic selector pushbutton 73B2 provides for stepping the BFP7 temperature control between manual and automatic control with successive pressings of the pushbutton. Reference is made to FIGS. 64 and 65 where there is shown the logic circuitry used to respond to pushbutton and computer commands for a typical manual/auto station.

A pushbutton 73B3 provides for incrementing the temperature setpoint while a pushbutton 73B4 provides for decrementing the temperature setpoint. If the station is in automatic, operation of the increment or decrement pushbutton causes the station to reject to manual. Other manual/automatic stations on the panel section 73B are like the lubication oil temperature station, and they are therefore indicated by blocks with the station name. However, the PRE BLR CLN-UP is provided only with increment and decrement pushbuttons.

Generally, the manual/automatic pushbuttons are provided with wiring code numbers extending from 41-12, 42-12, 43-12 for the buttons 73B4, 73B2 and 73B3, respectively to 145-12, 146-12 and 147-12 for the recirculation fan 7-2 damper (with numbers being applied consecutively downward in each column of stations and in successive columns to the right with the inclusion of unused stations. As an exception, the station PRE BLR CLN-UP has increment and decrement buttons coded as 80-14 and 81-14.

On the upper part of the boiler panel section 73B, the following table defines the pushbuttons:

| Pushbutton | Function | Wire Code-12 |
|---|---|---|
| COND RB | Condensate System Runback | 1 |
| FD FAN RB | Fan Inlet Damper Runback | 2 |
| BFP RB | Boiler Feed Pump Runback | 3 |
| ST UP AUTO | Start Up Auto | 4 |
| FW AUTO | Feedwater Auto | 5 |
| AIR AUTO | Air Auto | 6 |
| FUEL AUTO | Fuel Auto | 7 |
| SH AUTO | Superheat Auto | 8 |
| RH AUTO | Reheater Auto | 9 |
|  |  | 10 |
| 1 BFP LO | 1 BFP Lube Oil Setpoint | 11 |
| 2 BFP LO | 2 BFP Lube Oil Setpoint | 12 |
| TUR LO | Turbine Lube Oil Setpoint | 13 |
| FUEL OIL | Fuel Oil Temperature Setpoint | 15 |
| GEN H2 | Generator Hydrogen Temperature Setpoint | 16 |
| COND COL | Condensate Cooler Temperature Setpoint | 17 |
| BRG CLG WTR | Bearing Cooling Water Temperature Setpoint | 18 |
| TU | Time Update | 19 |
| BE/BTB TNF | BE/BTB Transfer | 20 |
| HOLD | Reference, Hold | 21 |
| GO | Reference, Go | 22 |
| FW REF | Feedwater Reference | 23 |
| ROC | Rate of Change | 24 |
| REST | Restore Setpoint | 25 |
| MAN | Manual, Boiler | 26 |
| BASE | Base Mode | 27 |
| CORD | Coordinated Control Mode | 28 |
| FR/FW-M/A | Firing Rate/Feedwater Ratio M/A Pushbutton | 29 |
| EX AIR M/A | Excess Air M/A | 30 |
| GAS RECIR EX AIR | Gas Recirculation Excess Air | 31 |
| FD BIAS | FD-1 Bias | 32 |
| BFP BIAS | BFP-1 Bias | 33 |
| F/A RATIO | Fuel/Air Ratio | 34 |
| GPFB | Gas Recirculation | 35 |

-continued

| Pushbutton | Function | Wire Code-12 |
|---|---|---|
| | Fan Bias | |
| S-BFP/P-BFP | Sequence BFP/Parallel BFP | 36 |
| OXG SET PT-B | Oxygen Setpoint Bias | 37 |
| BF SET PT-G | Base Fuel Setpoint Gas | 38 |
| BF SET PT-O | Base Fuel Setpoint Oil | 39 |
| FR/FW | Firing Rate/Feedwater Ratio | 40 |
| SEP PR | Separator Press | 308 |
| BASE LOAD GAS | PCT of base load gas | 309 |
| BASE LOAD OIL | PCT of base load oil | 310 |
| | | 311 |

In the plant and computer panel section 73P, the following table defines the pushbuttons:

| Plant Pushbutton | Function | Wire Code-12 |
|---|---|---|
| ACTD | Auto Computer Transfer Disabled | 148 |
| MAX L | Max Limit | 149 |
| MIN L | Min Limit | 150 |
| RB | Run Back | 151 |
| BC | Boiler Contingency | 152 |
| TC | Turbine Contingency | 153 |
| DLC | Deviat Limit Control | 154 |
| 2000-1 CF | 2000-1 Computer Failure | 155 |
| 2000-2 CF | 2000-2 Computer Failure | 156 |
| C T/W F | Control T/W Failure | 157 |
| HOLD | Reference, Hold | 158 |
| GO | Reference, Go | 159 |
| MW REF | Megawatt Reference | 160 |
| START | Start Mode | 161 |
| RAMP | Ramp Mode | 162 |
| PM | Plant Manual Mode | 163 |
| LC | Local Coordinated Mode | 164 |
| RC | Remote Coordinated Mode | 165 |
| BF | Boiler Follow Mode | 166 |
| TF | Turbine Follow Mode | 167 |
| LR MW/MIN | Loading Rate MW/MIN | 168 |
| HIGH LIMIT | Plant Reference High Limit | 169 |
| LOW LIMIT | Plant Reference Low Limit | 170 |
| TPS P | Throttle Pressure Setpoint | 171 |
| SU AUTO | Startup Auto | 312 |
| FW AUTO | Feedwater Auto | 172 |
| AIR AUTO | Air Auto | 173 |
| FUEL AUTO | Fuel Auto | 174 |
| SH AUTO | Superheat Auto | 175 |
| RH AUTO | Reheat Auto | 176 |
| | | 177 |
| 2000-1 TO C | Select 2000-1 To Control | 178 |
| 2000-2 TO C | Select 2000-2 To Control | 179 |

| Computer Pushbutton | Function | Wire Code-13 |
|---|---|---|
| IR | Invalid Request | 180 |
| DE | Diagnostic Error | 181 |
| A T/W F | Alarm T/W Failure | 182 |
| L T/W F | Log T/W Failure | 183 |
| U T/W F | Utility T/W Failure | 184 |
| CRT F | CRT Failure | 185 |
| P250 C F | P250 Computer Failure | 186 |
| ADD TO S | Add to Scan | 187 |
| R FROM S | Remove From Scan | 188 |
| CHL | Change High Limit | 189 |
| CLL | Change Low Limit | 190 |
| PAL | Print Alarm Limit | 191 |
| EV | Enter Value | 192 |
| PV | Print Value | 193 |
| AT | Analog Trend | 194 |
| ATR | Analog Trend Review | 195 |
| DT | Digital Trend | 196 |
| OPR | Omitted Point Review | 197 |
| ONR | Off Normal Review | 198 |
| VD | Visual Display | 199 |
| VDR | Visual Display Review | 200 |
| UC | Update Clock | 201 |
| AA | Annunciator Acknowledge | 202 |
| A TEST | Annunciator Test | 203 |
| | | 204 |
| | | 205 |
| PTR | Post Trip Review | 206 |
| | | 207 |
| DL | Demand Log | 208 |
| DC | Device Change | 209 |
| | | 210 |
| GR | Group Review | 211 |
| | | 212 |
| DPC | Demand Performance Calculations | 213 |
| CRT C | CRT Clear | 214 |
| | | 215–217 |
| C | Clear | 218 |
| A through - | Keyboard | 219–234 |
| BPT S P | Boiler Plant Turbine Setpoint | 235 |
| E/E | Execute/Enter | 236 |
| | | 237 |
| S/C | Stop/Cancel | 238 |
| ADDRESS | | 239 |
| VALUE 1 | | 240 |
| VALUE 2 | | 241 |
| VALUE 3 | | 242 |

In the turbine panel section 18C, the following table defines the pushbuttons:

| Turbine Pushbutton | Function | Wire Code-12 |
|---|---|---|
| TPM | Throttle Pressure Monitor | 313 |
| TT | Turgine Trip | 243 |
| CS CM | Control Speed Channel Monitor | 244 |
| OPC SCM | OPC (Overspeed Protection Controller) Speed Channel Monitor | 245 |
| MW TM | Megawatt Transducer Monitor | 246 |
| OPC PTM | OPC Pressure Transducer Monitor | 247 |
| OPC M | OPC Monitor | 248 |
| IMP PTM | IMP Pressure Transducer Monitor | 249 |
| EPS | Emergency Power Supply | 250 |
| HNT | Hybrid Not Tracking | 314 |
| HOLD | Reference, Hold | 251 |
| GO | Reference, Go | 252 |
| RPM/MWR | RPM/MW Reference | 253 |
| ROC | Rate of Change | 254 |
| MANUAL | Manual Mode | 255 |
| OPR AUTO | Operator Auto Mode | 256 |
| COORD | Coordinated Mode | 257 |
| LATCH | Auto Stop Latch Solenoid | 258 |
| TAS | Turbine Automatic Startup | 261 |
| ASM | Auto Sync Mode | 268 |
| TPC SP | Setpoint Throttle Pressure Control | 259 |
| TPC IN/OUT | Throttle Pressure Control In or Out | 315 |
| SV/SQV | Single Valve/Sequential Valve | 263 |
| GC | Generator Control | 269 |
| 4KV T | 4KV Transfer Control | 316 |
| INCR RPM/MW | Increment Reference | 265 |

-continued

| | | |
|---|---|---|
| DECR RPM/MW | Decrement Reference | 266 |
| HOLD RPM/MW | Hold Reference | 267 |
| TPD | Turbine Program Display | 260 |
| TS OFF | Turbine Supervision Off | 262 |
| ORA | Override Alarm | 264 |
| RS TO S | Return Sensor to Scan | 317 |
| OSA | Override Sensor Alarm | 318 |
| TV/GV | TH Valve/Gov Valve Transfer | 270 |
| IMP IN/OUT | Impulse Pressure Loop | 271 |
| MWIN/OUT | Megawatt Loop | 272 |
| SPEED IN/OUT | Speed Loop | 273 |
| TV ▽ | Throttle Valve Decrease | 274 |
| TV △ | Throttle Increase | 275 |
| FA | Fast Action | 276 |
| GV ▽ | Governor Valve Decrease | 277 |
| GV △ | Governor Valve Increase | 278 |
| VS | Valve Status | 279 |
| TV | Throttle Valve | 280 |
| CLOSE | Close Throttle Valve | 282 |
| | | 282 |
| GV | Governor Valve | 283 |
| VT | Valve Test | 284 |
| VPLD | Valve Position Limit Display | 285 |
| VPLL | Valve Position Limit Lower | 286 |
| VPLR | Valve Position Limit Raise | 287 |

| Turbine Pushbutton | Function | Wire Code-13 |
|---|---|---|
| TV1-OPEN/TV1-CLOSED | Throttle Valve | 288 |
| GV1-OPEN/GV1-CLOSED | Governor Valve | 289 |
| GV3-OPEN/GV3-CLOSED | Governor Valve | 290 |
| GV5-OPEN/GV5-CLOSED | Governor Valve | 291 |
| GV7-OPEN/GV7-CLOSED | Governor Valve | 292 |
| TV3-OPEN/TV3-CLOSED | Throttle Valve | 293 |
| TV2-OPEN/TV2-CLOSED | Throttle Valve | 294 |
| GV2-OPEN/GV2-CLOSED | Governor Valve | 295 |
| GV4-OPEN/GV4-CLOSED | Governor Valve | 296 |
| GV6-OPEN/GV6-CLOSED | Governor Valve | 297 |
| GV8-OPEN/GV8-CLOSED | Governor Valve | 298 |
| TV4-OPEN/TV4-CLOSED | Throttle Valve | 299 |
| RV1-OPEN/RV1-CLOSED | Reheater Valve | 300 |
| RV2-OPEN/RV2-CLOSED | Reheater Valve | 301 |
| IV1-OPEN/IV1-CLOSED | Interceptor Valve | 302 |
| IV3-OPEN/IV3-CLOSED | Interceptor Valve | 303 |
| IV2-OPEN/IV2-CLOSED | Interceptor Valve | 304 |
| IV4-OPEN/IV4-CLOSED | Interceptor Valve | 305 |
| TEST RV1 GROUP | Reheater Valve | 306 |
| TEST RV2 GROUP | Reheater Valve | 307 |

COMPUTER STARTUP PROCEDURES

Condition of Computer:

1. #1 Dead, no power
2. #2 Dead, no power
3. No programs in either machine, and nothing is loaded on the disc.
4. Plant operating on Manual, or shut down.

Procedure to Start Computer #1

1. Apply power 2. Load the Absolute Binary Loader using the P2000 Maintenance Panel
3. Load Monitor and Programmer's Console. It is necessary to have the PC connected to use disc functions for storing programs.
4. Load all system programs using the monitor and programmer's console functions.
5. After loading programs, write an unmodified image of the programs on disc.

6. Bootstrap system "Execution Mode" programs from disc to to core. The power fail routine will perform several operations which initialize the computer hardware/software for control. Those operations generally are:
(a) Reset all computer contact outputs (CCO's)
(b) Zero all dynamic controller data for both boiler and turbine
(c) Scan all computer contact inputs (CCI's)
(d) Scan all analog inputs (AI's)
7. Enable the 60 cycle sync switch on the I/O card or P2000 Main Frame Maintenance Panel Pushbuttons.

As a result of this operation, the Dead Computer Detection system will execute several program functions prior to arming the DD card (Dead Computer Contact). During the interval, all system programs will be executed and in effect be tracking the manual operation of the plant. However, until complete, the computer can perform no plant control functions.

8. At the conclusion of Stop/Initialize execution, the "2000-1 COMP FAILURE" light will be flashed signifying to the operator that his attention is required. Any time after the light starts flashing, the operator may press the pushbutton causing the computer to turn the light off and reset.

Prior to acknowledgement, the computer has no capability of performing output operations to the operator panel or plant hardware. Only after acknowledgment will the computer allow any control functions to occur. While both computers are dead, nothing but the hybrid lit Monitor lights will be on.

9. Upon determination that the computer has been reset, the "SELECT 2000-1 TO CONTROL " light will automatically light indicating that it was selected. When P2000-2 is dead and P2000-1 is alive, it will be selected forcibly.

Since a typewriter may not always be connected to the controlling computer, messages will be documented indicating status if typewriter is available.

10. After loading the computer, resetting the controller, and having it selected for control several operator functions must be performed in order to have automatic control. Setpoints, Rate of Change, Biases, etc., are entered and/or verified prior to transfer of control to automatic.

Condition of Computer

1. #1 Dead, no power
2. #2 Dead, no power
3. No programs in either machine, and nothing is loaded on the disc
4. Plant operating on Manual, or shut down.

Procedure to Start Computer #2

1. Apply power.
2. Load the Absolute Binray Loader using the P2000 Maintenance Panel.
3. Load Monitor and Programmer's Console. It is necessary to have the PC connected to use disc functions for storing programs.
4. Load all system programs using the monitor and programmer's console functions.
5. After loading programs, write and unmodified image of the programs on disc.
6. Bootstrap system "EXECUTION MODE" programs from disc to core. The power fail routine will perform several operations which initialize the computer hardware for control. Those operations are:

(a) Reset all computer contact outputs (CCO's)
(b) Zero all dynamic controller data for both boiler and turbine.
(c) Scan all computer contact inputs (CCI's)
(d) Scan all analog inputs (AI's)

7. Enable the 60 cycle sync switch on the I/O card or P2000 Main Frame Maintenance Panel Pushbuttons.

As a result of this operation, the Dead Computer Detection system will execute several program functions prior to arming the DD card (Dead Computer Contact). During the interval, all system programs will be executed, and in effect be tracking the manual operation of the plant. However, until complete, the computer can perform no plant control functions.

8. At the conclusion of Stop/Initialize execution, the "2000-2 COMP FAILURE" light will be flashed signifying to the operator that his attention is required. Any time after the light starts flashing the operator may press the pushbutton causing the computer to turn the light off and reset.

Prior to achknowledgment, the computer has no capability of performing output operations to the operator panel or plant hardware. Only after acknowledgment will the computer allow any control functions to occur. While both computers are dead, nothing but the hybrid operated Monitor lights will be on.

9. Upon determination that the computer has been reset, the "SELECT 2000-2 TO CONTROL" light will automatically light indicating that it was selected. When P2000-1 is dead and P2000-2 is alive, it will be selected forcibly.

Since a typewriter may not always be connected to the controlling computer, no messages will be documented indicating status.

10. After loading the computer, resetting the controller, and having selected for control several operator functions must be performed in order to have automatic control. Setpoints, Rate of Change, Biases, etc., are entered and/or verified prior to transfer to control to automatic.

Condition of Computer:

1. #1 Alive and Well
2. #2 Dead
3. Programs are loaded on the disc of computer #2.
4. Plant operating on Auto.

Procedure to Start Computer #2

1. Bootstrap system "EXECUTION MODE" programs from disc to core. The Power Fail Routine will perform several operations which initialize the computer hardware for control. Those operations are:
   (a) Read calibration information across the data link to update standby computer
   (b) Reset all computer contact outputs (CCO's)
   (c) Zero all dynamic controller data for both boiler and turbine control programs.
   (d) Scan all computer contact inputs (CCI's)
   (e) Scan all analog inputs (AI's)

2. Enable the 60 cycle sync switch on the I/O card or P2000 Main Frame Maintenance Panel Pushbuttons.

As a result of this operation the Dead Computer Detection system will execute several program functions prior to arming the DD card (Dead Computer Contact). During the interval all system programs will be executed and in effect be tracking the automatic operation of the plant. However, until complete, the computer can perform no plant control functions.

Incorporated here, but not previously discussed is an evaluation of the other computer's operational status. If one computer is Alive and Well, a transfer will be made to a data link program which eliminates operator updating of setpoints, etc.

3. At the conclusion of Stop/Initialize execution period the "2000-2 COMP FAILURE" light will be flashed signifying to the operator that his attention is required. Any time after the light starts flashing the operator may press the pushbutton causing the computer to turn the light off.

Prior to acknowledgment the computer has no capability to control the plant. Only after Reset acknowledgment will the computer respond to control as established.

At this time the computer is a full backup to the controlling machine. Transfer of control may occur at any time being the result of a failure on the other machine or because the operator has now selected 2000-2 to control.

INFORMATION FOR FIG. 62

UREL ALARM INPUTS AND UREL INPUTS

BE VALVES
BTB VALVES
BT VALVE-1
BT VALVE-2
SD VALVE
BFP 7-1 SPEED
BFP 7-1 MIN. SPEED
BFP 7-2 SPEED
BFP 7-2 MIN. SPEED
IC VALVE
F.D. FAN 7-1 DAMPER
F.D. FAN 7-2 DAMPER
FWB VALVE
FW VALVE
FUEL GAS VALVE
MIN. GAS VALVE
FUEL OIL VALVE
AIR REGISTER-GAS
AIR REGISTER-OIL
S.H. SPRAY VALVE-1
S.H. SPRAY VALVE-2
ISPR VALVE
R.H. SPRAY VALVE-1
R.H. SPRAY VALVE-2
RECIRC. FAN 7-1 DAMPER
RECIRC. FAN 7-2 DAMPER

INFORMATION FOR FIG. 63

AR AND UREL ALARM INPUTS AND AR AND UREL INPUTS

BE VALVES
BE VALVES
BTB VALVES
BTB VALVES
BT VALVE-1
BT VALVE-1
BT VALVE-2
BT VALVE-2
SD VALVE
SD VALVE
BFP 7-1 SPEED
BFP 7-1 SPEED
BFP 7-1 MIN SPEED
BFP 7-1 MIN SPEED

BFP 7-2 SPEED
BFP 7-2 SPEED
BFP 7-2 MIN. SPEED
BFP 7-2 MIN. SPEED
IC VALVE
IC VALVE
F.D. FAN 7-1 DAMPER
F.D. FAN 7-1 DAMPER
F.D. FAN 7-2 DAMPER
F.D. FAN 7-2 DAMPER
FWB VALVE
FWB VALVE
FW VALVE
FW VALVE
FUEL GAS VALVE
FUEL GAS VALVE
MIN. GAS VALVE
MIN. GAS VALVE
FUEL OIL VALVE
FUEL OIL VALVE
AIR REGISTER-GAS
AIR REGISTER-GAS
AIR REGISTER-OIL
AIR REGISTER-OIL
S.M. SPRAY VALVE-1
S.M. SPRAY VALVE-1
S.M. SPRAY VALVE-2
S.M. SPRAY VALVE-2
ISPR VALVE
ISPR VALVE
R.M. SPRAY VALVE-1
R.M. SPRAY VALVE-1
R.M. SPRAY VALVE-2
R.M. SPRAY VALVE-2
RECIRC. FAN 7-1 DAMPER
RECIRC. FAN 7-1 DAMPER
RECIRC. FAN 7-2 DAMPER
RECIRC. FAN 7-2 DAMPER

What is claimed is:

1. A system for controlling the operation of a fossil fired boiler-steam turbine plant, said system comprising:
   (a) boiler control means responsive to an electrical representation of load demand reference for operating the fossil fired boiler to meet the load demand reference;
   (b) an electrohydraulic control system for operating the turbine valves to direct steam from the fossil fired boiler to the turbine;
   (c) turbine control means responsive to the electrical representation of the load demand reference for controlling the operation of said electrohydraulic control system to direct steam into the turbine so that the turbine meets the plant load reference;
   (d) coordinated control means for providing the electrical representation of load demand reference in parallel to said turbine control means and to said boiler control means whereby coordinated control of the fossil fired boiler and steam turbine is achieved;
   (e) means for generating electrical representations of throttle pressure and generated power; and
   (f) said coordinated control means including first and second, distinct control loops responsive to the representations of throttle pressure and generated power, respectively, and each including an integrating controller responsive to the difference between its one representation and a corresponding reference value to modify the load demand reference applied to said boiler control means, and a third control loop including an integrating controller, responsive to the difference between the representation of throttle pressure and a throttle pressure reference for modifying the load demand reference applied to said turbine control means, said integrating controllers capable of processing its input difference signal with varying constants dependent upon the system mode of operation.

2. The system as claimed in claim 1, wherein there is further included means for generating an electrical representation of turbine rotor speed, and a fourth distinct control loop including an integrating controller responsive to the difference between the representation of turbine speed and a reference value to modify the load demand reference to be applied to said boiler control.

3. The system as claimed in claim 1, wherein said integrating controllers are operative in a first mode to integrate the input difference signal with a relatively fast time constant and in a second mode to respond to the difference signal with a relatively slower time constant.

4. The system as claimed in claim 1, wherein one of said integrating controllers comprises a proportional plus integral controller including an integrating circuit and a porportional circuit, said integrating controller including switch means operative in a first mode to apply its input difference signal to said integrating circuit to provide an integrated output therefrom and in a second mode for applying its input difference signal to said proportional circuit to provide a linear output therefrom.

5. The system as claimed in claim 4, wherein said integrating controller of said first control loop comprises said proportional plus integral controller.

6. The system as claimed in claim 1, wherein at least one of said integrating controllers comprises a proportional plus integrating controller including an integrating circuit whose output is coupled to a first input of a summing circuit, and a proportional circuit whose input receives the difference signal to provide a linear output to be applied to a second input of a summing circuit, and a switch disposable from a first position to apply the difference input to said integrating circuit to a second position for disconnecting the difference signal from the input of said integrating circuit, said proportional plus integral circuit operative in a first mode when said switch is disposed in its first position to provide an output corresponding to the integral of the difference signal and in a second mode when said switch is disposed to its second position to provide a proportional linear output.

7. The system as claimed in claim 1, wherein there is included means for providing an electrical representation of a turbine speed/load reference, first transition means operative in a first mode for applying the turbine speed/load reference to said electrohydraulic control system for operating the turbine valves in response to the turbine speed/load reference and in a second mode for applying the plant load reference to said electrohydraulic control system to control the turbine valves according to the plant load reference, means for providing an electrical representation of a feedwater reference, and second transition means operative in a first mode for applying the feedwater reference to said boiler control means to operate the boiler in accordance with the feedwater reference and in a second mode for applying the plant load reference to said boiler control means to operate the boiler in accordance with the plant load reference.

8. The system as claimed in claim 7, wherein there is included selector means for disposing said first and second transition means to their second mode to operate said control system in a coordinated mode wherein said boiler and turbine control means are responsive to the plant load reference to operate the boiler and turbine, respectively, and alternatively, for disposing said first and second transition means to their first mode to operate said control system in an uncoordinated mode wherein the boiler control is operative in accordance with the feedwater reference and said turbine control is operative in accordance with the turbine speed/load reference.

9. The system as claimed in claim 8, wherein said selector means is capable of selecting a local coordinated mode wherein the plant load reference is entered through an operator's panel, or a remote coordinated mode wherein the plant load reference is supplied from a remote automatic dispatching system.

10. The system as claimed in claim 8, wherein said selector means is capable of selecting a ramp mode wherein said second transition means is disposed to its second mode; and there is further included means for generating an increasing ramp reference, means for comparing said ramp reference with the representation of throttle pressure to develop an error signal, and means for trimming the feedwater reference in response to the error signal.

11. The system as claimed in claim 10, wherein there is included means for generating a second, decreasing ramp reference, and means actuatable before the initiation of the ramp mode to apply the decreasing ramp reference, if the throttle pressure representation exceeds the initial point from which the first-mentioned ramp reference begins.

12. The system as claimed in claim 10, wherein said ramp generating means includes means for setting an input signal indicative of the final point to which the increasing ramp reference is to be directed, a difference circuit responsive to the input signal and the output of said ramp generator for providing a difference signal, means responsive to a difference signal above a predetermined level to provide a first reference signal, and means responsive to the difference signal below the predetermined level to provide a second reference signal, and integrating means responsive to the first and second reference level signals to generate an ouput corresponding to the integrated value of one of the reference signals.

13. The system as claimed in claim 12, wherein said ramp generating means includes first and second proportional circuits for providing, respectively, the first and second reference signals of constant values, said integrator circuit providing in response to one of the constant level reference signals a corresponding ramp output signal.

14. The system as claimed in claim 8, wherein said selector means operates said control system in a start mode, and disposes said first and second transition means to their first mode.

15. The system as claimed in claim 7, wherein said first and second transition means each effects a smooth transfer from its first mode to its second mode whereby a bumpless transfer is effected in the application of the plant load reference to said boiler and turbine controls.

16. The system as claimed in claim 15, wherein at least one of said integrating controllers is operative in a first mode to integrate the difference signal applied thereto with a first, relatively fast time constant, and in a second mode to be driven by a predetermined reference signal at a second, relatively slow time constant toward a predetermined level in synchronism with the transitions of said first and second transition means.

17. The system as claimed in claim 1, wherein there is included means for selecting the mode of operation of said coordinated control means, and means responsive to a boiler contingency condition to actuate said selecting means to operate said control system in its turbine follow mode.

18. The system as claimed in claim 1, wherein there is included means for selecting one of a plurality of modes in which to operate said coordinated control means, and means responsive to a turbine contingency to actuate said selecting means to operate said control system in its boiler follow mode.

19. The system as claimed in claim 18, wherein said control system including said coordinated control means, said boiler control means and said turbine control means, is implemented in a computer having a central memory for receiving and storing indications of the electrical representations, the boiler and turbine contingency conditions, and indication of the mode in which said control system is operating.

20. The system as claimed in claim 1, wherein there is included a control loop having therein an integrating controller responsive to the difference between the representation of generated power and a corresponding reference for modifying the load demand reference to be applied to said turbine control.

21. The system as claimed in claim 1, wherein there is included means for generating an electrical representation of impulse pressure, a control loop including an integrating controller responsive to the difference between the representation of impulse pressure and a corresponding reference for modifying the load demand reference to be applied to said turbine control.

22. The system as claimed in claim 1, wherein there is included means for selecting one of a plurality of modes in which to operate said coordinated control means, means for providing an electrical representation of turbine speed, a fourth distinct control loop responsive to the difference between the representation of turbine speed and a corresponding reference to trim the plant load reference, a fifth distinct control loop responsive to the power generated for providing a difference signal indicative of the difference between the measured power generated and the modified plant load reference signal, and means responsive to the disposition of said selecting means to operate said control system in its turbine follow mode for applying the modified signal to adjust the throttle pressure reference applied to said third control loop.

23. A system for controlling the operation of a fossil fired boiler-steam turbine plant, said system comprising:
(a) turbine control means responsive to an electrical representation of load demand reference for operating the boiler to meet the load demand reference;
(b) an electrohydraulic control system for operating the turbine valves to direct steam from the fossil fired boiler to the turbine; (c) boiler control means responsive to the electrical representation of the load demand reference for controlling the operation of said electrohydraulic control system to direct steam into the turbine so that the turbine meets the load demand reference; (d) coordinated control means for providing the electrical representation of load demand in parallel to said turbine control means to said boiler control means whereby coordinated control of the fossil fired boiler and steam turbine is achieved; and (e) said turbine control means, said boiler control means and said coordinated control means are implemented in a single computer having a central memory.

24. The system as claimed in claim 23, wherein said coordinated control means includes first and second control loops respectively responsive to representations of throttle pressure and generated power and each including an integrating controller responsive to the difference between its representation and a corresponding reference value to modify the load demand reference applied to said boiler control, and a third control loop including an integrating controller responsive to the difference between a representation of throttle pressure and a throttle pressure reference for modifying the load demand reference applied to said turbine control means.

25. The system as claimed in claim 24, wherein said integrating controllers are operative in a first mode to effect an integration with a first, relatively fast time constant, and in a second mode to process the input difference signal with a second, relatively slow time constant, and means for calibrating the time constants to effect efficient control by said control loops wherein said time constants are entered and stored in said central memory.

26. The system as claimed in claim 23, wherein there is included means for selecting one of a plurality of modes in which said coordinated control system is operated, and means responsive to the operating condition of said selecting means and to the various operating conditions of the turbine and boiler to provide a first manifestation indicating a permission for transfer from one operating state to the next of said coordinated control means, said permission manifestions entered and stored in said central memory whereby said selecting means may be responsive thereto to facilitate the transfer or to prevent the transfer of said coordinated control means from one of its operating modes to another.

27. The system as claimed in claim 26, wherein said condition responsive means sets a priority for the operating modes of said coordinated control means, whereby said coordinated control means is transferred selectively from one mode to the next in sequence to operate the fossil fired boiler-steam turbine plant from an initial cold state to its rated power state.

28. The system as claimed in claim 23, wherein there is included means responsive to certain abnormal turbine conditions for providing flags indicative thereof, said flags entered and stored in said central memory, and means responsive to the stored flags for imposing limits upon the plant load reference as provided by said coordinated control means.

29. The system as claimed in claim 28, wherein said abnormal condition responsive means is responsive to the impairment of the boiler auxiliaries for raising flags indicative thereof.

30. The system as claimed in claim 23, wherein there is included means for generating electrical representations of throttle pressure, generated power, turbine rotor speed and impulse pressure, the electrical representations to be entered and stored in said central memory in preparation to be operated upon by each of said turbine control means, said boiler control means and said coordinated control means.

* * * * *